US012679777B2

(12) United States Patent
Walker et al.

(10) Patent No.: US 12,679,777 B2
(45) **Date of Patent: *Jul. 14, 2026**

(54) MULTILAYER SINTERED CERAMIC BODY

(71) Applicant: Heraeus Covantics North America LLC, Chandler, AZ (US)

(72) Inventors: Luke Walker, Chandler, AZ (US); Matthew Joseph Donelon, Chandler, AZ (US); Saurabh Waghmare, Chandler, AZ (US); Lillan Thompson, Chandler, AZ (US)

(73) Assignee: Heraeus Covantics North America LLC, Chandler, AZ (US)

( * ) Notice: Subject to any disclaimer, the term of this patent is extended or adjusted under 35 U.S.C. 154(b) by 549 days.

This patent is subject to a terminal disclaimer.

(21) Appl. No.: 18/257,209

(22) PCT Filed: Dec. 17, 2021

(86) PCT No.: PCT/US2021/063973
§ 371 (c)(1),
(2) Date: Jun. 13, 2023

(87) PCT Pub. No.: WO2022/133180
PCT Pub. Date: Jun. 23, 2022

(65) Prior Publication Data
US 2024/0101486 A1 Mar. 28, 2024

Related U.S. Application Data

(60) Provisional application No. 63/177,232, filed on Apr. 20, 2021, provisional application No. 63/127,984, filed on Dec. 18, 2020.

(51) Int. Cl.
*C04B 37/00* (2006.01)
*B32B 7/02* (2019.01)
(Continued)

(52) U.S. Cl.
CPC .............. *C04B 37/003* (2013.01); *B32B 7/02* (2013.01); *B32B 18/00* (2013.01); *C04B 35/10* (2013.01);
(Continued)

(58) Field of Classification Search
None
See application file for complete search history.

(56) References Cited

U.S. PATENT DOCUMENTS 5,262,029 A 11/1993 Erskine et al.
5,798,016 A 8/1998 Oehrlein et al.
(Continued)

FOREIGN PATENT DOCUMENTS

CN 108105604 A 6/2018
EP 1676935 A2 7/2006
(Continued)

*Primary Examiner* — David Sample
(74) *Attorney, Agent, or Firm* — Dicke, Billig & Czaja, PLLC

(57) ABSTRACT

Disclosed herein is a multilayer sintered ceramic body comprising at least one first layer comprising poly crystalline YAG, wherein the at least one first layer comprising poly crystalline YAG comprises pores wherein the pores have a maximum size of from 0.1 to 5 μm, at least one second layer comprising alumina and zirconia wherein the zirconia comprises at least one of stabilized and partially stabilized zirconia, and at least one third layer comprising at least one of YAG, alumina, and zirconia, wherein an absolute value of the difference in coefficient of thermal expansion (CTE) between the at least one first, second and third layers is from 0 to $0.75 \times 10\text{-}6/°$ C. as measured in accordance with ASTM E228-17, wherein the at least one first, second and third layers form a unitary, multilayer sintered ceramic body. Methods of making are also disclosed.

34 Claims, 40 Drawing Sheets

94

(51) Int. Cl.
  *B32B 18/00*     (2006.01)
  *C04B 35/10*     (2006.01)
  *C04B 35/645*    (2006.01)

(52) U.S. Cl.
  CPC ...... *C04B 35/645* (2013.01); *B32B 2307/308* (2013.01); *B32B 2307/72* (2013.01); *B32B 2307/7376* (2023.05); *C04B 2235/3217* (2013.01); *C04B 2235/3225* (2013.01); *C04B 2235/3246* (2013.01); *C04B 2235/6021* (2013.01); *C04B 2235/612* (2013.01); *C04B 2235/656* (2013.01); *C04B 2235/6581* (2013.01); *C04B 2235/662* (2013.01); *C04B 2235/77* (2013.01); *C04B 2237/064* (2013.01); *C04B 2237/068* (2013.01); *C04B 2237/343* (2013.01)

(56) References Cited

U.S. PATENT DOCUMENTS

| | | | |
|---|---|---|---|
| 5,838,529 | A | 11/1998 | Shufflebotham et al. |
| 5,911,852 | A | 6/1999 | Katayama et al. |
| 5,998,003 | A | 12/1999 | Courtright et al. |
| 6,123,791 | A | 9/2000 | Han et al. |
| 6,352,611 | B1 | 3/2002 | Han et al. |
| 6,858,332 | B2 | 2/2005 | Yamada |
| 7,226,673 | B2 | 6/2007 | Yamada et al. |
| 8,097,105 | B2 | 1/2012 | Shih et al. |
| 8,585,844 | B2 | 11/2013 | Shih et al. |
| 9,869,012 | B2 | 1/2018 | Sun et al. |
| 11,027,454 | B2 | 6/2021 | Kimura et al. |
| 11,376,822 | B2 | 7/2022 | Simpson et al. |
| 2003/0005181 | A1 | 1/2003 | Bau, III et al. |
| 2003/0051811 | A1 | 3/2003 | Uchimaru |
| 2003/0186034 | A1 | 10/2003 | Yamada |
| 2003/0232221 | A1 | 12/2003 | Yamada et al. |
| 2004/0138047 | A1 | 7/2004 | Yamada et al. |
| 2008/0169588 | A1 | 7/2008 | Shih et al. |
| 2011/0151239 | A1 | 6/2011 | Lane et al. |
| 2015/0329430 | A1 | 11/2015 | Sun et al. |
| 2017/0140902 | A1 | 5/2017 | Simpson et al. |
| 2017/0250057 | A1 | 8/2017 | Simpson et al. |
| 2024/0158301 | A1 | 5/2024 | Walker et al. |

FOREIGN PATENT DOCUMENTS

| | | | | |
|---|---|---|---|---|
| JP | 2016208034 A | * | 12/2016 | ....... H01L 21/02274 |
| JP | 2020050536 A | | 4/2020 | |

* cited by examiner

FIG. 1 — Prior Art

1) Pre cast tapes or films

A
B

2) Form Laminate

A
B
P 3 a) Sintering Rate
A > B 3 b) Sintering Rate
A < B co-sinter 4 a) concave sintered body co-sinter 4 b) convex sintered body

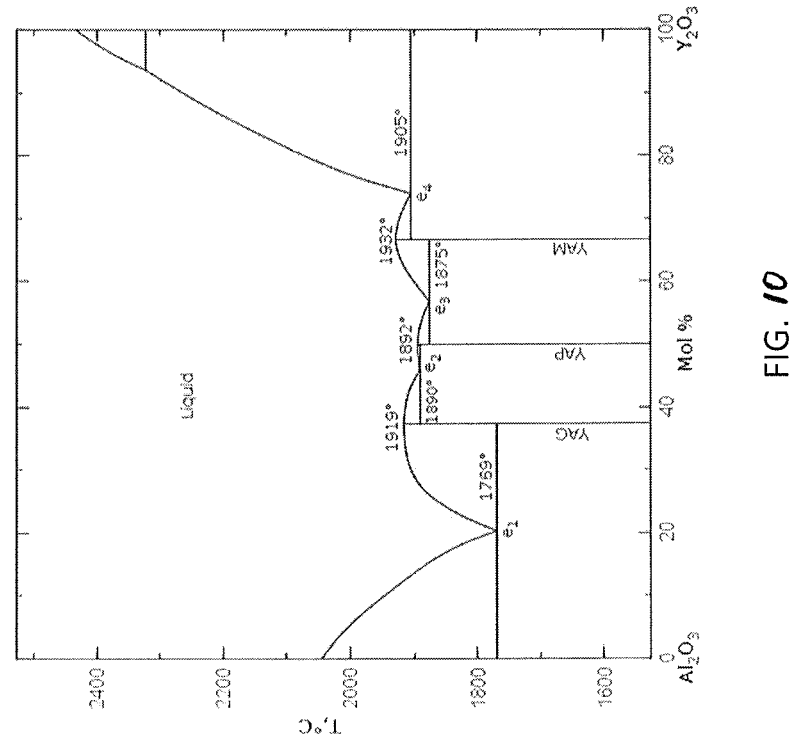
FIG. *10* a)

b)

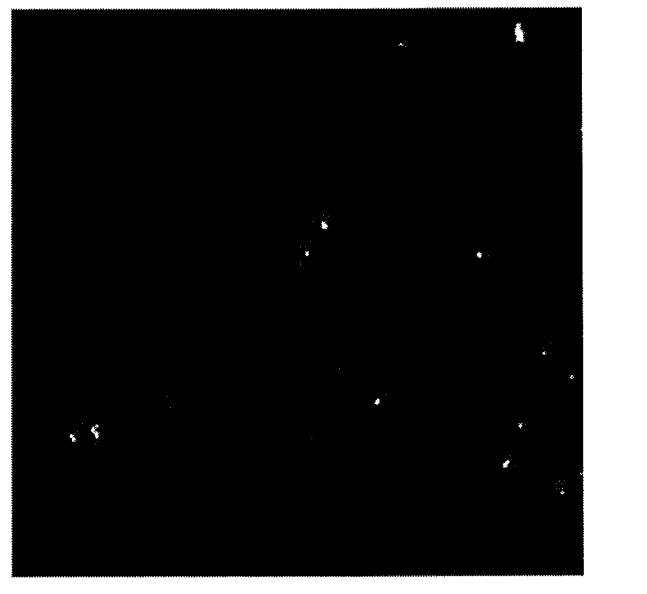
b)
FIG. 12
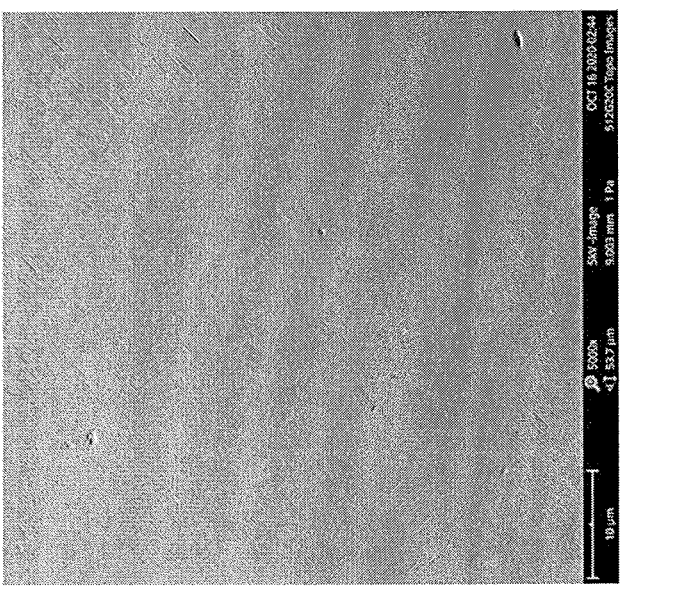
a)

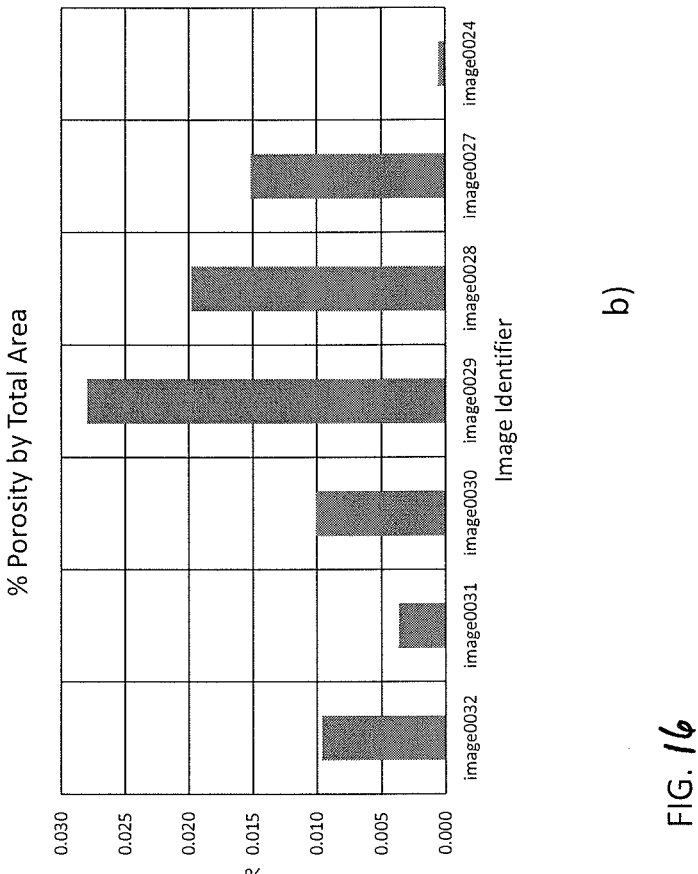
b)
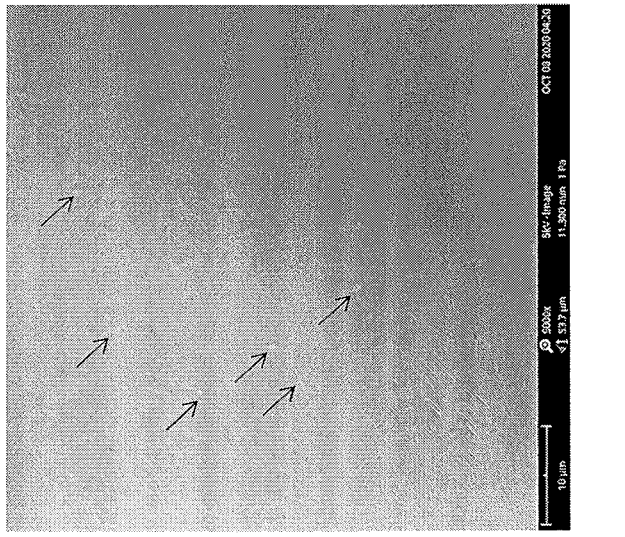
a)
FIG. 16

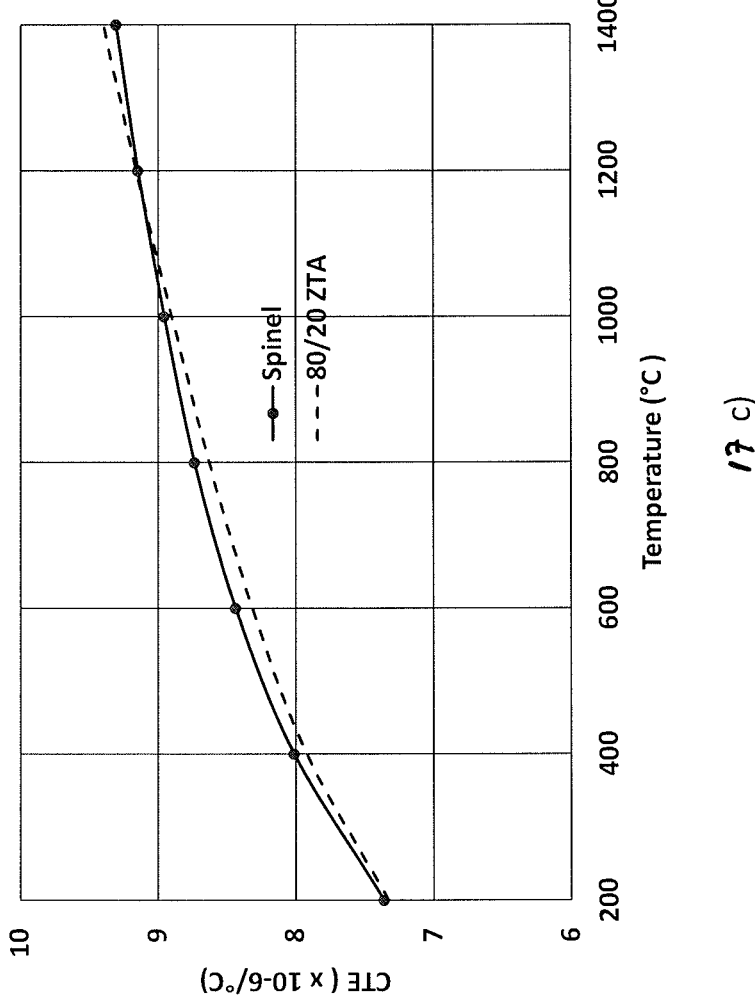
17 C)

spinel

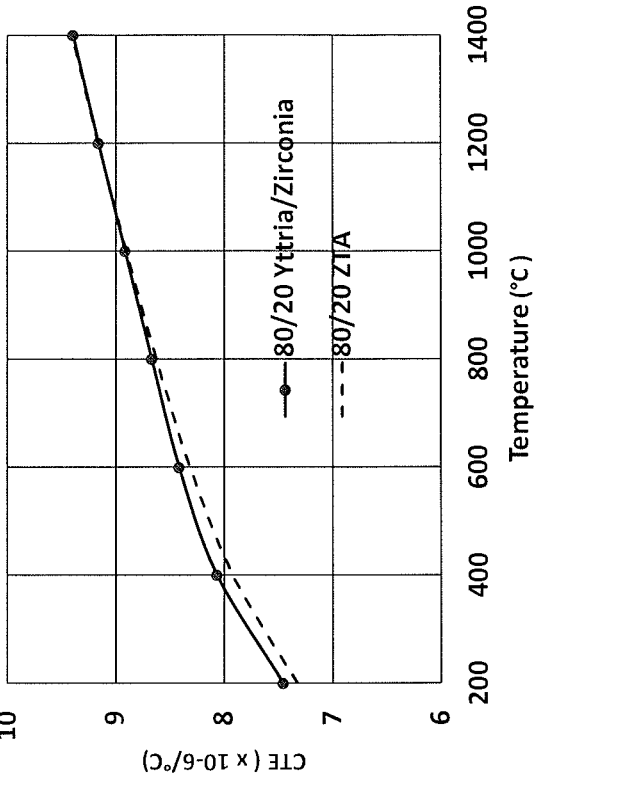
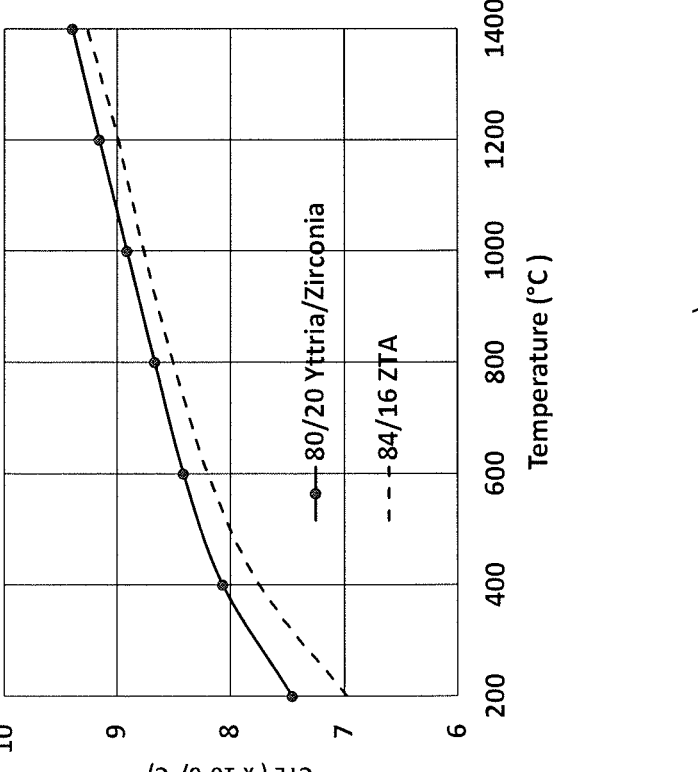
FIG. *20*

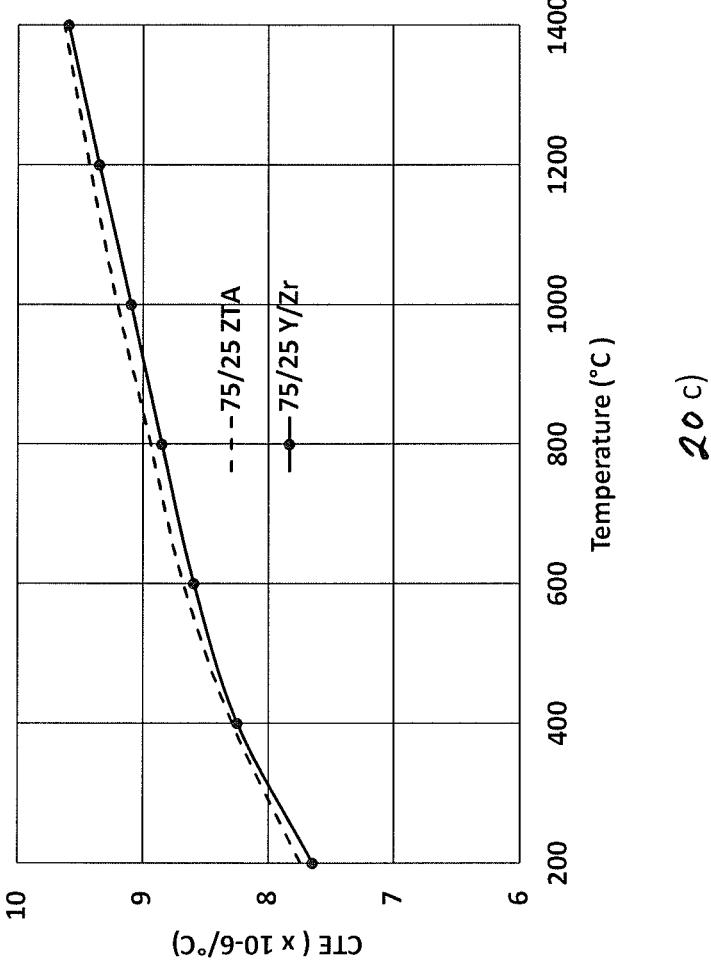
*20 C)*

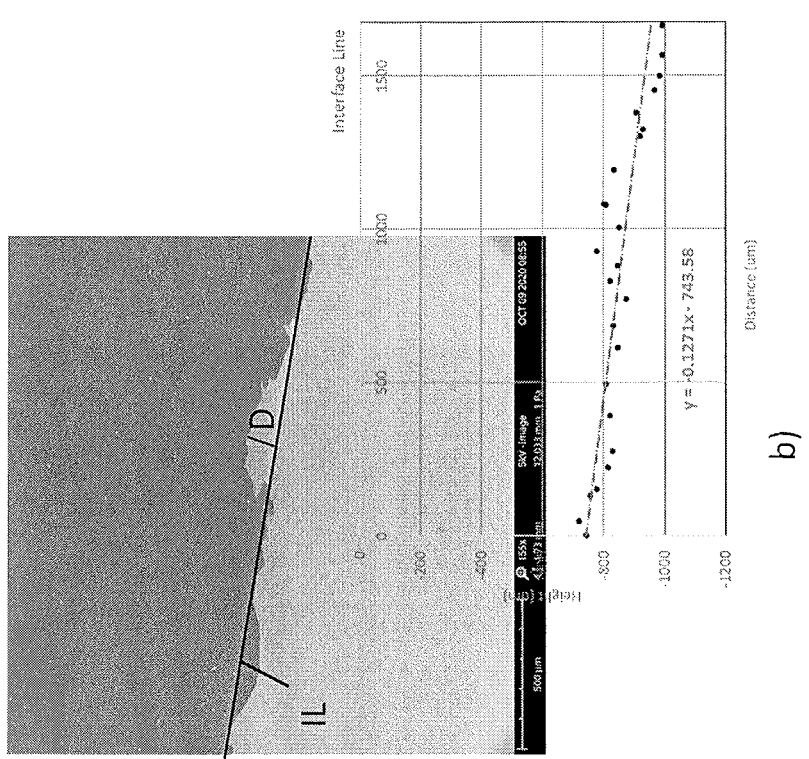
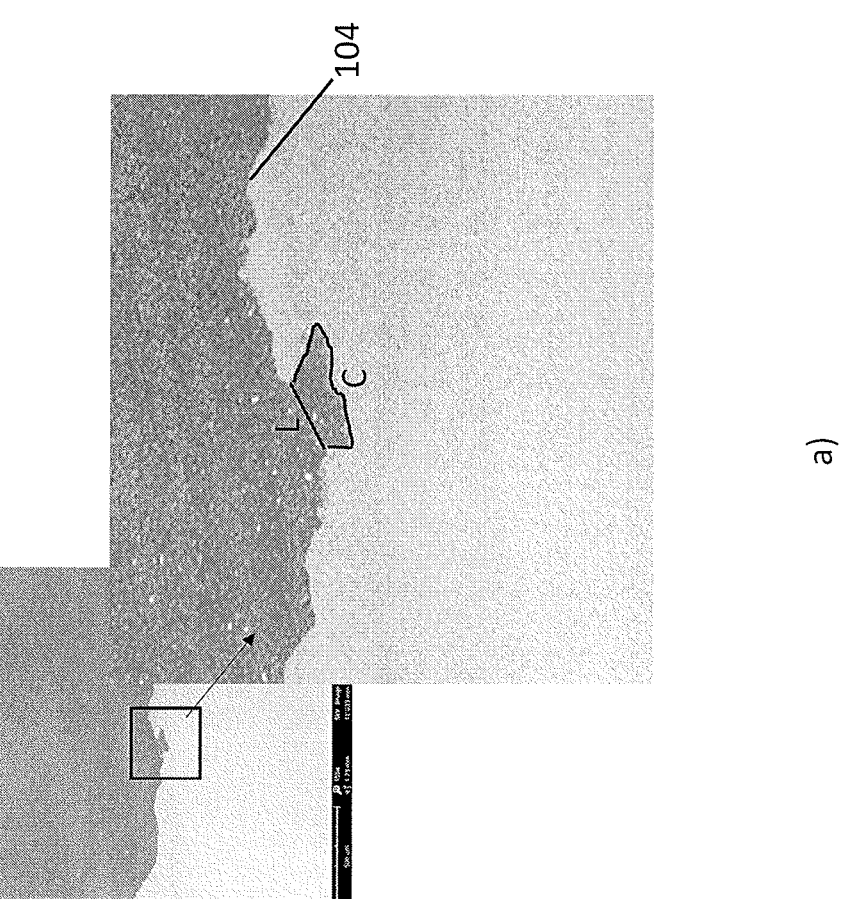
FIG. 23

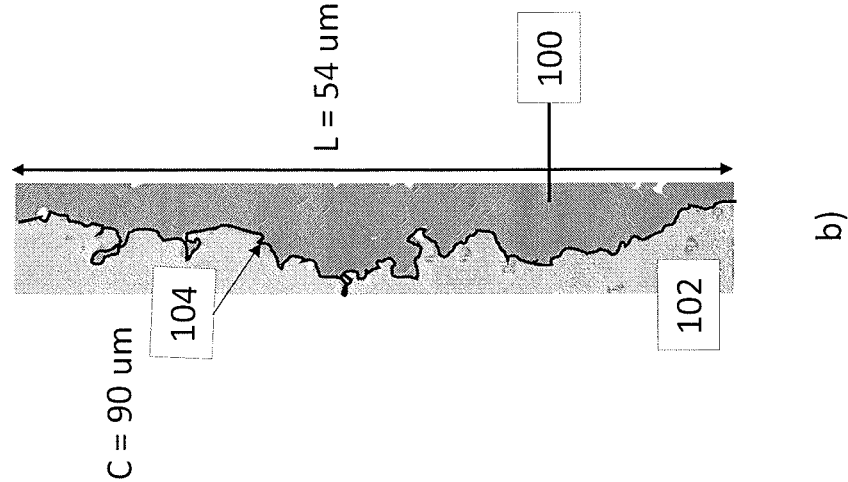
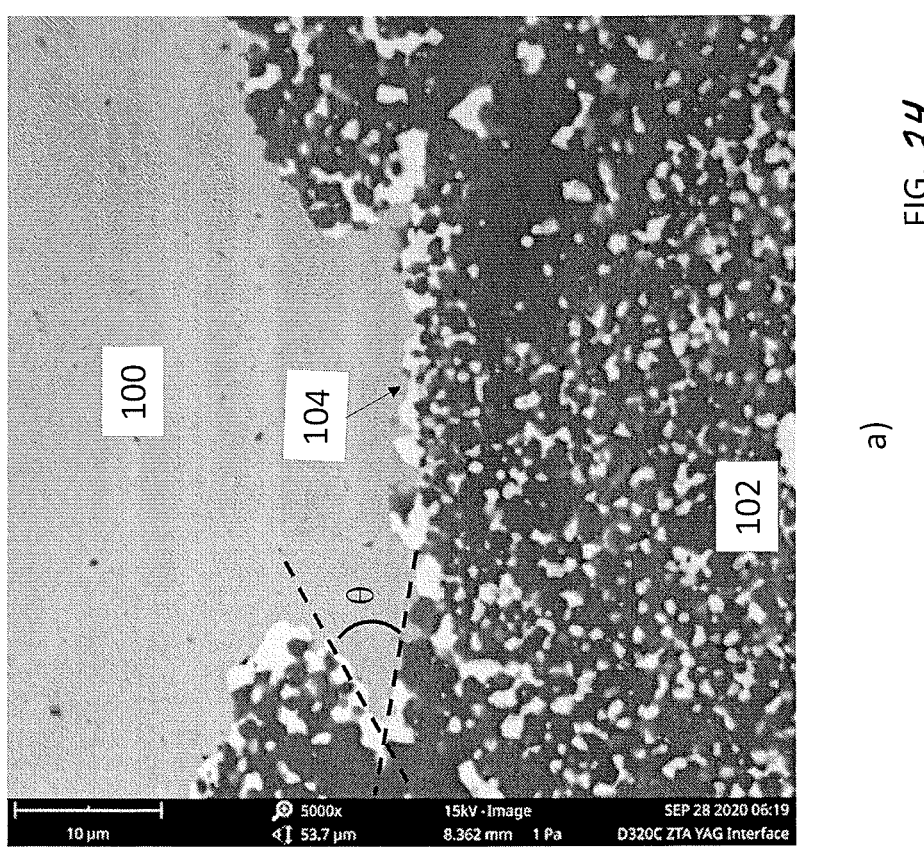
FIG. 24

MULTILAYER SINTERED CERAMIC BODY

TECHNICAL FIELD

The disclosure relates to corrosion-resistant, multilayer sintered ceramics and components formed therefrom, a method of producing the ceramics, and use within semiconductor plasma processing chambers.

BACKGROUND

Semiconductor processing requires the use of halogen-based gases in combination with high electric and magnetic fields to create a plasma environment. This plasma environment is made within vacuum chambers for etching or depositing materials on semiconductor substrates. These vacuum chambers include component parts such as disks or windows, liners, injectors, rings, and cylinders. During semiconductor plasma processing, the substrates are typically supported within the vacuum chamber by substrate holders, as disclosed, for example, in U.S. Pat. Nos. 5,262,029 and 5,838,529. Process gas for creation of the plasma processing environment can be supplied to the chamber by various gas supply systems. Some processes involve use of a radio frequency (RF) field and process gases are introduced into the processing chamber while the RF field is applied to the process gases to generate a plasma of the process gases. Ceramic materials used to form these components, in particular for RF applications, are required to have low dielectric loss tangents, on the order of $1 \times 10^{-3}$ and less. Dielectric losses higher than this cause overheating and hot spots within the components during use, leading to process variability and yield loss. Components fabricated from highly pure starting powders and use of manufacturing processes retaining initial purity will provide sintered ceramics to meet these low loss requirements. The harsh plasma processing environment necessitates the use of highly corrosion and erosion resistant materials for chamber components. These components have been formed from materials that provide resistance to corrosion and erosion in plasma environments and have been described, for example, in U.S. Pat. Nos. 5,798,016, 5,911,852, 6,123,791 and 6,352,611. Moreover, plasma processing chambers have been designed to include parts such as disks, rings, and cylinders that confine the plasma over the wafer being processed. However, these parts used in plasma processing chambers are continuously attacked by the plasma and, consequently, ultimately corrode, erode or accumulate contaminants and polymer build-up. The plasma etch and deposition conditions cause erosion and roughening of the surfaces of the chamber parts that are exposed to the plasma. This corrosion contributes to wafer level contamination through the release of particles from the component surface into the chamber, resulting in semiconductor device yield loss.

To address this, oftentimes chamber components have a surface layer which is resistant to corrosion and erosion upon exposure to the process gases. The surface layer may be formed atop a base or substrate which may have superior mechanical, electrical or other preferred properties. Corrosion resistant films or coatings of for example yttrium oxide or yttrium aluminum garnet (YAG) have been known to be deposited atop a base or substrate formed of a different material which are lower in price and higher in strength than most corrosion resistant materials. Such films or coatings have been made by several methods. Vapor deposition methods have been used to deposit corrosion resistant films on substrates, however vapor deposition is limited to relatively thin layers due to internal film stresses and often small holes are present in the thin film. These internal film stresses cause poor inter-layer adhesion and result in delamination typically at an interface between the corrosion resistant film and the base material, rendering these layers prone to cracking and spalling which thereby leads to undesirable particulate contamination. Corrosion resistant coatings or films made by aerosol or plasma spray techniques typically exhibit high levels of porosity of between 3% to about 50%, and correspondingly low density. Further, these films produced by aerosol or spray methods exhibit poor interfacial adhesion between the substrate material and the corrosion resistant layer, resulting in flaking and exfoliation and subsequent chamber contamination. FIG. 1 schematically illustrates delamination and cracking of films deposited atop a ceramic substrate.

Commercially available methods for film deposition onto sintered substrates limit film thicknesses to less than about 0.45 mm and less. Such film thicknesses often have holes resulting from non-uniformities in the underlying substrate, and the presence of holes and limited film thickness makes the film surface layer prone to cracking, exposing the underlying substrate to corrosive process gases and particle generation during processing.

Other approaches to form corrosion resistant, high strength sintered bodies and/or components involves laminating pre-cast films, applying pressure to the films to form a laminate, followed by co-sintering of the laminate. These methods typically use pressureless sintering and the flatness of the sintered body is dependent upon closely matching the sintering rates of the respective films. As depicted schematically in FIG. 2, if the sintering rate of the top film (film A) is greater than that of the bottom film (film B), the sintered ceramic laminate will have a concave curvature, whereas if the sintering rate of the bottom film (film B) is greater than that of the top film (film A), the sintered ceramic laminate will have a convex curvature (both as configured with the top film, film A, facing upwardly). Variances in sintering rates create residual stress in the sintered laminate, making it prone to breakage, microcracking and subsequent particle release, in particular at large dimension. Thus, materials selected for co-sintering are limited to those having the same or very similar sintering profiles of time, temperature and duration as known to those skilled in the art. Additionally, these sintered laminates often exhibit poor interfacial adhesion between layers, resulting in peeling and spalling of the top layer, combined with low densities, making them prone to breakage, delamination and cracking.

Drilling of holes and machining of features in order to form a component from ceramic bodies may result in small, visually undetectable microcracks beneath (subsurface) and on the surface of these brittle, nonmetallic materials. This surface and subsurface damage may lead to particle contamination due to erosion or spalling of the brittle material and/or fracture. Machinability of the components formed from brittle materials becomes increasingly challenging to prevent the release of particles into the plasma processing chamber and/or prevent fracture and cracking, in particular at large component dimensions.

As a result, there is a need in the art for a multilayer sintered ceramic body having the combined properties of plasma resistance, high adhesion between layers, high mechanical strength and improved machinability for use in plasma processing chambers. In particular, there is a need for corrosion resistant, high strength sintered ceramic bodies of large dimension (greater than 100 mm, such as, for example, from 100 mm to 625 mm), to enable fabrication of semiconductor devices at a large scale.

SUMMARY

To meet these and other needs, and in view of its purposes, the disclosure provides embodiments of a multilayer sintered ceramic body and a method for preparing large, multi-layer sintered ceramic bodies with improved mechanical, electrical and thermal properties and ability to be handled.

Sintered ceramic bodies, also referred to herein as multilayer sintered ceramic bodies or corrosion resistant bodies, and methods of making are described herein. These sintered ceramic bodies provide high corrosion resistance to chlorine and fluorine-based process gases, low dielectric loss, high thermal conductivity and enhanced machinability, and are thus desirable for use as components in semiconductor processing chambers utilizing halogen-based process gases. The ceramic bodies are particularly suited for use as large chamber components of dimension 100 mm and greater.

Embodiment 1. A multilayer sintered ceramic body comprising: at least one first layer comprising polycrystalline YAG, wherein the at least one first layer comprising polycrystalline YAG comprises pores wherein the pores have a maximum size of from 0.1 to 5 µm, at least one second layer comprising alumina and zirconia wherein the zirconia comprises at least one of stabilized and partially stabilized zirconia, and at least one third layer comprising at least one selected from the group consisting of YAG, alumina, and zirconia, wherein the at least one second layer is disposed between the at least one first layer and the at least one third layer, wherein an absolute value of the difference in coefficient of thermal expansion (CTE) between any of the at least one first, second and third layers is from 0 to $0.75 \times 10^{-6}/°$ C. as measured in accordance with ASTM E228-17, and wherein the at least one first, second and third layers form a unitary sintered ceramic body.

Embodiment 2. The multilayer sintered ceramic body of embodiment 1 wherein the absolute value of the difference in coefficient of thermal expansion between any of the layers is from 0 to $0.7 \times 10$-6/° C.

Embodiment 3. The multilayer sintered ceramic body as in any one of the preceding embodiments wherein the absolute value of the difference in coefficient of thermal expansion (CTE) between any of the at least one first, second, and third layers is maintained throughout a temperature range of from 200 to 1400° C.

Embodiment 4. The multilayer sintered ceramic body as in any one of the preceding embodiments wherein the at least one first layer has a density of from 4.47 to 4.56 g/cc, as measured according to ASTM B962-17.

Embodiment 5. The multilayer sintered ceramic body as in any one of the preceding embodiments wherein the at least one first layer has an Sa of from 0.0005 to 2 µm as measured according to ISO standard 25178-2-2012 or an Sz of from from 0.3 to 5 µm as measured according to ISO standard 25178-2-2012.

Embodiment 6. The multilayer sintered ceramic body as in any one of the preceding embodiments wherein the at least one second layer comprises zirconia in an amount by volume of from 10 to 30% relative to a volume of the at least one second layer.

Embodiment 7. The multilayer sintered ceramic body as in any one of the preceding embodiments wherein the at least one second layer comprises partially stabilized zirconia.

Embodiment 8. The multilayer sintered ceramic body as in any one of the preceding embodiments having a greatest dimension of from 100 to about 625 mm.

Embodiment 9. The multilayer sintered ceramic body as in any one of the preceding embodiments wherein the at least one second layer comprises about 16% by volume of zirconia relative to a volume of the at least one second layer.

Embodiment 10. The multilayer sintered ceramic body as in any one of the preceding embodiments wherein the at least one first layer comprises polycrystalline YAG in an amount by volume of from 98 to 99.9%, and the balance comprising at least one crystalline phase selected from the group consisting of aluminum oxide, yttrium oxide, YAM and YAP and combinations thereof as measured using XRD, SEM and image processing methods.

Embodiment 11. The multilayer sintered ceramic body as in any one of the preceding embodiments wherein the at least one first layer comprising polycrystalline YAG comprises pores wherein the pores have a maximum size of from 0.1 to 1 µm as measured using SEM.

Embodiment 12. The multilayer sintered ceramic body as in any one of the preceding embodiments wherein the at least one first layer comprising polycrystalline YAG has a cumulative pore distribution of from about 2 to about 800 $\mu m^2/mm^2$ as measured using SEM.

Embodiment 13. The multilayer sintered ceramic body as in any one of the preceding embodiments wherein the at least one first layer comprising polycrystalline YAG has porosity by percentage of surface area of from 0.0005 to 2% as measured using SEM.

Embodiment 14. The multilayer sintered ceramic body as in any one of the preceding embodiments wherein the at least one first layer comprising polycrystalline YAG has a total impurity content of less than from 5 to 50 ppm relative to the mass of the at least one first layer as measured using ICPMS methods.

Embodiment 15. The multilayer sintered ceramic body as in any one of the preceding embodiments wherein the at least one second layer has a density of from 4.19 to 4.46 g/cc as measured in accordance with ASTM B962-17.

Embodiment 16. The multilayer sintered ceramic body as in any one of the preceding embodiments wherein the at least one second layer comprises zirconia in an amount of 16% by volume and has a density of about 4.32 g/cc as measured in accordance with ASTM B962-17.

Embodiment 17. The multilayer sintered ceramic body of embodiment 20 wherein the at least one second layer has a coefficient of thermal expansion (CTE) of from $6.98 \times 10^{-6}/°$ C. to $9.26 \times 10^{-6}/°$ C. throughout a temperature range of from 200° C. to 1400° C. as measured in accordance with ASTM E228-17.

Embodiment 18. The multilayer sintered ceramic body as in any one of embodiments 19 to 21 wherein the at least one second layer has a dielectric loss of $7 \times 10^{-4}$ and less at a frequency of 1 MHz at ambient temperature as measured in accordance with ASTM D150.

Embodiment 19. The multilayer sintered ceramic body as in any one of the preceding embodiments wherein the at least one second layer has a total impurity content of from 5 to 200 ppm relative to the mass of the at least one second layer as measured using ICPMS methods.

Embodiment 20. The multilayer sintered ceramic body as in any one of the preceding embodiments wherein the at least one first layer has a thickness d1, the at least one second layer has a thickness d2, and the at least one third layer has a thickness d3, wherein the thickness d2, of the at least one second layer is from 60% to 85% of the combined thicknesses of the at least one first, second and third layers.

Embodiment 21. A method of making a multilayer sintered ceramic body, the method comprising the steps of: a) combining powders comprising yttria and alumina to make a first powder mixture; b) combining alumina powder and at least one of partially stabilized and stabilized zirconia powder to make a second powder mixture; c) combining alumina powder, yttria powder and at least one of unstabilized, partially stabilized, and stabilized zirconia powder to make at least one third powder mixture; d) calcining at least one of the first, second, and third powder mixtures by applying heat to raise the temperature of at least one of the powder mixtures to a calcination temperature and maintaining the calcination temperature to perform calcination to form at least one of first, second, and third calcined powder mixtures; e) separately disposing the first, second, and third powder mixtures in an inner volume defined by a tool set of a sintering apparatus to form at least one layer of the first powder mixture, at least one layer of the second powder mixture, and at least one layer of the third powder mixture and creating vacuum conditions inside the volume, wherein the tool set comprises a die comprising a sidewall comprising an inner wall and an outer wall, wherein the inner wall has a diameter that defines the inner volume capable of receiving the powders; and an upper punch and a lower punch operably coupled with the die, wherein each of the upper punch and the lower punch have an outer wall defining a diameter that is less than the diameter of the inner wall of the die thereby defining a gap between each of the upper punch and the lower punch and the inner wall of the die when at least one of the upper punch and the lower punch are moved within the inner volume of the die, wherein the gap is from 10 μm to 100 μm wide; f) applying pressure to the layers of the first, second, and third powder mixtures while heating to a sintering temperature and performing sintering to form the multilayer sintered ceramic body, wherein the at least one layer of the first powder mixture forms at least one first layer, the at least one layer of the second powder mixture forms at least one second layer, and the at least one layer of the third powder mixture forms at least one third layer; and g) lowering the temperature of the multilayer sintered ceramic body, wherein the at least one first layer comprises polycrystalline YAG, and the at least one second layer comprises alumina wherein the alumina comprises at least one of stabilized zirconia and partially stabilized zirconia, and the at least one third layer comprises yttria, alumina, and at least one of unstabilized zirconia, stabilized zirconia and partially stabilized zirconia, wherein the at least one second layer is disposed between the at least one first layer and the at least one third layer.

Embodiment 22. The method as in embodiment 21 wherein the first, second and third powder mixtures have a combined total impurity content of 200 ppm and less as measured using ICPMS.

Embodiment 23. The method as in embodiment 21 or 22 wherein the second powder mixture comprises partially stabilized or stabilized zirconia in an amount by weight of not less than 15% and not greater than 34% relative to the weight of the second powder mixture.

Embodiment 24. The method as in any one of embodiments 21 to 23 wherein the first, second and third powder mixtures are crystalline as determined by x ray diffraction methods.

Embodiment 25. The method as in any one of embodiments 21 to 24 wherein the second powder mixture comprises partially stabilized zirconia.

Embodiment 26. The method as in any one of embodiments 21 to 25 wherein the second powder mixture comprises partially yttria stabilized zirconia.

Embodiment 27. The method as in any one of embodiments 21 to 26 wherein the second powder mixture comprises 3 mol % partially yttria stabilized zirconia.

Embodiment 28. The method as in any one of embodiments 21 to 27 wherein a pressure applied to the at least one first, second and third layers of the first, second and third powder mixtures is from 5 MPa to 100 MPa.

Embodiment 29. The method as in any one of embodiments 21 to 28 wherein the temperature of the calcining step is from 600° C. to 1200° C.

Embodiment 30. The method as in any one of embodiments 21 to 29 wherein the sintering temperature is from 1000° C. to 1700° C.

Embodiment 31. The method as in any one of embodiments 21 to 30, further comprising the steps of: h) optionally annealing the multilayer sintered ceramic body by applying heat to raise the temperature of the multilayer sintered ceramic body to reach an annealing temperature, performing annealing; and i) lowering the temperature of the annealed multilayer sintered ceramic body.

Embodiment 32. The method as in any one of embodiments 21 to 31 further comprising the step of: j) machining the multilayer sintered ceramic body to create a multilayer sintered ceramic component in the shape of a window, a lid, a dielectric window, an RF window, a ring, a focus ring, a process ring, a deposition ring, a nozzle, an injector, a gas injector, a shower head, a gas distribution plate, a diffuser, an ion suppressor element, a chuck, an electrostatic wafer chuck (ESC), and a puck.

Embodiment 33. A multilayer sintered ceramic body made by the process as in any one of embodiments 21 to 32.

Embodiment 34. The multilayer sintered ceramic body of embodiment 33 having a greatest dimension of from 100 to about 625 mm.

The embodiments of the invention can be used alone or in combinations with each other.

BRIEF DESCRIPTION OF THE DRAWINGS

The disclosure is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 10 depicts the yttrium oxide/aluminum oxide two-component phase diagram;

FIG. 12a) depicts a topographic SEM micrograph of a surface of an at least one first layer comprising YAG of FIG. 11 (using topographic imaging methods) and b) a topographic SEM image from the same region of the surface after thresholding to reveal porosity and alumina phases according to embodiments as disclosed herein;

FIG. 16a) depicts an SEM micrograph of a surface of the at least one layer of the multilayer sintered ceramic body comprising YAG, and b) shows the total % of surface area comprising porosity within the 7 images of FIGS. 14 & 15.

FIGS. 20a), b) and c) depict variation in CTE of a unitary, multilayer sintered ceramic body comprising at least one first layer 100 comprising at least one crystalline phase of a ceramic material comprising yttria and zirconia, and embodiments of at least one second layer 102 according to embodiments as disclosed herein.

FIG. 23a) illustrates the tortuosity (T) and b) depicts an average interface line (IL), characterizing the nonlinear interface 104 according to embodiments as disclosed herein;

FIG. 24a) depicts an SEM micrograph at 5000× of nonlinear interface 104 of the multilayer sintered ceramic body and b) illustrates measurement of the tortuosity (T) of the nonlinear interface 104 according to embodiments as disclosed herein;

DETAILED DESCRIPTION

Figure 1:
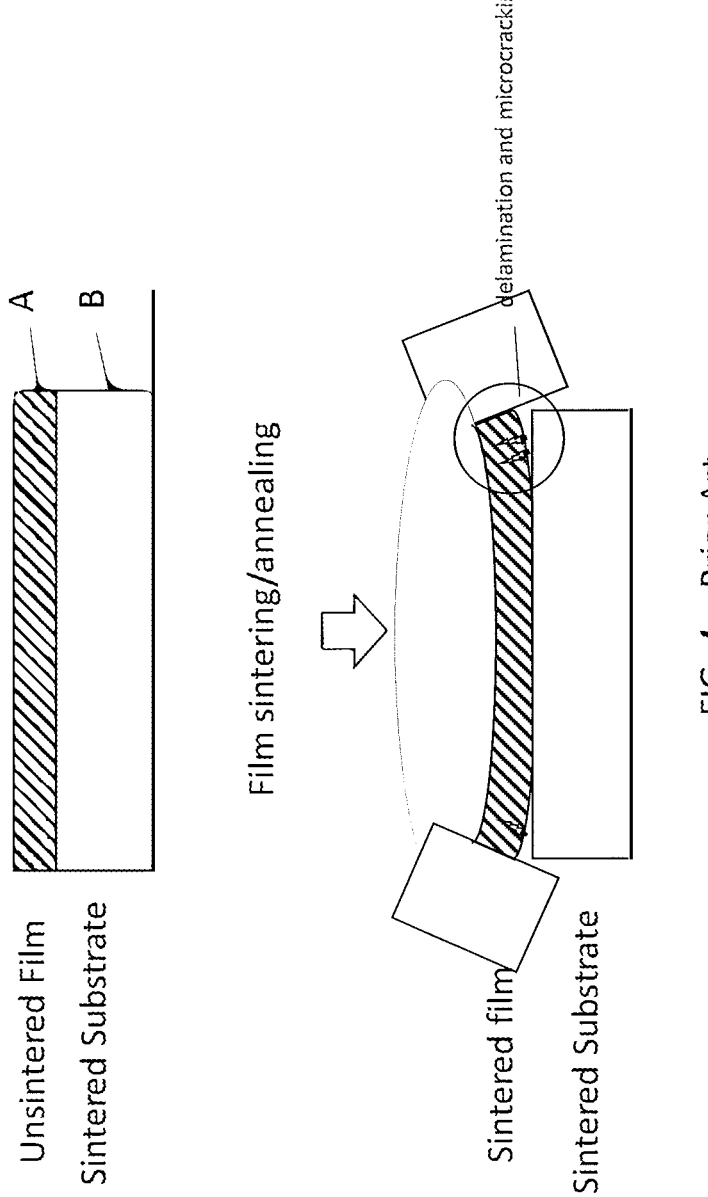
FIG. 1 illustrates a laminate structure as known in the art.

The following detailed description assumes the disclosure is implemented within equipment such as etch or deposition chambers necessary as part of the making of devices upon a semiconductor wafer substrate. However, the invention is not so limited. The work piece may be of various shapes, sizes, and materials. In addition to semiconductor wafer processing, other work pieces that may take advantage of this invention include various articles such as fine feature size inorganic circuit boards, magnetic recording media, magnetic recording sensors, mirrors, optical elements, micro-mechanical devices and the like.

Corrosion resistant ceramics and in particular multilayer sintered ceramic bodies having more than one layer for use as components in semiconductor reactor chambers and the making thereof are described herein. Semiconductor etch and deposition reactors require reactor components having surfaces which have high resistance to corrosion and erosion by halogen containing plasmas necessary for processing. The surfaces preferably minimize release of particles from the component surface into the chamber. Additionally, chamber components must possess enough mechanical strength for handleability and use, in particular at large (>100 mm in diameter) component dimensions. The sintered ceramic bodies may be machined into sintered components and as such, must be able to be handled and machined at large dimension while providing corrosion resistance, low particle generation and high mechanical strength. The sintered ceramic bodies as disclosed herein comprise at least one first layer having at least one polycrystalline ceramic material comprising YAG (yttrium aluminum oxide or yttrium aluminate) of formula $Y_3Al_5O_{12}$, having a garnet structure (with a composition comprising yttria and alumina in a ratio of about 3:5), spinel (magnesium aluminate spinel, $MgAl_2O_4$), and yttria and zirconia, wherein the zirconia is present in the yttria in an amount of not less than 10 mol % $ZrO_2$ and not greater than 25 mol % $ZrO_2$. These materials have excellent corrosion and erosion resistance. The use of these materials results in a semiconductor plasma processing chamber component having a surface which provides improved plasma resistance over other materials when subjected to halogen-based plasma etch and deposition conditions.

In one embodiment, disclosed herein is a multilayer sintered ceramic body comprising: at least one first layer comprising a polycrystalline ceramic material selected from the group consisting of: YAG, magnesium aluminate spinel, and yttria and zirconia wherein the zirconia is present in an amount of not less than 10 mol % and not greater than 25 mol %, at least one second layer comprising alumina and zirconia wherein the zirconia comprises at least one of stabilized and partially stabilized zirconia, and at least one third layer comprising at least one selected from the group consisting of YAG, alumina, and zirconia, wherein the at least one second layer is disposed between the at least one first layer and the at least one third layer, wherein an absolute value of the difference in coefficient of thermal expansion (CTE) between the at least one first, second and third layers is from 0 to $0.75 \times 10^{-6}/°$ C. as measured in accordance with ASTM E228-17, and wherein the at least one first, second and third layers form a unitary sintered ceramic body As the semiconductor fabrication industry moves towards greater semiconductor substrate diameters, chamber components of larger dimension, on the order of 100 to about 625 mm in diameter, are needed. As such, the multilayer sintered ceramic bodies as disclosed herein must have sufficient strength during use and handling to avoid breakage. The multilayer sintered ceramic bodies as disclosed herein further comprise at least one second layer comprising zirconia and alumina which is high in mechanical strength and also having preferable electrical and material properties as disclosed following.

Figure 6:
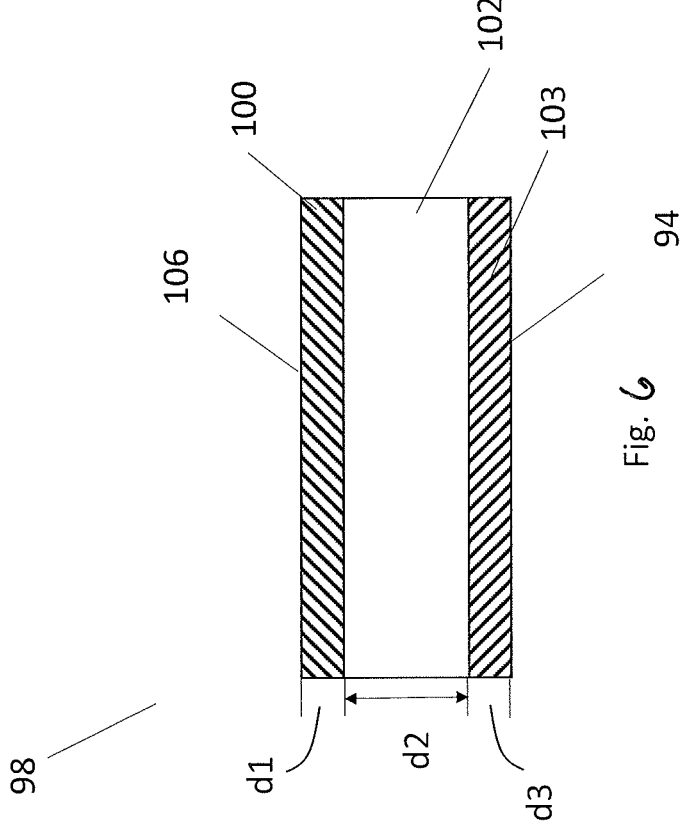
FIG. 6 depicts an exemplary schematic of a multilayer sintered ceramic body according to embodiments as disclosed herein.

Referring to FIG. 6, disclosed is a multilayer sintered ceramic body 98 having at least one first layer 100, which is the outer-most layer, having a plasma facing surface 106 providing resistance to the corrosive and erosive effects of halogen based plasmas and ion bombardment, a controlled distribution of porosity at a small pore size, a high purity, high density, and a low surface roughness. Preferably, the at least one first layer 100 has a coefficient of thermal expansion (CTE) that differs from the CTE of the at least one second layer 102 and the at least one third layer 103 in an amount of from 0 to $0.75 \times 10^{-6}/°$ C. (in absolute value) as measured in accordance with ASTM E228-17. In some embodiments, the CTE of the at least one first and second layers are substantially the same. Further, the multilayer sintered ceramic body 98 according to embodiments of the disclosure comprises a nonlinear interface 104 (see FIG. 21) defined by the at least one first layer 100 and at least one second layer 102, whereby the nonlinear interface 104 may provide enhanced adhesion between the layers.

Embodiments of the disclosure further relate to a specific multilayer sintered ceramic body comprising at least one second layer 102 having a range of compositions comprising zirconia and alumina. Across the compositional range of yttria and zirconia, the at least one second layer 102 exhibits high mechanical strength, enhanced stiffness (Young's Modulus), high thermal conductivity, low dielectric loss, high dielectric constant, and a coefficient of thermal expansion (CTE) which matches the CTE of the at least one first layer 100 and the at least one third layer 103 within the ranges as disclosed.

The at least one third layer 103 comprises multiple phases of at least one of YAG, alumina, and zirconia whereby the at least one third layer provides improved machinability. The at least one third layer 103 may provide a sintering profile similar to that of the at least one first layer 100, thereby providing greater uniformity across the layers during sintering. The CTE of the at least one third layer 103 is CTE-matched to the at least one first and second layers within the ranges as disclosed herein.

At least one first, second and third layers having CTE values within the ranges as disclosed herein provide for the preparation of unitary, multilayer sintered bodies and chamber components fabricated therefrom of large dimension (from 100 mm to about 625 mm). Additionally, methods for the preparation of such a corrosion resistant, multilayer sintered ceramic and the use thereof in plasma processing chambers are disclosed.

DEFINITIONS—As used herein, the following terms are defined following: "Alumina" is understood to be aluminum oxide, comprising $Al_2O_3$, "zirconia" is understood to be zirconium oxide, comprising $ZrO_2$, and "Yttria" is understood to be yttrium oxide, comprising $Y_2O_3$.

As used herein, the terms "semiconductor wafer," "wafer," "substrate," and "wafer substrate," are used interchangeably. A wafer or substrate used in the semiconductor device industry typically has a diameter of 200 mm, or 300 mm, or 450 mm.

As used herein, the term "sintered ceramic body" is synonymous with "multilayer sintered ceramic body", "multilayer corrosion resistant ceramic", "corrosion resistant body", "sintered ceramic", "multi-layer unitary body" and similar terms and refers to a unitary, integral sintered ceramic article formed from co-compacting more than one powder mixture by application of pressure and heat which creates a unitary, dense, multilayer sintered ceramic body. The unitary, multilayer sintered ceramic body may be machined into a unitary, multilayer sintered ceramic component useful as a chamber component in plasma processing applications. As such the multilayer sintered ceramic bodies disclosed herein are not formed by laminating preformed layers together, i.e., the multilayer sintered ceramic bodies disclosed herein are not laminates.

As used herein, the term "co-compacting" or "co-compaction" refers to the process by which at least two loose powder materials are disposed within a die and subjected to pressure to form a powder compact. The powder compact is free of binders, dispersants, and other similar organic matter as is required for the formation of green or shaped bodies, or tapes as is common in the art.

By "unitary" or "integral" is meant a single piece or a single unitary part that is complete by itself without additional pieces, i.e., the part is of one monolithic piece formed as a unit with another part.

The term "substantially," as used in this document, is a descriptive term that denotes approximation and means "considerable in extent" or "largely but not wholly that which is specified" and is intended to avoid a strict numerical boundary to the specified parameter.

As used herein, the term "sintered ceramic component" or "multilayer sintered ceramic component" refers to a sintered ceramic body, multilayer sintered ceramic body or corrosion resistant ceramic after a machining step forming the ceramic into a specific shape of a desired component for use in a semiconductor processing chamber as disclosed herein.

As used herein, the term "powder mixture" means more than one starting powder mixed together prior to a sintering process which after a sintering step are thereby formed into at least one layer of the multilayer sintered ceramic body.

The term "annealing" when applied to heat treatment of ceramics is understood herein to mean a heat treatment conducted on the disclosed multilayer sintered ceramic bodies in air to relieve stress and/or normalize stoichiometry.

As used herein, the term "tool set" is one that may comprise at least a die and at least two punches. When fully assembled, the tool set defines a volume for disposition of the powder mixtures as disclosed.

The term "phase" as used herein is understood to mean a distinct, crystalline region, portion or layer of a sintered ceramic body having a specific crystallographic structure.

A "solid solution" as used herein is defined as a mixture of different elements that share the same crystal lattice structure. The mixture within the lattice may be substitutional, in which the atoms of one starting crystal replace those of the other, or interstitial, in which the atoms occupy positions normally vacant in the lattice.

As used herein, the term "nanopowder" is intended to encompass those powders having a specific surface area of greater than 20 m²/g.

The term "phase" as used herein is understood to mean a distinct, crystalline region, portion or layer of a sintered ceramic body having a specific crystallographic structure.

As used herein, the term "layer" is understood to mean a thickness of material, typically one of several. The material can be, for example, a ceramic powder, a powder mixture, a calcined powder mixture, or a sintered region or sintered portion.

As used herein, "ambient temperature" refers to a temperature range of from about 22° C. to 25° C.

As used herein, the term "purity" refers to the absence of various contaminants in a) a starting material from which a powder mixture may be formed, b) a powder mixture (or calcined powder mixture) after processing, and c) a multilayer sintered ceramic body or component as disclosed herein. Higher purity, closer to 100%, represents a material having essentially no, or very low amounts of, contaminants or impurities, comprising substantially the material compositions present in the starting powders as disclosed.

As used herein, the term "impurity" refers to those compounds/contaminants present in the powders or sintered ceramics other than the intended compounds themselves (starting powders of magnesia, alumina, yttria and zirconia, stabilizing compounds where applicable, powder mixtures and ceramics formed therefrom). Impurities may be present in the starting powders, a powder mixture, the powder mixture after processing, and a sintered ceramic body. ICPMS methods were used to determine the impurity content of the powders, powder mixtures and first and second layers of the sintered body as disclosed herein.

The term "dopant" as used herein is a substance added to a bulk material to produce a desired characteristic in a ceramic material (e.g., to alter electrical properties). Typically, dopants if used are present at low concentrations, i.e., >0.002 wt. % to <0.05 wt.

Impurities differ from dopants in that dopants as defined herein are those compounds intentionally added to the starting powders or to the powder mixture to achieve certain electrical, mechanical, optical or other properties such as grain size modification for example, in the multilayer sintered ceramic body. The term "dopants" as used herein do not include Hf and Y as included in the starting material of zirconium oxide to the extent they may remain in the multilayer sintered ceramic body.

The term "sintering aid" as used herein refers to compounds, such as silica ($SiO_2$), lithia ($Li_2O$), lithium fluoride (LiF), magnesia (MgO), and/or calcia (CaO), that enhance densification, and thereby reduce porosity, during the sintering process. Hf and Y present in the starting powders and to the extent they remain in the sintered ceramic do not comprise sintering aids, impurities or dopants as defined herein.

As used herein, the terms "approximately" and "about" as they are used in connection with numbers or features as disclosed herein allow for a variance of plus or minus 10%.

As used herein, the term "coefficient of thermal expansion (CTE) is measured in accordance with ASTM E228-17 across a temperature range of from 25 to 200° C. to 25 to 1400° C., preferably of from 25 to 1200° C., more preferably of from 25 to 1000° C., more preferably 25 to 800° C., more preferably of from 25 to 600° C., more preferably of from 25 to 400° C., more preferably of from 25 to 200° C. The CTE describes how the size of an object changes with a change in temperature. Specifically, it measures the fractional change in size per degree change in temperature at a constant pressure. To determine the coefficient at a certain temperature, the volume of the material is measured at a reference temperature and the volume of the material is measured at the temperature, for which one would like to determine the CTE. Afterward, based on the differences in volume and temperature the fractional change is determined.

All CTE values for this disclosure were made according to ASTM E228-17. Especially, the reference temperature used was the ambient temperature, especially 25° C. Thus, if a CTE for a given temperature is disclosed (i.e., 200° C.), then the CTE has been determined by the comparison of the volume (or linear expansion for isotropic materials) at said temperate to the volume (or linear expansion for isotropic materials) at ambient temperature, especially 25° C. In any case of contradictions with respect to CTE, the ASTM E228-17 is always the dominating disclosure. In the disclosed examples, the CTE was measured using a vertical dilatometer, in particular, the L75 model, available from Linseis Messgeraete GmbH of Selb, Germany.

During processing of semiconductor devices, corrosion resistant chamber components are used within etch and/or deposition chambers and exposed to harsh corrosive and erosive environments which cause the release of particles into the chamber, resulting in yield loss due to wafer-level contamination. The multilayer sintered ceramic body and related components fabricated therefrom as disclosed herein provide improved plasma resistance, thermal conductivity, and enhanced mechanical strength for use within semiconductor processing chambers by way of specific material properties and features to be described following.

According to one embodiment, disclosed herein is a multilayer sintered ceramic body comprising at least one first layer comprising a polycrystalline phase of a ceramic material selected from the group consisting of YAG, magnesium aluminate spinel, and yttria and zirconia wherein the zirconia is present in an amount of not less than 10 mol % and not greater than 25 mol %, at least one second layer comprising alumina wherein the alumina comprises at least one of stabilized zirconia (SZ) and partially stabilized zirconia (PSZ), and at least one third layer comprising multiple phases of at least YAG, alumina and zirconia, wherein an absolute value of the difference in coefficient of thermal expansion (CTE) between the at least one first, second and third layers is from 0 to $0.75 \times 10$-6/° C. (as measured in accordance with ASTM E228-17), wherein the at least one first, second and third layers form a unitary, multilayer sintered ceramic body.

In one embodiment, the layers exhibit an absolute value of the difference in CTE between the at least one first, second and third layers in an amount of from 0 to $0.75 \times 10$-6/° C., preferably from 0 to $0.7 \times 10$-6/° C., preferably from 0 to $0.6 \times 10$-6/° C., preferably from 0 to $0.5 \times 10$-6/° C., preferably from 0 to $0.45 \times 10$-6/° C., preferably from 0 to $0.4 \times 10$-6/° C., preferably from 0 to $0.35 \times 10$-6/° C., preferably from 0 to $0.3 \times 10$-6/° C., preferably from 0 to $0.25 \times 10$-6/° C., preferably from 0 to $0.2 \times 10$-6/° C., preferably from 0 to $0.15 \times 10$-6/° C., preferably from 0 to $0.1 \times 10$-6/° C., preferably from 0 to $0.08 \times 10$-6/° C., preferably from 0 to $0.04 \times 10$-6/° C., and preferably from 0 to $0.02 \times 10$-6/° C., as measured in accordance with ASTM E228-17 across a temperature range of from 25 to 1700° C. or across a temperature range of from 200 to 1400° C. These ranges of the absolute value of the difference in CTE between the at least one first, second and third layers correspond to a difference in CTE by percentage between any of the at least one first, second and third layers of about 10% and less, preferably 9% and less, preferably 8% and less, preferably 6% and less, preferably 4% and less, preferably 3% and less, preferably 2.5% and less, preferably 2% and less, preferably 1.5% and less, preferably 1% and less, preferably 0.5% and less, and preferably 0.25% and less of the at least one first, second and third layers (as measured relative to the at least one first layer 100). When the CTE between the at least one first layer 100, the at least one second layer 102, and the at least one third layer 103 varies within these ranges, and more specifically when the CTE between the at least one first, second and third layers varies within these ranges across a temperature range of from ambient to about 1700° C. (or from about 200° C. to about 1400° C. as depicted in the figures) as measured in accordance with ASTM E228-17, a unitary multilayer sintered ceramic body, in particular one of large (>100 mm to about 625 mm) dimension, having high strength and high adhesion between layers may be formed using the pressure-assisted methods as disclosed herein. Due to the isotropic properties of the ceramic materials comprising the at least one first, second and third layers as disclosed herein, the coefficient of thermal expansion (CTE) as used herein may refer to either linear or volumetric CTEs interchangeably. It is preferable that the CTE difference between the at least one first, second and third layers is minimized in order to reduce interfacial stresses between layers. CTE differences between the at least one first, second and third layers which are greater than those as disclosed herein may lead to fracture and/or cracking of the multilayer sintered ceramic body.

Referring to FIG. 6, a schematic of the multilayer sintered ceramic body 98 as disclosed herein is depicted wherein 100 represents at least one first layer having a thickness d1, 102 illustrates at least one second layer 102 having a thickness d2, and 103 illustrates at least one third layer 103 having a thickness d3. The multilayer sintered ceramic bodies 98 produced according to the method as disclosed herein (depicting at least one first layer 100 wherein the first layer has a thickness, a second layer 102 wherein the second layer has a thickness, and a third layer 103 wherein the third layer has a thickness) preferably have a thickness of the second layer 102 which is from 70% to 95%, preferably from 70% to 90%, preferably from 70% to 85%, preferably from 80% to 95%, preferably from 85% to 95% of the combined thickness of the 3 layers 100, 102 and 103.

The at least one second layer 102 provides mechanical strength and electrical properties of low dielectric loss tangent (less than $7 \times 10$-4 at 1 MHz) and high dielectric constant of about 12. As such, in some embodiments it may be preferable that a thickness d2 is maximized. In order to provide high mechanical strength and rigidity combined with machinability to form sintered ceramic components from the multilayer sintered bodies as disclosed herein, the thickness d2 of the at least one second layer 102 as depicted in FIG. 6 is preferably greater than each of the thicknesses d1 of the at least one first layer 100, and/or the thickness d3 of the at least one third layer 103. The thickness d1 of the at least one first layer 100 and/or the thickness d3 of the at least one third layer may each be from 0.5 to 5 mm, preferably from 0.5 to 4 mm, preferably from 0.5 to 3 mm, preferably from 0.5 to 2 mm, preferably from 0.5 to 1 mm, preferably from 0.75 to 5 mm, preferably from 0.75 to 3 mm, preferably from 1 to 5 mm, preferably from 1 to 4 mm, preferably from 1 to 3 mm. A multilayer sintered ceramic body as disclosed herein may have a total thickness (d1+d2+d3) of from about 5 to about 50 mm, preferably from about 5 to about 40 mm, preferably from about 5 to about 35 mm, preferably from about 5 to about 33 mm, preferably from about 5 to about 30 mm, preferably from about 8 to about 25 mm, and preferably from about 10 to about 20 mm. In certain embodiments where it may be desirable to minimize the thickness d1 of the at least one first layer 100 and/or the thickness (d3) of the at least one third layer 103, the multilayer sintered ceramic body may be machined after sintering and/or after annealing to reduce the thicknesses d1 and/or d3 of layers 100 and/or 103 to modify electrical properties such as dielectric loss, dielectric constant, thermal conductivity or other properties of the multilayer sintered ceramic body 98 or component formed therefrom.

The multilayer sintered ceramic bodies disclosed herein have at least one first layer 100 wherein the at least one first layer has a thickness, at least one second layer 102 wherein the at least one second layer has a thickness, and at least one third layer 103 wherein the at least one third layer has a thickness, wherein the thickness of the at least one second layer 102 is from 70% to 95%, preferably from 70% to 90%, preferably from 70% to 85%, preferably from 80% to 95%, preferably from 85% to 95% of the combined thickness of the 3 layers 100, 102 and 103, respectively.

In certain embodiments, the thickness d2, of the at least one second layer is from 60% to 85%, preferably from 60% to 80%, preferably from 60% to 75%, preferably from 60% to 70%, preferably from 70% to 85%, preferably from 75% to 85%, preferably from 70% to 80%, preferably from 70% to 75% of the combined thicknesses of the at least one first, second and third layers (d1+d2+d3). The at least one first layer having a thickness d1 comprises a plasma facing surface 106 providing corrosion and erosion resistance to halogen-based plasmas. In embodiments, the thickness d1, of the at least one first layer is from 0.75% to 20%, preferably from 0.75% to 15%, preferably from 0.75% to 12%, preferably from 3% to 20%, preferably from 5% to 20%, preferably from 3% to 15%, preferably from 5% to 12% of the combined thicknesses of the at least one first, second and third layers (d1+d2+d3).

Stresses arising from layers comprising materials having mismatched CTE may impact the mechanical strength and integrity of the multi-layer sintered ceramic body. Accordingly, if the difference in absolute value of the CTE between the at least one first layer 100, the at least one second layer 102, and the at least one third layer 103 of the sintered ceramic body is too great, at least one layer of the multilayer sintered ceramic body may crack, warp and/or fracture upon performing the steps of the method as disclosed herein. This CTE difference is important across all process temperatures, and particularly at elevated temperatures such as those experienced during sintering, annealing and upon cooling, where differences in CTE may result in significant interfacial stresses between layers of the sintered body. As a result, in order to form a multilayer, unitary sintered ceramic body having high mechanical strength, high adhesion strength between layers and sufficient handleability (without cracking or breakage), the CTE difference between the at least one first layer 100, the at least one second layer 102, and the at least one third layer 103 of the multi-layer sintered ceramic body is preferred to be within the disclosed ranges, and further as closely matching as possible. In preferred embodiments at least one first, second and third layers may have respective CTEs which are the same, or substantially the same, in absolute value of CTE, across a temperature range of from ambient temperature (or about 200° C. as disclosed in the figures) to about 1700° C. (or at least to 1400° C. as depicted in the figures) in accordance with the method as disclosed. The term "CTE match" as used herein refers to combinations of the at least one first layer 100, the at least one second layer 102, and the at least one third layer 103 which differ in CTE within the preferred ranges as disclosed (from 0 to about $0.75 \times 10^{-6}/°$ C. in absolute value). According to one embodiment, the at least one first layer 100 may comprise a polycrystalline phase of a ceramic material selected from the group consisting of YAG, magnesium aluminate spinel, and yttria and zirconia, wherein the zirconia is present in an amount of not less than 10 mol % $ZrO_2$ and not greater than 25 mol % $ZrO_2$, whereby the at least one first layer 100 is CTE matched to the at least one second layer 102 (comprising alumina and at least one of stabilized and partially stabilized zirconia), and the at least one third layer 103 (comprising combinations of the at least one first and second layers) to form a unitary, multilayer sintered ceramic body. On a percentage basis, combinations of the at least one first layer 100, the at least one second layer 102, and the at least one third layer 103 may have CTE values (across the temperature ranges as disclosed herein) which match one another in a percentage of about 10% and less, preferably 9% and less, preferably 8% and less, preferably 6% and less, preferably 4% and less, preferably 3% and less, preferably 2.5% and less, preferably 2% and less, preferably 1.5% and less, preferably 1% and less, preferably 0.5% and less, and preferably 0.25% and less of the at least one first, second and third layers (as measured relative to the at least one first layer 100).

Figure 7:
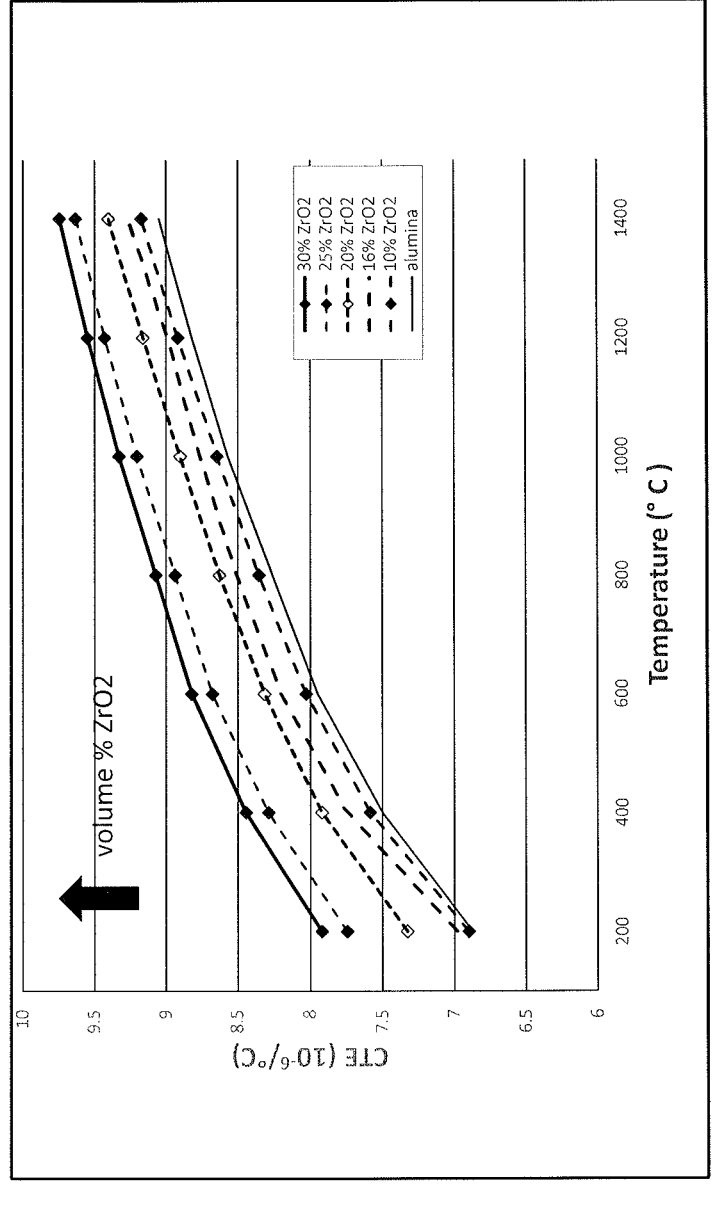
FIG. 7 illustrates variation in CTE for the at least one second layer 102 comprising zirconia in alumina according to embodiments as disclosed herein.

Compositions of the at least one second layer 102 may be selected to produce specific CTE characteristics based upon the volume % of zirconia in alumina as depicted in FIG. 7, which shows exemplary CTE results of the at least one second layer 102 as disclosed herein wherein the second layer comprises zirconia in amounts from 10 to 30% by volume and the balance comprising $Al_2O_3$. The amount of zirconia, and the resultant CTE values of the at least one second layer 102, are preferably CTE matched with the at least one first and third layers across a temperature range corresponding to that of the method, of from ambient temperature (or 200° C. in accordance with the figures) to about 1700° C. (or 1400° C. in accordance with the figures) to fabricate the unitary, multilayer sintered bodies as disclosed herein.

According to one embodiment, the at least one second layer 102 comprises alumina and zirconia wherein the zirconia comprises at least one of stabilized zirconia and partially stabilized zirconia in an amount by volume of from 5 to 30%, preferably from 5 to 25%, preferably from 5 to 20%, preferably from 5 to 16%, preferably from 10 to 30%, preferably from 16 to 30%, preferably from 10 to 25%, and preferably from 15 to 20% relative to a volume of the at least one second layer (and the balance comprising $Al_2O_3$). These volume percentages of the at least one second layer 102 correspond to weight percentages of a second powder mixture comprising zirconia (and the balance alumina) of from about 7% to about 40%, preferably from about 7% to about 35%, preferably from about 7% to about 28%, preferably from about 7% to about 23%, preferably from about 15% to about 40%, preferably from about 23% to about 40%, preferably from about 15% to about 34%, preferably from about 21% to about 28%, and preferably about 23%. Across this compositional and temperature range, the coefficient of thermal expansion (CTE) of the at least one second layer 102 may vary from an at least one second layer 102 comprising 5% by volume of zirconia, having a CTE of about $6.8 \times 10^{-6}/°$ C. as measured at 200° C., to an at least one second layer 102 comprising about 30% by volume of zirconia and having a CTE of about $9.75 \times 10^{-6}/°$ C. as measured at 1400° C. The volumetric amount of at least one of stabilized or partially stabilized zirconia in the at least one second layer 102 provides the ability to modify the CTE to be the same as, or substantially the same as, and within the disclosed CTE matching ranges, as that of the at least one first layer 100 and the at least one third layer 103.

Referring to FIG. 7, experimental data was taken to measure the coefficient of thermal expansion (CTE) of the at least one second layer 102 using dilatometry methods as performed in accordance with ASTM E228-17 for 10, 16 and 20 vol % $ZrO_2$ (and the balance alumina) compositions. An exemplary at least one second layer 102 comprising about 16% by volume of zirconia was measured to have a coefficient of thermal expansion (CTE) of from $6.98 \times 10^{-6}/°$ C. to $9.26 \times 10^{-6}/°$ C. throughout a temperature range of from about 200° C. to about 1400° C. as measured in accordance with ASTM E228-17. The at least one second layer 102 comprises at least two separate crystalline phases of zirconia and alumina (referred to herein as a composite oxide or particulate composite or a zirconia toughened alumina, ZTA) as illustrated from x ray diffraction results of FIG. 8. As such, the volumetric mixing rule as known to those skilled in the art was used to calculate CTE values for 5%, 25% and 30% by volume of zirconia (as depicted in FIG. 7). The CTE values with temperature for the at least one second layer comprising 5% by volume zirconia (not shown) are typically between the ranges of pure alumina and the at least one second layer comprising 10% by volume zirconia. The ability to modify the CTE characteristics of the at least one second layer 102 provides CTE matching between the at least one second layer 102, the at least one third layer 103, and the at least one first layer 100 in particular across a temperature range consistent with that of the method and sintering temperatures as disclosed herein. Selection of compositions of the at least one second layer 102 and at least one third layer 103 enables use of a variety of materials, without limitation, for the at least one first layer 100 having a CTE which is the same as, or substantially the same as that of the second layer 102 and third layer 103 within the ranges as disclosed herein. In some embodiments, across the disclosed temperature range of from ambient to about 1700° C., (or from 200° C. to 1400° C. as illustrated in the figures), the CTE of the at least one second layer 102 may be both greater and less than the CTE of the at least one first layers, thereby having a CTE difference of zero across the temperature range. In other embodiments, across the disclosed temperature range (from ambient to about 1700° C., or from 200° C. to 1400° C. as illustrated in the figures), the CTE of the at least one second layer 102 may be either greater or less than the CTE of the at least one first layer 100, and as such, the absolute value of the difference in coefficient of thermal expansion (CTE) between the at least one first layer 100 and the at least one second layer 102 may be from $0.003\times10\text{-}6/°$ C. to $0.75\times10\text{-}6/°$ C., preferably from $0.003\times10\text{-}6/°$ C. to $0.7\times10\text{-}6/°$ C., preferably from $0.003\times10\text{-}6/°$ C. to $0.6\times10\text{-}6/°$ C., preferably from $0.003\times10\text{-}6/°$ C. to $0.5\times10\text{-}6/°$ C., preferably from $0.003\times10\text{-}6/°$ C. to $0.45\times10\text{-}6/°$ C., preferably from $0.003\times10\text{-}6/°$ C. to $0.4\times10\text{-}6/°$ C., preferably from $0.003\times10\text{-}6/°$ C. to $0.35\times10\text{-}6/°$ C., preferably from $0.003\times10\text{-}6/°$ C. to $0.3\times10\text{-}6/°$ C., preferably from $0.003\times10\text{-}6/°$ C. to $0.25\times10\text{-}6/°$ C., preferably from $0.003\times10\text{-}6/°$ C. to $0.2\times10\text{-}6/°$ C., preferably from $0.003\times10\text{-}6/°$ C. to $0.15\times10\text{-}6/°$ C., preferably from $0.003\times10\text{-}6/°$ C. to $0.1\times10\text{-}6/°$ C., preferably from $0.003\times10\text{-}6/°$ C. to $0.08\times10\text{-}6/°$ C., preferably from $0.003\times10\text{-}6/°$ C. to $0.06\times10\text{-}6/°$ C., preferably from $0.003\times10\text{-}6/°$ C. to $0.04\times10\text{-}6/°$ C., preferably from $0.003\times10\text{-}6/°$ C. to $0.02\times10\text{-}6/°$ C., and preferably from $0.003\times10\text{-}6/°$ C. to $0.01\times10\text{-}6/°$ C. as measured in accordance with ASTM E228-17 across a temperature range of from 25 to 1700° C. or across a temperature range of from 200 to 1400° C.

In other embodiments, the at least one second layer 102 may have a CTE which is greater than that of the at least one first layer 100 across a temperature range of from about 600° C. to about 1700° C. (or to at least 1400° C. as depicted in the figures), and a CTE which is less than that of the at least one first layer 100 across a temperature range of from ambient (or to at least 200° C. as depicted in the figures) to about 600° C. The temperature at which the CTE changes in magnitude between the at least one first and second layers may occur at any temperature from about 200° C. to about 800° C. Without intending to be bound by a particular theory, the lower CTE of the at least one second layer 102 relative to the at least one first layer 100 at lower temperatures (for example of 800° C. to ambient) functions to provide compression of the at least one first layer 100, thereby reducing the likelihood of crack propagation, fracture, and spalling, which may lead to particle generation during use as components in semiconductor plasma processing chambers.

The at least one third layer 103 typically has a CTE within the ranges as disclosed for the at least one first and second layers. The CTE of the at least one third layer 103 may be adjusted to match that of the at least one first and second layers through variations in the amount of zirconia. As such, the absolute value of the difference in coefficient of thermal expansion (CTE) between the at least one first layer 100, the at least one second layer 102, and the at least one third layer 103 may in some embodiments be from 0 to $0.75\times10\text{-}6/°$ C., preferably from 0 to $0.7\times10\text{-}6/°$ C., preferably from 0 to $0.6\times10\text{-}6/°$ C., preferably from 0 to $0.5\times10\text{-}6/°$ C., preferably from 0 to $0.45\times10\text{-}6/°$ C., preferably from 0 to $0.4\times10\text{-}6/°$ C., preferably from 0 to $0.35\times10\text{-}6/°$ C., preferably from 0 to $0.25\times10\text{-}6/°$ C., preferably from 0 to $0.2\times10\text{-}6/°$ C., preferably from 0 to $0.15\times10\text{-}6/°$ C., preferably from 0 to $0.1\times10\text{-}6/°$ C., preferably from 0 to $0.08\times10\text{-}6/°$ C., preferably from 0 to $0.06\times10\text{-}6/°$ C., preferably from 0 to $0.04\times10\text{-}6/°$ C., preferably from 0 to $0.02\times10\text{-}6/°$ C., and preferably from 0 to $0.01\times10\text{-}6/°$ C. as measured in accordance with ASTM E228-17 across a temperature range of from 25 to 1700° C. or across a temperature range of from 200 to 1400° C.

In other embodiments, the absolute value of the difference in coefficient of thermal expansion (CTE) between the at least one first layer 100, the at least one second layer 102, and the at least one third layer 103 may be from $0.003\times10\text{-}6/°$ C. to $0.75\times10\text{-}6/°$ C., preferably from $0.003\times10\text{-}6/°$ C. to $0.7\times10\text{-}6/°$ C., preferably from $0.003\times10\text{-}6/°$ C. to $0.6\times10\text{-}6/°$ C., preferably from $0.003\times10\text{-}6/°$ C. to $0.5\times10\text{-}6/°$ C., preferably from $0.003\times10\text{-}6/°$ C. to $0.45\times10\text{-}6/°$ C., preferably from $0.003\times10\text{-}6/°$ C. to $0.4\times10\text{-}6/°$ C., preferably from $0.003\times10\text{-}6/°$ C. to $0.35\times10\text{-}6/°$ C., preferably from $0.003\times10\text{-}6/°$ C. to $0.3\times10\text{-}6/°$ C., preferably from $0.003\times10\text{-}6/°$ C. to $0.25\times10\text{-}6/°$ C., preferably from $0.003\times10\text{-}6/°$ C. to $0.2\times10\text{-}6/°$ C., preferably from $0.003\times10\text{-}6/°$ C. to $0.15\times10\text{-}6/°$ C., preferably from $0.003\times10\text{-}6/°$ C. to $0.1\times10\text{-}6/°$ C., preferably from $0.003\times10\text{-}6/°$ C. to $0.08\times10\text{-}6/°$ C., preferably from $0.003\times10\text{-}6/°$ C. to $0.06\times10\text{-}6/°$ C., preferably from $0.003\times10\text{-}6/°$ C. to $0.04\times10\text{-}6/°$ C., preferably from $0.003\times10\text{-}6/°$ C. to $0.02\times10\text{-}6/°$ C., and preferably from $0.003\times10\text{-}6/°$ C. to $0.01\times10\text{-}6/°$ C. as measured in accordance with ASTM E228-17 across a temperature range of from 25 to 1700° C. or across a temperature range of from 200 to 1400° C.

Figure 3:
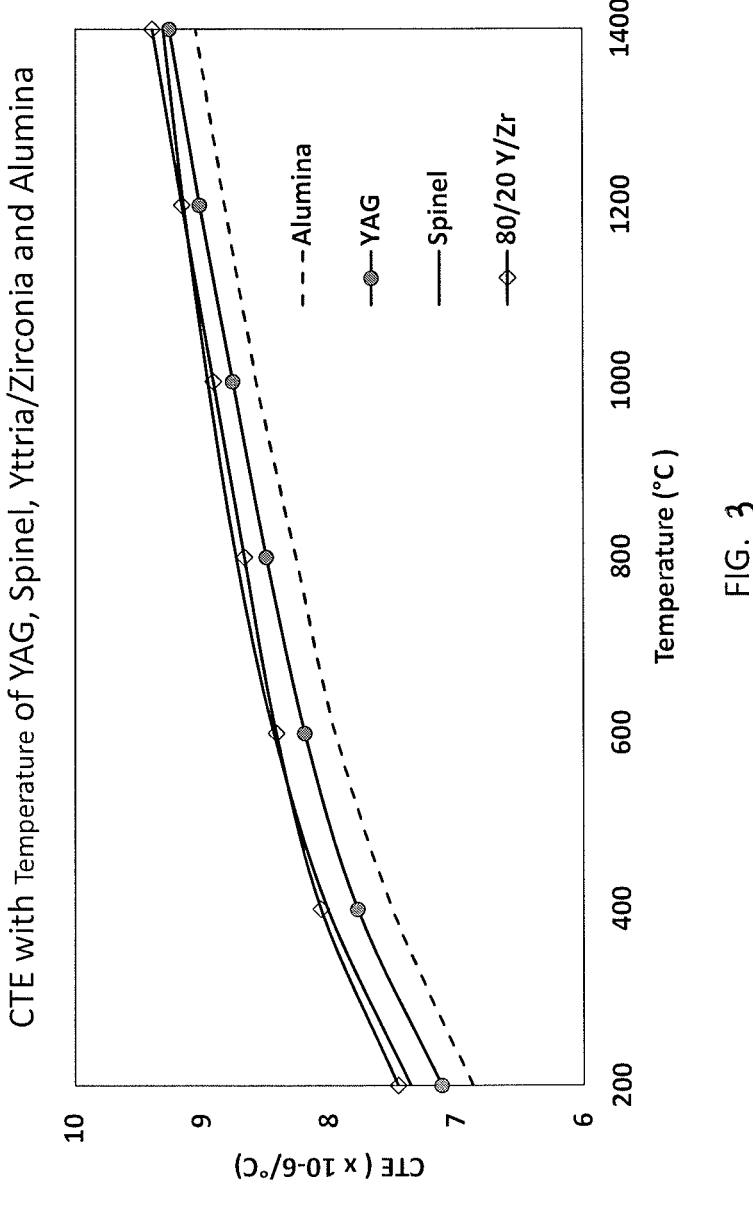
FIG. 3 illustrates CTE differences between YAG, spinel and at least one phase of yttria/zirconia (depicted as Y/Zr) as compared to alumina across a temperature range.
Figure 4:
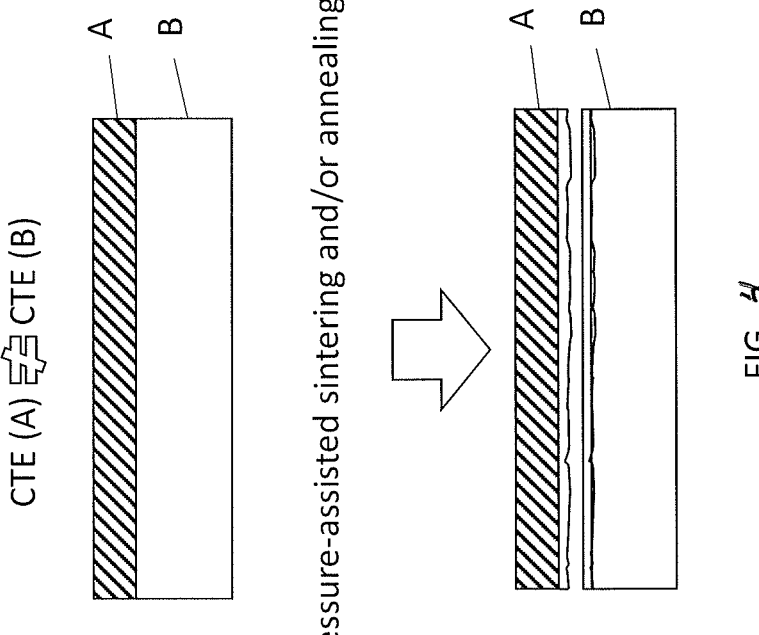
FIG. 4 illustrates a unitary multilayer structure having mismatched CTE values between the at least one first and second layers.

By contrast, a material combination made by the same method but that did not meet the CTE matching requirements as disclosed herein (and are thus mismatched in absolute value of CTE differences), is illustrated in FIG. 4 depicting a sintered ceramic body formed from a YAG first layer and an aluminum oxide substrate (second layer) (in accordance with the "comparator example" of the examples section). As illustrated in FIG. 3, alumina is shown to have a lower CTE than any of YAG, spinel and 80% yttria/20% zirconia. The sintered ceramic body fractured within the alumina substrate near to the interface between the layers during annealing. Fracture will occur at the weakest region in the sintered body, and fracture occurring within the bulk alumina may indicate an interfacial strength which is about the same as, or greater than, that of the bulk alumina substrate. The location of fracture (within the alumina) is representative of a very high interfacial strength (which may exceed that of the bulk first and second layers) achieved through use of the materials and methods as disclosed herein. The differences in CTE between the YAG and alumina was sufficient to cause fracture within the bulk sintered body while maintaining the integrity at the interface between the two layers. Film deposition and/or film lamination methods to form laminates typically exhibit much lower interfacial strengths, and correspondingly fracture and/or cracking occurs at interfaces between film layers (inter-layer fracture or delamination as depicted in the schematic of FIG. 1). As shown in FIG. 3, YAG is closest in CTE matching to alumina, and as such it is expected that use of ceramic materials for the at least one first layer 100 having a coefficient of thermal expansion varying by greater amounts relative to alumina (such as for example spinel as a first layer in combination with an aluminum oxide substrate layer) will similarly produce a multilayer sintered body prone to fracture upon sintering when using alumina as a substrate material. Thus, the coefficient of thermal expansion (CTE) of alumina across the temperature range as disclosed herein differs from the CTE of many corrosion resistant materials in amounts sufficient to prevent formation of unitary multilayer sintered bodies using alumina as a substrate material.

In addition to CTE matching, the multilayer sintered ceramic bodies preferably have high thermal conductivity for use as components in semiconductor plasma processing chambers. Zirconia toughened alumina (ZTA) compositions selected for use as the at least one second layer 102 (and at least a portion of the at least one third layer 103) will significantly impact properties of the unitary, multilayer sintered bodies. High thermal conductivity of the at least one second layer 102 is an important material property to effectively distribute heat and thereby avoid localized over-heating within the at least one second layer during use, in particular when used as a dielectric or RF window component. This localized overheating may result in cracking or fracture of the unitary, multilayer sintered body. Zirconia is reported in the literature to have a lower thermal conduc-tivity than that of alumina, thus the amount of zirconia will affect the thermal conductivity of the at least one second layer 102. Although pure aluminum oxide is known to have a high thermal conductivity, the mismatch in CTE precludes it's use in combination with the materials for use as at least one first layer 100 as disclosed herein. While there may be no practical lower limit to the minimum amount of zirconia in the at least one second layer 102 for thermal conductivity reasons, in order to provide CTE matching to the at least one first layer 100 as well as high thermal conductivity (about the same as that of alumina), at least one second layer 102 comprising at least one of stabilized zirconia and partially stabilized zirconia in an amount of about 5% by volume and greater, up to and including 30% by volume (with the balance comprising a second crystalline phase of about 70% to 95% by volume alumina) are preferable.

In order to provide the at least one second layer 102 having thermal conductivity sufficient for use for example in high frequency applications (such as an RF or dielectric window or lid component), the at least one second layer 102 having up to and including about 30% by volume, and in some embodiments preferably not greater than 25% by volume of zirconia may be preferable. A second layer 102 having greater than 30% by volume of zirconia may not provide sufficient thermal conductivity for use as compo-nents in semiconductor plasma processing chambers for which high thermal conductivity is a requirement. Compo-sitions of the at least one second layer 102 having greater than 30% by volume of zirconia may result in high thermal gradients within the at least one second layer 102 and may lead to fracture and/or cracking.

Figure 8:
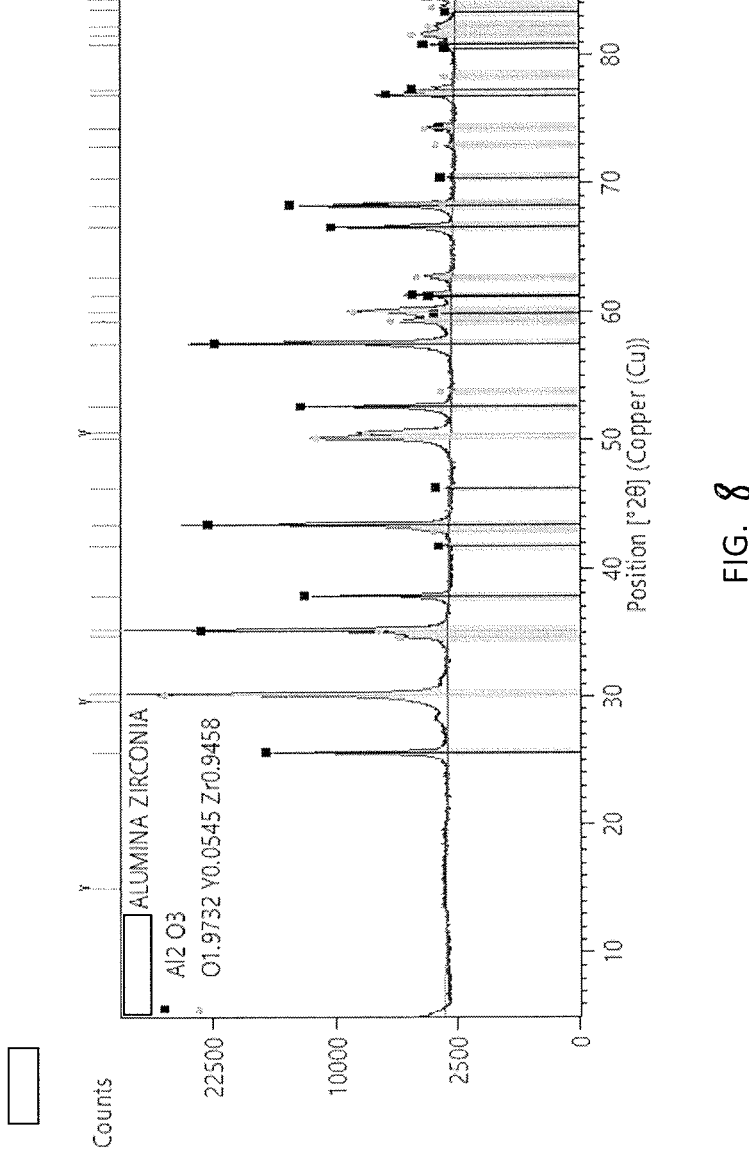
FIG. 8 illustrates x ray diffraction results of the at least one second layer 102 according to embodiments as disclosed herein.

FIG. 7 illustrates coefficient of thermal expansion results from 200 to 1400° C. for the at least one second layer 102 as disclosed herein, having zirconia present in amounts of from 10 to 30% by volume. The CTE values with tempera-ture for the at least one second layer comprising 5% by volume zirconia (not shown) are typically between the ranges of pure alumina and the at least one second layer comprising 10% by volume zirconia. The at least one second layer 102 comprises at least two separate crystalline phases of zirconia and alumina as illustrated in FIG. 8, thus the volumetric mixing rule as known to those skilled in the art was used to calculate CTE values for 5%, 25% and 30% by volume zirconia. The CTE is shown to increase with increas-ing amounts by volume of zirconia as illustrated in FIG. 7. Dependent upon the volume of zirconia in the ZTA (zirconia toughened alumina), at least one second layer 102, the CTE of the at least one second layer may be greater than, substantially equal to, equal to, or less than (varying in amounts within the ranges as disclosed herein) that of the at least one first layer 100 (comprising YAG, spinel, or yttria and zirconia) comprising the unitary, multilayer sintered ceramic body. Thus, the difference in CTE as used herein typically means the absolute value of the difference in CTE, unless specifically stated otherwise.

High toughness values of the at least one second layer 102 are preferable to increase handleability and prevent fracture and/or cracking in the multilayer sintered ceramic body. To enhance toughness of the at least one second layer 102 comprising alumina and zirconia, toughening and/or stabi-lization of the at least one second layer is preferable. Without intending to be bound by a particular theory, the toughening and stabilization mechanisms as disclosed herein may serve the purpose of stabilization of the tetrago-nal crystalline phase of zirconia, thereby limiting transfor-mation (at lower temperatures) into the monoclinic crystal-line phase, which is accompanied by a large change in volume of about 4.5%, making the phase stability of the tetragonal form of zirconia preferable. Stabilization of tetragonal zirconia may be achieved by any stabilization method as known to those skilled in the art, without limi-tation.

The combination of zirconia and alumina in the at least one second layer may provide a transformation toughening effect through a dispersion of tetragonal zirconia particles, at least a portion of which transform to monoclinic upon crack propagation. The volume expansion from tetragonal to monoclinic zirconia provides the transformation or disper-sion toughening effect in the at least one second layer 102 as known to those skilled in the art. In embodiments, the at least one second layer 102 may comprise a particle com-posite (also referred to herein as a composite oxide or ZTA, representing a dispersion or transformation toughened ceramic) of the crystalline phases of zirconia and alumina in the amounts by volume as disclosed. This method of tough-ening may be affected by powder particle size, shape and location of the tetragonal and monoclinic, dispersed zirconia phases in the alumina matrix.

A further method of stabilization utilizes stabilizing com-pounds comprising yttria, calcia, lanthanum oxide ($La_2O_3$), ceria ($CeO_2$), samaria ($Sm_2O_3$) and magnesia, and combi-nations thereof in varying molar amounts to stabilize zirco-nia in the preferably tetragonal or cubic crystalline phases (the monoclinic crystalline phase of zirconia is stable at room temperature; thus, the tetragonal and cubic crystalline phases are considered metastable phases when present at room temperature). The relative amounts and types of these stabilizing compounds may produce at least one second layer 102 comprising zirconia which comprises at least one of fully stabilized (SZ) and partially stabilized (PSZ). Typi-cally, stabilizing compounds may be selected for their valence and atomic radii relative to zirconium (Zr). Those stabilizing compounds having larger atomic radii than zir-conium favor stabilization of the tetragonal and/or cubic crystalline phases. In some embodiments, yttria may be selected as a tetragonal phase stabilizing compound having a lower valence (+3) and larger atomic radii (180 picom-eters, pm) than that of zirconia (having an atomic radii of 160 pm). Typically, those stabilizing compounds having lower valence state (coordination number) than zirconia are preferable. Without intending to be bound by a particular theory, use of those stabilizing compounds having a lower valence state than that of zirconia (+4) may result in intro-duction of oxygen vacancies, which may increase dielectric loss at high frequencies (such as RF or microwave frequen-cies). As such, in some embodiments, stabilizing compounds, such as cerium oxide (CeO2), having the same valence as zirconia (+4) and a larger atomic radii (185 pm) may stabilize the tetragonal and/or cubic crystalline phase without the introduction of oxygen vacancies. In some embodiments, combinations of at least two of the stabilizing compounds may be preferable and may be combined in any combination in the amounts as disclosed herein to stabilize the zirconia comprising the at least one second layer 102 and/or the at least one third layer 103. The stabilizing compounds may be added to the at least one second and/or third powder mixtures according to the method as disclosed. Table 1 lists the stabilizing compounds and their molar amounts and weight percent to produce stabilized (SZ) and/or partially stabilized zirconia (PSZ). Stabilization of zirconia using the stabilizing compounds as disclosed may result in changes in the CTE of the at least one third layer, and the amount of zirconia may be adjusted accordingly.

more preferably from about 14 ppm to about 50 ppm, preferably from about 14 ppm to about 30 ppm preferably about 14 ppm and less (as measured using ICPMS methods), relative to a mass of the at least one second layer 102. A second layer 102 comprising sintering aids within the disclosed ranges may provide a multilayer sintered ceramic body which is free of, or substantially free of, a glassy phase, providing high thermal conductivity of the multilayer sintered ceramic body. Disclosed herein is a multilayer sintered ceramic body comprising at least one second layer 102 which is free of, or substantially free of, dopants and/or sintering aids as disclosed herein.

Thermal conductivity was calculated (as the product of the diffusivity, the density and the known heat capacity) from thermal diffusivity measurements which were performed (at ambient temperature and at 200° C.) in accordance with ASTM E1461-13 on at least one second layer

TABLE 1

| Stabilizing Compound | PSZ, mole % | SZ, mole % | PSZ, wt % | SZ, wt % |
|---|---|---|---|---|
| yttrium oxide (Y₂O₃) | 1 to 8 mole % | >8 to 15 mol % | 1.8 to 14 wt % | >14 to 25 wt % |
| magnesium oxide (MgO) | 1 to 50 mol % | N/A | 0.2 to 16 wt % | N/A |
| ceria (CeO₂) | 1 to 12 mole % | >12 to 20 mol % | 1 to 15 wt % | >15 to 25 |
| lanthanum oxide (La₂O₃) | 0.5 to 7 mole % | >7 to 12 mol % | 1 to 15 wt % | >16 to 27 |
| calcia (CaO) | 1 to 28 mole % | >28 to 43 mol % | 0.5 to 15 wt % | >15 to 25 |
| samaria (Sm₂O₃) | 0.5 to 6 mole % | >6 to 12 mol % | 1 to 15 wt % | >15 to 27 |

In embodiments, the at least one second layer 102 may comprise particles or grains of zirconia (PSZ, SZ and combinations thereof) dispersed in a host matrix of alumina wherein the least one second layer comprises a particle composite (composite oxide) having two separate crystalline phases of alumina and zirconia. Preferably, the at least one second layer 102 does not form a solid solution. Formation of a solid solution may degrade thermal conductivity and as such the at least one second layer 102 comprises separate crystalline phases of zirconia and alumina. FIG. 8 depicts separate crystalline phases of zirconia and alumina from x ray diffraction results, confirming the at least one second layer 102 comprises separate crystalline phases, without formation of a solid solution. X ray diffraction for all measurements as disclosed herein was performed using a PANanlytical Aeris model XRD capable of crystalline phase identification to about +/−5%. Small amounts of yttria present in the x-ray diffraction pattern of FIG. 8 may result from the partial stabilization of zirconia (partially yttria stabilized zirconia, PYSZ) according to embodiments of the at least one second layer.

Further, use within the at least one second layer 102 of those compounds known to form glasses (such as magnesia, silica and calcia) as sintering aids may result in a low thermal conductivity, glassy phase present between grains, thus adversely affecting thermal conductivity. As a result, in some embodiments, it is preferred that the at least one second layer 102 comprises magnesia and/or calcia in the ranges of from about 2 to 100 ppm, preferably from about 2 to 75 ppm, preferably from about 2 to 50 ppm, preferably from about 2 to 25 ppm, preferably from about 2 to 20 ppm, preferably from about 2 to 10 ppm, preferably about 8 ppm, preferably about 2 ppm and less, relative to the mass of the at least one second layer as measured using ICPMS methods. In further embodiments, the at least one second layer 102 may comprise silica in an amount of from about 14 ppm to 100 ppm, preferably from about 14 ppm to about 75 ppm, 102 comprising about 16% by volume of partially yttria stabilized zirconia (3 mol %) and the balance alumina. In embodiments, the at least one second layer 102 comprising about 16% by volume of partially yttria stabilized zirconia was calculated to have a thermal conductivity at ambient temperature of about 25 W/m-K, and a thermal conductivity of about 14 W/m-K at 200° C. As such, the at least one second layer 102 preferably comprises zirconia in amounts by volume of from about 5 to about 30%, preferably from about 5 to about 20%, preferably from about 10 to about 20%, preferably from about 15 to about 20%, relative to a volume of the at least one second layer 102. The at least one second layers 102 having compositions within the ranges as disclosed herein provide thermal conductivity sufficient for use as for example a dielectric window, an RF window, a lid and other components requiring high thermal conductivity in plasma processing chambers as disclosed herein.

In order to prevent localized hot spots and overheating during use, in particular for RF applications, a low dielectric loss is preferable. Dielectric loss may be affected by such material properties as grain size and presence of impurities, sintering aids and/or dopants for example. The presence of impurities and/or sintering aids and/or dopants, such as in particular silica in the at least one second layer 102 may result in a higher dielectric loss. The use of highly pure/low impurity content starting powders and a method that preserves the purity results in an at least one second layer 102 of high total purity and correspondingly low in total impurity content. As such, in embodiments, the at least one second layer 102 as disclosed may have a total impurity content of from 5 to 200 ppm, preferably from 5 to 150 ppm, preferably less than 100 ppm, preferably less than 50 ppm, preferably less than 25 ppm, preferably less than 15 ppm, preferably from 10 to 100 ppm, preferably from 10 to 80 ppm, preferably from 10 to 60 ppm, preferably from 10 to 40 ppm, preferably from 20 to 80 ppm, and preferably from 30 to 60 ppm relative to the mass of the at least one second layer as measured using ICPMS methods. In embodiments, the at least one second layer 102 is formed from a powder mixture which comprises silica in amounts of from about 14 to 100 ppm, preferably from about 14 to 75 ppm, preferably from about 14 to 50 ppm, preferably from about 14 to 25 ppm, preferably about 14 ppm relative to total mass of the calcined powder mixture. In embodiments, the at least one second layer 102 may comprise magnesia (MgO) in an amount of from about 2 to 100 ppm, preferably from about 2 to 75 ppm, preferably from about 2 to 50 ppm, preferably from about 2 to 25 ppm, preferably from about 2 to 20 ppm, preferably from about 2 to 10 ppm, preferably about 8 ppm and less, and preferably about 2 ppm relative to a mass of the at least one second layer 102 as measured using ICPMS methods.

For use in plasma processing chambers and in particular those operating in the RF range, preferable is a multilayer sintered ceramic body 98 having low dielectric loss (tangent δ). The at least one second layer 102 may in embodiments comprise the largest thickness (and accordingly the greatest volume) of the multilayer sintered ceramic body 98, thus the associated properties of the at least one second layer may greatly influence the electrical and other properties, such as thermal conductivity, of the sintered body. Dielectric loss for the sintered body may be impacted by the purity of the at least one second layer 102, in particular the silica content. As such, the at least one second layer 102 may comprise magnesia and/or calcia in amounts of from about 2 to 100 ppm, preferably from about 2 to 75 ppm, preferably from about 2 to 50 ppm, preferably from about 2 to 25 ppm, preferably from about 2 to 20 ppm, preferably from about 2 to 10 ppm, preferably about 2 ppm, each relative to the mass of the composite oxide second layer 102. In further embodiments, the at least one second layer 102 as disclosed herein may be formed from at least one powder mixture having a Si content of about 14 ppm and greater, preferably from 14 to 100 ppm, preferably from 14 to 75 ppm, preferably from 14 to 50 ppm, preferably from 14 to 25 ppm, preferably from 14 to 20 ppm, preferably about 14 ppm relative to the total mass of the second layer 102. In embodiments, the second layer may have a total impurity content of from 5 to 200 ppm, preferably from 5 to 150 ppm, preferably less than 100 ppm, preferably less than 50 ppm, preferably less than 25 ppm, preferably less than 15 ppm, preferably from 10 to 100 ppm, preferably from 10 to 80 ppm, preferably from 10 to 60 ppm, preferably from 10 to 40 ppm, preferably from 20 to 80 ppm, preferably from 30 to 60 ppm, relative to the total mass of the second layer.

The total impurity content of the at least one second layer 102, comprising calcia, silica and magnesia in the amounts as disclosed herein, provides an at least one second layer 102 having a dielectric loss of less than $7 \times 10^{-4}$ at a frequency of 1 MHz at ambient temperature as measured in accordance with ASTM D150, as listed in Table 7 for at least one second layer 102 comprising about 16 volume % partially yttria stabilized (3 mol % yttria) zirconia and the balance alumina. In embodiments, the at least one second layer 102 is free of (0 ppm or at or below limit of detection), or substantially free of (2-5 ppm), dopants and/or sintering aids as disclosed herein. The at least one second layer 102 as disclosed herein provides a multilayer sintered ceramic body or component fabricated therefrom having low dielectric loss, suitable for use as a chamber component, in particular as window or lid components for use in high frequency, RF plasma processing chambers.

Plasma processing chambers for fabrication of semiconductor devices are designed to accommodate substrates having ever-increasing diameters which correspondingly require chamber components of large dimension. These chamber components, fabricated from the multilayer sintered ceramic body disclosed herein, may have a greatest dimension of for example from 100 to about 625 mm, preferably from 100 to 622 mm, preferably from 200 to about 625 mm, preferably from 300 to about 625 mm, preferably from 400 to about 625 mm, preferably from 500 to about 625 mm, preferably from 300 to 622 mm, preferably from 400 to 622 mm, and preferably from 500 to 622 mm.

A number of materials which provide resistance to corrosion and erosion are known to be difficult to sinter, resulting in low densities and correspondingly low sintering strengths which may result in breakage or cracking. This makes fabrication of large, unitary, monolithic solid body components from these corrosion resistant materials challenging. There is a need for a high strength material comprising the at least one second layer 102 (which is CTE matching with the corrosion resistant materials as disclosed herein) to enable fabrication of large size chamber components. The at least one second layer 102 provides mechanical strength and stiffness to the unitary multilayer corrosion resistant sintered bodies (and components fabricated therefrom) as disclosed herein. The at least one second layer 102 may be sintered to a very high density, and in embodiments sintered to a fully dense body, which provides the mechanical strength and stiffness necessary for fabrication of multilayer sintered bodies of large dimension, the multilayer sintered bodies having a greatest dimension of for example from 100 to about 625 mm, preferably from 100 to 622 mm, preferably from 200 to about 625 mm, preferably from 300 to about 625 mm, preferably from 400 to about 625 mm, preferably from 500 to about 625 mm, preferably from 300 to 622 mm, preferably from 400 to 622 mm, and preferably from 500 to 622 mm. Density measurements were performed in accordance with ASTM B962-17 for sintered bodies having zirconia in amounts from 10 to 16 volume % (with the balance comprising alumina), and the volumetric mixing rule was used to calculate densities for those at least one second layers having 5, 20, 25 and 30% zirconia. 99% of theoretical density was assumed in the calculated densities. Table 2 lists densities of the at least one second layers comprising crystalline phases of zirconia and alumina as disclosed herein.

TABLE 2

| Vol % ZrO2 | Vol % Al2O3 | Average Density (g/cc) | % Theoretical Density | % Volumetric Porosity |
|---|---|---|---|---|
| 5 | 95 | 4.04 | >99 | <1 |
| 10 | 90 | 4.19 | 100 | 0 |
| 12 | 88 | 4.23 | 99.9 | 0.12 |
| 12 | 88 | 4.22 | 99.8 | 0.21 |
| 12 | 88 | 4.20 | 99.2 | 0.83 |
| 16 | 84 | 4.32 | 100 | 0 |
| 20 | 80 | 4.36 | >99 | <1 |
| 25 | 75 | 4.46 | >99 | <1 |
| 30 | 70 | 4.57 | >99 | <1 |

Zirconia is reported to have a theoretical density of 6.09 g/cc, while alumina is reported to have a theoretical density of 3.98 g/cc. The theoretical density of the at least one second layer 102 was calculated (using these density values and the volume fraction of the respective crystalline phases of zirconia and alumina) in accordance with the volumetric mixing rule as known to those skilled in the art. Very high densities (from 99 to 100% of the theoretical density) were measured for embodiments of the at least one second layer 102 as disclosed in Table 2. An at least one second layer 102 comprising zirconia in an amount of about 16% by volume (and the balance alumina) as disclosed herein was measured to have a density of about 4.32 g/cc as measured in accordance with ASTM B962-17. These high densities provide mechanical strength and stiffness (Young's modulus) sufficient for formation of unitary, multilayer sintered bodies of large dimension, up to and including about 625 mm greatest dimension.

At least one second layer 102 comprising zirconia in an amount of about 16% by volume (and the balance alumina) as disclosed herein was tested in four-point flexural testing in accordance with ASTM standard C 1161-3, "Standard Test Method for Flexural Strength of Advanced Ceramics at Ambient Temperature" to determine the flexural strength. Four-point bend testing is preferable over three-point bend testing as it exposes a larger volume of the sample to a uniform, maximum stress, and thus yields strengths which are more representative of the material under test. Three-point bend testing exposes a comparatively smaller volume of the sample to maximum stresses, and as such, reported 3 point flexural test strength values are often higher. As such, comparison between 3 and 4 point flexural testing poses challenges due to significant variations in their measurement setup and methods. Using ASTM standard C 1161-3, very high strength values were achieved in a four-point bend configuration for the at least one second layer 102 comprising 16 volume % zirconia. Table 3 lists flexural strength (modulus of rupture, MOR) and other material properties for an at least one layer 102 comprising about 16% partially stabilized $ZrO_2$ and the balance alumina.

During use in semiconductor reactors under vacuum conditions, corrosion resistant, multilayer components fabavailable online). The at least one second layer 102 as disclosed herein may provide mechanical strength and stiffness/young's modulus about the same as, or exceeding that of, alumina while providing the required CTE matching to the at least one first layer 100 and the at least one third layer 103. Use of at least one second layer 102 as disclosed herein may significantly enhance flexural strength and rigidity of the unitary, multilayer components fabricated from the multilayer sintered ceramic bodies to enable the making of large (>100 to about 625 mm and greater dimension) components having both high strength, high stiffness and resistance to halogen-based corrosion and erosion as necessary for use as components in semiconductor plasma processing chambers.

While the at least one first layer 100 provides a chemically inert, plasma-facing surface 106 resistant to the corrosive effects of halogen process gases and the erosive effects of plasma ion bombardment (often an inert gas for example such as Argon may be used, along with other process gases as known in the art), the at least one second layer 102 provides mechanical strength to the multilayer corrosion resistant sintered bodies as disclosed herein. The at least one second layer 102 may be sintered to a very high density, and in embodiments sintered to a fully dense body, which provides the mechanical strength necessary for fabrication of multilayer sintered bodies of large dimension, for example from 100 to about 625 mm in diameter, preferably between 200 to about 625 mm, preferably between 250 to about 625 mm, preferably between 300 to about 625 mm, more preferably between 350 to about 625 mm, more preferably between 400 to about 625 mm, more preferably between 450 to about 625 mm, more preferably between 500 to about 625 mm. Table 3 lists properties of an at least one second layer 102 comprising 16% by volume of partially stabilized zirconia and the balance alumina.

TABLE 3

| Material Property | Test Method | Units | Alumina 16 vol % Zirconium Oxide |
|---|---|---|---|
| Theoretical Density | ASTM B962-17 | g/cc | 4.3 |
| Typical Measured Density | ASTM C 20 | g/cc | >4.2 |
| Largest Pore Size (d90) | SEM/ImageJ | μm | <5 |
| Bulk Purity | ICP-MS | % | >99.99 |
| Grain Size-Average | Line intercept/ ASTM E112-2010 | μm | 1 to 3 |
| Grain Size-Max | Line intercept/ ASTM E112-2010 | μm | 5 |
| 4 pt Flexural Strength (MOR) | ASTM C1161 | MPa | 575 |
| Young's Modulus | ASTM 1259-15 | GPa | 358 |
| Vickers Hardness | ASTM C1327 | GPa | 20 |
| Fracture Toughness | Indention Method | MPa-$m^{1/2}$ | 4.2 |
| Thermal Conductivity 20° C. | ASTM E1461-13 | W/(m-K) | 25 |
| Thermal Conductivity 200° C. | ASTM E1461-13 | W/(m-K) | 14 |
| C.T.E. (RT-200 C.) | ASTM E228-17 | $\times 10^{-6}$/° C. | 7.1 |
| Volume Resistivity 200° C. | ASTM D257 | ohm-cm | >1.0E+12 |
| Dielectric Constant @ 1 MHz | ASTM D150 | — | 12 |
| Dielectric loss @ 1 MHz | ASTM D150 | — | <0.0007 | ricated from the multilayer sintered ceramic bodies as disclosed herein may be subjected to a bending stress across component dimensions in excess of 500 mm. The properties of high strength and increased stiffness/young's modulus may be necessary for application of the materials for use as components as disclosed herein to large scale etch and/or deposition chambers. The flexural strength of 98% dense aluminum oxide is reported to be about 375 MPa, and the stiffness (modulus of elasticity/young's modulus) is reported at about 350 GPa (Coorstek Advanced Alumina datasheet, Referring now to an embodiment of FIG. 6, disclosed is a multilayer sintered ceramic body 98 comprising at least one third layer 103. The at least one third layer 103 comprises polycrystalline phases comprising at least one of YAG, alumina, and zirconia. The zirconia may comprise at least one of unstabilized, partially stabilized and stabilized zirconia.

In embodiments, the at least one third layer 103 comprises YAG in an amount by area of from greater than 50% to 90%, preferably from greater than 50% to 80%, preferably from greater than 50% to 60%, and more preferably about 51% to 55%, relative to the area of an exemplary, polished surface of the at least one third layer. Area measurements were completed using backscatter detection images from SEM which were imported into ImageJ software, and thereafter the respective phases of YAG and alumina/zirconia were measured as to their percentage of surface area across an exemplary image area. The at least one third layer 103 of the multilayer sintered ceramic body may comprise an integral body, thus comprising throughout the crystalline phases of at least YAG, zirconia and alumina made according to the process disclosed herein. In other words, a structure measured on a surface is representative of a structure within a volume of the bulk at least one third layer. As such, the at least one third layer of the multilayer sintered ceramic body may comprise the crystalline phases of YAG, zirconia and alumina in the same relative amounts over a surface, and throughout a volume of the sintered body.

The multiple phase structure of the at least one third layer 103 is depicted in the 1000×SEM micrographs of FIG. 26a) and b). FIG. 26a) illustrates a microstructure of the at least one third layer 103 comprising large (from about 80 μm to about 200 μm in greatest dimension) regions of the YAG phase (white/light gray regions) and an alumina phase (black regions throughout) having a zirconia phase dispersed therein (small dimension, about 10 μm diameter white regions within the alumina phase). The microstructure of FIG. 26a) may be achieved by dry blending powders of alumina, yttria and at least one of unstabilized, partially stabilized and stabilized zirconia for about 16 hours without the use of milling/mixing media to form the third powder mixture according to embodiments as disclosed herein. The absence of milling media and dry blending conditions may contribute to the microstructure as depicted in FIG. 26a).

FIG. 26b) illustrates microstructures at 1000× and 5000× (inset) of the at least one third layer 103 comprising a finely dispersed (from about 5 μm to about 20 μm in greatest dimension) YAG phase (white/light gray regions) and an alumina phase (black regions) having a zirconia phase dispersed therein (small dimension, about 3 μm diameter white regions within the alumina phase). The microstructure of FIG. 26b) may be achieved by forming a 40 wt % ethanol slurry comprising powders of alumina, yttria and at least one of unstabilized, partially stabilized and stabilized zirconia to form the third powder mixture according to embodiments as disclosed herein. Alumina media was added in an amount of about 100% loading relative to powder weight, and the powder was tumble milled for 20 hours. The high media loading and extended milling times may contribute to the finely dispersed, highly uniform microstructure as depicted in FIG. 26b).

The at least one third layer 103 also provides improved machinability and CTE matching (within the ranges as disclosed herein) to the at least one first layer 100 and at least one second layer 102. According to FIG. 22a), light gray/white regions (comprising YAG) and alumina/zirconia regions (depicted as dark gray or black having white regions within) each form regions of about 100 μm and greater in dimension as illustrated within the SEM depicting the multiphase, third layer 103. Multiple SEM images were analyzed using ImageJ to determine the percentage of area comprising each phase of the multi-phase layer 103. Using the SEM image of FIG. 26a) (and other images taken at the same magnification, 500×), the multilayer sintered body comprises at least one third layer 103 comprising the YAG phase in an amount of from about 51 to about 63%, preferably from about 51 to about 60%, preferably from about 55 to about 60%, and preferably about 60% on an area basis of an alumina rich phase (comprising YAG) and the balance comprising alumina and zirconia wherein the zirconia comprises at least one of unstabilized, partially stabilized and stabilized zirconia). The multiple phase structure, having regions comprising YAG and regions comprising alumina and zirconia, may provide improved fracture toughness and resistance to crack propagation by deflection of cracks along the interfaces between the regions, thereby increasing crack length. Further, the at least one third layer 103 may reduce the dimension and frequency of defects which may form during machining, and thereby maintain mechanical strength and toughness by absorbing energy generated during machining within the multiple phase, at least one third layer 103.

In embodiments, the at least one third phase comprises a zirconia toughened alumina (ZTA) phase comprising at least one of unstabilized, partially stabilized or stabilized zirconia in an amount of about 16% by volume and the balance alumina.

Figure 26:
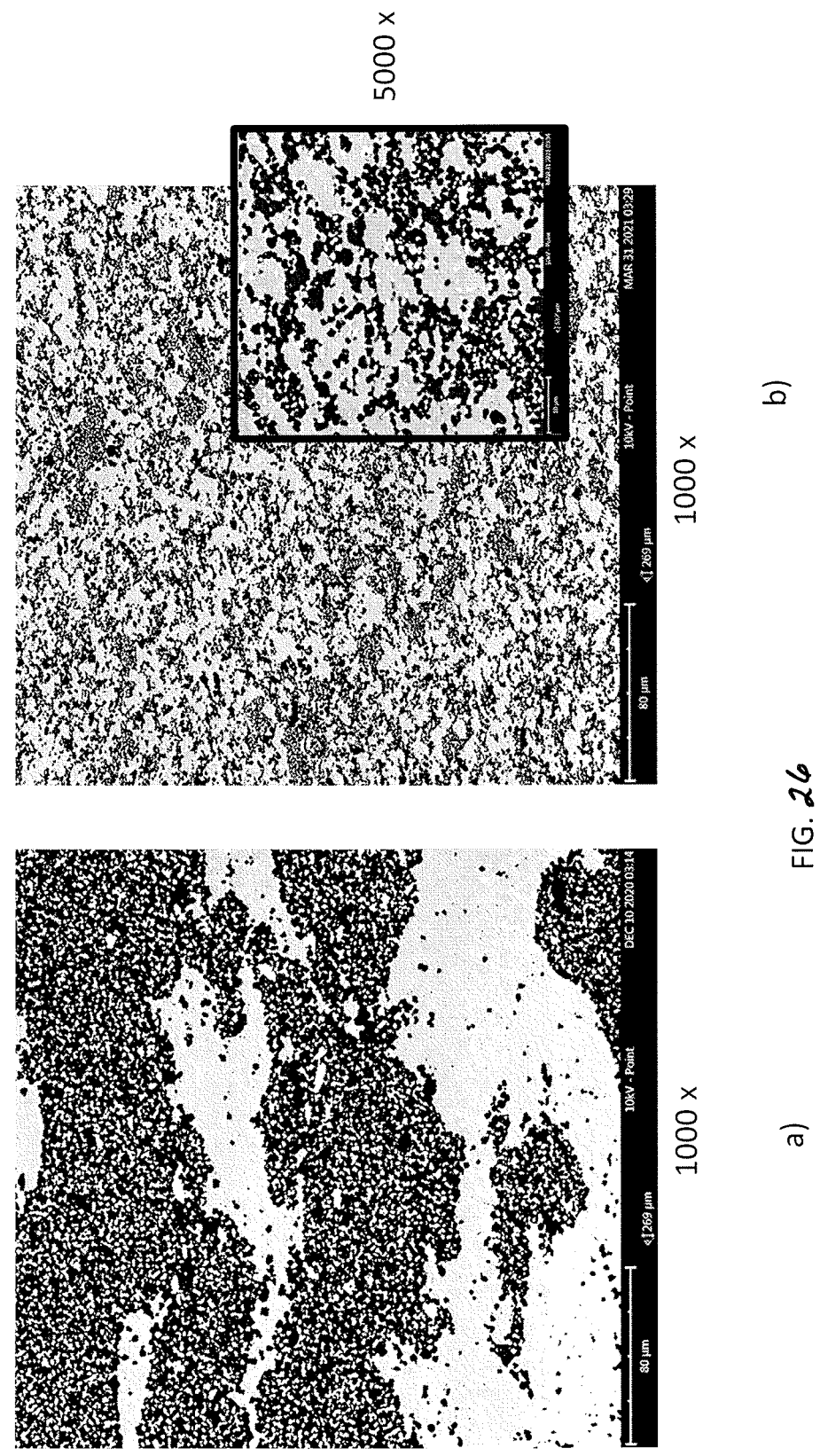
FIGS. 26a) and b) illustrate SEM micrographs at 1000× (and 5000×) of the at least one third layer of the multilayer sintered ceramic body as disclosed herein.

In some embodiments (as depicted in FIG. 26), the at least one third layer 103 comprises the YAG phase (white/light grey regions) in an amount by area (and thereby volume) of greater than 50 to about 55%, an alumina phase (black/grey) and a zirconia phase dispersed within the alumina phase (white regions within black/grey) wherein the zirconia comprises about 16% by volume of 3 mol % yttria partially stabilized zirconia in an amount of from about 45 to less than 50%.

The at least one third layer 103 also provides improved uniformity during sintering by combining yttria, zirconia and alumina powders to form the third powder mixture having sintering characteristics similar to that of the at least one first powder mixture. The third powder mixture may provide more uniform heat transfer, and thereby more uniform sintering characteristics (such as sintering temperature and rate of densification of the respective layers), across the powder mixtures during sintering according to the method as disclosed herein.

Figure 22:
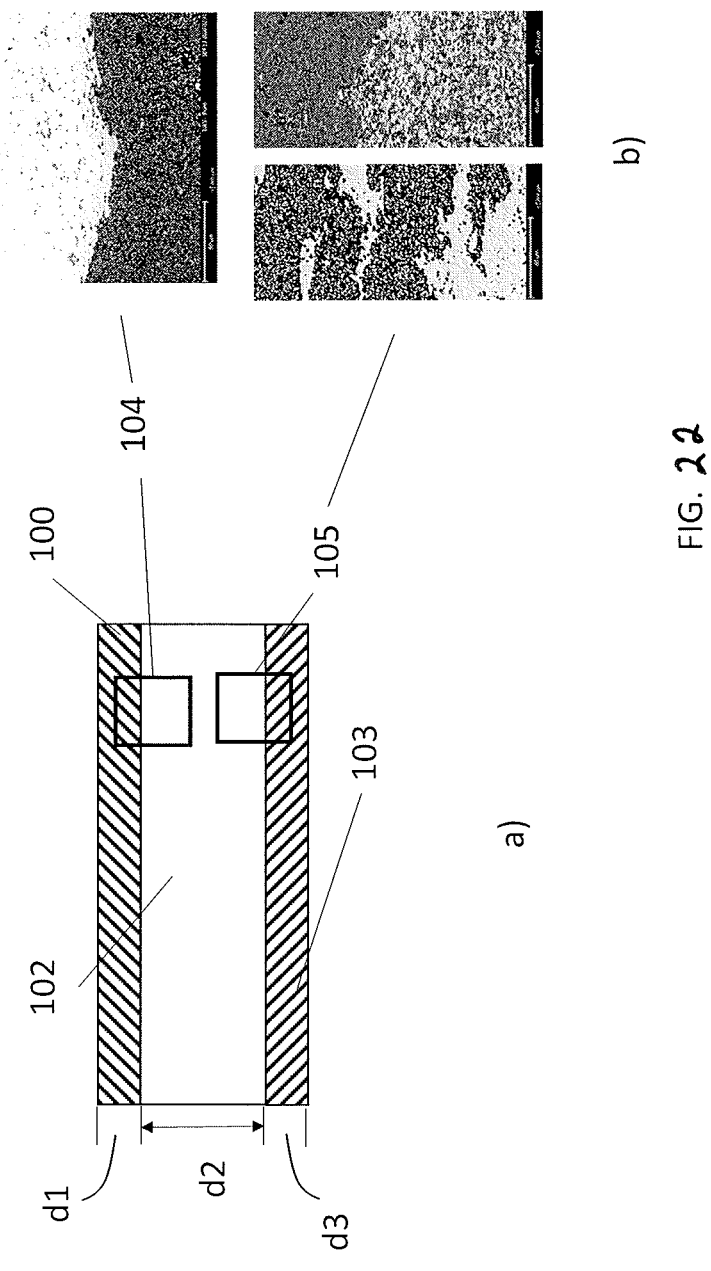
FIG. 22a) depicts a schematic of the multilayer sintered ceramic body 98, and b) illustrates an enlarged schematic illustrating nonlinear interface 104 and second interface 105 according to embodiments as disclosed herein.

A second interface 105 between the at least one third layer 103 and the at least one second layer 102 is depicted in the schematic of FIG. 22a) and b). As illustrated, the second interface 105 (which is described in greater detail herein) may provide for enhanced toughness between the at least one third layer 103 and the at least one second layer 102. This improved toughness may be achieved by a number of factors, such as the multiple phase characteristics of the second interface 105, which may provide an increased area between phases to deflect crack propagation, and an interlocking effect provided by the morphology of the multiple phases and non-linearity of the second interface 105. Intermixing between the powder mixtures forming the at least one third layer 103 and the at least one second layer 102 provides a second interface 105 which may in some embodiments not have a clearly delineated boundary between the third layer 103 and the second layer 102. Second interface 105 may in some embodiments comprise a diffuse boundary and as such, properties such as composition, strength, fracture toughness, etc. across the second interface 105 may have a gradation. In other embodiments, second interface 105 provides a distinct, nonlinear boundary between the at least one second layer 102 and the at least one third layer 103. Various powder combining methods as disclosed herein for the at least one third powder mixture may produce the at least one second interface 105 as depicted in FIG. 22b). In embodiments, the at least one second and third layers may be in contact, forming second interface 105, and thus second and third layers are contiguous. In other embodiments, circuitry, heating elements, RF coils/antennae and the like may be disposed between second and third layers as required by the specific component application, and irrespective of these features, first and second layers may be contiguous or substantially contiguous.

In preferred embodiments, compositions are chosen for at least one third layer 103, at least one first layer 100, and at least one second layer 102 wherein the absolute value of the difference in coefficient of thermal expansion (CTE) of the at least one first, second and third layers are from 0 to $0.75\times10\text{-}6/°$ C., preferably from 0 to $0.7\times10\text{-}6/°$ C., preferably from 0 to $0.6\times10\text{-}6/°$ C., preferably from 0 to $0.5\times10\text{-}6/°$ C., preferably from 0 to $0.45\times10\text{-}6/°$ C., preferably from 0 to $0.4\times10\text{-}6/°$ C., preferably from 0 to $0.35\times10\text{-}6/°$ C., preferably from 0 to $0.3\times10\text{-}6/°$ C., preferably from 0 to $0.25\times10\text{-}6/°$ C., preferably from 0 to $0.2\times10\text{-}6/°$ C., preferably from 0 to $0.15\times10\text{-}6/°$ C., preferably from 0 to $0.1\times10\text{-}6/°$ C., preferably from 0 to $0.08\times10\text{-}6/°$ C., preferably from 0 to $0.04\times10\text{-}6/°$ C., and preferably from 0 to $0.02\times10\text{-}6/°$ C., as measured in accordance with ASTM E228-17 across a temperature range of from 25 to 1700° C. or across a temperature range of from 200 to 1400° C. The CTE matching between at least one first layer 100, second layer 102, and third layer 103 may be provided across a temperature range of ambient to about 1700° C. in accordance with that of the method as disclosed herein. Selection of these materials providing this difference in CTE may reduce the interfacial stresses on nonlinear interface 104 and second interface 105, thereby improving adhesion between the layers of the multilayer sintered ceramic body and components formed therefrom.

According to one embodiment, disclosed herein is a unitary, multilayer sintered ceramic body comprising at least one first layer 100 comprising at least one ceramic material comprising polycrystalline YAG, at least one second layer 102 comprising alumina and zirconia wherein the zirconia comprises at least one of stabilized and partially stabilized, and at least one third layer 103 comprising multiple phases of at least one selected from the group consisting of YAG, alumina, and zirconia wherein the zirconia comprises at least one of unstabilized, partially stabilized, and stabilized zirconia, wherein an absolute value of the difference in coefficient of thermal expansion (CTE) between the at least one first, second and third layers is from 0 to $0.75\times10\text{-}6/°$ C., preferably from 0 to $0.7\times10\text{-}6/°$ C., preferably from 0 to $0.6\times10\text{-}6/°$ C., preferably from 0 to $0.5\times10\text{-}6/°$ C., preferably from 0 to $0.45\times10\text{-}6/°$ C., preferably from 0 to $0.4\times10\text{-}6/°$ C., preferably from 0 to $0.35\times10\text{-}6/°$ C., preferably from 0 to $0.3\times10\text{-}6/°$ C., preferably from 0 to $0.25\times10\text{-}6/°$ C., preferably from 0 to $0.2\times10\text{-}6/°$ C., preferably from 0 to $0.15\times10\text{-}6/°$ C., preferably from 0 to $0.1\times10\text{-}6/°$ C., preferably from 0 to $0.08\times10\text{-}6/°$ C., preferably from 0 to $0.04\times10\text{-}6/°$ C., and preferably from 0 to $0.02\times10\text{-}6/°$ C., as measured in accordance with ASTM E228-17 across a temperature range of from 25 to 1700° C. or across a temperature range of from 200 to 1400° C., wherein the at least one first, second and third layers form a unitary, multilayer sintered ceramic body. These ranges of the absolute value of the difference in CTE between the at least one first layer comprising polycrystalline YAG, and second and third layers corresponds to a difference in CTE by percentage between any of the at least one first, second and third layers of about 10% and less, preferably 9% and less, preferably 8% and less, preferably 6% and less, preferably 4% and less, preferably 3% and less, preferably 2.5% and less, preferably 2% and less, preferably 1.5% and less, preferably 1% and less, preferably 0.5% and less, and preferably 0.25% and less of the at least one first, second and third layers (as measured relative to the at least one first layer 100 comprising polycrystalline YAG).

Figure 9:
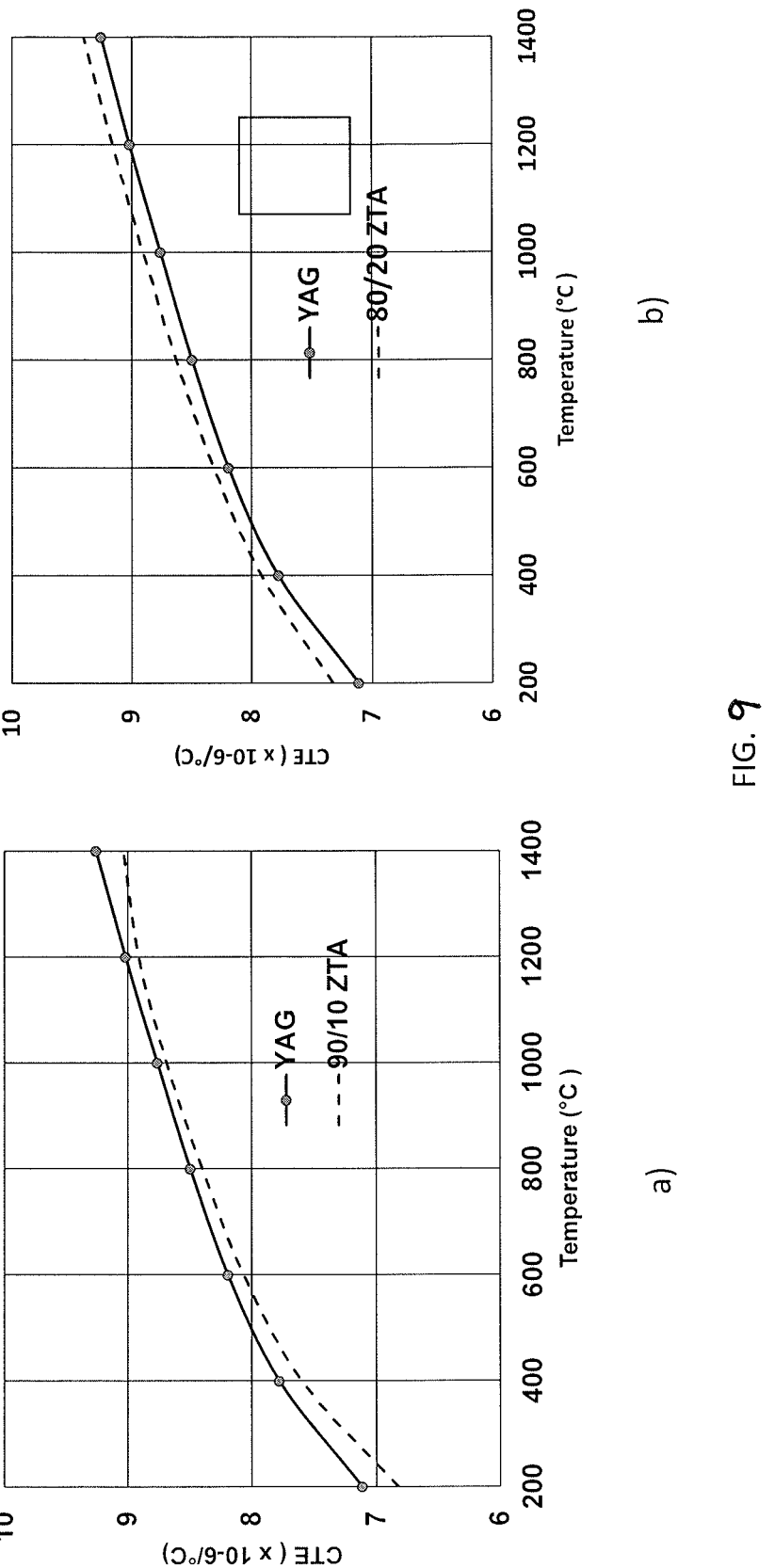
FIGS. 9a), b) and c) depict variation in CTE of a multi-layer sintered ceramic body comprising at least one first layer comprising YAG and compositions of at least one second layer according to embodiments as disclosed herein.
Figure 9C:
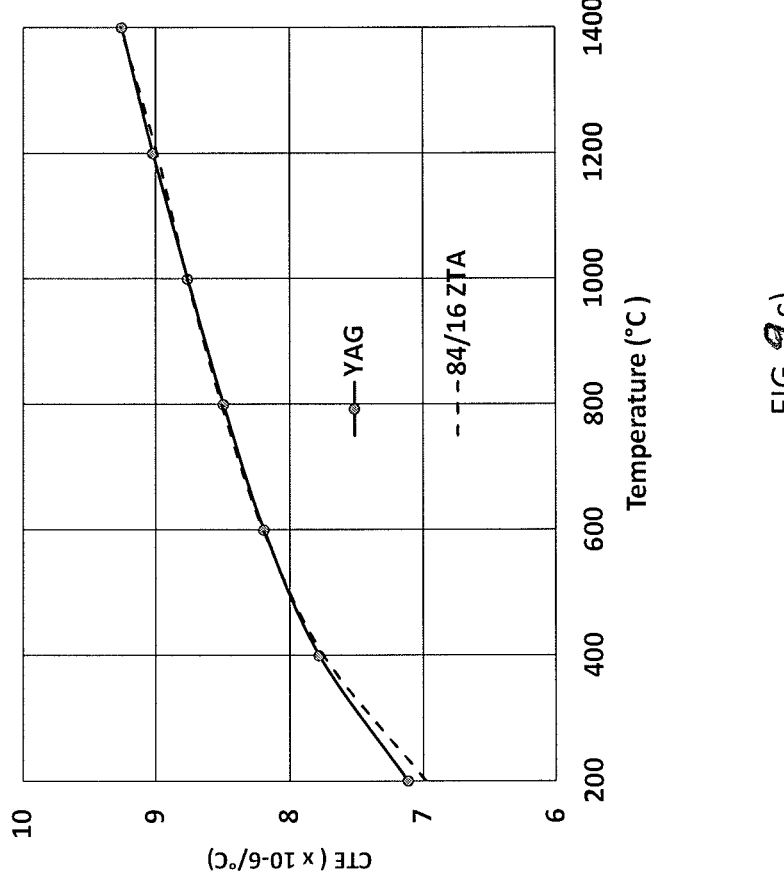

The at least one first, second and third layers are CTE matched within the ranges as disclosed across a temperature range of from ambient (or at least from 200° C. as depicted in the figures) to about 1700° C. (or at least to 1400° C. as depicted in the figures) to form a unitary, multilayer sintered ceramic body. In embodiments, the at least one first layer 100 may further comprise at least one crystalline phase selected from the group consisting of YAP (yttrium aluminum perovskite), YAM (yttrium aluminum monoclinic), yttria, alumina and combinations thereof present in amounts of less than 5%, preferably less than 3%, and more preferably less than 1%, each by volume of the at least one first layer 100 as determined by x ray diffraction, SEM imaging and ImageJ analysis. Each of the crystalline phases of YAG, YAP and YAM are preferably polycrystalline. FIGS. 9a), b) and c) illustrate CTE measurements across a temperature range of ambient (or at least from 200° C. as depicted in the figures) to about 1700° C. (or at least to 1400° C. as depicted in the figures) of exemplary materials for forming at least one first and second layers of the unitary, multilayer sintered ceramic bodies according to embodiments. All CTE measurements as disclosed herein were performed in accordance with ASTM E228-17 across a temperature range of from 25 to 1700° C. or across a temperature range of from 200 to 1400° C. CTE measurements were performed on exemplary, bulk materials. FIG. 9a) depicts a polycrystalline YAG first layer 100 (solid line) and second layer (ZTA, dashed line) 102 comprising about 10% by volume of at least one of stabilized and partially stabilized zirconia and the balance (90% by volume) alumina relative to a total volume of the at least one second layer 102. FIG. 9b) depicts a polycrystalline YAG first layer 100 (solid line) and a second layer (ZTA, dashed line) 102 comprising about 20% by volume of zirconia and the balance (80% by volume) alumina, relative to a total volume of the at least one second layer. FIG. 9c) depicts at least one first layer 100 comprising polycrystalline YAG and an at least one second layer 102 comprising about 16% by volume of zirconia (and the balance alumina), relative to a total volume of the at least one second layer.

In one embodiment, a range of compositions (from about 5% to about 30% by volume of zirconia and the balance alumina) of the at least one second layer 102 may be suitable to CTE match the at least one first layer 100 comprising polycrystalline YAG within the CTE matching and percentage ranges. As such, multilayer sintered ceramic bodies 98 comprising at least one second layer 102 comprising alumina and at least one of stabilized and partially stabilized zirconia in amounts of from about 5 to about 30% by volume, preferably from about 10 to about 30% by volume, preferably from about 5 to about 20% by volume, preferably from about 10 to about 20% by volume relative to a volume of the at least one second layer, and at least one first layer 100 comprising polycrystalline YAG are disclosed herein. In preferred embodiments, in order to more closely CTE match the polycrystalline, at least one YAG first layer 100, the at least one second layer 102 may comprise at least one of partially stabilized and stabilized zirconia in amounts by volume of from about 13 to about 19%, preferably from about 14% to about 18%, preferably from about 15% to about 17%, more preferably about 16% by volume (and the balance alumina), each with respect to a volume of the at least one second layer 102. These compositional ranges of the at least one second layer 102 provide CTE matching to the YAG at least one first layer 100 in an amount of about $0.4\times10^{-6}/°$ C. and less, preferably $0.3\times10^{-6}/°$ C. and less, preferably $0.25\times10^{-6}/°$ C. and less, preferably about $0.2\times10^{-6}/°$ C. and less, preferably $0.15\times10^{-6}/°$ C. and less, preferably $0.1\times10^{-6}/°$ C. and less, preferably $0.08\times10\text{-}6/°$ C. and less, preferably $0.06\times10\text{-}6/°$ C. and less, preferably $0.04\times10\text{-}6/°$ C. and less, preferably $0.02\times10\text{-}6/°$ C. and less, and preferably $0.01\times10\text{-}6/°$ C. and less as measured in accordance with ASTM E228-17 across a temperature range of ambient (or at least from 200° C. as depicted in the figures) to about 1700° C. (or at least to 1400° C. as depicted in the figures). As a percentage relative to the at least one first layer, this CTE difference (between any of the first, second and third layers according to an embodiment) may be 5% and less, preferably 4% and less, preferably 3% and less, preferably 2.5% and less, preferably 2% and less, preferably 1.5% and less, preferably 1% and less, preferably 0.5% and less, preferably 0.25% and less, and preferably 0.1% and less, of the at least one first, second and third layers (as measured relative to the at least one first layer 100). The zirconia of the at least one second layer may comprise at least one of stabilized and partially stabilized in accordance with the methods and stabilizing compounds as disclosed herein. Unitary, multilayer sintered bodies have been formed having a greatest dimension of from 100 to about 625 mm having at least one first layer 100 comprising polycrystalline YAG and at least one second layer 102 comprising about 16% by volume of partially stabilized zirconia.

To provide corrosion and erosion resistance suitable for application as components in plasma processing chambers, polycrystalline, unitary multilayer ceramic bodies having at least one first layer 100 comprising highly phase pure, polycrystalline YAG (>90% by volume) are preferable. However, the formation of substantially phase pure YAG requires careful compositional and processing control in order to maintain stoichiometry and thus form a sintered ceramic body comprising phase pure YAG (of composition 37.5+/−0.1 mol % yttrium oxide and 62.5+/−0.1 mol % aluminum oxide). Oftentimes other crystalline phases, such as alumina, yttria, YAP, ($YAlO_3$; yttrium aluminum perovskite phase), and YAM ($Y_4Al_2O_9$; yttrium aluminum monoclinic phase) and combinations of these may be present. As a guide, FIG. 10 depicts the yttrium oxide/aluminum oxide two-component phase diagram. The horizonal axis corresponds to mixture proportions in mole percent of yttria and alumina, while the vertical axis is temperature in Celsius. The left of the horizontal axis corresponds to 100% alumina while the right corresponds to 100% yttria. The phase diagram of FIG. 10 illustrates regions where the yttrium aluminum oxide phases of YAG, YAP, and YAM are formed and the conditions of molar composition and temperature necessary to produce the forms.

Figure 13:
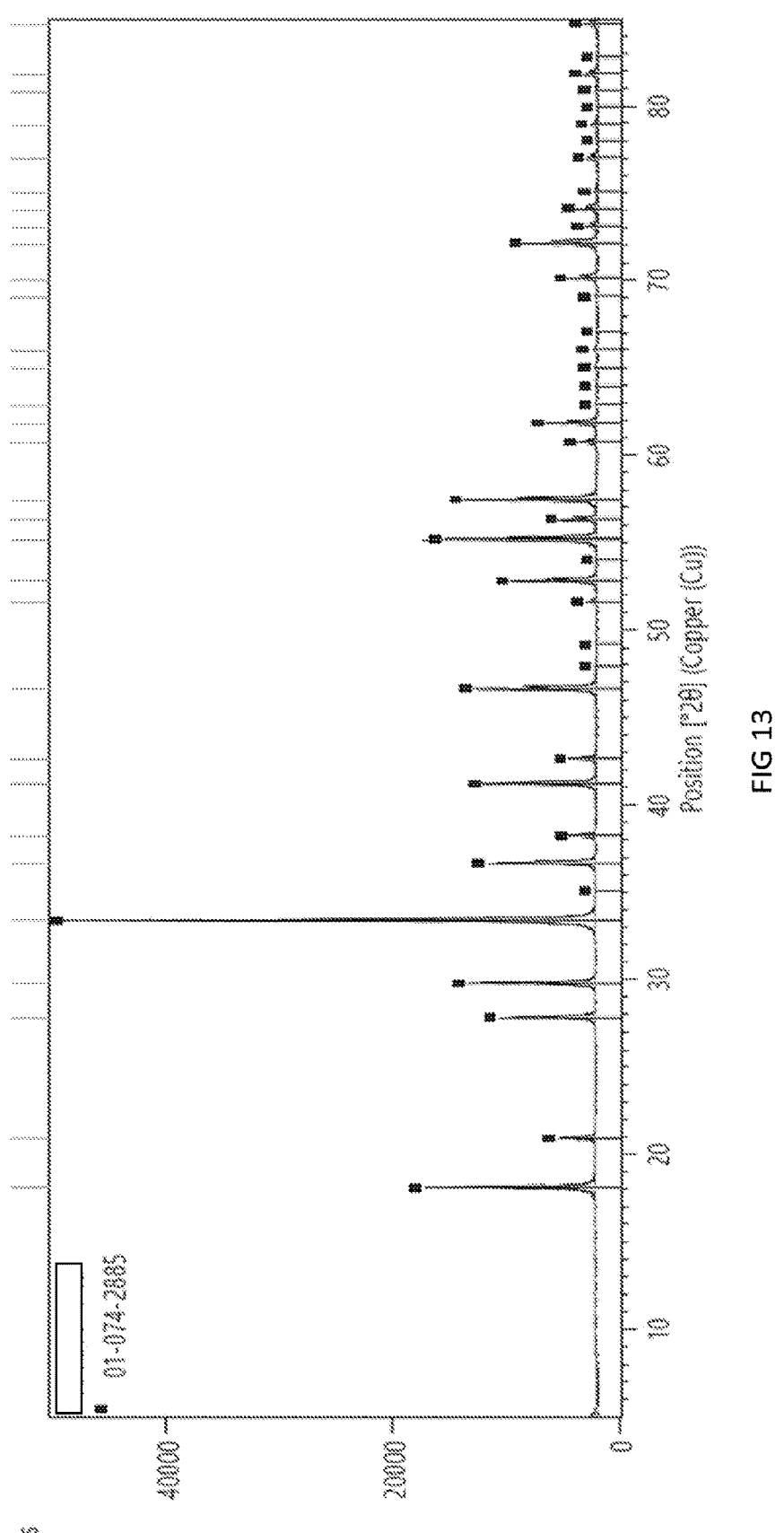
FIG. 13 illustrates x ray diffraction results of the at least one first layer 100 comprising YAG according to embodiments as disclosed herein.

Measurements of crystalline phases and image-based porosity of the at least one first layer 100 comprising YAG of the multilayer ceramic sintered bodies according to an embodiment as disclosed herein were performed using a combination of x ray diffraction (XRD), SEM imaging and use of image processing software (ImageJ). XRD was performed using a PANanlytical Aeris model XRD capable of crystalline phase identification to about +/−5% by volume. FIG. 13 depicts x ray diffraction results confirming formation of highly phase pure, polycrystalline YAG comprising the at least one first layer 100. Within the detection limits of XRD, no other phases were identified. YAG exists as a line compound according to known phase diagrams, thus formation of phase pure YAG poses challenge and requires careful compositional and process control. Such phase pure YAG is disclosed in International Patent Application No. PCT/

US20/60918, filed Nov. 17, 2020, which is herein incorporated by reference. The YAG at least one first layer 100 according to an embodiment may in some embodiments comprise excess alumina and/or excess yttria, and may be substantially free of, or free of, dopants and/or substantially free of, or free of, sintering aids as disclosed herein. In other embodiments, the first layer comprising YAG may comprise sintering aids and/or dopants in the amounts as disclosed herein. In embodiments, the polycrystalline YAG first layer 100 is substantially free of, or free of, dopants and may comprise sintering aids in the amounts as disclosed herein. XRD of the at least one first layer 100 of the multilayer ceramic sintered bodies as disclosed herein may measure phase purity up to and including about 95% by volume. As such, the at least one first layer 100 of the unitary, multilayer sintered ceramic body comprises at least about 95% by volume of the YAG phase in embodiments as depicted in the xrd results of FIG. 13.

In order to determine the phase purity to greater accuracy, for example up to and including about 99.8% by volume, SEM images were taken using backscatter detection (BSD) methods as known to those skilled in the art. Using BSD, the YAG phase appears grey, the aluminum oxide phase appears black, the yttrium oxide phase appears white, and porosity, if present, also appears black. Images were taken at 5000× using BSD methods to identify the YAG, alumina and yttria phases, and any porosity present as depicted in FIG. 11a) for a polycrystalline YAG sintered ceramic body in accordance with embodiments as disclosed herein.

Figure 11:
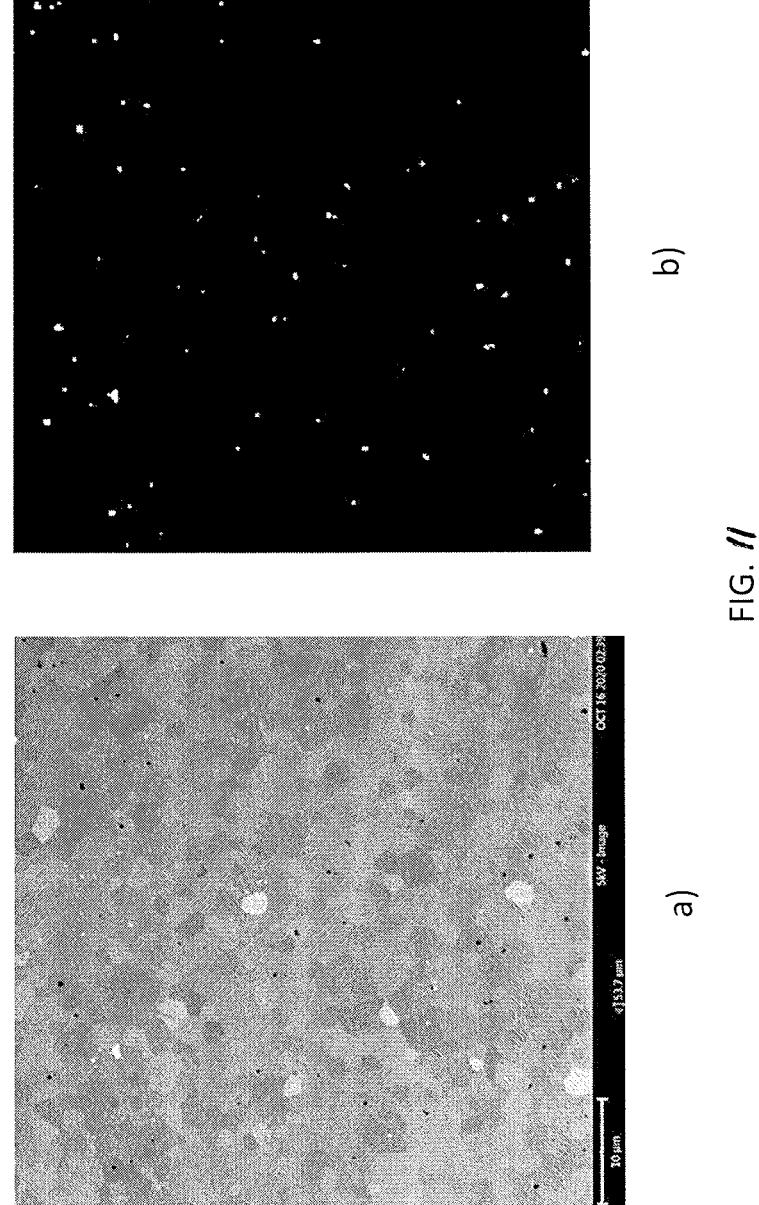
FIG. 11a) depicts an SEM micrograph of a surface of an at least one first layer 100 comprising polycrystalline YAG using backscatter detection (BSD) methods and b) an SEM image from the same region of the surface after thresholding to reveal porosity and alumina phases according to embodiments as disclosed herein.

To differentiate between black regions comprising alumina and those comprising porosity, the BSD image was black and white threshold using ImageJ processing software to highlight black regions in the BSD image which may comprise either porosity or alumina, as depicted for the same region in FIG. 11b). ImageJ has been developed at the National Institute of Health (NIH), USA, and is a Java-based public domain image processing and analysis program for image processing of scientific multi-dimensional images. The BSD detector as used for measurements disclosed herein has further capability to measure topographic features, thereby highlighting any deviations in the surface topography, such as surface porosity. Using the topographic mode of the BSD detector, topographic images were taken at 5000× across a surface of the same region of the polycrystalline YAG sintered ceramic body in accordance with Example 7 as depicted in FIG. 11a), and the topographic images are shown in FIG. 12a). Regions comprising surface porosity were highlighted as illustrated in FIG. 12b) after thresholding the topographic image in ImageJ. The area comprising surface porosity within the topographic image of FIG. 12b) was thereafter subtracted from the area comprising alumina and/or porosity in the BSD images of FIG. 12a), providing the % area, and thereby % by volume, comprising alumina phase in the polycrystalline YAG sintered ceramic body in accordance with embodiments as disclosed herein. The at least one first layer 100 of the multilayer sintered ceramic body 98 disclosed herein may have porosity and/or an aluminum oxide phase both on a surface and throughout the body. Thus, in embodiments, the multilayer sintered ceramic body may comprise an integral body comprising YAG made according to the process disclosed herein which further comprises an aluminum oxide phase and porosity distributed throughout the body. In other words, a structure measured on a surface (for example plasma facing surface 106) is representative of a structure within a volume of the bulk multilayer sintered ceramic body comprising YAG and in embodiments further comprising aluminum oxide. The combination of these analytical tools of multiple SEM imaging modes and ImageJ analysis may provide for the determination of phase purity with confidence of about +/−0.1% by volume. Using the disclosed methods, the polycrystalline YAG sintered ceramic body in accordance with Example 7 was measured to comprise from about 0.1 to about 0.2% by volume of alumina phase, from about 0.1 to about 0.2% by volume of porosity, and from about 99.6 to about 99.8% by volume of the YAG phase. Accounting for measurement variance, the polycrystalline YAG sintered ceramic bodies may comprise the YAG phase in amounts of from 99.4 to 99.8% by volume and may further comprise porosity in an amount by volume of from 0.1 to 0.3%, and aluminum oxide in an amount by volume of from 0.1 to about 0.3%.

Thus, multilayer sintered ceramic bodies having at least one first layer 100 comprising the YAG phase in amounts from 90 to 99.9%, preferably from 90 to 99.8%, preferably from 90 to 99.7%, preferably from 90 to 99.6%, preferably from 93 to 99.8% by volume, preferably from 93 to 99.7%, and preferably from 93 to 99.6%, each by volume of the at least one first layer 100, may be formed using the materials and methods as disclosed herein.

In order to assess grain size of the at least one first layer 100 comprising polycrystalline YAG, linear intercept grain size measurements were performed in accordance with the Heyn Linear Intercept Procedure described in ASTM standard E112-2010 "Standard Test Method for Determining Average Grain Size." Grain size measurements were performed (as listed in Table 4) on an exemplary plasma facing surface 106, and an average grain size of from 1.1 to 6.3 μm was measured across 25 repetitions. A maximum and minimum grain size of from 2 to 7.7 μm were also measured on an exemplary plasma facing surface 106 of the at least one first layer 100 comprising YAG. The unitary, multilayer sintered ceramic body may have a plasma facing surface 106 having a grain size of, for example, a maximum grain size of about 8 μm and less, preferably a maximum grain size of 6 μm and less. In embodiments, the unitary, multilayer sintered ceramic body may have a plasma facing surface 106 having an average grain size of from 0.4 to 6.5 μm, preferably from 0.4 to 5 μm, preferably from 0.4 to 3 μm, preferably from 0.8 to 6.5 μm, preferably from 0.8 to 5 μm, preferably from 0.8 to 3 μm, preferably from 1 to 7 μm, preferably from 1 to 6.5 μm.

TABLE 4

| Sample | d10 (μm) | Average Grain Size (μm) | Median (d50) (μm) | d90 (μm) | Min (μm) | Max (μm) |
|---|---|---|---|---|---|---|
| 519 | 1.1 | 2.1 | 1.8 | 3.1 | 0.5 | 7 |
| 531 | 0.6 | 1.1 | 1.0 | 1.5 | 0.4 | 2 |
| 506 | n/a | 6.3 | n/a | n/a | 5 | 7.7 |

To meet corrosion and erosion resistance requirements for use as components in semiconductor processing chambers, multilayered sintered ceramic bodies comprising at least one first layer 100 having low porosity across a plasma facing surface 106 and/or within the layer 100 are preferable. Porosity may serve as a site for initiation of corrosion and erosion, and as such it is preferable that there is minimal to no porosity, pores or voids within the at least one first layer 100 and/or on a plasma facing surface 106 of the first layer 100 of the multilayer sintered body. The at least one first layers disclosed herein may have very small pores both on the surface and throughout. Preferably, the at least one first layer 100 comprising at least one crystalline phase of a ceramic material selected from the group consisting of YAG, magnesium aluminate spinel and yttria and zirconia made according to the process disclosed herein are, thus, an integral layer having pores distributed uniformly throughout. In other words, pores or voids or porosity measured on a plasma facing surface 106 may be representative of pores or voids or porosity within the bulk of the at least one first layer 100.

The level of porosity was measured across sample surfaces through use of SEM images obtained from a Phenom XL scanning electron microscope at 5000× magnification. Images were imported into ImageJ Software for analysis. ImageJ has been developed at the National Institute of Health (NIH), USA, and is a Java-based public domain image processing and analysis program for image processing of scientific multi-dimensional images.

Pore size and total area comprising porosity were measured across 7 SEM images using ImageJ software methods as disclosed herein. Images were taken at 5000×, each having a total area about 53.7 μm×53.7 μm corresponding to a single image measurement area of about 2885 μm².

Figure 14:
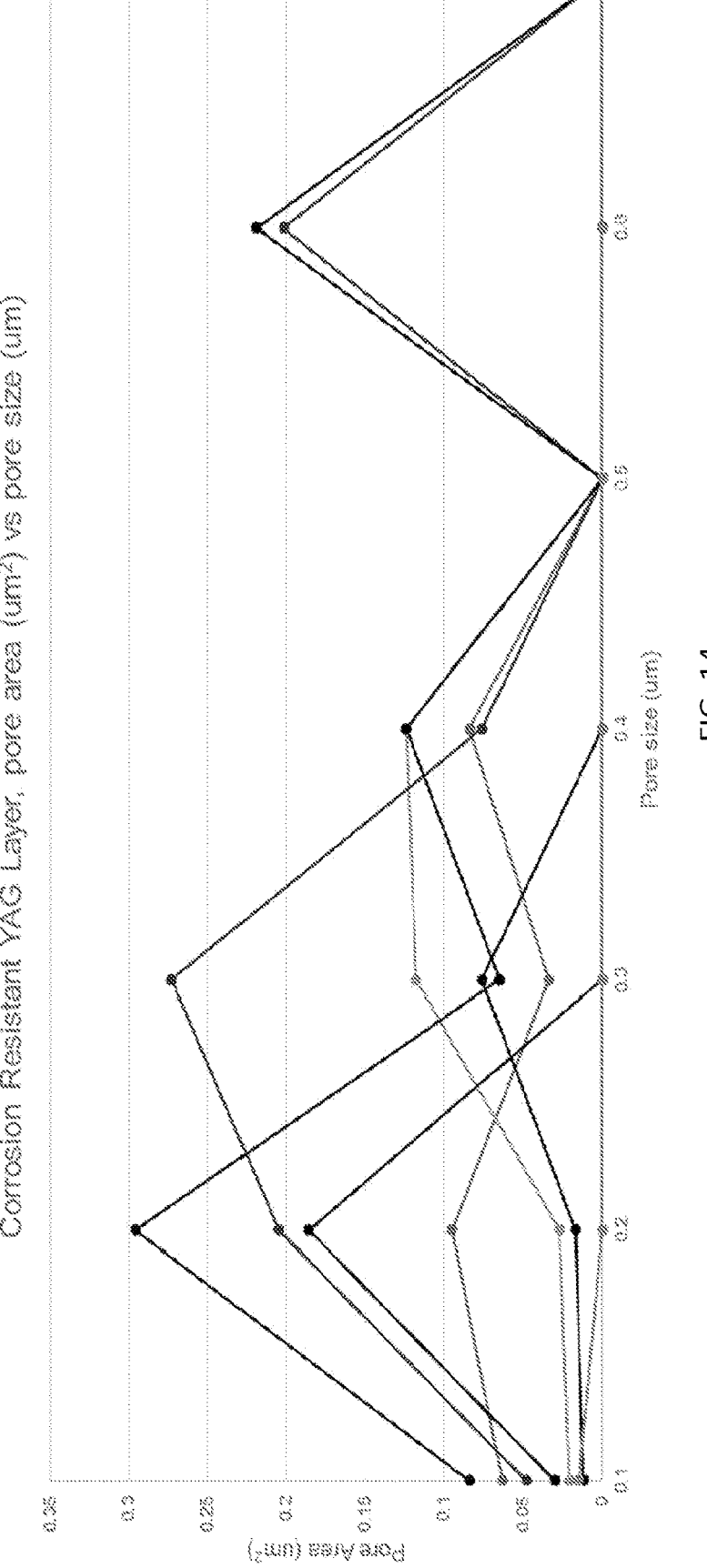
FIG. 14 illustrates pore area versus pore size for a unitary, multilayer sintered ceramic body comprising an at least one first layer 100 comprising YAG and at least one second layer 102 comprising about 16% by volume of zirconia.

FIG. 14 illustrates porosity results measured on an exemplary plasma facing surface 106 of an at least one first layer 100 comprising YAG, depicting total pore area (μm²) on the vertical axis and a horizontal axis representing pore size in microns. Measurements were performed across 7 images taken at 5000×, each of area 53.7 μm×53.7 μm for a total measurement area of about 2885 μm². A total area comprising porosity within any one of the 7 images was measured as from about 0.015 to about 0.3 μm², preferably from about 0.015 to about 0.2 μm², and preferably from about 0.015 to about 0.15 μm². A maximum pore size on the plasma facing surface 106 of the at least one first layer 100 comprising YAG of 0.7 μm and less was measured, and a maximum area comprising porosity was found to be about 0.3 μm² and less. No pores of pore size larger than 0.7 μm were measured across the 7 images analyzed within the plasma facing surface 106 of the polycrystalline YAG at least one first layer 100.

Figure 15:
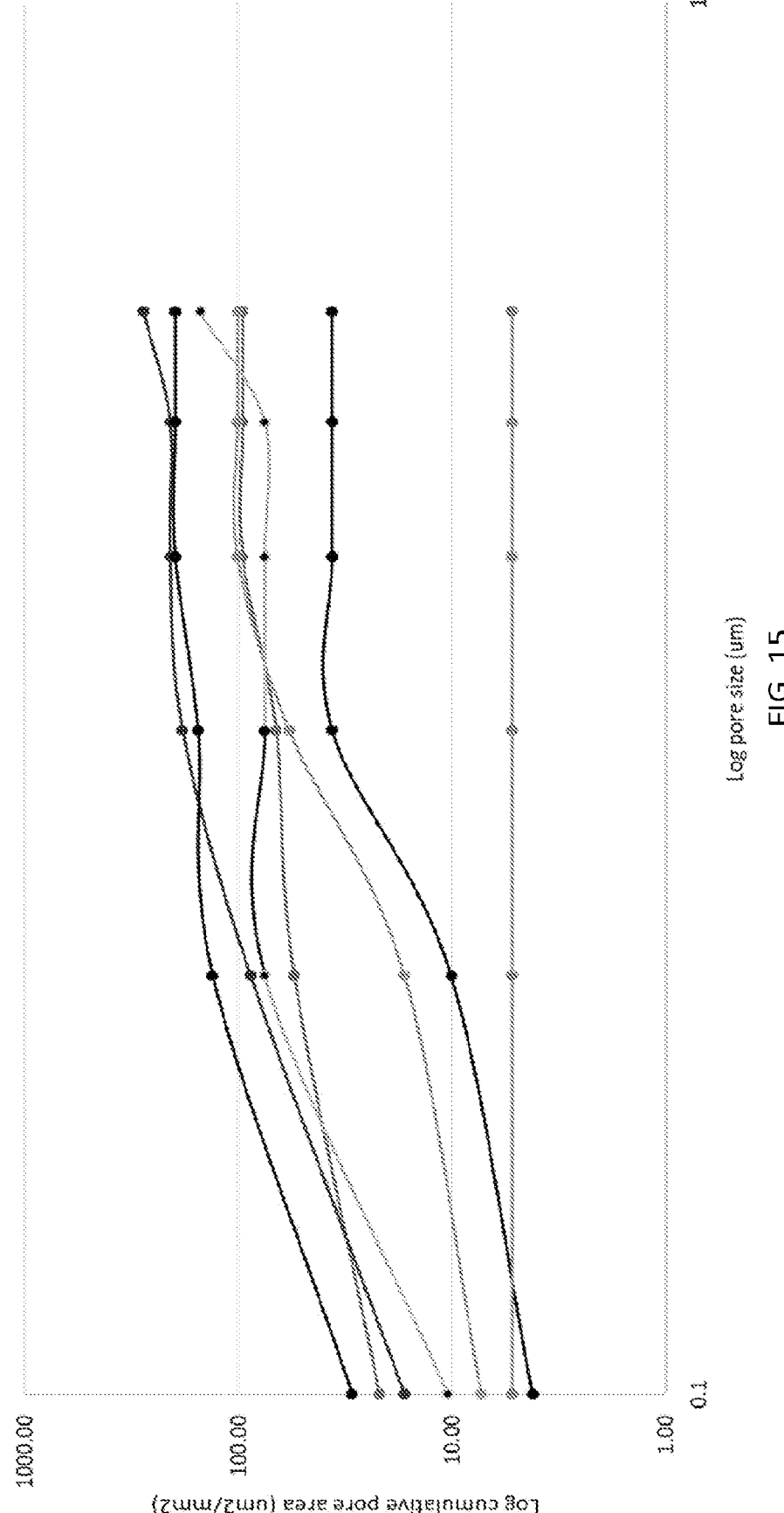
FIG. 15 illustrates cumulative pore area versus pore size for a multilayer sintered ceramic body comprising at least one first layer 100 comprising YAG and at least one second layer 102 comprising about 16% by volume of zirconia and the balance alumina according to embodiments as disclosed herein.

FIG. 15 depicts the cumulative fractional area comprising porosity (cumulative pore area) in μm² across an area in mm², expressed as the cumulative pore area (in μm²/mm²) for a given pore size of the 7 images (from plasma facing surface 106) as referenced in FIG. 14. Using SEM images and ImageJ image processing methods as disclosed herein, porosity was measured within each image (in μm²) and normalized across the total image area measured (in mm²) to calculate the cumulative pore area. The at least one first layer 100 comprising YAG as disclosed herein comprises a cumulative pore area of from about 2 to about 800 μm²/mm², preferably from about 2 to about 600 μm²/mm², preferably from about 2 to about 400 μm²/mm², preferably from about 2 to about 300 μm²/mm² as measured using SEM and image processing methods as disclosed herein. No pores of pore size larger than 0.6 μm were measured across the 7 images analyzed over the plasma facing surface 106 of the YAG at least one first layer 100 of the multilayer sintered ceramic body. Thus, across 7 images, each of area about 54 μm×54 μm, the multilayer sintered ceramic bodies as disclosed herein have at least one first layer 100 having a plasma facing surface 106 comprising porosity corresponding to pore sizes of less than 1 μm in very low (<0.1% by area) percentages by area, thus providing a corrosion and erosion resistant, plasma facing surface 106 of the multilayer sintered ceramic body for use in plasma processing chambers.

FIG. 16a) illustrates a 5000×SEM image illustrating a high density, sintered microstructure after a thermal etching process of a plasma facing surface 106 of the at least one first layer 100 comprising a polycrystalline YAG phase. Very fine scale porosity with few pores are depicted on a plasma facing surface 106 of the YAG at least one first layer 100 is indicated. A nearly fully dense microstructure is depicted, having minimal porosity and pore sizes of about 1 μm and less are visible. The multilayer sintered ceramic body according to one embodiment comprises at least one first layer 100 comprising polycrystalline YAG having a plasma facing surface 106 comprising pores wherein the pores have pore sizes on the order of 5 μm and less, down to sub-micron scale pore sizes of from about 0.1 to about 5 μm, preferably from about 0.1 to about 4 μm, preferably from about 0.1 to about 3 μm preferably from about 0.1 to about 2 μm, and preferably from about 0.1 to about 1 μm. In this embodiment, the at least one first layer 100 comprising YAG of the multilayer sintered ceramic body 98 formed from the materials and processes may comprise pores which have a maximum size of from 0.1 to 5 μm, preferably from 0.1 to 4 μm, preferably from 0.1 to 3 μm, preferably from 0.1 to 2 μm, and from 0.1 to 1 μm as measured using SEM and image processing methods as disclosed herein. About 22 pores were counted across the 54 μm×54 μm plasma facing surface 106.

FIG. 16b) depicts a summation of the total surface area comprising pores or porosity (in % of surface area) for each of 7 SEM images measured for FIG. 15 on the vertical axis and a horizontal axis representing the corresponding pore size for a given % pore area in microns. Within a given image, the total area comprising porosity and the total image measurement area were used to calculate the % pore area. As depicted in FIG. 16, the measurements across 7 SEM images correspond to an at least one first layer 100 having a plasma facing surface 106 comprising YAG comprising porosity in a percent of total area in an amount of from 0.0005 to 2%, preferably from 0.0005 to 1%, preferably from 0.0005 to 0.5%, preferably from 0.0005 to 0.05%, preferably from 0.0005 to 0.03%, preferably from 0.0005 to 0.005%, preferably from 0.0005 to 0.003%, preferably from 0.0005 to 0.001%, preferably from 0.005 to 2%, preferably from 0.05 to 2%, preferably from 0.5 to 2%, preferably from 0.005 to 2%, preferably from 0.005 to 1%, preferably from 0.05 to 2%, preferably from 0.05 to 1%, and preferably from 0.5 to 2% as measured from SEM images and using ImageJ software and methods as disclosed herein. Thus, across an image of area about 54 μm×54 μm, the multilayer sintered ceramic bodies as disclosed herein comprise a plasma facing surface 106 comprising porosity in very low (<1% by total area) percentages, thus providing a corrosion and erosion resistant surface of the multilayer sintered ceramic body 98 for use in plasma processing chambers.

The small pore/void maximum size and minimal % area of porosity of the at least one first layers 100 of the multilayer sintered bodies may enable reductions in particle generation and corrosion and erosion as required for use in semiconductor reactors. This minimal porosity corresponds to a high density, which also provides the corrosive and erosive properties to enable their use as components in semiconductor etch and deposition applications.

Density measurement of multilayer bodies proves challenging due to differences in the densities of the layers. Density measurements were performed on a multilayer sintered ceramic body (as disclosed in Example 4) by sectioning a sample cut from the full thickness of the multilayer sintered body into its first and second layers and performing density measurements on the layers individually. Measurements were performed in accordance with the Archimedes immersion method of ASTM B962-17, and a density of from 4.55 to 4.57 g/cc, preferably about 4.56 g/cc was measured for the polycrystalline YAG at least one first layer 100. Density values as reported are for an average across 5 measurements, and the standard deviation in measurements (using a known standard) was measured to be about 0.002. A commercially available, single crystal sample of bulk YAG was measured for density using the methods as disclosed herein. An Archimedes density of 4.56 g/cc across 5 measurements was obtained and this value is taken as the theoretical density of YAG as used herein. As such, the at least one first layer 100 comprising YAG of the unitary, multilayer sintered ceramic body according to an embodiment has a theoretical density of from 98.5 to 100%, preferably from 99 to 100%, preferably from 99.5 to 100%, preferably from 99.7 to 100%, and preferably about 100% of the theoretical density of YAG. The at least one second layer 102 comprising about 16% by volume of at least one of stabilized and partially stabilized zirconia (and the balance alumina) was measured for density in accordance with the Archimedes immersion method of ASTM B962-17, and a density of about 4.32 g/cc was calculated. The volumetric mixing rule as known in the art was used to calculate a theoretical density of the at least one second layer comprising alumina and about 16% by volume of at least one of stabilized and partially stabilized zirconia, and a density of from 4.31 to 4.33 g/cc, preferably about 4.32 g/cc was measured and taken as the theoretical density of the at least one second layer 102. As such, the at least one second layer 102 of the multilayer sintered ceramic body (comprising about 16% by volume of zirconia and the balance alumina) has a percent of theoretical density of from 98 to 100%, preferably from 99 to 100%, preferably from 99.5 to 100%, preferably about 100% of that of the theoretical density. The unitary, multilayer sintered ceramic body as disclosed in accordance with this embodiment has at least one first and second layers each having a percent of theoretical density (also expressed as relative density, RD) which is greater than 98%, preferably from 98 to 100%, preferably from 99 to 100%, preferably from 99.5 to 100%, preferably about 100% of the theoretical density of the unitary, multilayer sintered ceramic body.

The relative density (RD) for a given material is defined as the ratio of the measured density of the sample to the theoretical density for the same material, as shown in the following equation. Volumetric porosity (Vp) is calculated from density measurements as follows:

$$RD = \frac{\rho\ \text{sample}}{\rho\ \text{theoretical}} = 1 - Vp$$

where ρ sample is the measured (Archimedes) density according to ASTM B962-17, ρ theoretical is the theoretical density as disclosed herein, and RD is the relative fractional density. Using this calculation, volumetric porosity (Vp) levels by percent of from 0.04 to 2%, preferably from 0.04 to 1%, preferably from 0.04 to 0.8%, preferably from 0.04 to 0.6%, preferably from 0.04 to 0.5%, and preferably from 0.04 to 0.4% may be calculated from measured density values for each of the at least one first layer comprising YAG and the at least one second layer comprising alumina and about 16 volume % of partially stabilized zirconia of the multilayer ceramic sintered bodies in accordance with Example 4 and embodiments as disclosed herein.

The very high density of the at least one first layer comprising polycrystalline YAG (see, e.g., Example 4) enables polishing of the at least one plasma facing surface 106 to a very low surface roughness, Sa and low peak to valley, Sz. Polishing was performed using methods as known to those skilled in the art, and the plasma facing surface 106 of the at least one first layer 100 comprising polycrystalline YAG was measured to have an average surface roughness, Sa, of 8 nm, and an average peak to valley, Sz, of 0.14 um, using the measurement methods according to ISO standard 25178-2-2012 as disclosed herein. Measurements were averaged across 10 repetitions. The plasma facing surface 106 of the at least one first layer 100 comprising polycrystalline YAG was measured to have a maximum surface roughness, Sa, of 10 nm, and a maximum peak to valley, Sz, of 0.21 μm. The plasma facing surface 106 of the at least one first layer 100 comprising polycrystalline YAG was measured to have a minimum surface roughness, Sa, of 5 nm, and a minimum peak to valley, Sz, of 0.057 μm. The surface characteristics as disclosed of the highly dense, at least one first layer comprising YAG provide enhanced resistance to corrosion and erosion, and thereby may provide a reduction in particle generation during use as components in semiconductor plasma processing chambers.

The laminated bodies as are common in the art, comprising for example tape cast and spray dried layers, typically have laminates or layers that are exposed to plasma processing which have densities lower than those as disclosed herein, and as such may not be polished to the very low surface roughness as disclosed herein. As such, these laminates or layers may not provide sufficient resistance to the corrosive and erosive effects of harsh plasmas used during semiconductor processing, resulting in release of particles into the plasma chambers during use.

The high density of the polycrystalline YAG at least one first layer may enable high hardness values of the plasma-facing surface 106 of the at least one first layer which may provide resistance to the erosive effects of ion bombardment used during typical plasma processes. Erosion or spalling may result from ion bombardment of component or layer surfaces through use of inert plasma gases such as Ar. Those materials having a high value of hardness may be preferred for use as materials for components due to their enhanced hardness values providing greater resistance to ion bombardment and thereby, erosion. As such, Vickers hardness measurements were performed on an exemplary plasma facing surface 106 of the at least one first layer 100 comprising polycrystalline YAG in accordance with ASTM Standard C1327 "Standard Test Method for Vickers Indentation Hardness of Advanced Ceramics." The test equipment used for all hardness measurements was a Wilson Micro Hardness Tester Model VH1202. Hardness values of at least 1200 HV, preferably at least 1400 HV, preferably at least 1800 HV, preferably at least 2000 HV, from 1300 to 1600 HV, from 1300 to 1500 HV, from 1300 to 1450 HV, from 1300 to 1400 HV, from 1400 to 1600 HV, from 1450 and 1600 HV, from 1450 and 1550 HV were measured for the plasma facing surface 106 of the at least one first layer 100 of the multilayer sintered ceramic body 98 as disclosed herein. Measurements performed using Vickers hardness methods as known in the art were converted to SI units of GPa. Hardness values of from 12.75 to 15.69 GPa, from 12.75 to 14.71 GPa, from 12.75 to 14.22 GPa, from 12.75 to 13.73 GPa, from 13.73 and 15.69 GPa, from 14.22 and 15.69

GPa, preferably from 14.22 and 15.20 GPa were measured. These high hardness values may contribute to enhanced resistance to ion bombardment during semiconductor etch processes and reduced erosion during use, providing extended component lifetimes when the multilayer sintered ceramic body is machined into multilayer sintered ceramic components having fine scale features. Table 5 lists hardness values for the multilayer ceramic sintered bodies as disclosed herein. Averages are reported across eight test repetitions using a 2 kgf load cell/applied load for samples A, C and B, and a 0.025 kgf load for sample D.

TABLE 5

| Sample | Average (GPa) | St Dev | Max (GPa) | Min (GPa) |
|--------|--------------|--------|-----------|-----------|
| A | 13.47 | 0.69 | 14.7 | 12.4 |
| B | 14.14 | 0.58 | 15.0 | 13.2 |
| C | 14.5 | 0.4 | 16.1 | 14.5 |
| D | 14.8 | 1.0 | 16.0 | 12.7 |

In one embodiment, the sintered ceramic body disclosed herein has an average hardness of from 13.0 to 16.0 GPa as calculated from eight test repetitions using an applied load of 0.2 kgf as measured in accordance with ASTM Standard C1327. In another embodiment, the sintered ceramic body disclosed herein has an average hardness of about 13.5 to 15 GPa as calculated from eight test repetitions using an applied load of 0.2 kgf as measured in accordance with ASTM Standard C1327. In other embodiments, the sintered ceramic body may have an average hardness of from about 13.8 to 15.8 GPa as calculated from eight test repetitions using an applied load of 0.025 kgf.

Surface roughness of the plasma facing surface 106 of the at least one first layer may impact performance in semiconductor processing chambers. Surface roughness measurements were performed using a Keyence 3D laser scanning confocal digital microscope model VK-X250X under ambient conditions in a class 1 cleanroom. The microscope rests on a TMC tabletop CSP passive benchtop isolator with 2.8 Hz Natural Frequency. This non-contact system uses laser beam light and optical sensors to analyse the surface through reflected light intensity. The surface roughness parameters Sa, Sdr and Sz are well-known in the underlying technical field and, for example, described in ISO standard 25178-2-2012. Section 4.17 of the ISO standard describes surface roughness Sa, section 4.1.6 describes Sz and section 4.3.2 describes Sdr. The ISO 25178 Surface Texture (Areal Roughness Measurement) is a collection of international standards relating to the analysis of surface roughness with which this microscope is compliant. Sa represents an average roughness value calculated across a user-defined area of a surface of the multilayer sintered ceramic body (arithmetical mean height of the scale limited surface). Sz represents the maximum peak-to-valley distance across a user-defined area of a surface of the multilayer sintered ceramic body (maximum height, peak to valley, of the scale-limited surface). Sdr is a calculated numerical value defined as the "developed interfacial area ratio" and is a proportional expression for an increase in actual surface area beyond that of a completely flat surface. A flat surface is assigned an Sdr of zero, and the value increases with the slope of the surface. Larger numerical values correspond with greater increases in surface area. This allows for numerical comparison of the degree of surface area increase of a sample. It represents additional surface area arising from texture or surface features as compared to a planar area.

The surface of samples was laser scanned using the confocal microscope at 50× magnification to capture a detailed image of the sample. The parameters of Sa (arithmetical mean height), Sz (maximum height), Ra (line roughness) and Sdr (developed interfacial area) were measured on a selected area of a polished surface (plasma facing surface 106) of the at least one layer 100 of the multilayer sintered ceramic body. These parameters were obtained on a profile of 7 partitioned blocks. The lambda chi($\lambda$), which represents the measurement sampling lengths or areas, was adjusted so that the line reading was limited to measurements from the 5 middle blocks of the 7 according to ISO specification 4288: Geometrical Product Specifications (GPS)—Surface texture: Profile method—Rules and procedures for the assessment of surface texture. Surface areas were selected within polished surfaces of a sample for measurement. Areas were selected to be most representative of the typical sample surface and used to calculate Ra, Sdr, Sa and Sz.

In one embodiment wherein the plasma facing surface 106 of the at least one first layer comprises YAG, surface roughness measurements were performed in accordance with ISO standard 25178-2-2012, and Sa values of from 0.0005 to 2 µm, preferably from 0.0005 to 1.5 µm, preferably from 0.0005 to 1 µm, preferably from 0.0005 to 0.75 µm, preferably from 0.0005 to 0.5 µm, preferably from 0.0005 to 0.25 µm, preferably from 0.0005 to 0.125 µm, preferably from 0.0005 to 0.075 µm, preferably from 0.0005 to 0.050 µm, preferably from 0.0005 to 0.025 µm, preferably from 0.0005 to 0.020 µm, preferably from 0.0005 to 0.015 µm, preferably from 0.0005 to 0.010 µm, preferably from 0.001 to 0.030 µm, preferably from 0.001 to 0.020 µm, and preferably from 0.001 to 0.010 µm, across a surface were measured. The following Table 6 lists Sa, Sz and Sdr values for an at least one first layer 100 comprising a plasma facing surface 106 comprising YAG according to embodiments as disclosed herein.

TABLE 6

| YAG | | | | |
| Sa µm | Sz µm | Sdr N/A | Ra µm | Rz µm |
| --- | --- | --- | --- | --- |
| 0.0018 | 0.5514 | 0.00052 | 0.0018 | 0.0373 |
| 0.0021 | 0.6236 | 0.00058 | 0.0017 | 0.0259 |
| 0.0025 | 0.6902 | 0.00136 | 0.0027 | 0.0714 |
| 0.0016 | 0.5379 | 0.00041 | 0.0015 | 0.0251 |
| 0.0007 | 0.3702 | 0.00007 | 0.0006 | 0.0060 |
| 0.0007 | 0.4437 | 0.00007 | 0.0006 | 0.0044 |
| 0.0007 | 0.3488 | 0.00007 | 0.0007 | 0.0150 |
| 0.0009 | 0.8121 | 0.00015 | 0.0008 | 0.0196 |
| 0.0030 | 0.6495 | 0.00028 | 0.0017 | 0.0250 |
| 0.0029 | 0.6752 | 0.00043 | 0.0016 | 0.0162 |
| 0.0060 | 1.1173 | 0.00526 | 0.0054 | 0.1176 |
| 0.0029 | 2.2639 | 0.00039 | 0.0017 | 0.0179 |
| 0.0059 | 1.3057 | 0.00546 | 0.0048 | 0.1378 |
| 0.0051 | 0.9395 | 0.00389 | 0.0041 | 0.0910 |
| 0.0054 | 0.7969 | 0.00432 | 0.0044 | 0.1092 |
| 0.0030 | 1.1078 | 0.00033 | 0.0017 | 0.0401 |
| Average | 0.0028 | 0.8271 | 0.00148 | 0.0022 | 0.0475 |
| SD | 0.0019 | 0.4711 | 0.00199 | 0.0016 | 0.0434 |

Thus, the at least one first layer 100 comprising YAG of the multilayer sintered ceramic body according to an embodiment (and listed in Table 6) as disclosed may have a plasma facing surface 106 having a surface roughness, Sa, of from 0.0005 to 2 µm, preferably from 0.0005 to 1.5 µm, preferably from 0.0005 to 1 µm, preferably from 0.0005 to 0.75 µm, preferably from 0.0005 to 0.5 µm, preferably from 0.0005 to 0.25 µm, preferably from 0.0005 to 0.125 µm, preferably from 0.0005 to 0.075 µm, preferably from 0.0005 to 0.050 µm, preferably from 0.0005 to 0.025 µm, preferably from 0.0005 to 0.020 µm, preferably from 0.0005 to 0.015 µm, preferably from 0.0005 to 0.010 µm, preferably from 0.001 to 0.030 µm, preferably from 0.001 to 0.020 µm, and preferably from 0.001 to 0.010 µm as measured according to ISO standard 25178-2-2012.

According to Table 6, the at least one first layer 100 comprising YAG of the multilayer sintered ceramic body according to an embodiment as disclosed herein may have a plasma facing surface 106 having a peak to valley, Sz of from 0.3 to 5 µm, preferably from 0.3 to 4 µm, preferably from 0.3 to 3 µm, preferably from 0.3 to 2 µm, preferably from 0.3 to 1 µm, preferably from 0.65 to 5 µm, preferably from 1 to 5 µm, preferably from 2 to 5 µm, preferably from 0.35 to 3 µm, and preferably from 0.5 to 1 µm as measured according to ISO standard 25178-2-2012.

According to Table 6, the at least one first layer 100 comprising YAG of the multilayer sintered ceramic body according to an embodiment as disclosed herein may have a plasma facing surface 106 having a developed interfacial area, Sdr of from $5 \times 10^{-5}$ to $550 \times 10^{-5}$, preferably from $30 \times 10^{-5}$ to $400 \times 10^{-5}$, preferably from $30 \times 10^{-5}$ to $200 \times 10^{-5}$, and preferably from $40 \times 10^{-5}$ to $100 \times 10^{-5}$, as measured according to ISO standard 25178-2-2012.

In order to assess performance in halogen-based plasma applications, etching was carried out on a sintered ceramic body prepared according to an embodiment comprising an at least one first layer 100 comprising YAG as described following.

To assess etch performance, polished ceramic samples having a plasma facing surface comprising a first layer of YAG of dimension 6 mm×6 mm×2 mm were mounted onto a c plane sapphire wafer using a silicone-based heat sink compound. Regions of each part were blocked from exposure to the etch process by bonding a 5 mm×5 mm square sapphire ceramic to the sample surface.

The dry etch process was performed using a Plasma-Therm Versaline DESC PDC Deep Silicon Etch which is standard equipment for the industry. Etching was completed using a 2-step process for a total duration of 6 hours. The etch method was performed having a pressure of 10 millitorr, a bias of 600 volts and ICP power of 2000 watts. The etch method was conducted with a first etch step having a $CF_4$ flow rate of 90 standard cubic centimetres per minute (sccm), an oxygen flow rate of 30 standard cubic centimetres per minute (sccm), an argon flow rate of 20 standard cubic centimetres per minute (sccm), and a second etch step having an oxygen flow rate of 100 standard cubic centimetres per minute (sccm) and an argon flow rate of 20 standard cubic centimetres per minute (sccm), wherein first and second etch steps are performed for 300 seconds each and repeated for a combined duration of 6 hours. The etch conditions as used here to assess sample performance were selected to subject the disclosed materials to extreme etch conditions in order to differentiate performance. Upon completion of the etch procedure, surface roughness parameters of Sa, Sz and Sdr were measured using the methods as disclosed herein. Table 7 lists results after etching (using the 2 step process as disclosed herein) on a variety of samples having a plasma facing surface 106 of the at least one first layer 100 comprising YAG.

TABLE 7

| Sample | Description | anneal | Sa (nm) pre etch | Sa (nm) post etch | Sz (um) pre etch | Sz (um) post etch | Sdr (×10−5) pre etch | Sdr (×10−5) post etch | Process (T/P/t) |
|--------|-------------|--------|------------------|-------------------|------------------|-------------------|----------------------|-----------------------|-----------------|
| 322 | 0.5% alumina | N | 10 | 10 | 3.9 | 4.7 | <400 | <400 | 1450/20/45 |
| 322-1 | 0.5% alumina | Y | 24 | 21 | N/A | N/A | <500 | <500 | 1450/20/45 |
| 298 | zr doping | N | 10 | 14 | 3.9 | 3.8 | 300 | 300 | 1450/20/30 |
| 298-2 | zr doping | Y | 26 | 28 | 7.2 | 7.7 | 4800 | 5500 | 1450/20/30 |
| 454 | YAG | N | 14 | 16 | 3.7 | 4.8 | 300 | 800 | 1525/20/45 |
| 454-1 | 98-98.5% RD | Y | 16 | 18 | 6.6 | 6.8 | 700 | 1400 | 1525/20/45 |
| 223 | YAG | N | 20 | 20 | 3.1 | 4.9 | 400 | 400 | 1450/20/45 |
| TSC-3 | quartz glass | N/A | 58 | 59 | 4.3 | 22 | 300 | 17,300 | N/A |
| 311 | 0.25% alumina | N | 20 | 18 | 7.4 | 7.1 | 2100 | 1700 | 1450/20/30 |
| 311-1 | 0.25% alumina | Y | 30 | 30 | 7.3 | 7.4 | 4700 | 4500 | 1450/20/30 |

The exemplary plasma facing surfaces 106 of the at least one first layers 100 comprising YAG were made with excess alumina (samples 311 and 322), zirconia doping (samples 298), stoichiometric YAG (samples 454 and 223), and lowered relative density (RD), sample 454-1. As listed in Table 7, the process conditions (Process) are listed as temperature, T (° C.), pressure, P (MPa), and time, t (minutes) used to make each of the respective samples according to the method as disclosed herein. Where applicable, annealing was performed at 1400° C. for 8 hours in air.

In an embodiment, the present disclosure relates to a multilayer sintered ceramic body and/or component made therefrom having an at least one first layer 100 comprising YAG having a plasma facing surface 106 before an etch or deposition process providing an arithmetical mean height, Sa, in an unetched area of less than 15 nm, more preferably loss than 13 nm, more preferably less than 10 nm, more preferably less than 8 nm, and more preferably less than 5 nm, according to ISO standard 25178-2-2012, section 4.1.7. surface roughness and not exceeding a specific value.

In an embodiment, the present disclosure relates to a multilayer sintered ceramic body and/or component made therefrom having an at least one first layer 100 comprising polycrystalline YAG having a plasma facing surface 106 before an etch or deposition process providing a maximum height, Sz, of less than 5.0 μm, more preferably loss than 4.0 μm, most preferably less than 3.5 μm, more preferably less than 2.5 μm, more preferably less than 2 μm, and more preferably less than 1.5 μm, according to ISO standard 25178-2-2012, and not exceeding a specific value.

In an embodiment, the present disclosure relates to a multilayer sintered ceramic body and/or component made therefrom having an at least one first layer 100 comprising polycrystalline YAG having a plasma facing surface 106 before an etch or deposition process providing a developed interfacial area, Sdr, of less than $1500 \times 10^{-5}$, more preferably less than $1200 \times 10^{-5}$, more preferably less than $1000 \times 10^{-5}$, more preferably less than $800 \times 10^{-5}$, more preferably less than $600 \times 10^{-5}$, and more preferably less than $400 \times 10^{-5}$, according to ISO standard 25178-2-2012, section 4.1.7. surface roughness and not exceeding a specific value.

In an embodiment, the present disclosure relates to a multilayer sintered ceramic body and/or component made therefrom having an at least one first layer comprising polycrystalline YAG having a plasma facing surface 106 after the etch or deposition process as disclosed herein providing an arithmetical mean height, Sa, of from 0.0005 to 2 μm, preferably from 0.0005 to 1.5 μm, preferably from 0.0005 to 1 μm, preferably from 0.0005 to 0.75 μm, preferably from 0.0005 to 0.5 μm, preferably from 0.0005 to 0.25 μm, preferably from 0.0005 to 0.125 μm, preferably from 0.0005 to 0.075 μm, preferably from 0.0005 to 0.050

μm, preferably from 0.0005 to 0.025 μm, preferably from 0.0005 to 0.020 μm, preferably from 0.0005 to 0.015 μm, preferably from 0.0005 to 0.010 μm, preferably from 0.001 to 0.030 μm, preferably from 0.001 to 0.020 μm, preferably from 0.001 to 0.010 μm, and preferably about 0.008 μm according to ISO standard 25178-2-2012, section 4.1.7. surface roughness and not exceeding a specific value.

In an embodiment, the present disclosure relates to a multilayer sintered ceramic body and/or component made therefrom having an at least one first layer comprising polycrystalline YAG having a plasma facing surface 106 after the etch or deposition process as disclosed herein providing a maximum height, Sz, of less than 3.8 μm, preferably less than 2.8 μm, preferably less than 2.5 μm, preferably from 0.1 to 2.5 μm, preferably from 0.1 to 1.5 μm, preferably from 0.1 to 1.0 μm, preferably from 0.1 to 0.5 μm, and preferably from about 0.1 to 0.3 μm, according to ISO standard 25178-2-2012, section 4.1.7. surface roughness and not exceeding a specific value.

In an embodiment, the present disclosure relates to a multilayer sintered ceramic body and/or component made therefrom having an at least one first layer comprising polycrystalline YAG having a plasma facing surface 106 after the etch or deposition process as disclosed herein providing a developed interfacial area, Sdr, of less than $3000 \times 10^{-5}$, more preferably less than $2500 \times 10^{-5}$, more preferably less than $2000 \times 10^{-5}$, more preferably less than $1500 \times 10^{-5}$, more preferably less than $1000 \times 10^{-5}$, and more preferably less than 800×10-5, according to ISO standard 25178-2-2012, section 4.1.7. surface roughness and not exceeding a specific value. By using the above-described multilayer sintered ceramic body according to embodiments disclosed herein, a significant corrosion and erosion resistant material is provided which allows continuous, extended use as components in etch and deposition processes. This corrosion and erosion resistant material minimizes particle generation through improved surface characteristics as disclosed herein, providing improved performance during use and reduced contamination of semiconductor substrates during processing.

The starting powders and powder mixtures used for making the at least one first layer 100 as disclosed herein and having very high purity may provide corrosive and erosive resistance to enable use as components in semiconductor etch and deposition applications. This high purity provides a chemically inert, plasma facing surface 106 (the term inert as used herein is intended to mean chemically inactive) which may prevent roughening of the plasma facing surface 106 of the at least one first layer 100 by halogen based gaseous species which may otherwise chemically attack and etch, or erode by ion bombardment, those materials made from powders and powder mixtures lower in purity. Impurities and contaminants within the at least one first layer 100 serve as a site for initiation of corrosion and erosion, and as such high purity (and correspondingly low impurity content as expressed in ppm of contaminants) is preferable within the at least one first layer 100 of the multilayer corrosion resistant sintered ceramic body, and in particular on the plasma facing surface 106. Table 9 lists impurities of exemplary powder mixtures according to an embodiment, which are sintered to form at least one first layer, 100 comprising substantially phase pure, polycrystalline YAG.

In accordance with the disclosure herein, a multilayer sintered ceramic body having a plasma facing surface 106 of an at least one first layer comprising the yttrium aluminum garnet (YAG) phase in amounts of greater than 90% by volume may be formed by in situ, reactive sintering during the sintering step by way of the combined properties of particle size distribution, purity and/or surface area of the powder mixtures as disclosed herein. In embodiments, the powder mixtures comprise crystalline powders of yttria and alumina. In other embodiments, in addition to the crystalline powders of yttria and alumina, the powder mixture may be calcined and comprise less than about 10% by volume of YAG, preferably less than 8% by volume of YAG, and preferably less than 5% by volume of YAG; in other embodiments disclosed herein is a powder mixture which is free of, or substantially free of, the YAG phase (comprising crystalline powders of yttria and alumina). In other embodiments, it may be preferred that the powder mixture has a specific surface area of greater than 2 m²/g. In other embodiments, it may be preferable that the powder mixture is free of a YAG phase having a specific surface area of about 2 m²/g and greater in order to form at least one first layer of the multilayer sintered ceramic body comprising YAG through the in situ, reactive phase sintering process as disclosed herein. All purity measurements disclosed herein are as measured above the reporting limit for a specific element and were completed using an ICP-MS (inductively coupled plasma mass spectrometry) from Agilent, 7900 ICP-MS model G8403, a quadrupole mass spectrometry system. Liquid samples are introduced into the ICP-MS as a fine aerosol which is ionized in the plasma discharge and later separated using a quadrupole mass analyser as known to those skilled in the art. Detection limits using the ICP-MS methods as disclosed herein to identify presence of lighter elements are higher than reporting limits of heavier elements. In other words, heavier elements, such as from Sc and higher, are detected with greater accuracy, for example to as low as 0.06 ppm, than those lighter elements, from for example, Li to Al (detected at for example accuracy of as low as 0.7 ppm). Thus, impurity contents for those powders comprising lighter elements, such as from Li to Al, may be determined to about 0.7 ppm and greater, and impurity contents of heavier elements, from Sc (scandium) to U (uranium) may be determined to about 0.06 ppm and greater. Using the ICPMS methods as disclosed herein, silica may be detected in amounts as low as about 14 ppm, while K (potassium) and Ca (calcium) may be identified in amounts of 1.4 ppm and greater. Iron may be detected with accuracy in amounts of as low as 0.14 ppm and greater. Total impurity contents as disclosed herein do not include silica.

The plasma facing surface 106 of the at least one first layer 100 comprising polycrystalline YAG may have a total impurity content of less than 100 ppm, preferably less than 75 ppm, less than 50 ppm, preferably less than 25 ppm, preferably less than 15 ppm, preferably less than 10 ppm, preferably less than 8 ppm, preferably less than 5 ppm, preferably from 5 to 30 ppm, preferably from 5 to 20 ppm relative to a total mass of the at least one first layer comprising polycrystalline YAG as measured using ICPMS methods. The total impurity contents as disclosed herein do not include Si in the form of silica.

Detection limits using the ICP-MS methods as disclosed herein to identify presence of lighter elements are higher than reporting limits of heavier elements. In other words, heavier elements, such as from Sc and higher, are detected with greater accuracy, for example to as low as 0.06 ppm, than those lighter elements, from for example Li to Al (detected at for example accuracy of as low as 0.7 ppm). Thus, impurity contents for those powders comprising lighter elements, such as from Li to Al, may be determined to about 0.7 ppm and greater, and impurity contents of heavier elements, from Sc (scandium) to U (uranium) may be determined to about 0.06 ppm and greater. Using the ICPMS methods as disclosed herein, silica may be detected in amounts as low as about 14 ppm, while K (potassium) and Ca (calcium) may be identified in amounts of 1.4 ppm and greater. Iron may be detected with accuracy in amounts of as low as 0.14 ppm.

Sintering aids such as $SiO_2$, MgO, CaO, $Li_2O$ and LiF, are known to promote densification, and LiF in particular is known to be used to promote grain growth and thereby increase grain size in YAG and spinel. However, these sintering aids may degrade corrosion resistance, strength and performance in etch and deposition applications. Thus, in embodiments, the at least one first layer 100 of the multilayer sintered ceramic bodies as disclosed herein may be formed from at least one powder mixture having a calcia, magnesia, lithia and/or a lithium fluoride content of about 2 ppm and less each, relative to a total mass of the powder mixture. The high purity of the powder mixtures (which may be calcined and thereafter sintered using the methods as disclosed herein) is thereby transferred to the multilayer sintered ceramic body. In embodiments as disclosed herein, for example, the multilayer sintered ceramic bodies may have at least one first layer 100 comprising at least one crystalline phase of a ceramic material selected from the group consisting of YAG, magnesium aluminate spinel and yttria and zirconia wherein each of the at least one first layers 100 comprise silica in amounts of from 14 to 100 ppm, preferably from 14 to 75 ppm, preferably from 14 to 50 ppm, preferably from 14 to 25 ppm, preferably from 14 to 20 ppm, preferably about 14 ppm each relative to a mass of the at least one first layer 100. In other embodiments, each of the at least one first layers 100 may comprise at least one of magnesia, lithia/lithium fluoride and/or calcia in amounts of from about 2 to 100 ppm, preferably from about 2 to 75 ppm, preferably from about 2 to 50 ppm, preferably from about 2 to 25 ppm, preferably from about 2 to 20 ppm, preferably from about 2 to 10 ppm each relative to a mass of the at least one first layer 100. In order to enhance strength and provide chemical inertness in the at least one first layer 100 comprising at least one crystalline phase of a ceramic material selected from the group consisting of YAG, magnesium aluminate spinel, and zirconia and alumina, it is preferable that each of the at least one first layers 100 do not comprise Li or LiF in amounts greater than about 2 ppm each, relative to a mass of the at least one first layer 100. As such, in further embodiments, each of the at least one first layers 100 comprising at least one crystalline phase of a ceramic material selected from the group consisting of YAG, magnesium aluminate spinel, and zirconia and alumina may comprise lithium fluoride, calcia, and/or magnesia in amounts of from about 2 to 100 ppm, preferably from about 2 to 75 ppm, preferably from about 2 to 50 ppm, preferably from about 2 to 25 ppm, preferably from about 2 to 20 ppm, each relative to a mass of the at least one first layer 100.

In preferred embodiments, the at least one first layer comprising polycrystalline YAG may have a purity of 99.99% and greater, preferably 99.995% and greater, each relative to a material having 100% purity as measured using the ICPMS methods as disclosed herein.

In embodiments, each of the at least one first layers 100 comprising at least one polycrystalline ceramic material selected from the group consisting of YAG, magnesium aluminate spinel, and yttria and zirconia may comprise Si in the form of silica in amounts of from 14 to 100 ppm, preferably from 14 to 75 ppm, preferably from 14 to 50 ppm, preferably from 14 to 25 ppm, preferably from 14 to 20 ppm, and preferably about 14 ppm, each relative to a total mass of the at least one first layer.

In embodiments of the multilayer sintered ceramic bodies disclosed herein, each of the at least one first layers 100 comprising at least one polycrystalline ceramic material selected from the group consisting of YAG, magnesium aluminate spinel, and yttria and zirconia may be made with optional dopants of for example a rare earth oxide selected from the group consisting of Sc, La, Er, Ce, Cr, Pr, Nd, Pm, Sm, Eu, Gd, Tb, Dy, Ho, Tm, Yb, and Lu and oxides and combinations thereof in amounts of $\geq$0.002% by weight, preferably $\geq$0.0035% by weight, preferably $\geq$0.005% by weight, and preferably $\geq$0.0075% by weight, which may be added into the starting powders or powder mixtures at steps a, b or c.

In embodiments of the multilayer sintered ceramic bodies disclosed herein, the at least one first layer 100 of the aforementioned ceramic sintered bodies may be made with optional dopants of for example a rare earth oxide selected from the group consisting of Sc, La, Er, Ce, Cr, Pr, Nd, Pm, Sm, Eu, Gd, Tb, Dy, Ho, Tm, Yb, and Lu and oxides and combinations thereof in amounts of $\leq$0.05% by weight, preferably $\leq$0.03% by weight, preferably $\leq$0.01% by weight, and preferably from 0.002 to 0.02% by weight, which may be added into the starting powders or powder mixture at steps a, b or c.

In embodiments of the multilayer sintered ceramic bodies as disclosed herein, the at least one first layer 100 comprising at least one polycrystalline ceramic material selected from the group consisting of YAG, magnesium aluminate spinel, and yttria and zirconia may be made without the aforementioned dopants. In particular, for semiconductor chamber applications requiring chemical inertness and resistance to corrosion and erosion combined with high strength, it may be preferable that each of the at least one first layers 100 comprising at least one polycrystalline ceramic material selected from the group consisting of YAG, magnesium aluminate spinel, and yttria and zirconia of the multilayer sintered ceramic body are free of, or substantially free of, dopants. Thus, in certain embodiments, the multilayer sintered ceramic body having at least one first layer 100 comprising at least one polycrystalline ceramic material selected from the group consisting of YAG, magnesium aluminate spinel, and yttria and zirconia is substantially free of, or free of, at least one of, or all of the aforementioned dopants.

According to some embodiments, excess yttria and/or alumina within the polycrystalline YAG layer 100 are not considered dopants or sintering aids to the extent they may remain in the at least one first layer. The high purity and correspondingly low impurity of the plasma facing surface 106 of the at least one first layer as disclosed may enable reductions in particle generation and corrosion and erosion as required for use in semiconductor reactors. Purities of for example 99.99% and higher, preferably 99.995% and higher, preferably 99.999% and higher, preferably 99.9995% and higher, preferably about 99.9999% may be measured for the at least one first layer 100 comprising polycrystalline YAG.

The dielectric loss/tangent delta of the polycrystalline YAG at least one first layer 100 and the at least one second layer 102 are listed in the following Table 8. The high purity of the respective layers comprising the multilayer sintered ceramic body provides low loss tangents for at least one first layer comprising YAG of from $5.5\times10^{-3}$ and less at 1 MHz, and less than $1\times10^{-4}$ at 1 GHz, and less than 0.0007 for at least one second layer comprising alumina and about 16% by volume of partially stabilized zirconia. Measurements were performed on exemplary solid bodies of each material.

TABLE 8

| material | frequency | dielectric constant | loss tangent |
|---|---|---|---|
| YAG | 1 MHz | 11.56 | <0.0001 |
| YAG | 1 MHz | 11.65 | 0.0055 |
| YAG | 1 GHz | 11.03 | <0.0001 |
| YAG | 1 GHz | 11.06 | <0.0001 |
| Alumina 16 vol. % Zirconia | 1 MHz | 12 | <0.0007 |

However, these corrosion and erosion resistant materials pose challenges to sinter to the high densities required for application to semiconductor etch and deposition chambers. As such, typically pressure assisted sintering methods, and in preferred embodiments pressure and current assisted sintering methods are required.

According to another embodiment, disclosed herein is a unitary, multilayer sintered ceramic body comprising at least one first layer 100 comprising magnesium aluminate spinel, at least one second layer 102 comprising alumina and zirconia wherein the zirconia comprises at least one of stabilized and partially stabilized zirconia, and at least one third layer 103 comprising a multiphase layer comprising at least YAG, alumina, and zirconia wherein the zirconia comprises at least one of unstabilized, stabilized and partially stabilized zirconia, wherein an absolute value of the difference in coefficient of thermal expansion (CTE) between the at least one first, second and third layers is from 0 to $0.75\times10\text{-}6/^\circ$ C., preferably from 0 to $0.7\times10\text{-}6/^\circ$ C., preferably from 0 to $0.6\times10\text{-}6/^\circ$ C., preferably from 0 to $0.5\times10\text{-}6/^\circ$ C., preferably from 0 to $0.45\times10\text{-}6/^\circ$ C., preferably from 0 to $0.4\times10\text{-}6/^\circ$ C., preferably from 0 to $0.35\times10\text{-}6/^\circ$ C., preferably from 0 to $0.3\times10\text{-}6/^\circ$ C., preferably from 0 to $0.25\times10\text{-}6/^\circ$ C., preferably from 0 to $0.2\times10\text{-}6/^\circ$ C., preferably from 0 to $0.15\times10\text{-}6/^\circ$ C., preferably from 0 to $0.1\times10\text{-}6/^\circ$ C., preferably from 0 to $0.08\times10\text{-}6/^\circ$ C., preferably from 0 to $0.04\times10\text{-}6/^\circ$ C., and preferably from 0 to $0.02\times10\text{-}6/^\circ$ C. as measured in accordance with ASTM E228-17 across a temperature range of from 25 to 1700° C. or across a temperature range of from 200 to 1400° C. These ranges of the absolute value of the difference in CTE between the at least one first layer comprising magnesium aluminate spinel, and the at least one second and third layers corresponds to a difference in CTE by percentage between any of the at least one first, second and third layers of 9% and less, preferably 7% and less, preferably 5% and less, preferably 3% and less, preferably 2% and less, preferably 1.5% and less, preferably 1% and less, preferably 0.5% and less, and preferably 0.1% and less of the at least one first, second and third layers (as measured relative to the at least one first layer 100 comprising magnesium aluminate spinel). The at least one first, second and third layers are CTE matched within the ranges as disclosed across a temperature range of ambient (or at least from 200° C. as depicted in the figures) to about 1700° C. (or at least to 1400° C. as depicted in the figures) to form a unitary, multilayer sintered ceramic body.

Figure 17:
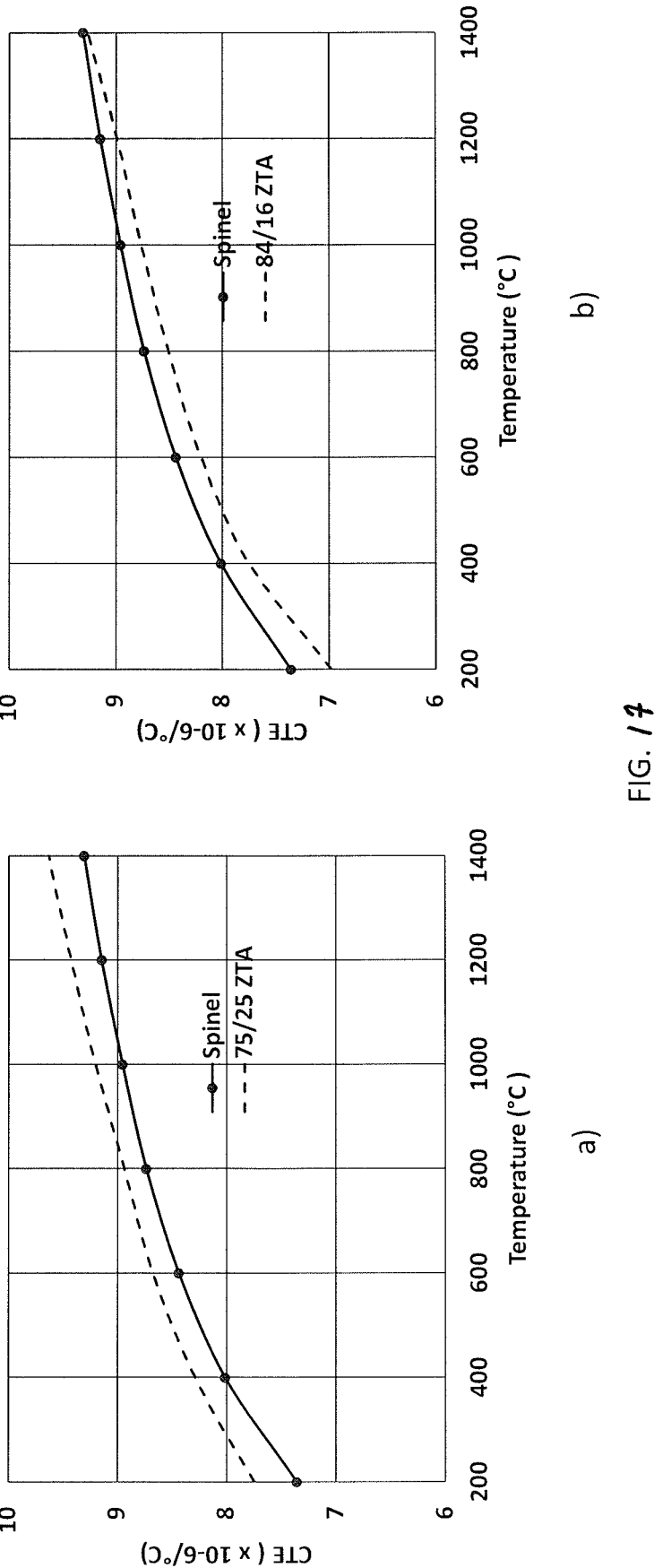
FIGS. 17a), b) and c) depict variation in CTE of a multilayer sintered ceramic body comprising an at least one first layer 100 comprising spinel and at least one second layer 102 according to embodiments as disclosed herein.

FIGS. 17$a$), $b$) and $c$) illustrate CTE measurements across a temperature range of ambient (or at least from 200° C. as depicted in the figures) to about 1700° C. (or at least to 1400° C. as depicted in the figures) of exemplary materials for forming at least one first and second layers of the unitary, multilayer sintered ceramic bodies according to an embodiment. All CTE measurements as disclosed herein were performed in accordance with ASTM E228-17. CTE measurements were performed on exemplary, bulk materials. FIG. 17$a$) depicts a magnesium aluminate spinel first layer 100 and a second layer 102 comprising alumina and zirconia wherein the zirconia comprises at least one of stabilized zirconia and partially stabilized zirconia in an amount of about 25% by volume. FIG. 17$b$) depicts the spinel first layer and a second layer 102 comprising alumina and zirconia wherein the zirconia comprises at least one of stabilized zirconia and partially stabilized zirconia in an amount of about 16% by volume of zirconia and the balance alumina. FIG. 17$c$) depicts CTE measurements of an at least one first layer 100 of magnesium aluminate spinel and at least one second layer 102 comprising alumina and zirconia wherein the zirconia comprises at least one of stabilized zirconia and partially stabilized zirconia in an amount of about 20% by volume of zirconia and the balance alumina across a temperature range of from 200° C. to 1400° C. Compositions of the ZTA, at least one second layer 102 and the at least one third layer 103 may be varied to CTE match the at least one first layer 100 comprising spinel. A range of compositions (from 16% to 25% by volume zirconia and the balance alumina) of the at least one second layer 102 comprising zirconia and alumina may be suitable to CTE match the at least one first layer 100 comprising spinel. As such, multilayer sintered ceramic bodies comprising at least one second layer comprising from about 16 to about 25% by volume of zirconia (and the balance alumina), at least one first layer 100 comprising magnesium aluminate spinel, and at least one third layer which is CTE matched to the at least one first and second layers are disclosed herein. In order to more closely CTE match the spinel first layer 100, the second layer 102 and the third layer 103 according to an embodiment, a second layer 102 comprising from about 15% to about 25%, preferably from about 18% to about 20%, more preferably about 20%, each by volume of zirconia (and the balance alumina). These compositional ranges of the at least one second layer 102 may provide CTE matching to the spinel at least one first layer 100 in an amount of about $0.45 \times 10^{-6}/°$ C. and less, preferably about $0.4 \times 10^{-6}/°$ C. and less, preferably about $0.3 \times 10^{-6}/°$ C. and less, preferably about $0.25 \times 10^{-6}/°$ C. and less, preferably about $0.2 \times 10^{-6}/°$ C. and less, preferably $0.15 \times 10^{-6}/°$ C. and less, preferably $0.1 \times 10^{-6}/°$ C. and less, preferably $0.08 \times 10\text{-}6/°$ C. and less, preferably $0.06 \times 10\text{-}6/°$ C. and less, preferably $0.04 \times 10\text{-}6/°$ C. and less, preferably $0.02 \times 10\text{-}6/°$ C. and less, and preferably $0.01 \times 10\text{-}6/°$ C. and less, as measured in accordance with ASTM E228-17 across a temperature range of ambient (or at least from 200° C. as depicted in the figures) to about 1700° C. (or at least to 1400° C. as depicted in the figures). As a percentage relative to the at least one first layer, this CTE difference (between any of the first, second and third layers according to one embodiment) may be 6% and less, preferably 5% and less, preferably 4% and less, preferably 3% and less, preferably 2% and less, preferably 1.5% and less, preferably 1% and less, preferably 0.5% and less, and preferably 0.25% and less, of the at least one first, second and third layers (as measured relative to the at least one first layer 100 comprising spinel). The zirconia may be at least one of stabilized and partially stabilized in accordance with the methods and stabilizing compounds as disclosed herein. The variation in CTE between the at least one second layer 102 (comprising zirconia and alumina), the at least one first layer (comprising magnesium aluminate spinel) and the at least one third layer (comprising combinations of first and second layers) is within the disclosed ranges for successful fabrication of unitary, multilayer sintered ceramic bodies as disclosed herein.

Figure 18:
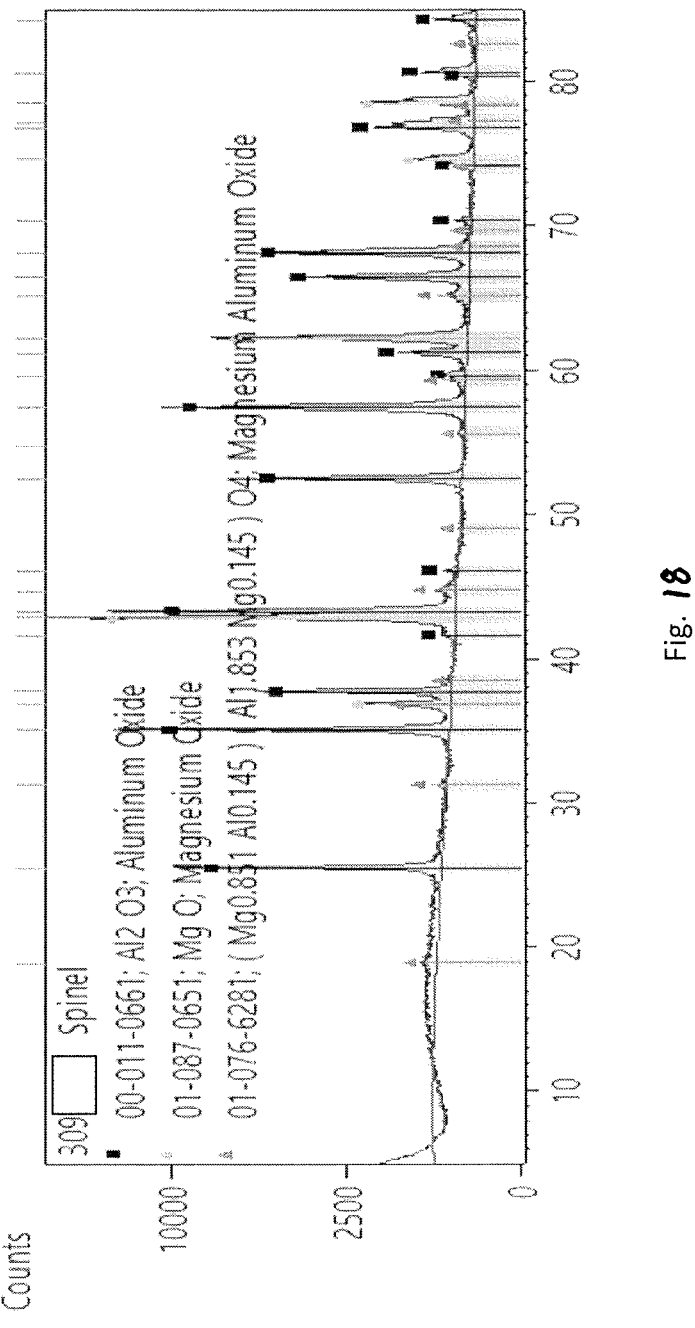
FIG. 18 illustrates x ray diffraction results of a calcined powder mixture of composition to form at least one first layer 100 comprising magnesium aluminate spinel.

FIG. 18 depicts x ray diffraction results of a calcined powder mixture (850° C. for 4 hours) of magnesia and alumina (with small amounts of spinel phase formation) batched to form at least one first layer 100 comprising the magnesium aluminate spinel phase, $MgAl_2O_4$ (upon sintering) according to an embodiment of the unitary, multilayer sintered ceramic body as disclosed herein. The spinel phase is formed through an in-situ, reactive sintering step from powder mixtures comprising the starting powders of magnesia and alumina. In some preferred embodiments, the at least one first layer 100 comprising spinel is substantially free of, or free of, dopants and substantially free of, or free of, sintering aids and substantially free of, or free of, LiF. In other embodiments, the spinel first layer may comprise sintering aids in the amounts as disclosed herein (with the exception of magnesia, which is a main component of spinel).

Figure 19:
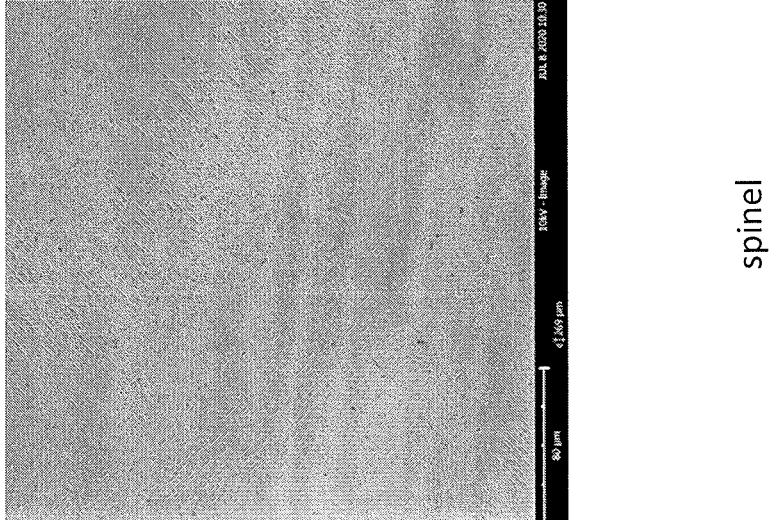
FIG. 19 depicts an SEM micrograph of a surface of at least one first layer 100 comprising magnesium aluminate spinel according to embodiments as disclosed herein.

FIG. 19 illustrates a 1000×SEM image of a high density, sintered microstructure of the at least one first layer 100 comprising magnesium aluminate spinel according to one embodiment as disclosed herein. The at least one first layer 100 comprising spinel is free of, or substantially free of dopants, sintering aids and LiF as disclosed herein. Nearly fully dense microstructures are depicted, having minimal porosity.

According to this embodiment, wherein the at least one first layer comprises spinel, an Sa of from about 5 to about 20 nm may be measured across a surface using the methods for surface roughness measurements as disclosed herein.

According to another embodiment, disclosed herein is a unitary, multilayer sintered ceramic body comprising at least one first layer comprising at least one polycrystalline ceramic material comprising yttria and zirconia wherein the zirconia is present in an amount of not less than 10 mol % and not greater than 25 mol %, at least one second layer 102 comprising alumina and zirconia wherein the zirconia comprises at least one of stabilized and partially stabilized zirconia, and at least one third layer 103 comprising multiple phases of at least YAG, alumina and zirconia, wherein an absolute value of the difference in coefficient of thermal expansion (CTE) between the at least one first, second and third layers is from 0 to $0.75 \times 10\text{-}6/°$ C., preferably from 0 to $0.7 \times 10\text{-}6/°$ C., preferably from 0 to $0.6 \times 10\text{-}6/°$ C., preferably from 0 to $0.5 \times 10\text{-}6/°$ C., preferably from 0 to $0.45 \times 10\text{-}6/°$ C., preferably from 0 to $0.4 \times 10\text{-}6/°$ C., preferably from 0 to $0.35 \times 10\text{-}6/°$ C., preferably from 0 to $0.3 \times 10\text{-}6/°$ C., preferably from 0 to $0.25 \times 10\text{-}6/°$ C., preferably from 0 to $0.2 \times 10\text{-}6/°$ C., preferably from 0 to $0.15 \times 10\text{-}6/°$ C., preferably from 0 to $0.08 \times 10\text{-}6/°$ C., preferably from 0 to $0.06 \times 10\text{-}6/°$ C., preferably from 0 to $0.04 \times 10\text{-}6/°$ C., preferably from 0 to $0.02 \times 10\text{-}6/°$ C., preferably from 0 to $0.01 \times 10\text{-}6/°$ C. as measured in accordance with ASTM E228-17 across a temperature range of from 25 to 1700° C. or across a temperature range of from 200 to 1400° C. These ranges of the absolute value of the difference in CTE between the at least one first layer comprising yttria and zirconia (wherein the zirconia is present in an amount of not less than 10 mol % and not greater than 25 mol %) and second and third layers corresponds to a difference in CTE by percentage between any of the at least one first, second and third layers of 8% and less, preferably 6.5% and less, preferably 5% and less, preferably 4% and less, preferably 3% and less, preferably 2% and less, preferably 1% and less, preferably 0.5% and less, and preferably 0.1% and less of the at least one first, second and third layers (as measured relative to the at least one first layer 100). The at least one first, second and third layers are CTE matched within the ranges as disclosed across a temperature range of ambient (or at least from 200° C. as depicted in the figures) to about 1700° C. (or at least to 1400° C. as depicted in the figures) to form a unitary, multilayer sintered ceramic body.

FIGS. 20*a*), *b*) and *c*) illustrate CTE measurements across a temperature range of ambient (or at least from 200° C. as depicted in the figures) to about 1700° C. (or at least to 1400° C. as depicted in the figures) of exemplary materials for forming at least one first and second layers of the unitary, multilayer sintered ceramic bodies according to one embodiment. All CTE measurements as disclosed herein were performed in accordance with ASTM E228-17. CTE measurements were performed on exemplary, bulk materials. FIG. 20*a*) depicts at least one first layer 100 comprising about 20 mol % zirconia and the balance yttria and at least one second layer 102 having 16% by volume zirconia and the balance alumina. FIG. 20*b*) depicts at least one first layer 100 comprising about 20 mol % zirconia and the balance yttria, and at least one second layer 102 having about 20% by volume of at least one of partially and stabilized zirconia, and the balance alumina. FIG. 20*c*) depicts at least one first layer 100 comprising about 25 mol % zirconia and the balance yttria, and at least one second layer 102 comprising about 25% by volume zirconia (relative to a volume of the at least one second layer) and the balance alumina. Variations of this embodiment may comprise at least one first layer 100 comprising at least one crystalline phase of a ceramic material comprising yttria and zirconia, wherein the zirconia is present in an amount of not less than 10 mol % $ZrO_2$ and not greater than 25 mol % $ZrO_2$, preferably not less than 12 and not greater than 23 mol % $ZrO_2$, preferably not less than 15 and not greater than 25 mol % $ZrO_2$, preferably not less than 18 and not greater than 25 mol % $ZrO_2$, preferably not less than 10 and not greater than 23 mol % $ZrO_2$, preferably not less than 10 and not greater than 20 mol % $ZrO_2$, preferably not less than 15 and preferably not greater than 23 mol % $ZrO_2$, and the balance comprising $Y_2O_3$. These compositions for at least one first layer 100 may be combined with compositions of the at least one second layer 102 and the at least one third layer 103 as disclosed herein wherein the at least one second and third layers have suitable composition (of zirconia and alumina) to CTE match the at least one first layer 100 comprising at least one crystalline phase of yttria and zirconia. In embodiments, the at least one first layer 100 may comprise at least one crystalline phase of yttria and zirconia which is selected from the group consisting of a type C solid solution, or combinations of a fluorite solid solution and a type C solid solution, or combinations of a compound phase comprising $Zr_3Y_4O_{12}$ and a type C solid solution. A type C solid solution refers to a rare earth, yttria type solid solution. These crystalline phases are consistent with the disclosed compositional ranges as reported in "phase relationships in the yttria-rich part of the yttria-zirconia system", (J. Mater. Sci 12 (1977) 311-316, H. G. Scott). In one embodiment, the CTE of the at least one first layer 100 (comprising from 10 to 25 mol % zirconia and the balance yttria) may be CTE matched by at least one second layer 102 comprising from about 16% to about 25% by volume of zirconia (relative to a volume of the at least one second layer) and the balance alumina. In this embodiment, the CTE of the at least one first layer 100 (comprising from 10 to 25 mol % zirconia and the balance yttria) may be CTE matched to at least one second layer 102 comprising from about 16 to about 25% by volume of at least one of partially stabilized and stabilized zirconia, and the balance alumina. As such, multilayer sintered ceramic bodies 98 comprising at least one second layer 102 comprising from about 16 to about 25% by volume of at least one of partially stabilized and stabilized zirconia (and the balance alumina) and at least one first layer 100 comprising from 10 to 25 mol % zirconia and the balance yttria are disclosed herein. In preferred embodiments, to more closely CTE match the at least one first layer 100 (comprising from 10 to 25 mol % zirconia and the balance yttria) and the at least one second layer 102 (comprising alumina and at least one of partially stabilized and stabilized zirconia), the at least one second layer comprises zirconia in volumetric amounts of from about 16 to about 25%, preferably from about 20% to about 25%, preferably from about 22% to about 25%, more preferably about 20% of at least one of partially stabilized and stabilized zirconia (and the balance alumina), each with respect to a volume of the at least one second layer 102. These compositional ranges of the at least one second layer 102 provide CTE matching to the at least one first layer 100 (comprising from 10 to 25 mol % zirconia and the balance yttria) in an amount of about $0.55 \times 10^{-6}/°$ C. and less, preferably $0.5 \times 10^{-6}/°$ C. and less, preferably about $0.4 \times 10^{-6}/°$ C. and less, preferably about $0.3 \times 10^{-6}/°$ C. and less, preferably about $0.2 \times 10^{-6}/°$ C. and less, preferably $0.15 \times 10^{-6}/°$ C. and less as measured in accordance with ASTM E228-17 across a temperature range of ambient (or at least from 200° C. as depicted in the figures) to about 1700° C. (or at least to 1400° C. as depicted in the figures). The zirconia comprising the at least one second layer 102 may be at least one of stabilized and partially stabilized in accordance with the methods and stabilizing compounds as disclosed herein.

In embodiments, the at least one first layer 100 comprising at least one crystalline phase of yttria and zirconia wherein the zirconia is present in an amount of not less than 10 mol % $ZrO_2$ and not greater than 25 mol % $ZrO_2$ is substantially free of, or free of, dopants and/or substantially free of, or free of, sintering aids. In other embodiments, the at least one first layer 100 comprising at least one crystalline phase of yttria and zirconia in the amounts as disclosed may comprise sintering aids and/or dopants in the amounts as disclosed herein. The starting powder of zirconia comprising the at least one first phase 100 comprising yttria and zirconia in the amounts as disclosed may comprise at least one selected from the group consisting of unstabilized, partially stabilized and stabilized zirconia.

Figure 21:
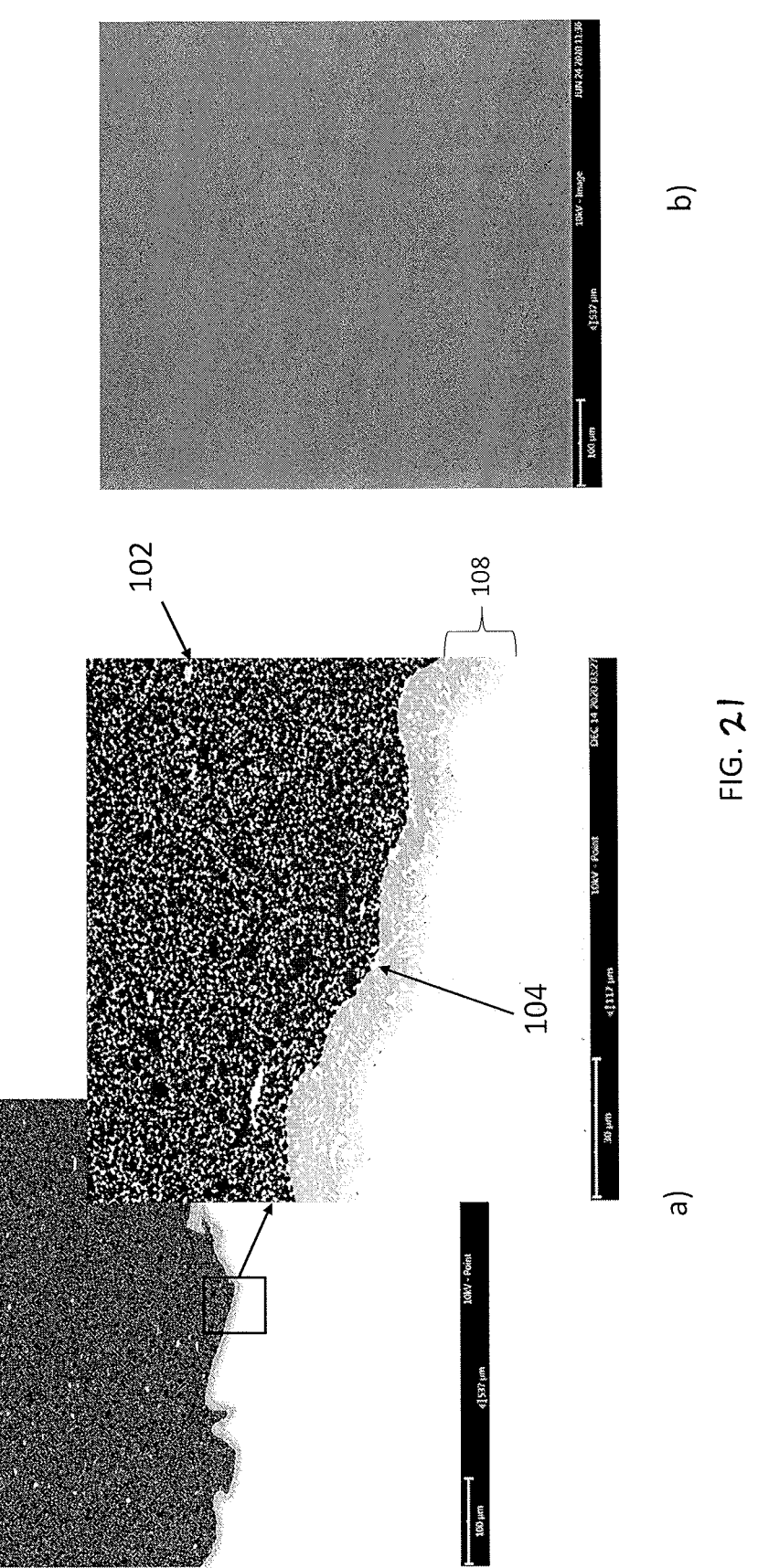
FIG. 21a) illustrates a nonlinear interface 104 of the unitary, multilayer sintered ceramic body, and b) depicts an SEM image at 500× of a surface of at least one first layer 100 comprising about 20 mol % zirconia and about 80 mol % yttria according to embodiments as disclosed herein.

FIG. 21*a*) illustrates an SEM image showing a nonlinear interface 104 of the unitary, multilayer sintered ceramic body 98 according to an embodiment wherein the at least one first layer 100 comprises at least one crystalline phase of a ceramic material comprising yttria and zirconia wherein the zirconia is present in an amount of about 20 mol % and the balance yttria. In certain embodiments, the zirconia of the at least one first layer may be partially stabilized and comprise about 3 mol % yttria as a stabilizing compound. In other embodiments, the zirconia of the at least one first layer may comprise at least one of unstabilized, partially stabilized and stabilized zirconia. In embodiments, the at least one first layer 100 may comprise a reaction layer 108 contiguous with the at least one second layer 102 wherein the at least one second layer 102 and the reaction layer 108 form a nonlinear interface 104 between the layers. As may be viewed in the SEM results of FIG. 21, the reaction layer 108 is highly dense and having minimal porosity. The reaction layer 108 may have a thickness of from 10 to 30 μm, preferably from 15 to 30 μm, preferably from 20 to 30 μm, preferably from 25 to 30 μm, preferably about 20 μm as measured from SEM imaging. Adhesion strength of the nonlinear interface 104 may be enhanced by the reaction layer 108. In embodiments, the reaction layer 108 may comprise at least one crystalline phase selected from the group consisting of YAG, YAP, YAM, a cubic crystalline phase (comprising a solid solution of at least two of yttria, alumina and zirconia), and a cubic, fluorite crystalline phase (comprising a solid solution of at least two of yttria, alumina and zirconia) and combinations thereof. FIG. 21b) depicts a high density, sintered microstructure of a plasma facing surface 106 of an at least one first layer 100 comprising about 20 mol % zirconia and the balance yttria. A nearly fully dense microstructure is depicted, having minimal porosity.

According to one embodiment wherein the at least one first layer comprises a solid solution of 80 mol % yttria and 20 mol % zirconia, an average Ra across 5 measurements of from 10 to 25 nm was measured.

Multilayered sintered bodies as known to those skilled in the art are often formed from pre-cast layers or tapes which are laminated and co-sintered or laminated or deposited onto a sintered substrate and sintered. However, these multilayer laminates often suffer from delamination at interfaces between the layers due to insufficient interfacial bonding between layers, resulting in spalling and particle release during use in semiconductor reactors. Typically, these laminates have an interface which is linear and therefore does not provide the advantages of the interlocking, increased adhesion/joining strength of the nonlinear interface 104 and the enhanced toughness of the multiphase, second interface 105 which are characteristic of the unitary, multilayer, sintered ceramic bodies as disclosed herein.

Disclosed herein is a multilayer sintered ceramic body comprising at least one first layer 100 and at least one second layer 102 which are contiguous and bounded by a nonlinear interface 104 as depicted in the schematic of FIGS. 22a) and b). Also as depicted in FIGS. 22a) and b), nonlinear interface 105 is between contiguous layers 102 and 103. As illustrated, the nonlinear interface 104, (as is described in greater detail herein), may provide for enhanced adhesion between the at least one first layer 100 and the at least one second layer 102. This improved adhesion may be achieved by a number of factors, including the increased interfacial length, and related increased area of the interface, the tortuosity (T), the arithmetical mean of the interface (distance of the interface from an average interfacial line), the nonlinearity and an interlocking effect provided by the morphology of the interface 104.

The interfaces of the layers typically have a tortuosity and a non-linear interface so that the interface layer usually meanders between the at least one first and second layers and between the at least one second and third layers. The tortuosity using the calculations as disclosed herein may be between 1.2 and 2.2, in particular between 1.4 and 2.0. The measurements for determining the tortuosity are described later below and are based on an increase in the interfacial length relative to the linear distance of the interface layer. Thus, disclosed herein is a multilayer sintered ceramic body having an interface defined by the at least one second layer and the at least one first layer and between the at least one second layer and the at least one third layer wherein the interfacial length is increased by from 20 to 70%, preferably from 20 to 60%, preferably from 20 to 40%, preferably from 30 to 80%, preferably from 40 to 80%, preferably from 50 to 70%.

Correspondingly, the at least one second layer and the at least one first layer and the at least one third layer and the at least one second layer may contact one another at an interface commensurate in interfacial area to the greatest dimension of the multilayer sintered ceramic body along the interface layer.

For unitary, multilayer sintered bodies having greatest dimensions of from 100 to about 625 mm considering the above-mentioned tortuosity of at least 1.2, the at least one second layer and the at least one first layer contact one another at a nonlinear interface having an area of at least 113 $cm^2$, preferably of at least 452 $cm^2$, preferably at least 1,018 $cm^2$, and preferably at least 1,810 $cm^2$.

For unitary, multilayer sintered bodies having greatest dimensions of from 100 to about 625 mm considering the above-mentioned tortuosity of at least 1.4, the at least one second layer and the at least one first layer contact one another at a nonlinear interface having an area of at least 153 $cm^2$, preferably of at least 616 $cm^2$, preferably at least 1,386 $cm^2$, and preferably at least 2,464 $cm^2$.

For unitary, multilayer sintered bodies having greatest dimensions of from 100 to about 625 mm considering the above-mentioned tortuosity of at most 2.2, the at least one second layer and the at least one first layer contact one another at a nonlinear interface having an area of at most 15,085 $cm^2$, preferably of at most 14,850 $cm^2$, preferably at most 14,128 $cm^2$, preferably at most 9,802 $cm^2$, preferably at most 6,083 $cm^2$, preferably at most 3,421 $cm^2$, and preferably at most 1,520 $cm^2$.

For unitary, multilayer sintered bodies having greatest dimensions of from 100 to about 625 mm considering the above-mentioned tortuosity of at most 2.0, the at least one second layer and the at least one first layer contact one another at a nonlinear interface having an area of at most 12,468 $cm^2$, preferably of at most 12,272 $cm^2$, preferably at most 11,676 $cm^2$, preferably at most 7,852 $cm^2$, preferably at most 5,028 $cm^2$, preferably at most 2,828 $cm^2$, and preferably at most 1,256 $cm^2$.

For unitary, multilayer sintered bodies having greatest dimensions of from 100 to about 625 mm considering the above-mentioned tortuosity of at least 1.2, the at least one second layer and the at least one first layer contact one another at a nonlinear interface having an area of from 113 to about 4,488 $cm^2$, preferably from 113 to about 4,418 $cm^2$, preferably from 113 to 4,204 $cm^2$, preferably from 113 to 2,827 $cm^2$, preferably from 113 to 1,918 $cm^2$, preferably from 113 to 1,018 $cm^2$, preferably from 113 to 452 $cm^2$, preferably from 452 to about 4,488 $cm^2$, preferably from 452 to about 4,418 $cm^2$, preferably from 452 to 4,203 $cm^2$, preferably from 452 to 2,827 $cm^2$, preferably from 452 to 1,810 $cm^2$, preferably from 1,018 to about 4,418 $cm^2$, and preferably from 1,810 to 4,376 $cm^2$.

For unitary, multilayer sintered bodies having greatest dimensions of from 100 to about 625 mm considering the above-mentioned tortuosity of at least 1.4, the at least one second layer and the at least one first layer contact one another at a nonlinear interface having an area of from 153 to about 6,110 cm², preferably from 153 to about 6,013 cm², preferably from 153 to 5,722 cm², preferably from 153 to 3,847 cm², preferably from 153 to 2,464 cm², preferably from 153 to 1,386 cm², preferably from 153 to 616 cm², preferably from 616 to about 6,110 cm², preferably from 616 to about 6,013 cm², preferably from 616 to 5,722 cm², preferably from 616 to 3,847 cm², preferably from 616 to 2,464 cm², preferably from 1,386 to about 6,013 cm², and preferably from 2,464 to 5,957 cm².

For unitary, multilayer sintered bodies having greatest dimensions of from 100 to about 625 mm considering the above-mentioned tortuosity of at most 2.2, the at least one second layer and the at least one first layer contact one another at a nonlinear interface having an area of from 378 to about 15,085 cm², preferably from 378 to about 14,850 cm², preferably from 378 to 14,128 cm², preferably from 378 to 9,502 cm², preferably from 378 to 6,083 cm², preferably from 378 to 3,421 cm², preferably from 378 to 1,520 cm², preferably from 1,520 to about 15,085 cm², preferably from 1,520 to about 14,850 cm², preferably from 1,520 to 14,128 cm², preferably from 1,520 to 9,502 cm², preferably from 1,1520 to 6,083 cm², preferably from 3,421 to about 14,850 cm², and preferably from 6,083 to 14,710 cm².

For unitary, multilayer sintered bodies having greatest dimensions of from 100 to about 625 mm considering the above-mentioned tortuosity of at most 2.0, the at least one second layer and the at least one first layer contact one another at a nonlinear interface having an area of from 312 to about 12,468 cm², preferably from 312 to about 12,272 cm², preferably from 312 to 11,676 cm², preferably from 312 to 7,852 cm², preferably from 312 to 5,028 cm², preferably from 312 to 2,828 cm², preferably from 312 to 1,256 cm², preferably from 1,256 to about 12,468 cm², preferably from 1,256 to about 12,272 cm², preferably from 1,256 to 11,676 cm², preferably from 1,256 to 7,652 cm², preferably from 1,256 to 5,028 cm², preferably from 2,828 to about 12,272 cm², and preferably from 5,028 to 7,294 cm².

FIGS. 24a) and b) illustrate SEM images depicting characteristics of the interface 104 between the at least one first layer 100 and the at least one second layer 102 wherein a straight-line distance between ends (L) is about 54 μm, and the measured interfacial length or curve (C) along interface 104 is about 90 μm, as depicted in the exemplary image of FIG. 24b). The tortuosity according to FIG. 24b) using the calculations as disclosed herein is about 1.7. Measurements were taken across 9 SEM images using ImageJ software analysis as disclosed herein. An average interfacial length of about 90 μm was measured, representing about a 66% increase in interfacial length (C) relative to the linear distance (L). Thus, disclosed herein is a multilayer sintered ceramic body having an interface 104 defined by the at least one second layer and the at least one first layer wherein the interfacial length is increased by from 20 to 70%, preferably from 20 to 60%, preferably from 20 to 40%, preferably from 30 to 80%, preferably from 40 to 80%, preferably from 50 to 70%. Correspondingly, the at least one second layer 102 and the at least one first layer 100 may contact one another at an interface commensurate in interfacial area to the greatest dimension of the multilayer sintered ceramic body. In some embodiments, for unitary, multilayer sintered bodies having greatest dimensions of from 100 to about 625 mm, the at least one second layer 102 and the at least one first layer 100 contact one another at a nonlinear interface 104 having an area of about 3,117 cm², preferably about 3,068 cm² and less, preferably 2,919 cm² and less, preferably from 78 to about 3,117 cm², preferably from 78 to about 3,068 cm², preferably from 78 to 2,919 cm², preferably from 78 to 1,963 cm², preferably from 78 to 1,257 cm², preferably from 78 to 707 cm², preferably from 78 to 314 cm², preferably from 314 to about 3,117 cm², preferably from 314 to about 3,068 cm², preferably from 314 to 2,919 cm², preferably from 314 to 1,963 cm², preferably from 314 to 1,257 cm², preferably from 707 to about 3,068 cm², and preferably from 1257 to 3,039 cm². In embodiments, it is preferable that the first and second layers are in direct contact, forming nonlinear interface 104, and thus the at least one first and second layers are contiguous layers. In other embodiments, circuitry, heating elements, RF coils/RF antennae and the like may be disposed between first and second layers as required by the specific component application, and irrespective of these features, at least a portion of first and second layers may be contiguous or substantially contiguous. This increased interfacial length and interfacial area will enhance adhesion at the nonlinear interface 104 between the at least one first layer 100 and the at least one second layer 102.

Referring again to FIG. 24b), the width of the interface layer as shown is typically from 1 to 200 μm, in particular 5 to 100 μm, more particularly 10 to 50 μm, and even more particularly from 20 to 30 μm.

The volume of the first layer over the width of the interface layer set forth above has pores with a maximum size of less than 5 μm, in particular of less than 3 μm, particularly of less than 1 μm.

The volume of the first layer over the width of the interface layer set forth above has in particular only pores with a maximum size of less than 5 μm, in particular of less than 3 μm, particularly of less than 1 μm.

The volume of the at least first layer in the width as disclosed herein has a structure, whereby less than 0.2%, more preferably less than 0.15%, most preferably less than 0.1%, of the volume is taken up by the pores set forth above.

The volume of the second layer over the width of the interface layer set forth above has pores with a maximum size of less than 5 μm, in particular of less than 3 μm, particularly of less than 1 μm.

The volume of the second layer over the width of the interface layer set forth above has in particular only pores with a maximum size of less than 5 μm, in particular of less than 3 μm, particularly of less than 1 μm.

The volume of the at least second layer in the width as disclosed herein has a structure, whereby less than 0.2%, more preferably less than 0.15%, most preferably less than 0.1%, of the volume is taken up by the pores set forth above.

FIG. 23a) illustrates a SEM micrograph at 500× of a nonlinear interface 104 of the multilayer sintered ceramic body wherein the nonlinear interface 104 defined by the at least one second layer 102 and the at least one first layer 100 is an irregular, nonlinear boundary which in embodiments may comprise retrograde angles. In some embodiments as depicted in FIG. 23a), the interface may comprise at least one dovetail structure and/or at least a portion of a dovetail structure. In other embodiments at least a portion of the interface may comprise a trapezoidal shape. The tortuosity (T) as disclosed herein, is defined mathematically as the ratio of the length of the curve (interface), C, to the linear distance between its ends, L, whereby T=C/L. The image of FIG. 23a) was measured to have a tortuosity of 2.7. The nonlinear interface 104 as disclosed herein may have a tortuosity, T, of from greater than 1.02 to about 1.5, preferably from greater than 1.02 to about 2.0, preferably from greater than 1.02 to about 2.5, preferably from greater than 1.02 to about 3.0, preferably from 1.1 to about 3.0, preferably from 1.3 to about 3, and preferably from 1.5 to 2.7 as measured using SEM and image processing methods (measurements within ImageJ software) as disclosed herein.

A straight-line interface (as is typical of laminates and structures using pre-sintered bodies onto which layers are applied) has a tortuosity of about 1 to 1.02. The increased tortuosity of the interface 104 of the multilayer bodies as disclosed herein provides an interlocking effect between layers, thereby increasing adhesion strength such that an indivisible, unitary multilayer ceramic sintered body is formed.

FIG. 23b) depicts an average interface line (IL) of the nonlinear interface 104 as calculated from SEM and image processing methods. The exemplary SEM image of FIG. 23b), depicting nonlinear interface 104 was imported into ImageJ software, and x/y coordinates corresponding to points along the interface were used to obtain the linear equation of the average interface line (IL) as shown in FIG. 23b), and the nonlinear interface 104 was characterized by a distance of the nonlinear interface 104 from the average interface line (IL). A distance (D) of the interface 104 from the average interface line (IL) varies in amount of from 10 to 100 μm, preferably from 20 to 100 μm, preferably from 30 to 100 μm, preferably from 40 to 100 μm, from 50 to 100 μm, preferably from 25 to 85 μm as measured using SEM and image processing. Increased distance (D) from the average interface line (IL) may contribute to the enhanced adhesion and interlocking effect of the multilayer sintered ceramic bodies as disclosed herein.

These reverse or retrograde angles, characteristics and structures may provide an anchoring effect thereby increasing interfacial and tensile strength and bonding across the interface 104 defined by the at least one second layer 102 and the at least one first layer 100.

Figure 5:
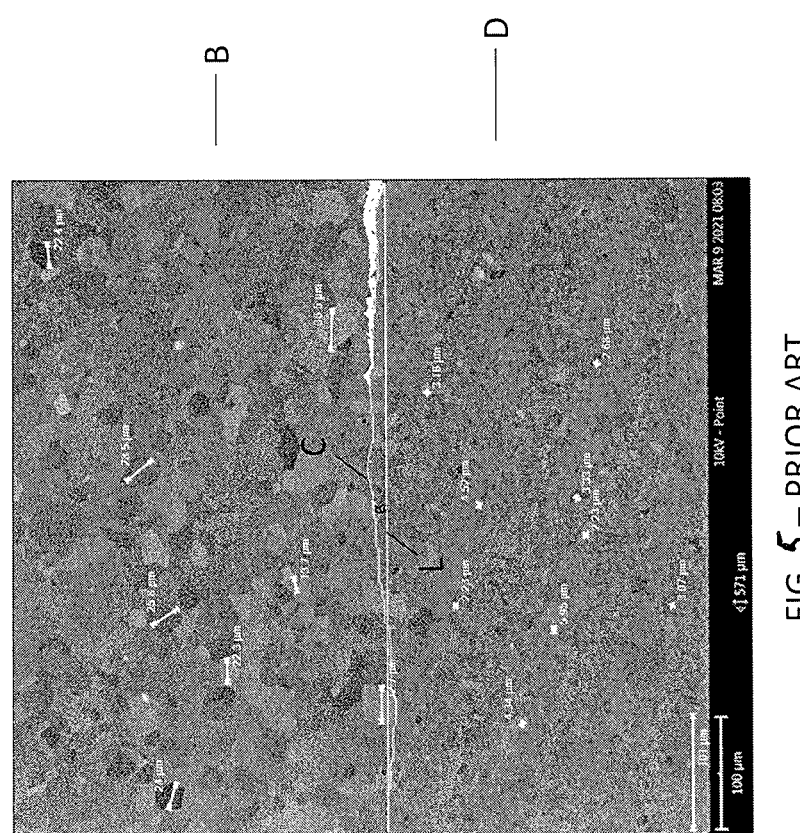
FIG. 5 depicts an SEM micrograph of an interface of a laminate structure as known in the art.

By comparison, FIG. 5 depicts an interface of a prior art sample where it may be that a layer or substrate B was first sintered to form a solid body, and thereafter a layer D was deposited atop substrate B, and the two were bonded over time, temperature and pressure. Evident is a substantially linear interface having no retrograde or interfacial angles, and minimal or no increase in interfacial length. Tortuosity measurements were calculated (using the image as depicted in FIG. 5) as disclosed herein whereby the length of the curve (interface) (C) and the linear distance between its ends, L, were measured from SEM images imported into ImageJ image processing software as disclosed herein. A tortuosity (T) of the prior art, laminate body was calculated to be less than about 1.02. Thus, the interface of embodiments of multilayer bodies as known in the art do not provide the beneficial features of enhanced inter layer adhesion and the interlocking effect of the subject unitary, multilayer sintered ceramic bodies as disclosed herein. A bright region as depicted in FIG. 5 (center-right region of the image) corresponds to a metallic layer.

As depicted in the prior art laminated body of FIG. 5, a significant grain size variation exists between the layer B and layer D. Layer B has large grains, on the order of 20 to 30 μm which may indicate extensive thermal history, such as multiple sintering processes. Layer D has grains on the order of 2 to 5 μm, indicating far less grain growth which is typically caused by thermal history and sintering. This grain size difference may indicate a lamination or deposition process whereby layer D has been deposited or laminated atop layer B, and subsequently sintered to form a laminate or laminated body.

The high densities required of layer B (to impart mechanical strength, high Young's modulus and other properties) necessitates extended sintering times and high temperatures, thus resulting in exaggerated grain growth. The layer D is subsequently bonded to substrate B at lower temperatures and for shorter durations, and thereby layer D may not experience the exaggerated grain growth of substrate B. This results in a layered structure having significant disparity in grain sizes. The grain size was measured (using the Heyn Line Intercept method as known to those skilled in the art), and grain sizes of about 12 μm and 4 μm were measured for the substrate B and layer D, respectively. This grain size difference may lead to variance in properties (such as mechanical strength, Young's modulus, dielectric loss, and other properties) between the two bodies, which may result in fracture and/or cracking.

By contrast, grain size measurements were performed on the multilayer sintered ceramic body of an embodiment comprising at least one first layer comprising YAG and at least one second layer comprising alumina wherein the alumina comprises at least one of stabilized and partially stabilized zirconia present in an amount of about 16% by volume. The grain size of the at least one YAG, first layer and the at least one second layer were measured to be about 0.78 μm and 0.74 μm, respectively. These differences may be within the accuracy of measurement, thus the multilayer sintered ceramic bodies as disclosed herein may comprise at least one first and second layers comprising grains wherein the grains have the same size, or substantially the same size between the at least one first 100 and second 102 layers.

Figure 25:
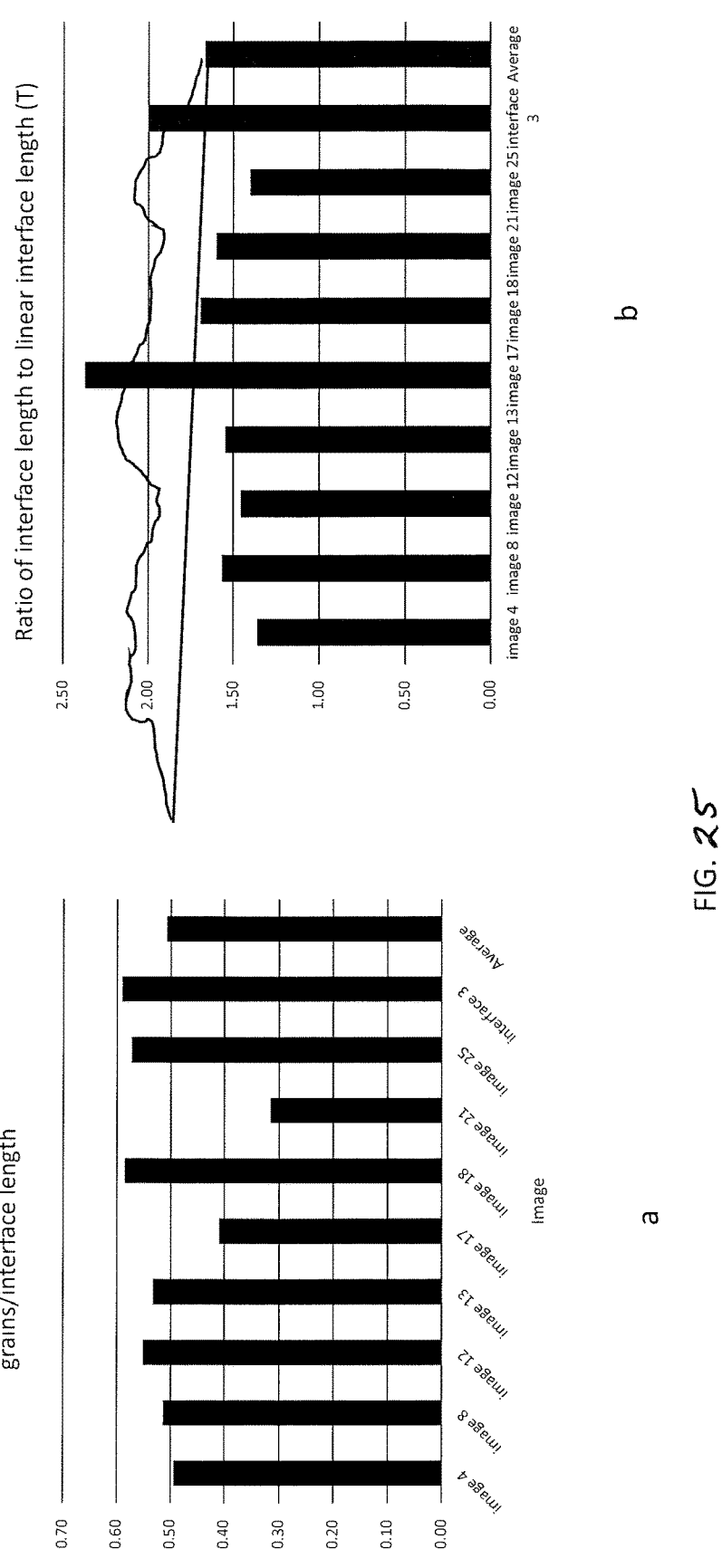
FIG. 25a) illustrates the number of grains per interface length in μm of the nonlinear interface 104 and b) depicts the tortuosity (T) of the nonlinear interface 104 according to embodiments as disclosed herein.

The number of grains in contact across the interface may also play a role in adhesion and strength characteristics of nonlinear interface 104. The number of grains were counted across an interface length to obtain the number of grains per μm. FIG. 25a) illustrates the number of grains per interface length (in μm) of the interface defined by the at least one first layer 100 and the at least one second layer 102 across 10 images, with smaller numbers of grains per micron preferable. In embodiments, the number of grains per micron comprises from 0.2 to 0.8 grains per μm, preferably from 0.3 to 0.6 grains per μm, preferably from 0.4 to 0.55 grains per micron, and preferably an average grains per μm of about 0.5, for a multilayer sintered ceramic body comprising YAG as an at least one first layer 100 and a second layer of about 16% by volume of zirconia in an alumina matrix. FIG. 25b) depicts the ratio of interface length (also defined as C, length of the curve/interface) to the linear measurement, L (the linear distance between the endpoints of C, which is defined herein as the tortuosity, T) across the image area as disclosed, of about 54 μm across 10 SEM images. Nonlinear interface 104 may have a tortuosity (T) of from greater than 1.02 to 3, preferably from 1.1 to 3, preferably from 1.2 to 3, preferably from 1.3 to 3, preferably from 1.3 to 2.7, and preferably an average tortuosity of about 1.7 as measured using SEM and image processing methods. Higher ratios of interface length, C to linear interface length, L (or tortuosity, T) are preferable to increase adhesion strength between the at least one first 100 and second layers 102.

As described, nonlinear interface 104 may provide for enhanced adhesion strength between the at least one first layer 100 and the at least one second layer 102. This improved adhesion strength may be achieved by the increased interfacial length, increased distance from the interfacial line, and an interlocking effect as measured by the tortuosity, T, between the at least one first layer 100 and the at least one second layer 102.

Referring now to FIGS. 26a) and b), SEM micrographs of the microstructure of the at least one third layer 103 are shown. In embodiments, the at least one third layer 103 comprises multiple phases of a ceramic material comprising YAG, alumina and at least one of unstabilized, partially stabilized and stabilized zirconia. The multiple phase structure of the at least one third layer 103 may provide a toughening effect by way of an interface between the at least two phases which may facilitate preferential crack propagation along the increased distance of the interface. Large areas comprising YAG and ZTA (zirconia toughened alumina) are depicted in FIGS. 26a) and b), each comprising about 50% by area as measured using SEM images and ImageJ software.

The CTE matching within the disclosed ranges between the at least one first, second and third layers is preferably provided across a temperature range of ambient (or at least from 200° C. as depicted in the figures) to about 1700° C. (or at least to 1400° C. as depicted in the figures) in accordance with that of the method as disclosed herein. Selection of materials for the respective at least one first, second and third layers providing the disclosed difference in CTE may reduce the interfacial stresses on the nonlinear interface 104 and the second interface 105, thereby improving adhesion and strength between the at least one first layer 100, the at least one second layer 102, and the at least one third layer 103.

Figure 27:
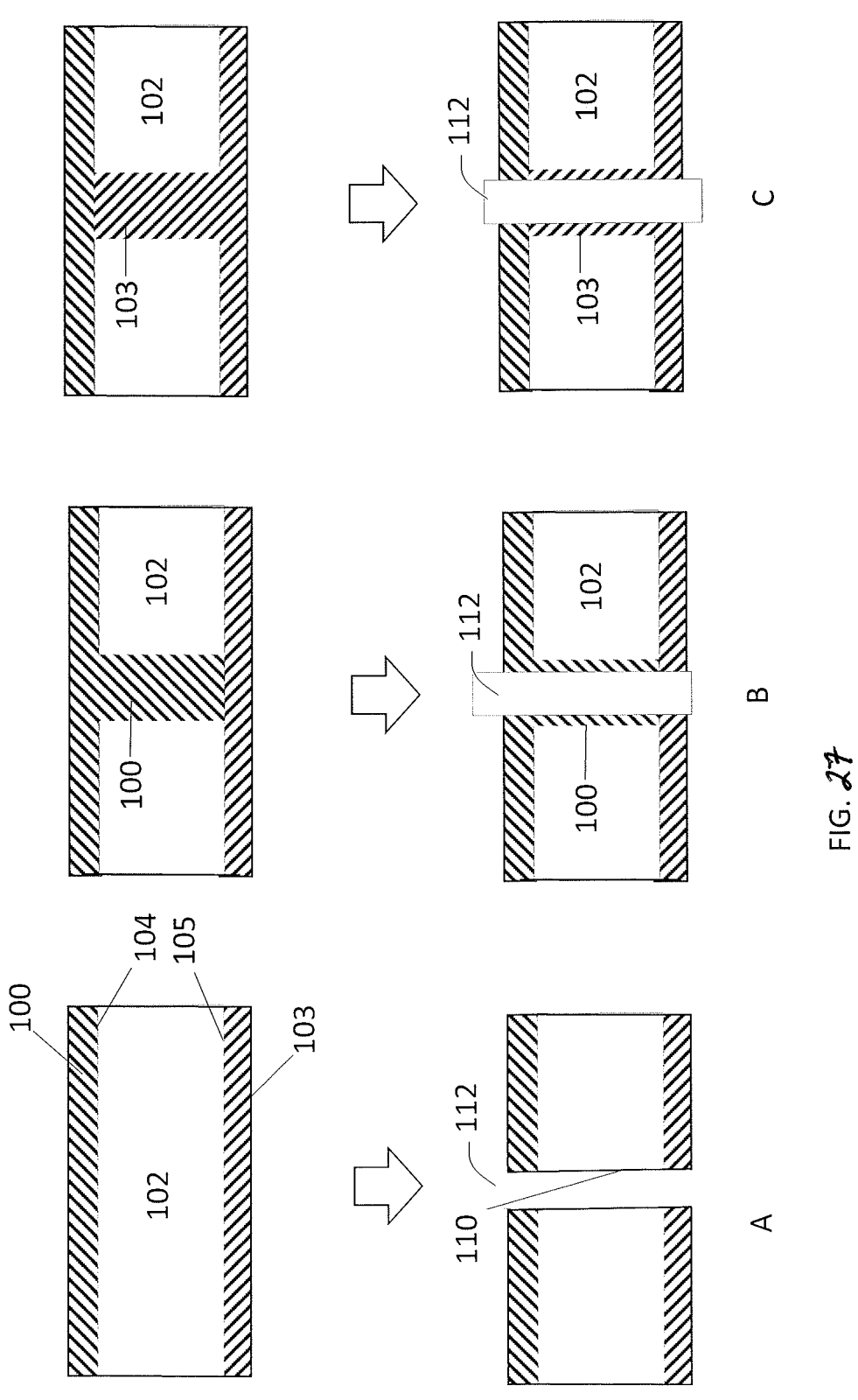
FIGS. 27a), b) and c) illustrates exemplary cross section views of embodiments of the multilayer sintered ceramic body as disclosed herein before and after a machining process to create a multilayer sintered component comprising through holes 112 according to embodiments as disclosed herein.

To form a plasma processing chamber component from the multilayer sintered ceramic bodies as disclosed, the multilayer sintered ceramic bodies may be machined, drilled, surface ground, lapped, polished and other processes as necessary to form them into multilayer sintered components having the required through holes, surface finish and dimensional tolerancing dependent upon component design, as depicted schematically in FIG. 27. FIG. 27 illustrates exemplary embodiments of a multilayer sintered ceramic body and a multilayer sintered ceramic component fabricated therefrom. Through holes 112 may be created through the at least one first layer 100, the at least one second layer 102, and the at least one third layer 103 by any number of machining, grinding and/or drilling processes as known to those skilled in the art. The multilayer sintered ceramic component formed from the sintered bodies as disclosed herein may have any number of through holes 112. As depicted in FIGS. 27a), b) and c), through holes 112 may comprise sidewalls 110 wherein the sidewalls 110 comprise at least a portion of a crystalline phase of a ceramic material selected from the group consisting of YAG, magnesium aluminate spinel, and yttria and zirconia wherein the zirconia is present in an amount of not less than 10 mol % and not greater than 25 mol %. In some embodiments, a thickness comprising the at least one second layer 102 is maximized, and a thickness of the at least one first layer 100 and/or the at least one third layer 103 are minimized, each to a range of from about 0.5 to 3 mm, preferably from 0.5 to 1.5 mm. By maximizing the thickness of the at least one second layer 102, corrosion resistance and machinability are provided, combined with the preferred properties of high mechanical strength, high thermal conductivity, high dielectric constant and low dielectric loss. The at least one second layer 102, made within the compositional ranges as disclosed, may provide the aforementioned preferred properties as required for high frequency chamber applications. The combination of high strength, corrosion resistance, low dielectric loss and thermal conductivity of the multilayer sintered ceramic body as disclosed herein makes the multilayer sintered ceramic bodies 98 particularly well suited as a material for fabrication of dielectric or RF windows and many other components for use in semiconductor plasma processing chambers. These include a window, a lid, a dielectric window, an RF window, a ring, a focus ring, a process ring, a deposition ring, a nozzle, an injector, a gas injector, a shower head, a gas distribution plate, a diffuser, an ion suppressor element, a chuck, an electrostatic wafer chuck (ESC), and a puck.

However, these necessary grinding and polishing processes invariably create defects, such as cracking and/or microcracking (those cracks which are not readily visible by eye) or subsurface defects in the sintered ceramic components. In order to minimize particle release from a plasma facing surface 106 of the at least one first layer 100 as depicted in FIG. 6 into the chamber, generation of surface and/or subsurface defects during machining is preferably minimized. These surface and/or subsurface defects may cause microcracking on a plasma facing surface 106 of the first layer 100 at a scale unable to be readily visibly apparent, which thereafter may lead to subsequent release of particles into the plasma processing chamber from the plasma facing surface 106 of the at least one first layer 100. Additionally, the presence of defects on a larger scale in second layer 102 may result in fracture of the sintered body at a strength less than typical for the material according to an interrelation between the material type itself (in this case brittle, nonmetallic ceramics), the flaw or defect size (resulting from machining), and the applied stress (remaining from processing, and/or due to CTE differences between the layers, and/or arising during use as a sintered ceramic component). This relationship between material, flaw size and stress is in accordance with fracture mechanics as reported by A. A. Griffith in "The phenomena of rupture and flow in solids" Phil. Trans. Roy. Soc. London, Volume 221, Issue 582-593, 1 Jan. 1921.

Residual stress remaining in the sintered body may arise from differences in CTE between layers which may manifest during the heating, sintering, annealing and cooling steps to form the multilayer sintered ceramic bodies herein. Thus, it is preferable to minimize these internal stresses which come about by differences in CTE of the subject materials by providing those materials as layers which are matched in CTE (within the disclosed ranges) across a temperature range of from ambient temperature to the sintering and annealing temperatures as disclosed herein, of from ambient temperature (or at least from 200° C. as illustrated in the figures) to about 1700° C. (or at least to about 1400° C. as illustrated in the figures).

If the difference in CTE between any of the at least one first layer 100, the at least one second layer 102, and/or the at least one third layer 103 of the multilayer sintered ceramic body is greater than $0.75 \times 10^{-6}/°$ C., during a machining or drilling step, the greater stress arising from the CTE mismatch may be placed upon the at least one first layer and may result in surface or subsurface damage in the form of microcracking in the at least one first layer 100. This damage to the at least one first layer may result in spalling and/or increased erosion of the layer, and subsequent release of particles from the plasma facing surface 106 into the plasma processing chambers during use. As a result, in order to form a multilayer sintered ceramic body having high strength, sufficient handleability, and minimal surface damage to the at least one first layer from machining, the CTE difference between the at least one first layer 100, the at least one second layer 102 and the at least one third layer 103 of the multilayer sintered ceramic body is preferred to be within the disclosed ranges, and preferably as closely matching in CTE as possible, including a value of zero where substantially no difference in the CTE was measured, across a temperature range of from ambient (or about 200° C. as depicted in the figures) to about 1700° C. in accordance with the method as disclosed. The term "CTE matching" as used herein refers to combinations of the at least one first layer 100, the at least one third layer 103 and the at least one second layer 102 which differ in their respective CTE values by (in absolute value) from 0 to $0.75 \times 10^{-6}$ and less across a temperature range of from ambient temperature to a sintering temperature of about 1700° C. and less.

As such, in embodiments, preferable are those materials selected for first, second and third layers wherein the absolute value of the coefficient of thermal expansion (CTE) of the first, second and third layers differ in an amount of from about 0 to less than 0.75×10-6/° C., preferably from 0 to $0.7 \times 10^{-6}/°$ C., preferably from 0 to $0.6 \times 10^{-6}/°$ C., preferably from 0 to $0.5 \times 10^{-6}/°$ C., preferably from 0 to $0.45 \times 10^{-6}/°$ C., preferably from 0 to $0.4 \times 10^{-6}/°$ C., preferably from 0 to $0.35 \times 10^{-6}/°$ C., preferably from 0 to $0.3 \times 10^{-6}/°$ C., preferably from 0 to $0.25 \times 10^{-6}/°$ C., preferably from 0 to $0.2 \times 10^{-6}/°$ C., preferably from 0 to $0.15 \times 10^{-6}/°$ C., preferably from 0 to $0.1 \times 10^{-6}/°$ C., preferably from 0 to $0.08 \times 10^{-6}/°$ C., preferably from 0 to $0.06 \times 10^{-6}/°$ C., preferably from 0 to $0.04 \times 10^{-6}/°$ C., preferably from 0 to $0.02 \times 10^{-6}/°$ C., and preferably from 0 to $0.01 \times 10^{-6}/°$ C. as measured in accordance with ASTM E228-17 across a temperature range of from 25 to 1700° C. or across a temperature range of from 200 to 1400° C.

In embodiments where the CTE of each of the first, second and third layers do not cross one another over the disclosed temperature range (i.e. the absolute value of the difference in CTE is non-zero across the temperature range), the absolute value of the coefficient of thermal expansion (CTE) of the first, second and third layers may differ in an amount of from about $0.003 \times 10^{-6}/°$ C. to less than 0.75× $10^{-6}/°$ C., preferably from $0.003 \times 10^{-6}/°$ C. to $0.7 \times 10^{-6}/°$ C., preferably from $0.003 \times 10^{-6}/°$ C. to $0.6 \times 10^{-6}/°$ C., preferably from $0.003 \times 10^{-6}/°$ C. to $0.5 \times 10^{-6}/°$ C., preferably from $0.003 \times 10^{-6}/°$ C. to $0.45 \times 10^{-6}/°$ C., preferably from $0.003 \times 10^{-6}/°$ C. to $0.4 \times 10^{-6}/°$ C., preferably from $0.003 \times 10^{-6}/°$ C. to $0.35 \times 10^{-6}/°$ C., preferably from $0.003 \times 10^{-6}/°$ C. to $0.3 \times 10^{-6}/°$ C., preferably from $0.003 \times 10^{-6}/°$ C. to $0.25 \times 10^{-6}/°$ C., preferably from $0.003 \times 10^{-6}/°$ C. to $0.2 \times 10^{-6}/°$ C., preferably from $0.003 \times 10^{-6}/°$ C. to $0.15 \times 10^{-6}/°$ C., preferably from $0.003 \times 10^{-6}/°$ C. to $0.1 \times 10^{-6}/°$ C., preferably from $0.003 \times 10^{-6}/°$ C. to $0.08 \times 10^{-6}/°$ C., preferably from $0.003 \times 10^{-6}/°$ C. to $0.06 \times 10^{-6}/°$ C., preferably from $0.003 \times 10^{-6}/°$ C. to $0.04 \times 10^{-6}/°$ C., preferably from $0.003 \times 10^{-6}/°$ C. to $0.02 \times 10^{-6}/°$ C., and preferably from $0.003 \times 10^{-6}/°$ C. to $0.01 \times 10^{-6}/°$ C. as measured in accordance with ASTM E228-17 across a temperature range of from 25 to 1700° C. or across a temperature range of from 200 to 1400° C.

The disclosed ranges of the absolute value of the difference in coefficient of thermal expansion between the at least one first, second and third layers are preferably maintained across a temperature range in accordance with the method as disclosed herein. The desired ranges of the absolute value of the difference in coefficient of thermal expansion between the first, second and third layers are preferably maintained across a temperature range of from ambient temperature (or at least from 200° C. as illustrated in the figures) to about 1700° C. (or at least to about 1400° C. as illustrated in the figures), preferably from 200° C. to 1400° C., preferably across a sintering temperature range of from 1000° C. to 1700° C., and/or an annealing temperature range of from 900° C. to 1800° C.

Use of the CTE matched multilayer sintered ceramic body as disclosed herein may reduce the stress (and thereby the likelihood of particle generation in plasma processing chambers) on the at least one first layer 100 and improve machinability (by reductions in subsurface and/or surface damage) by providing at least one third layer 103, by way of symmetrically balanced, matching CTEs on either side of the at least one second layer 102. Additionally, compositions of the at least one second layer 102 may be selected for CTE matching with the at least one first layer 100 and/or the at least one third layer 103 within the ranges as disclosed.

This reduced stress between and within layers may reduce the effects of surface and subsurface damage during machining and thereby may reduce particle generation from the plasma facing surface 106 of the at least one first layer 100 while improving the overall strength and machinability of the multilayer ceramic sintered bodies (and components fabricated therefrom) as disclosed herein.

When the absolute value of the CTE between any of the layers varies within these ranges, a multilayer sintered ceramic body, in particular one of large (>100 mm) dimension, having high strength with improved machinability, reduced surface and subsurface defects may be formed using the pressure-assisted methods as disclosed herein.

Apparatus/Spark Plasma Sintering Tool

The apparatus for preparing the multilayer sintered ceramic bodies disclosed herein is preferably a spark plasma sintering (SPS) tool comprising: a die comprising a sidewall comprising an inner wall and an outer wall, wherein the inner wall has a diameter that defines an inner volume capable of receiving at least one ceramic powder (or at least one powder mixture as the case may be); and an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch are moved within the inner volume of the die, wherein the gap is from 10 μm to 100 μm wide and the at least one powder mixture has a specific surface area (SSA) of from 1 to 10 m²/g as measured according to ASTM C1274.

Figure 2:
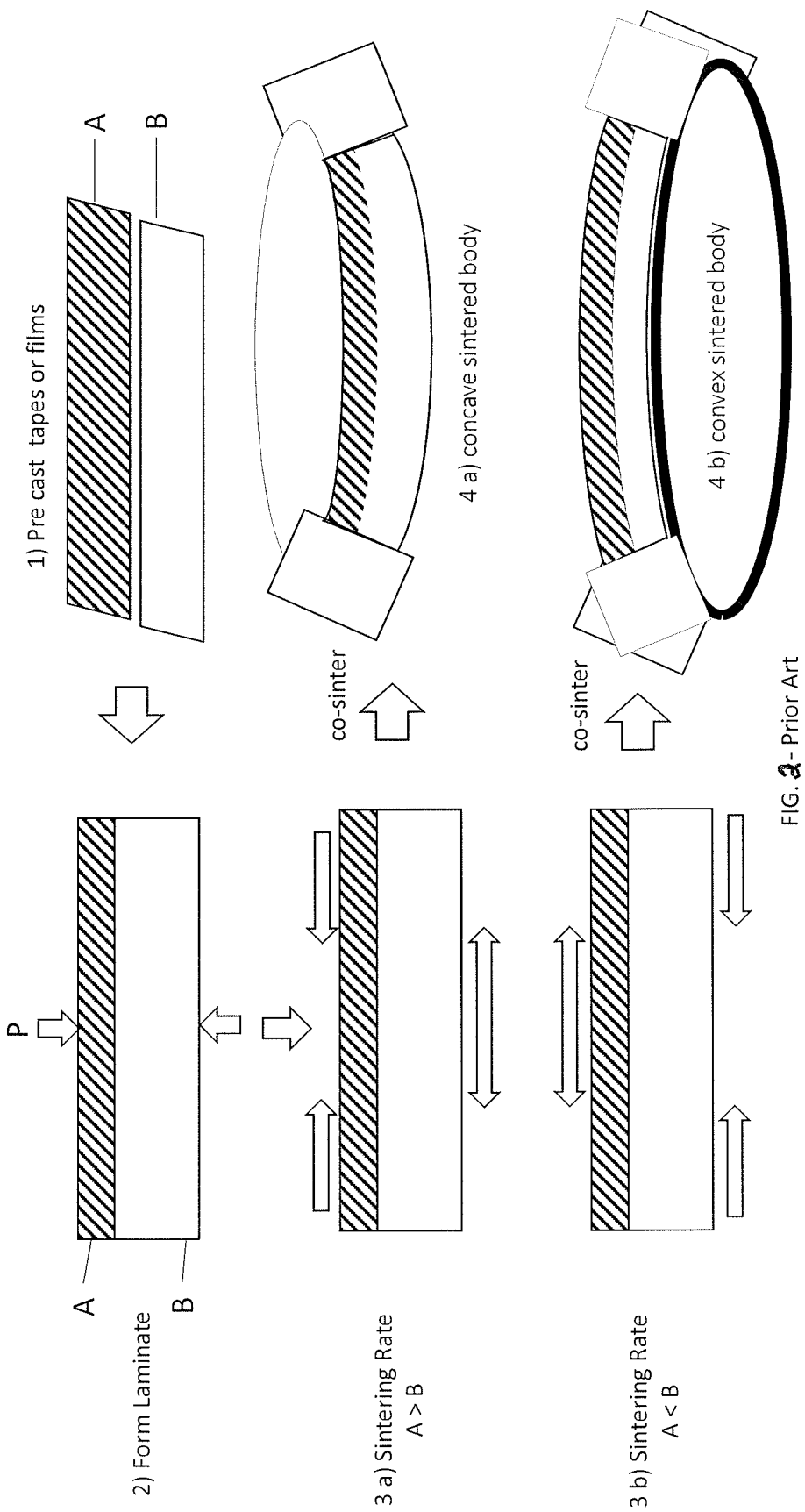
FIG. 2 illustrates a laminate structure as known in the art.
Figure 28:
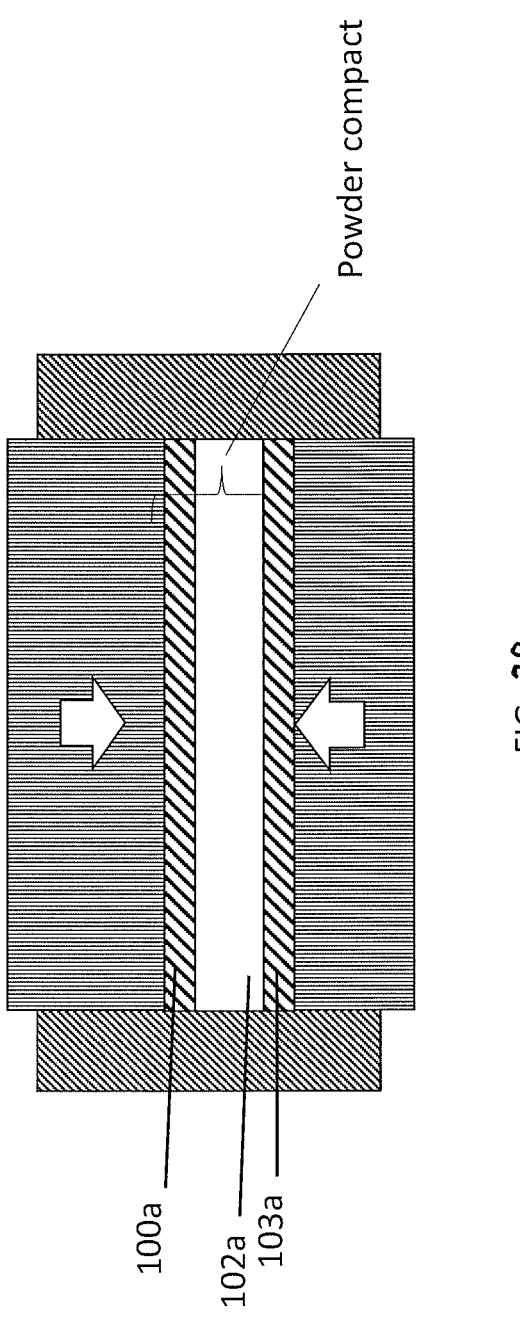
FIG. 28 depicts a schematic of the tool set of the pressure-assisted sintering apparatus according to embodiments as disclosed herein.

As depicted in FIG. 28, the pressure-assisted sintering processes (and in preferred embodiments pressure-and-current assisted sintering processes, such as SPS) as disclosed herein provide for the preparation of unitary, multilayer sintered ceramic bodies 98 from at least three layers of powder mixtures disposed in the tool set (powder compact) without the use of dopants and/or sintering aids. The unitary, multilayer sintered body 98 is formed (upon in-situ sintering) from layers of the powder mixtures (depicted in FIG. 28 as 100a, corresponding to the at least one first layer 100, 102a, corresponding to the at least one second layer 102, and 103a, corresponding to the at least one third layer 103, (thus forming the powder compact) which are thereafter formed into the at least one first 100, second 102 and third 103 layers, respectively, of the sintered body (without the formation of films, tapes, or green bodies as is common in the art). In some embodiments, the order of disposition of the at least one first and third powder mixtures may be reversed. In embodiments, at least one of the powder mixtures may be calcined, while in other embodiments, all powder mixtures may be calcined. In contrast to FIGS. 1 and 2, the pressure-assisted methods produce a unitary, multilayer sintered ceramic body of high density without the requirement of matching sintering rates of the pressureless methods as known to those skilled in the art. The absolute value of the CTE difference between the at least one first 100, second 102, and third 103 layers of the multilayer sintered body is preferably within the ranges as disclosed herein, to avoid the cracking and fracture arising from CTE mismatch outside the disclosed ranges (which may be experienced during sintering as well as during other thermal excursions such as annealing and similar) as depicted in FIG. 4.

Figure 29:
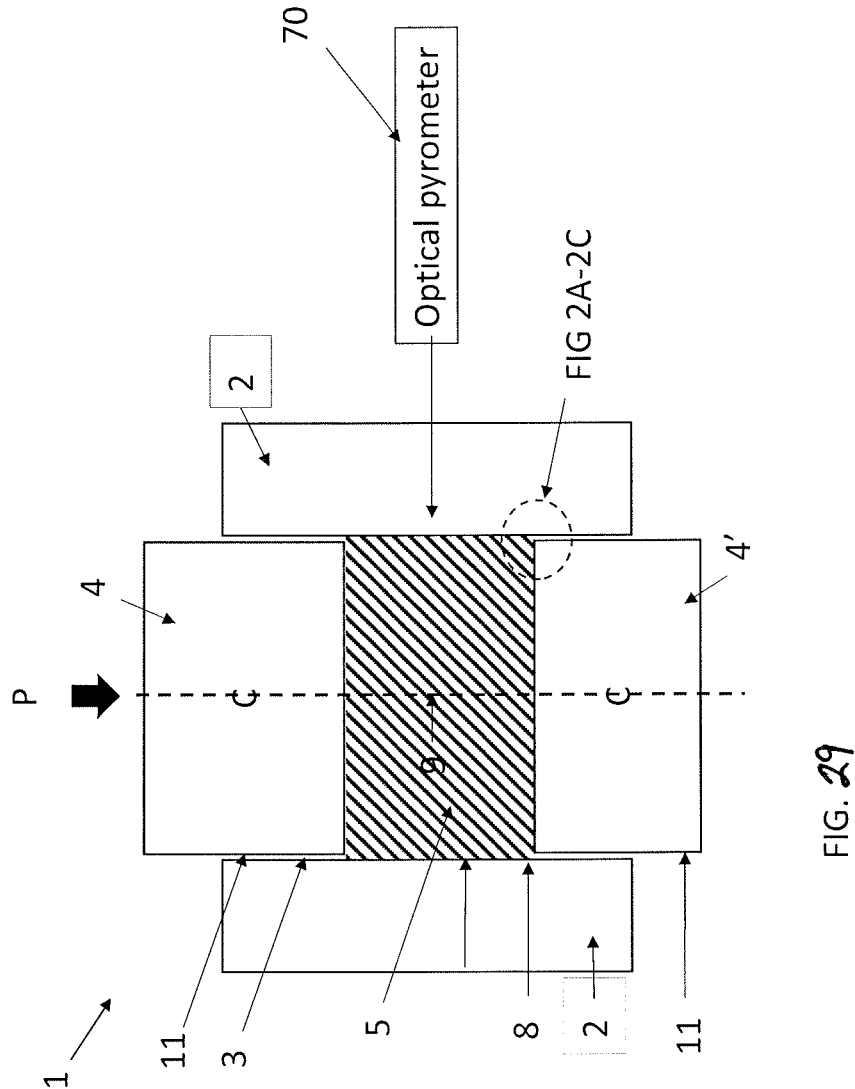
FIG. 29 illustrates a cross-sectional view of an SPS sintering apparatus having a tool set located in a vacuum chamber (not shown) with a simple arrangement used for sintering ceramic materials.

FIG. 29 depicts an SPS tool 1 with a simplified die/punch arrangement used for sintering ceramic powders and/or powder mixtures. Typically, the die/punch arrangement is within a vacuum chamber (not shown) as will be recognized by one of ordinary skill in the art. Referring to FIG. 29, the spark plasma sintering tool 1 comprises a die system 2 comprising a sidewall comprising an inner wall 8 having a diameter that defines an inner volume capable of receiving a ceramic powder or a powder mixture 5.

Still referring to FIG. 29, the spark plasma sintering tool 1 comprises an upper punch 4 and a lower punch 4' operably coupled with the die system 2, wherein each of the upper punch 4 and the lower punch 4' have an outer wall 11 defining a diameter that is less than the diameter of the inner wall 8 of the die system 2 thereby creating a gap 3 between each of the upper punch 4 and the lower punch 4' and the inner wall 8 of the die system 2 when at least one of the upper punch 4 and the lower punch 4' are moved within the inner volume of the die system 2.

The die system 2 and upper 4 and lower 4' punches may comprise at least one graphite material. In certain embodiments, the graphite material/s disclosed herein may comprise at least one isotropic graphite material. In other embodiments, the graphite material/s disclosed herein may comprise at least one reinforced graphite material such as for example a carbon-carbon composite, and graphite materials comprising fibers, particles or sheets or mesh or laminates of other electrically conductive materials such as carbon in a matrix of an isotropic graphite material. In other embodiments, the die and upper and lower punches may comprise combinations of these isotropic and reinforced graphite materials.

The graphite materials used for some or all of the parts of the tool such as, for example, die 6 and punches 4 and 4' may comprise porous graphite materials which exhibit a porosity of from about 5% to about 20%, from about 5% to about 17%, from about 5% to about 13%, from about 5% to about 10%, from 5% to about 8%, from about 8% to about 20%, from about 12% to 20%, from about 15% to about 20%, from about 11% to about 20%, from about 5% to 15%, from 6% to about 13%, and preferably from about 7% to about 12%.

Preferably, the graphite material has an average pore size (pore diameter) of from 0.4 to 5.0 μm, preferably from 1.0 to 4.0 μm and comprises pores with a surface pore diameter of up to 30 μm, preferably up to 20 μm, preferably up to 10 μm. More preferably, pores with a surface pore diameter of from 10 to 30 μm may be present.

The graphite materials used for the tool as disclosed herein may have an average grain size of <0.05 mm, preferably <0.04 mm, preferably <0.03 mm, preferably <0.028 mm, preferably <0.025 mm, preferably <0.02 mm, preferably <0.018 mm, preferably <0.015 mm, and preferably <0.010 mm.

The graphite materials used for the tool as disclosed herein may have an average grain size of >0.001 mm, preferably >0.003 mm, preferably >0.006 mm, preferably >0.008 mm, preferably >0.010 mm, preferably >0.012 mm, preferably >0.014 mm, preferably >0.020 mm preferably >0.025 mm and preferably >0.030 mm.

The graphite materials used for the tool as disclosed herein may have a density of $\geq 1.45$ g/cm³, preferably $\geq 1.50$ g/cm³, preferably $\geq 1.55$ g/cm³, preferably $\geq 1.60$ g/cm³, preferably $\geq 1.65$ g/cm³, preferably $\geq 1.70$ g/cm³, and preferably $\geq 1.75$ g/cm³.

The graphite materials used for the tool as disclosed herein may have a density of $\leq 2.0$ g/cm³, preferably 1.90 g/cm³, preferably $\leq 1.85$ g/cm³ and preferably $\leq 1.80$ g/cm³.

In embodiments, the graphite materials have a coefficient of thermal expansion (CTE) across a temperature range from about 400 to about 1400° C. of $\geq 3.3 \times 10^{-6}/°$ C., $\geq 3.5 \times 10^{-6}/°$ C., $\geq 3.7 \times 10^{-6}/°$ C., $\geq 4.0 \times 10^{-6}/°$ C., $\geq 4.2 \times 10^{-6}/°$ C., $\geq 4.4 \times 10^{-6}/°$ C., $\geq 4.6 \times 10^{-6}/°$ C., $\geq 4.8 \times 10^{-6}/°$ C.

In embodiments, the graphite materials may have a coefficient of thermal expansion (CTE) across a temperature range from about 400 to 1400° C. of $\leq 7.2 \times 10^{-6}/°$ C., preferably $\leq 7.0 \times 10^{-6}/°$ C., preferably $\leq 6.0 \times 10^{-6}/°$ C., preferably $\leq 5.0 \times 10^{-6}/°$ C., preferably $\leq 4.8 \times 10^{-6}/°$ C., and preferably $\leq 4.6 \times 10^{-6}/°$ C.

Table 9 lists properties of exemplary graphite materials as disclosed herein.

TABLE 9

| Property | Range |
| --- | --- |
| Density (g/cc) | 1.45 to 2.0 |
| Average Grain Size (μm) | 1 to < 50 |
| Resistivity (Ohm- cm) | 0.001 to 0.003 |
| Flexural Strength (MPa) | 40-160 |
| Compressive Strength (MPa) | 80-260 |
| CTE (x10⁻⁶/C.) at 400° C. to 1400° C. | 3.3 to 7 |
| Porosity % | 5 to 20 |
| Average Pore Diameter (μm) | 0.4 to 5 |
| Thermal K (W/m K) | 40-130 |
| Shore Hardness (HSD) | 55 to 59 |
| Tensile Strength (MPa) | 25 to 30 |
| Elastic Modulus (GPa) | 9 to 11 |
| Impurities/Ash (ppm) | 3 to 500 |

The die system 2 comprises a die 6 and optionally but preferably at least one conductive foil 7 located on the inner wall of the die as depicted in the embodiments of FIGS. 25a) to 25c). The number of conductive foils on the inner wall of the die is not limited and 1, 2, 3, 4, 5, 6, 7, 8, 9, or 10 conductive foils may be provided as a circumferential liner between die 6 and each of upper 4 and lower 4' punches whereby the inner wall 8 of the die system 2 (including the at least one conductive foil, if present) and the outer wall 11 of each of the upper and lower punches defines the gap 3. The at least one conductive foil 7 may comprise graphite, niobium, nickel, molybdenum, platinum and other ductile, conductive materials and combinations thereof which are stable within the temperature range according to the method as disclosed herein.

In certain embodiments, the conductive foil may comprise a flexible and compressible graphite foil as disclosed herein having one or more of the following characteristics:

carbon content of more than 99 wt %, preferably more than 99.2 wt %, more preferably more than 99.4 wt %, more preferably more than 99.6 wt %, more preferably more than 99.8 wt %, more preferably more than 99.9 wt %, more preferably more than 99.99 wt %, and more preferably more than 99.999 wt %;

impurities of less than 500 ppm, preferably less than 400 ppm, more preferably less than 300 ppm, more preferably less than 200 ppm, more preferably less than 100 ppm, more preferably less than 50 ppm, more preferably less than 10 ppm, more preferably less than 5 ppm, and more preferably less than 3 ppm;

tensile strength of the graphite foil in a range of from 4.0 to 6.0 MPa, preferably from 4.2 to 5.8 MPa, and more preferably from 4.4 or 5.6 MPa; and/or bulk density of the graphite foil preferably in a range of from 1.0 to 1.2 g/cc, preferably 1.02 to 1.18 g/cc, more preferably 1.04 to 1.16 g/cc, and more preferably 1.06 to 1.16 g/cc.

In embodiments, the at least one foil typically comprises graphite. In certain embodiments, the at least one foil as part of the die system may comprise a circumferential liner between a surface of the die and each of the upper and lower punches.

The graphite foils may improve the temperature distribution across the powder during sintering. Table 10 lists properties of exemplary graphite foils according to embodiments as disclosed herein.

TABLE 10

| Thickness (mm) | 0.030 to 0.260 |
|---|---|
| Density (Mg/m$^3$) | 0.5 to 2 |
| Tensile Strength (MPa) | 4.9-6.3 |
| Resistivity ($\mu$Ohm-m; 25° C.) (parallel to surface) | 5 to 10 |
| Resistivity ($\mu$Ohm-m; 25° C.) (perpendicular to surface) | 900 to 1100 |
| CTE ($\times 10^{-6}$/C.; parallel to surface) at 350° C. to 500° C. | 5 to 5.5 |
| CTE (perpendicular to surface) at 350° C. to 500° C. | $2 \times 10^{-4}$ |
| Compressibility (%) | 40-50 |
| Recovery (%) | 10 to 20 |
| thermal conductivity (W/mK at 25° C.; parallel to surface) | 175 to 225 |
| thermal conductivity (W/mK at 25° C.; perpendicular to surface) | ~5 |
| Impurities/Ash (wt %) | <0.5 |

Figure 30A:
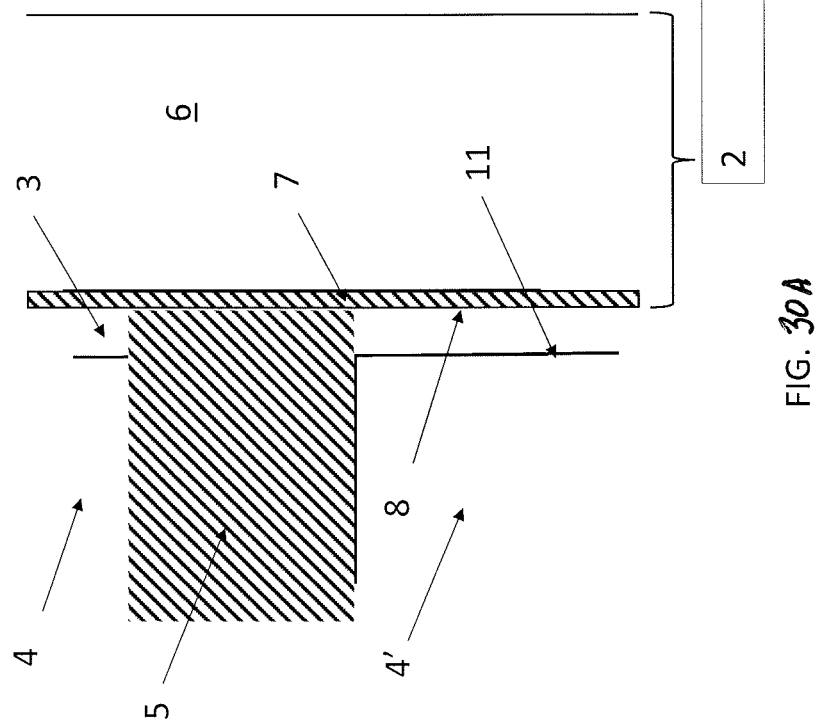
FIG. 30A illustrates an embodiment of FIG. 29 showing one foil layer.
Figure 30B:
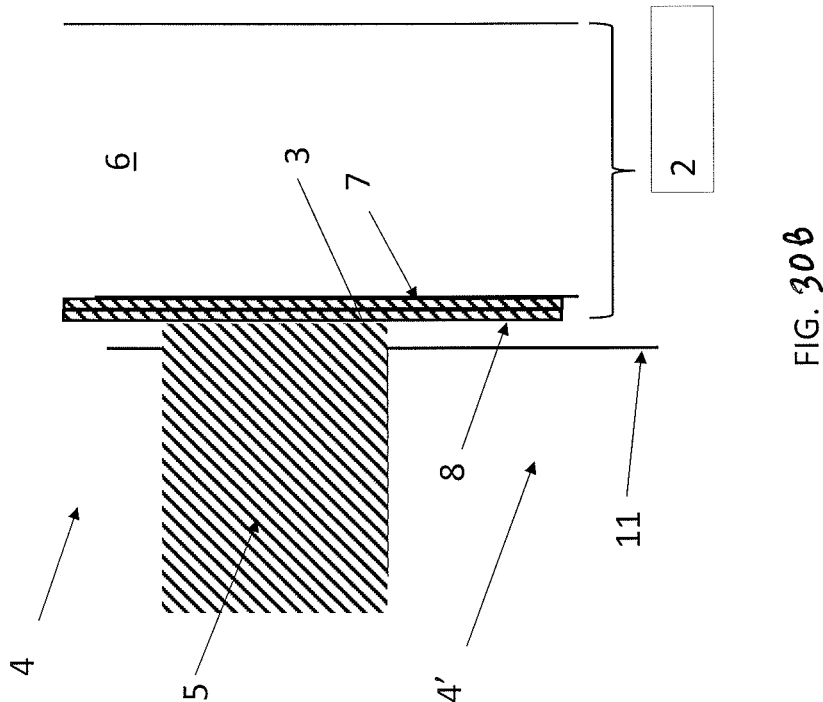
FIG. 30B illustrates an alternative embodiment of FIG. 29 showing two foil layers.
Figure 30C:
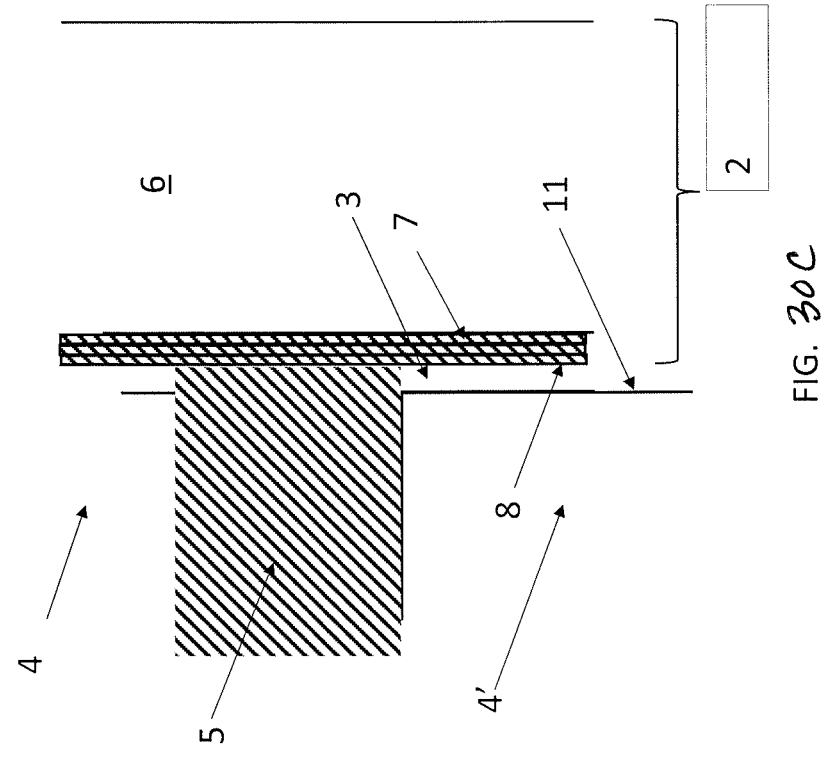
FIG. 30C illustrates another alternative embodiment of FIG. 29 showing three foil layers.

Referring now to FIGS. 30a), 25 b) and 30c), an SPS tool set with embodiments of the graphite foil arrangement is shown. At least one ceramic powder (or powder mixture) 5 is disposed between at least one of upper and lower punches 4 and 4' and gap 3 is shown between the outer wall 11 of each of the upper and lower punches and the inner wall 8 of the die system 2. FIGS. 30a), 30b) and 30c) depict 1 to 3 layers of conductive foil 7 respectively and die 6 as part of the die system 2. Accordingly, the gap extends from the inner wall 8 of the die system 2 to the outer wall 11 of each of the upper and lower punches. The gap distance is arranged such that the powder may degas before and/or during heating and sintering, while also maintaining ohmic contact between punch and die to improve the temperature distribution across the ceramic powder or powder mixture during heating and sintering.

The graphite foils 7 may have a thickness of, for example, from 0.025 to 0.260 mm, preferably from 0.025 to 0.200 mm, preferably from 0.025 to 0.175 mm, preferably from 0.025 to 0.150 mm, preferably from 0.025 to 0.125 mm, preferably from 0.035 to 0.200 mm, preferably from 0.045 to 0.200 mm, and preferably from 0.055 to 0.200 mm.

The distance of gap 3 is measured from an inwardly facing surface of the foil 7 closest to the upper and lower punches 4 and 4' to the outer wall 11 of each of the upper and lower punches. Preferred ranges for the distance of gap 3 are preferably from 10 to 100 $\mu$m, from 10 to 70 $\mu$m, preferably from 10 to 60 $\mu$m, preferably from 10 to 50 $\mu$m, preferably from 30 to 70 $\mu$m, preferably from 20 to 60 $\mu$m, and preferably from 30 to 60 $\mu$m.

Moreover, the width of gap 3 between the inner wall 8 of the die system 2 and the outer wall 11 of each of the upper 4 and lower 4' punches may be determined by the person skilled in the art so that the powder degassing during the preheating, heating and sintering processes are sufficiently facilitated on one hand, and that a sufficient electrical contact for Joule or resistive heating and, thereby, sintering is achieved on the other hand. If the distance of gap 3 is less than 10 $\mu$m, the force required to move at least one of the upper and lower punches within the inner volume of the die system, and thereby assemble the tool set, may cause damage to the tool set. Further, a gap 3 of less than 10 $\mu$m may not allow for escape of adsorbed gases, organics, humidity and the like within the powder 5 which would extend processing time during manufacturing and may result in residual porosity, and thereby lowered density, in the resulting sintered ceramic body. If the width of gap 3 is greater than 70 $\mu$m when sintering ceramic powders or powder mixtures, localized overheating may occur, resulting in thermal gradients within the tool set during sintering. As a result, in order to form a multilayer sintered ceramic body (such as that disclosed herein) of a large dimension (up to about 625 mm in greatest dimension), a gap of from 10 to 100 $\mu$m is preferable. Thus, in some embodiments, the distance of the gap 3 between the inner wall 8 of the die system 2 and the outer wall 11 of each of the upper and lower punches when sintering the ceramic powder or powder mixtures is preferably from 10 to 100 $\mu$m, from 10 to 70 $\mu$m, preferably from 10 to 60 $\mu$m, preferably from 10 to 50 $\mu$m, preferably from 10 to 40 $\mu$m, preferably from 20 to 70 $\mu$m, preferably from 30 to 70 $\mu$m, preferably from 40 to 70 $\mu$m, preferably from 50 to 70 $\mu$m, preferably from 30 to 60 $\mu$m.

These thermal gradients may result in low overall or bulk density and high-density variations and a sintered ceramic body which is fragile and prone to breakage. As a result, the distance of gap 3 between the inner wall 8 of the die system 2 and the outer wall 11 of each of the upper and lower punches when sintering ceramic powders or powder mixtures as disclosed herein is from 10 to 100 $\mu$m, 10 to 70 $\mu$m, preferably from 10 to 60 $\mu$m, preferably from 10 to 40 $\mu$m, preferably from 20 to 70 $\mu$m, preferably from 40 to 70 $\mu$m, preferably from 50 to 70 $\mu$m, preferably from 30 to 70 $\mu$m, preferably from 40 to 60 $\mu$m. Without intending to be bound by a particular theory, it is believed that the gap distance between the inner wall 8 of the die system 2 and the outer wall 11 of each of the upper and lower punches during sintering functions to facilitate powder degassing of organics, moisture, adsorbed molecules, etc. during the sintering process. This leads to a sintered ceramic body, such as the multilayered body disclosed herein, of a large size having high density and low volumetric porosity, and improved mechanical properties such that the body may be easily handled and machined into a predetermined form of a chamber component without breakage. Multilayer sintered ceramic bodies made as disclosed herein may have dimensions of from 100 mm to about 625 mm with regard to the greatest dimension of the multilayer sintered ceramic body 98.

Figure 31A:
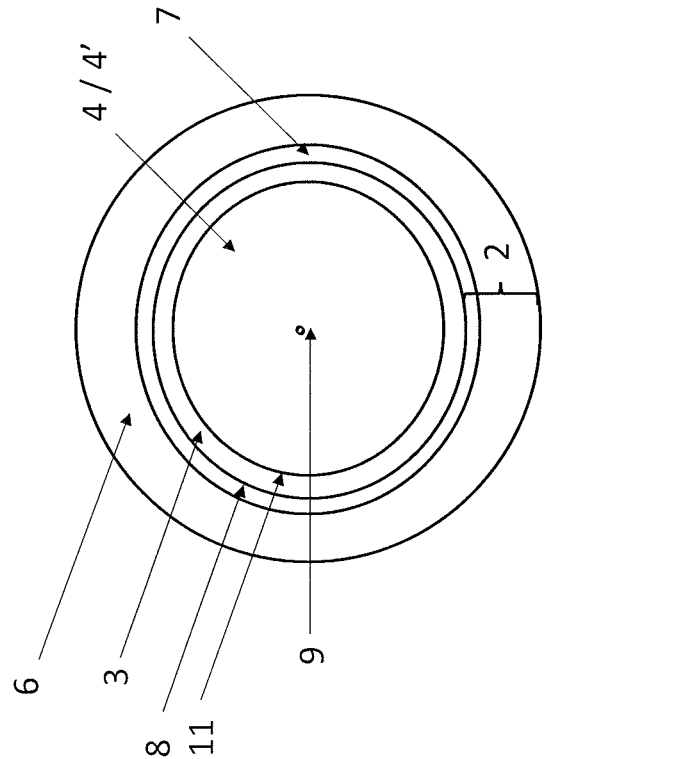
FIGS. 31A and 31B are top plan views of the SPS sintering apparatus of FIG. 29.
Figure 31B:
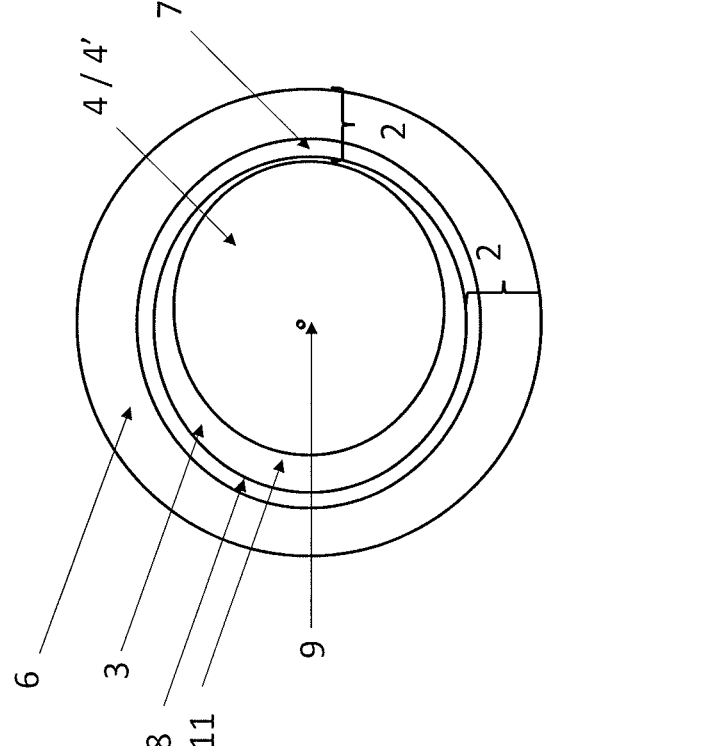

In practice, the upper and lower punches 4 and 4' are not always perfectly aligned about a central axis. FIG. 31a) and FIG. 31b) are plan views of the tool set 1, illustrating alignments of upper and lower punches 4 and 4', gap 3, any number of conductive foils 7, and die system 2 about central axis 9. In embodiments as depicted in FIG. 31a), the gap may be axisymmetric about central axis 9. In other embodiments as depicted in FIG. 31b) the gap may be asymmetric about central axis, 9. The gap 3 may extend between from 10 µm to 100 µm when sintering the ceramic powder or powder mixtures to form a multilayer sintered ceramic body as disclosed herein, in both axisymmetric and asymmetric embodiments as depicted.

Figure 32:
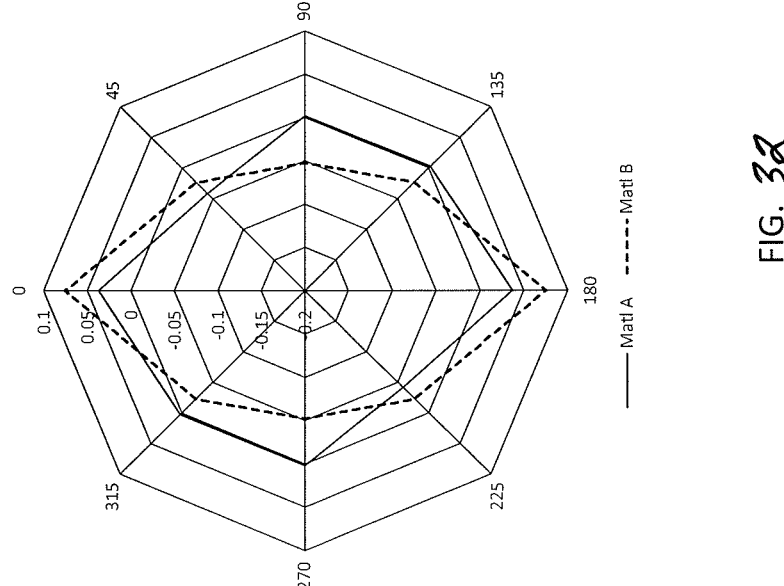
FIG. 32 is a graph depicting radial variance in average coefficient of thermal expansion (CTE) of graphite materials A and B at 1200° C.

Gap asymmetry performance can be measured by performing an absolute radial CTE deviation analysis over a range of temperatures. For example, FIG. 32 shows the radial deviation from average CTE of two isotropic graphite materials (A and B) used as the punches and die of the apparatus disclosed herein at 1200° C. FIG. 32 shows that for a material to be successful at maintaining the desired gap over a large temperature range, the radial deviation cannot vary in the x-y plane by >0.3×10-6 at the maximum from, e.g., room temperature to 2000° C. Material B displays an unacceptable CTE expansion in the x-y plane whereas Material A exhibited an acceptable CTE expansion throughout the temperature range.

The advantages of the specific tool set design used according to an embodiment may lead to the overall technical effect to provide a large, multilayer sintered ceramic body of very high purity and having a high and uniform density and low volumetric porosity and thereby a reduced tendency towards breakage in the sintering process, in particular in the SPS process, according to the present disclosure. Therefore, all features disclosed with respect to the tool set also apply to the product of a multilayer sintered ceramic body of dimension greater than 100 mm and up to and including about 625 mm.

By using the tool set as disclosed herein it becomes possible to achieve a more homogeneous temperature distribution in the ceramic powder or powder mixtures 5 to be sintered, and make a sintered ceramic body, in particular one of large dimension, exceeding for example 100 mm and/or 200 mm in greatest dimension including to about 625 mm and greater, having very high (>98% of theoretical density of a specified material) density and enhanced interlayer adhesion and thereby a reduced tendency towards breakage. The word "homogeneous" means that a material or system has substantially the same property at every point; it is uniform without irregularities. Thus, by "homogeneous temperature distribution" is meant that the temperature distribution is spatially uniform and does not have considerable gradients, i.e., a substantially uniform temperature exists regardless of position in a horizontal x-y plane along the ceramic powder or powder mixtures 5.

The tool set as disclosed may further comprise spacer elements, shims, liners and other tool set components. Typically, such components are fabricated from at least one of the graphite materials having the properties as disclosed herein.

Figure 33:
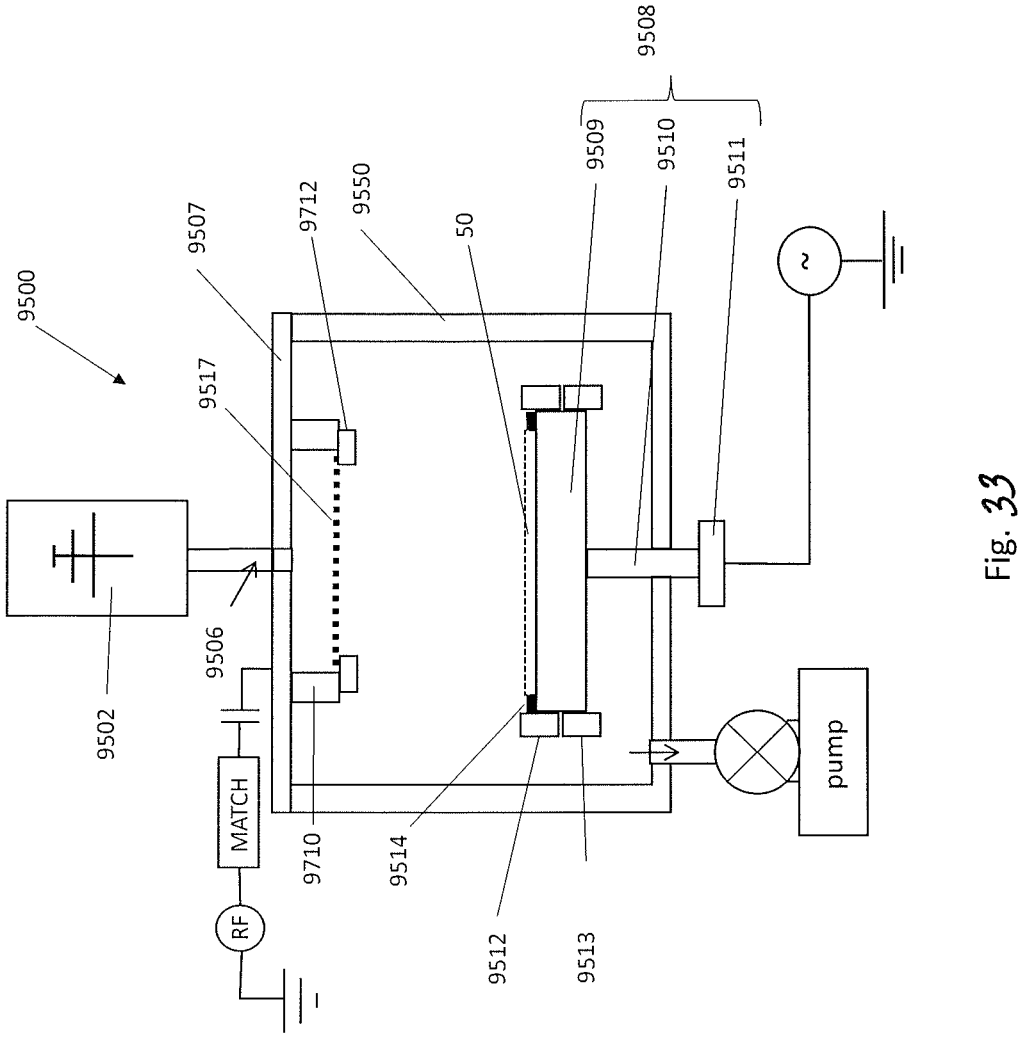
FIGS. 33-34 depict semiconductor plasma processing systems 9500 and 9600.

As shown in FIG. 33, embodiments of the technology as disclosed herein may be useful as components for use in a plasma processing system 9500, which may be configured for use in semiconductor etching processes, also denoted as "etch processing system". Etch processing system 9500 may in embodiments include a remote plasma region. The remote plasma region may include a remote RF source/matching network 9502, which is also denoted as remote plasma source ("RPS").

Etch processing system 9500 may comprise a vacuum chamber 9550 having a corrosion resistant chamber liner (not shown), a vacuum source, and a chuck or electrostatic chuck ("ESC") 9509 on which a wafer 50, also denoted as substrate, is supported. A cover ring or electrode cover 9514, a top shield ring 9512 and shield ring 9513 surrounds the wafer 50 and puck 9509. A top plate/window/lid 9507 forms an upper wall of the vacuum chamber 9550. A showerhead 9517 forms an upper wall or is mounted beneath an upper wall of the vacuum chamber 9650. Top plate/window/lid 9507 (which may comprise an RF window or dielectric window), gas distribution system 9506, showerhead 9517, cover ring or electrode cover 9514, top shield ring 9512, shield ring 9513, chamber liner (not shown), and chuck or electrostatic chuck (ESC) 9508 and puck 9509 may be made at least in part of embodiments of the multilayer sintered ceramic bodies as disclosed herein.

Parts of the surface of the showerhead 9517 may be covered with a shield ring 9712. Parts of the surface of the showerhead 9517, especially radial sides of the surface of the showerhead 9517 may be covered with a top shield ring 9710. Shield ring 9712, showerhead 9517 and top shield ring 9710 may be made at least in part from embodiments of the multilayer sintered ceramic bodies as disclosed herein.

The remote plasma source 9502 is provided outside of the window 9507 of the chamber 9550 for accommodating the wafer 50 to be processed. The remote plasma region may be in fluid communication with the vacuum chamber 9550 through a gas delivery system 9506. In the chamber 9550, a reactive plasma may be generated by supplying a processing gas to the chamber 9550 and a high frequency power to the plasma source 9502. By using the reactive plasma thus generated, a predetermined plasma processing is performed on the wafer 50. A planar antenna having a predetermined pattern is widely used for the high frequency antenna of the etch processing system 9500.

Figure 34:
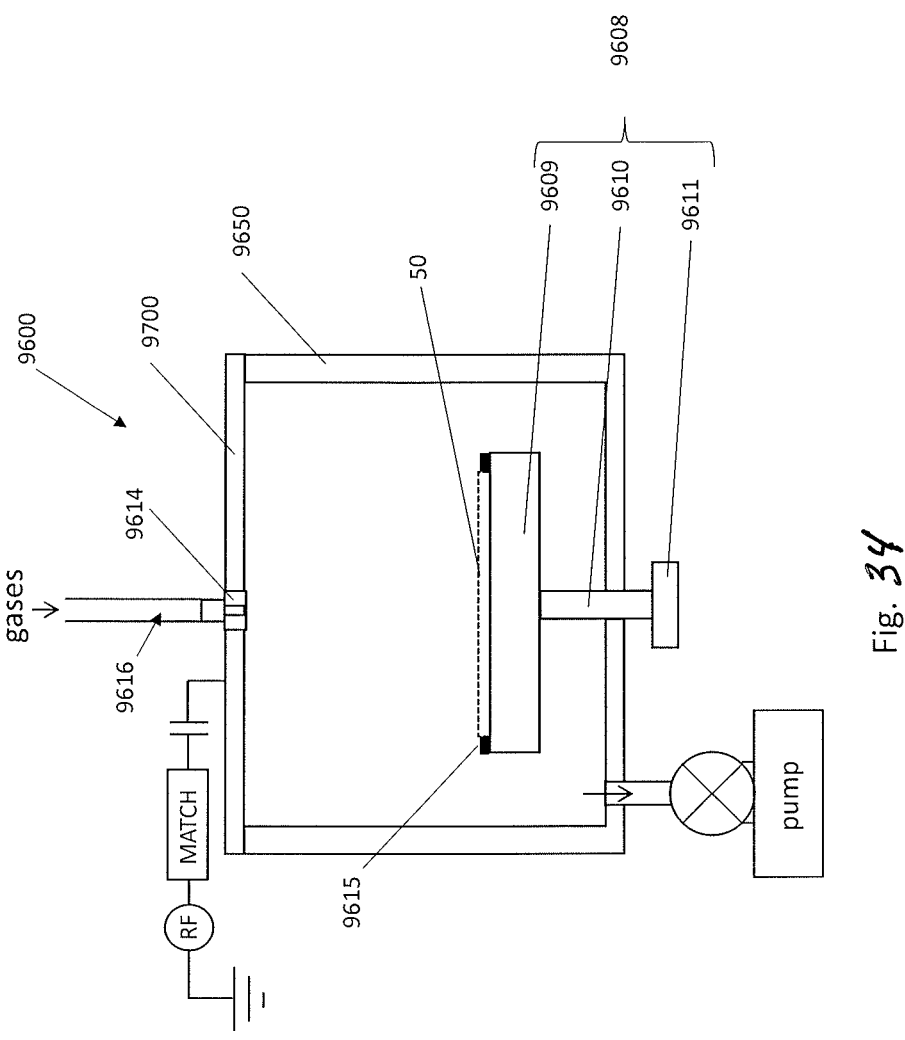

As shown in FIG. 34, embodiments of the technology as disclosed herein may be useful as components in a plasma processing system 9600 which may be configured for use in semiconductor deposition processes, also called "deposition processing system". Deposition processing system 9600 comprises a vacuum chamber 9650, a vacuum source, and a puck 9609 on which a wafer 50, also denoted as semiconductor substrate, is supported. The processing system may further include a nozzle or injector 9614 which is in fluid communication with a gas delivery system 9616 for supplying process gases to the interior of the vacuum chamber 9650. A top wall 9700 of the chamber 9650 may comprise a central opening configured to receive a central gas injector (also referred to as nozzle), 9614. In certain embodiments, the top wall 9700 of the chamber may comprise an RF or dielectric window configured with a central opening to accommodate injector, 9614. An RF energy source energizes the process gas into a plasma state to process the substrate 50. Embodiments of the top wall, comprising an RF or dielectric window 9700, the gas delivery system 9616 and the central gas injector 9614 may be made entirely or partially from embodiments of the multilayer sintered ceramic body as disclosed herein.

Deposition processing system 9600 may further include an electrostatic chuck 9608 that is designed to carry a wafer 50. The chuck 9608 may comprise a puck 9609, for supporting the wafer 50. Parts of the supporting surface of the puck 9609 may be covered with a deposition ring, 9615. Other names for deposition ring 9615 such as deposition shield or deposition ring assembly are taken as synonymous and may be used interchangeably herein. Deposition ring 9615 may be made entirely or partially from embodiments of the multilayer sintered ceramic body as disclosed herein.

The puck 9609 may be formed fully or in part from embodiments of the multilayer sintered ceramic body as disclosed herein and may have a chucking electrode disposed within the puck proximate a support surface of the puck 9609 to electrostatically retain the wafer 50 when disposed on the puck 9609. The chuck 9608 may comprise a base 9611 having a ring-like extending to support the puck 9609; and a shaft 9610 disposed between the base and the puck to support the puck above the base such that a gap is formed between the puck 9609 and the base 9610, wherein the shaft 9610 supports the puck proximate a peripheral edge of the puck 9609. Chuck 9608, puck 9609, and deposition ring 9615 may be made entirely or partially from embodiments of the unitary, multilayer sintered ceramic body as disclosed herein.

Method of Preparation

Preparation of the multilayer sintered ceramic body may be achieved by use of pressure assisted sintering, such as for example Spark Plasma Sintering (SPS), also known as Field Assisted Sintering Technology (FAST), or Direct Current Sintering (DCS). These direct current sintering and related techniques employ a direct current to heat up an electrically conductive die configuration or tool set, and thereby a material to be sintered. This manner of heating allows the application of very high heating and cooling rates, enhancing densification mechanisms over grain growth promoting diffusion mechanisms, which may facilitate preparation of ceramic sintered bodies of very fine grain size, and transferring the intrinsic properties of the original powders into their near or fully dense products. The direct current, pressure assisted methods as disclosed herein utilize a preferably unpulsed, continuous direct current to heat the tool set as disclosed.

Preparation of the multilayer sintered ceramic bodies as disclosed herein may also be achieved through use of pressure assisted sintering methods such as uniaxial hot pressing whereby the die configuration or tool set is heated by way of an externally applied heat source such as induction heating.

The multilayer sintered ceramic body is prepared according to the general process steps as follows: a) combining at least two powders selected from the group consisting of yttria, alumina, magnesia, and at least one selected from the group consisting of unstabilized, partially stabilized and stabilized zirconia, and combinations thereof to make a first powder mixture; b) combining alumina powder and at least one of partially stabilized and stabilized zirconia powder to make a second powder mixture; c) combining yttria powder, alumina powder, and at least one of unstabilized, partially stabilized, and stabilized zirconia powder to make a third powder mixture; d) calcining at least one of the first, second, and third powder mixtures by applying heat to raise the temperature of at least one of the powder mixtures to a calcination temperature and maintaining the calcination temperature to perform calcination to form at least one of first, second, and third calcined powder mixtures; e) separately disposing the at least one first, second, and third powder mixtures inside a volume defined by a tool set of a sintering apparatus to form at least one layer of the first powder mixture, at least one layer of the second powder mixture, and at least one layer of the third powder mixture, and creating vacuum conditions inside the volume, wherein the tool set comprises a die comprising a sidewall comprising an inner wall and an outer wall, wherein the inner wall has a diameter that defines an inner volume capable of receiving at least one powder; and an upper punch and a lower punch operably coupled with the die, wherein each of the upper punch and the lower punch have an outer wall defining a diameter that is less than the diameter of the inner wall of the die thereby defining a gap between each of the upper punch and the lower punch and the inner wall of the die when at least one of the upper punch and the lower punch are moved within the inner volume of the die, wherein the gap is from 10 µm to 100 µm wide; f) applying pressure to the layers of the first, second, and third powder mixtures while heating to a sintering temperature and performing sintering to form the multilayer sintered ceramic body, wherein the at least one layer of the first powder mixture forms at least one first layer, the at least one layer of the second powder mixture forms at least one second layer, and the at least one layer of the third powder mixture forms at least one third layer; and g) lowering the temperature of the multilayer sintered ceramic body, wherein the at least one first layer comprises at least one polycrystalline ceramic material selected from the group consisting of (i) YAG (ii) magnesium aluminate spinel, and (iii) yttria and zirconia wherein the zirconia is present in an amount of not less than 10 mol % $ZrO_2$ and not greater than 25 mol % $ZrO_2$, preferably not less than 12 mol % and not greater than 25 mol % $ZrO_2$, preferably not less than 15 mol % and not greater than 25 mol % $ZrO_2$, preferably not less than 18 and not greater than 25 mol % $ZrO_2$, preferably not less than 10 mol % and not greater than 23 mol % $ZrO_2$, preferably not less than 10 mol % and not greater than 20 mol % $ZrO_2$, preferably not less than 15 mol % and not greater than 23 mol % $ZrO_2$, (and the balance comprising $Y_2O_3$), and the at least one second layer comprises alumina and zirconia wherein the zirconia comprises at least one of stabilized and partially stabilized zirconia, and the at least one third layer comprises at least one selected from the group consisting of yttria, alumina, and zirconia wherein the zirconia comprises at least one of unstabilized zirconia, stabilized zirconia and partially stabilized zirconia, wherein the at least one second layer is disposed between the at least one first layer and the at least one third layer, wherein an absolute value of the difference in coefficient of thermal expansion (CTE) between any of the at least one first, second, and third layers is from 0 to 0.75×10-6/° C. as measured in accordance with ASTM E228-17, wherein the at least one first, second and third layers form a unitary sintered ceramic body. In preferred embodiments, the powders selected from the group consisting of yttria, alumina, magnesia, and at least one selected from the group consisting of unstabilized, partially stabilized and stabilized zirconia in accordance with steps a), b) and c) each have a specific surface area of about 18 m²/g and less, preferably from about 1 to about 18 m²/g, as measured according to ASTM C1274. Preferably, the first, second and third powder mixtures have a total impurity content of 200 ppm and less as measured relative to a mass of the first, second and third powder mixtures.

The at least one second powder mixture comprises alumina and zirconia wherein the zirconia comprises at least one of stabilized zirconia and partially stabilized zirconia. The at least one second powder mixture comprises alumina in amounts by weight of from 60% to 92.5%, preferably from 75% to 85%, preferably about 77%, relative to the weight of the at least one second powder mixture. The at least one second powder mixture comprises zirconia (to include stabilizers to form at least one of stabilized and partially stabilized zirconia) in amounts by weight of from 7.5% to 40%, preferably from 15% to 25%, preferably about 23%, relative to the weight of the at least one second powder mixture. Upon sintering, these compositional ranges of the at least one second powder mixture correspond to at least one second layer 102 which comprises zirconia (upon sintering) in an amount of from 5 to 30% by volume, preferably from 10 to 30% by volume, preferably from 15 to 30% by volume, preferably from 20 to 30% by volume, preferably from 12 to 25% by volume, preferably from 15 to 25% by volume, preferably from 17 to 25% by volume, preferably from 10 to 22% by volume, preferably from 10 to 20% by volume, preferably from 10 to 17% by volume, preferably from 15 to 21%, preferably from 16 to 20%, and preferably about 16% by volume (and the balance comprising alumina), each relative to a volume of the at least one second layer 102. These volumetric amounts of zirconia may be measured using the combination of SEM imaging and ImageJ analysis software according to the methods as disclosed herein.

The at least one third powder mixture comprises at least one selected from the group consisting of yttria, alumina, and zirconia wherein the zirconia comprises at least one of unstabilized, partially stabilized and stabilized zirconia. The at least one third powder mixture comprises yttria in amounts by weight of from 1 to 57%, preferably from 3 to 57%, preferably from 5 to 57%, preferably from 1 to 40%, preferably from 1 to 30%, preferably from 3 to 30%, preferably from 5 to 30%, preferably from 5 to 15%, and preferably about 6% relative to the weight of the at least one third powder mixture. The at least one third powder mixture comprises alumina in amounts by weight of from 43% to 92.5%, preferably from 65% to 75%, preferably about 73%, relative to the weight of the at least one third powder mixture. The at least one third powder mixture comprises zirconia (including stabilizers, where applicable to form stabilized and/or unstabilized) in amounts by weight of from about 0.4% to 40%, preferably from 4% to 40%, preferably from 15% to 40%, preferably from 15% to 25%, preferably about 21%, relative to the weight of the at least one third powder mixture. Upon sintering, these compositional ranges of the at least one third powder mixture may correspond to the exemplary SEM images of the at least one third layer 103 comprising the multiple phase structure of YAG, zirconia and alumina as depicted in FIGS. 26a) and b). In a preferred embodiment, the at least one third powder mixture comprises zirconia in amounts for the at least one third layer (upon sintering) to comprise $ZrO_2$ in an amount of from about 5 to about 30% by volume, preferably from 5 to 25% by volume, preferably from 5 to 20% by volume, preferably from 5 to 16% by volume, preferably from 10 to 30% by volume, preferably from 15 to 30% by volume, preferably from 20 to 30% by volume, and preferably from 15 to 20% by volume (and the balance comprising $Y_2O_3$ and $Al_2O_3$, each relative to a volume of the at least one third layer 103.

The following additional steps are optional; h) annealing the multilayer sintered ceramic body by applying heat to raise the temperature of the multilayer sintered ceramic body to reach an annealing temperature, performing annealing; i) lowering the temperature of the annealed multilayer sintered ceramic body; and j) machining the multilayer sintered ceramic body or the annealed multilayer sintered ceramic body to create a multilayer sintered ceramic component in the shape of a window, a lid, a dielectric window, an RF window, a ring, a focus ring, a process ring, a deposition ring, a nozzle, an injector, a gas injector, a shower head, a gas distribution plate, a diffuser, an ion suppressor element, a chuck, an electrostatic wafer chuck (ESC), and a puck.

In some embodiments, an optional annealing step may be performed. Optionally, annealing is performed by applying heat to raise the temperature of the multilayer sintered ceramic body to reach an annealing temperature, performing annealing, and lowering the temperature of the sintered and annealed multilayer sintered ceramic body to an ambient temperature by removing the heat source applied to the body and removing the multilayer sintered ceramic body.

The above-mentioned characteristics of the corrosion resistant multilayer sintered ceramic body according to an embodiment are achieved in part by adapting the purity and specific surface area (SSA) of the first, second and third powder mixtures, the pressure to the first, second and third mixtures, the temperature of the first, second and third powder mixtures, the duration of sintering of the first, second and third powder mixtures, the temperature of the multilayer sintered ceramic body during the optional annealing step, and the duration of the optional annealing step.

Disclosed is a method for preparing a multilayer sintered ceramic body, the method comprising the steps of: a) combining at least two powders selected from the group consisting of yttria, alumina, magnesia, and at least one selected from the group consisting of unstabilized, partially stabilized and stabilized zirconia, and combinations thereof to make a first powder mixture; b) combining alumina powder and at least one of partially stabilized and stabilized zirconia powder to make a second powder mixture; c) combining yttria powder, alumina powder, and at least one of unstabilized, partially stabilized, and stabilized zirconia powder to make a third powder mixture; d) calcining at least one of the first, second, and third powder mixtures by applying heat to raise the temperature of the powder mixtures to a calcination temperature and maintaining the calcination temperature to perform calcination to form at least one of first, second, and third calcined powder mixtures; e) separately disposing the first, second, and third powder mixtures inside a volume defined by a tool set of a sintering apparatus to form at least one layer of the first powder mixture, at least one layer of the second powder mixture, and at least one layer of the third powder mixture and creating vacuum conditions inside the volume, wherein the tool set comprises a die comprising a sidewall comprising an inner wall and an outer wall, wherein the inner wall has a diameter that defines an inner volume capable of receiving at least one powder; and an upper punch and a lower punch operably coupled with the die, wherein each of the upper punch and the lower punch have an outer wall defining a diameter that is less than the diameter of the inner wall of the die thereby defining a gap between each of the upper punch and the lower punch and the inner wall of the die when at least one of the upper punch and the lower punch are moved within the inner volume of the die, wherein the gap is from 10 μm to 100 μm wide; f) applying pressure to the layers of the at least one first, second, and third powder mixtures while heating to a sintering temperature and performing sintering to form the multilayer sintered ceramic body, wherein the at least one layer of the first powder mixture upon sintering forms at least one first layer, the at least one layer of the second powder mixture forms at least one second layer, and the at least one layer of the third powder mixture forms at least one third layer; and g) lowering the temperature of the multilayer sintered ceramic body, wherein the first layer comprises at least one crystalline phase of a ceramic material selected from the group consisting of (i) YAG, (ii) magnesium aluminate spinel, and (iii) yttria and zirconia wherein the zirconia is present in an amount of not less than 10 mol % $ZrO_2$ and not greater than 25 mol % $ZrO_2$, preferably not less than 12 mol % and not greater than 25 mol % $ZrO_2$, preferably not less than 15 mol % and not greater than 25 mol % $ZrO_2$, preferably not less than 18 and not greater than 25 mol % $ZrO_2$, preferably not less than 10 mol % and not greater than 23 mol % $ZrO_2$, preferably not less than 10 mol % and not greater than 20 mol % $ZrO_2$, and preferably not less than 15 mol % and not greater than 23 mol % $ZrO_2$. The at least one second layer comprises alumina and zirconia wherein the zirconia comprises at least one of unstabilized, stabilized and partially stabilized zirconia, wherein the at least one second layer is disposed between the at least one first layer and the at least one third layer, wherein an absolute value of the difference in coefficient of thermal expansion (CTE) between any of the at least one first, second, and third layers is from 0 to $0.75 \times 10\text{-}6/°$ C. as measured in accordance with ASTM E228-17, wherein the at least one first, second and third layers form a unitary sintered ceramic body. In preferred embodiments, the powders selected from the group consisting of yttria, alumina, magnesia, and at least one selected from the group consisting of unstabilized, partially stabilized and stabilized zirconia each have a specific surface area of about 18 $m^2$/g and less, preferably from about 1 to about 18 $m^2$/g as measured according to ASTM C1274. In additional preferred embodiments, the at least one first, second and third powder mixtures (or calcined powder mixtures as the case may be) each have a specific surface area of about 18 $m^2$/g and less, preferably from 1 to 18 $m^2$/g as measured according to ASTM C1274. Preferably, the first, second and third powder mixtures have a total impurity content of 200 ppm and less as measured relative to a mass of the first, second and third powder mixtures.

The following additional steps are optional; h) annealing the multilayer sintered ceramic body by applying heat to raise the temperature of the multilayer sintered ceramic body to reach an annealing temperature, performing annealing; i) lowering the temperature of the annealed multilayer sintered ceramic body; and j) machining the multilayer sintered ceramic body or the annealed multilayer sintered ceramic body to create a multilayer sintered ceramic component in the shape of a window, a lid, a dielectric window, an RF window, a ring, a focus ring, a process ring, a deposition ring, a nozzle, an injector, a gas injector, a shower head, a gas distribution plate, a diffuser, an ion suppressor element, a chuck, an electrostatic wafer chuck (ESC), and a puck for use in plasma processing chambers.

Step a) of the method as disclosed herein comprises combining at least two powders selected from the group consisting of yttria, alumina, magnesia, and zirconia (wherein the zirconia is selected from at least one of unstabilized, partially stabilized and stabilized zirconia) to make a first powder mixture; the starting powder materials comprising the first powder mixture are combined and mixed in proportions such that the at least one first powder mixture upon sintering forms an at least one first layer comprising at least one crystalline phase of a ceramic material comprising YAG, magnesium aluminate spinel or comprising yttria and zirconia, wherein the zirconia is present in an amount of not less than 10 mol % $ZrO_2$ and not greater than 25 mol % $ZrO_2$, and the balance comprising $Y_2O_3$. The powders selected to form the at least one first powder mixture are preferably high purity (>99.99%) commercially available powders. However, other oxide powders may be used, for example those produced from chemical synthesis processes and related methods as long as the high purity requirement is satisfied.

Particle sizes for the starting powders, powder mixtures and calcined powder mixtures can be measured using a Horiba model LA-960 Laser Scattering Particle Size Distribution Analyzer capable of measuring particle size from 10 nm to 5 mm. Specific surface area (SSA) for the starting powders, powder mixtures and calcined powder mixtures can be measured using a Horiba BET Surface Area Analyzer model SA-9601 capable of measuring across a specific surface area of 0.01 to 2000 $m^2$/g with an accuracy of 10% and less for most samples. Purity of the starting powders, powder mixtures and calcined powder mixtures can be measured using ICP-MS measurements using an Agilent 7900 ICP-MS model G8403 capable of analysis of lighter elements (such as from Sc and smaller atomic numbers) to about 1.4 ppm, and heavier elements (such as higher atomic numbers than Sc) to about 0.14 ppm. Purity is reported herein as a percent relative to 100% purity, which represents a material comprising the intended constituents only, without impurities, dopants, sintering aids and the like. Impurity contents are reported herein in ppm relative to a total mass of the material under assessment. Silica is not disclosed in the purity and impurity reporting and may be measured in amounts of about 14 ppm using the ICP-MS methods as disclosed herein.

The d50 as used herein is defined as the median and represents the value where half of the particle size distribution resides above this point, and half resides below this point. Similarly, 90 percent of the distribution lies below the d90, and 10 percent of the distribution lies below the d10.

The starting powders as disclosed herein of yttria, zirconia, magnesia and alumina are preferably crystalline, and thereby have a long-range crystallographic order. Any one or all of the starting powders of yttria, zirconia, magnesia and alumina may be sieved, tumbled, blended, milled, etc. according to methods known to those skilled in the art. In some embodiments, the starting powders of yttria, magnesia, zirconia and/or alumina may be optionally calcined according to methods as known to those skilled in the art. Starting powders, powder mixtures and calcined powder mixtures having high specific surface areas (SSAs) such as those nanopowders exceeding 20 $m^2$/g pose issues in handleability when loading the tool set with powder, achieving uniform particle dispersion and mixing during the powder combination/mixing step, and formation of the first layer comprising the YAG phase during the in-situ, reactive sintering method to form YAG as disclosed in International Application No. PCT/US20/60918, which is herein incorporated by reference. The starting powders in accordance with the method as disclosed herein comprise yttria, magnesia, zirconia and alumina and preferably have specific surface areas of 18 $m^2$/g and less. Thus, it is preferable that the powder mixtures as disclosed herein are free of, or substantially free of nanopowders as disclosed herein, and have a specific surface area (SSA) of about 18 $m^2$/g and less.

Starting powders, powder mixtures and/or calcined powder mixtures having specific surface areas of less than about 0.75 $m^2$/g may suffer from agglomeration, require higher energy for mixing and extended mixing times to combine to form the powder mixtures as disclosed herein. Further, powders having surface areas in this range may reduce the driving force necessary for sintering to the high densities as disclosed herein, producing sintered ceramic bodies having lower densities and higher porosity. Preferable for use in the method as disclosed are starting powders as disclosed herein having a SSA of from 1 to 18 $m^2$/g, preferably from 2 to 15 $m^2$/g, and preferably from 3 to 12 $m^2$/g as measured according to ASTM C1274.

The d10 particle size of the yttrium oxide powder used as a starting material according to embodiments as disclosed herein is preferably from 1 to 6 μm, preferably from 1 to 5 μm, preferably from 1 to 4 μm, preferably from 2 to 6 μm, preferably from 3 to 6 μm, preferably from 4 to 6 μm, preferably from 2 to 4 μm.

The d50 particle size of the yttrium oxide powder used as a starting material according to embodiments as disclosed herein is preferably from 3 to 9 μm, preferably from 3 to 8.5 μm, preferably from 3 to 8 μm, preferably from 3 to 7 μm, preferably from 4 to 9 μm, preferably from 5 to 9 μm, preferably from 6 to 9 μm, preferably from 4 to 8 μm. The yttria powder as disclosed herein may have an average particle size of from about 5 to 9 μm.

The d90 particle size of the yttrium oxide powder used as a starting material according to embodiments as disclosed herein is preferably from 6 to 16 μm, preferably from 6 to 15 μm, preferably from 6 to 14 μm, preferably from 6.5 to 16 μm, preferably from 7 to 16 μm, preferably from 7.5 to 16 μm, preferably from 7.5 to 14 μm.

The yttrium oxide powder typically has a specific surface area (SSA) of from 2 to 10 m$^2$/g, preferably from 2 to 8 m$^2$/g, preferably from 2 to 6 m$^2$/g, preferably from 3 to 10 m$^2$/g, preferably from 4 to 10 m$^2$/g, preferably from 6 to 10 m$^2$/g, and preferably from 2 to 4 m$^2$/g.

The purity of the yttrium oxide starting material is preferably higher than 99.99%, preferably higher than 99.995%, preferably higher than 99.999%, more preferably higher than 99.9995%, and more preferably about 99.9999%. This corresponds to impurity levels of 100 ppm and less, preferably 50 ppm and less, preferably 25 ppm and less, preferably 10 ppm and less, more preferably about 1 ppm, preferably from 1 to 100 ppm, preferably from 1 to 50 ppm, preferably from 1 to 25 ppm, preferably from 1 to 10 ppm, preferably from 1 to 5 ppm.

The average or d50 particle size of the magnesium oxide powder used as a starting material according to embodiments as disclosed herein is typically from 1.5 to 5.5 μm, from 2 to 5.5 μm, from 2.5 to 5.5 μm, from 3 to 5.5 μm, from 1.5 to 5 μm, from 1.5 to 4.5 μm, more preferably from 2 to 4.5 μm.

The d90 particle size of the magnesium oxide powder used as a starting material according to embodiments as disclosed herein is typically from 4 to 9 μm, preferably from 5 to 9 μm, preferably from 6 to 9 μm, preferably from 4 to 8 μm preferably from 4 to 7 μm and more preferably from 5 to 7.5 μm.

The magnesium oxide powder typically has a specific surface area (SSA) of from 0.5 to 10 m$^2$/g, preferably from 0.5 to 8 m$^2$/g, preferably from 0.5 to 6 m$^2$/g, preferably from 1 to 10 m$^2$/g preferably from 2 to 10 m$^2$/g preferably from 3 to 10 m$^2$/g and more preferably from 2 to 6 m$^2$/g. The purity of the magnesium oxide starting material is preferably higher than 99.99%, preferably higher than 99.995%, more preferably higher than 99.9975%, preferably higher than 99.999%, and preferably higher than 99.9992% as measured using ICPMS methods as known in the art. Correspondingly the impurity content of the magnesia powder may be 100 ppm and less, preferably 50 ppm and less, preferably 25 ppm and less, preferably about 10 ppm.

The zirconia powder in accordance with step a) may be selected from the group consisting of unstabilized, partially stabilized and stabilized zirconia. Reaction between the zirconia and yttria powders to form at least one crystalline phase makes it possible to use any zirconia powder, without the need for stabilization of the tetragonal/monoclinic phase transformation that occurs with phase pure zirconia. As such, the zirconia powder to form the at least one first layer may comprise any one of or combinations of unstabilized, partially stabilized and stabilized zirconia. Additional powder characteristics of zirconia and alumina (according to the second powder mixture) are disclosed in step b) of the method following.

Combining at least two of alumina, magnesia, yttria and at least one of unstabilized, partially stabilized and stabilized zirconia powders to make at least first and second powder mixtures (in accordance with either or both of steps a) and b)) may be performed using the powder preparation techniques of wet or dry ball (axially rotating) milling, wet or dry tumble (end over end or vertical) mixing, jet milling, and combinations of these. Use of these powder combination methods provide a high energy process which breaks down particulates and agglomerates.

Using dry conditions, the starting powders may be ball milled or end-over-end/tumble mixed using high purity (>99.9%) alumina media in order to preserve the purity of the starting powders during mixing. In other embodiments, a harder media such as zirconia media may be used to break up hard agglomerates. The high purity alumina media was tested using ICPMS methods as disclosed herein and found to have a purity of from 99.9 to about 99.99%. Use of zirconia media may result in trace amounts, such as less than 100 ppm, of zirconia in the multilayer sintered ceramic body. Media used to perform dry ball milling may have a range of dimensions, from for example 5 mm to 15 mm in diameter, added at a loading of from about 50 to about 100% by powder weight. Media used to perform dry tumble mixing may comprise at least one media element of large dimension (from about 20 to 40 mm diameter) without limitation. Dry ball milling and/or dry tumble mixing may be performed for durations of from 12 to 48 hours, preferably from 16 to 48 hours, preferably from 16 to 24 hours, preferably from 18 to 22 hours. Dry ball milling or tumble milling processes (axially rotating) may use an RPM of from 50 to 250 RPM, preferably from 75 to 200 RPM, preferably from 75 to 150 RPM, preferably from 100 to 125 RPM, each for containers having about 200 mm diameter. RPMs may vary dependent upon the dimensions of containers selected for use, and as such, those containers greater than 200 mm in diameter may have correspondingly lower RPMs as known to those skilled in the art. Dry end-over-end/tumble mixing may be performed at an RPM of from 10 to 30 rpm, preferably about 20 RPM. After dry ball milling and/or end-over-end/tumble milling/mixing, the powder mixture may be optionally sieved using any number of meshes which may have openings of for example from 45 to 400 μm, and blended, without limitation as to repetition or order as known to those skilled in the art.

Wet ball milling or wet end-over-end/tumble mixing may be performed by suspending the starting powders in various solvents such as ethanol, methanol, and other alcohols, to form a slurry. The slurries in either process (ball or tumble milling/mixing) may be formed having a powder loading during milling or mixing of from 25 to 75% by powder weight, preferably from 40 to 75% by powder weight, preferably from 50 to 75% by powder weight. Wet ball milling or wet end-over-end/tumble mixing may provide for improved dispersion of the powders through increased mobility, resulting in fine scale, uniform mixing before heat treatment or calcination. In embodiments, a dispersant may optionally be added to the slurry using any number of commercially available dispersants such as for example poly methyl methacrylate (PMMA) and polyvinyl pyrrolidone (PVP) and other dispersants as known to those skilled in the art. The dispersant may optionally be added in amounts from 0.05 to 0.2% by powder weight, preferably from 0.05 to 0.1% by powder weight. Media loadings for either wet ball or wet tumble/end-over-end mixing may be varied from a loading of 30 to 100% by powder weight, preferably from 30 to 75% by powder weight, preferably from 30 to 60% by powder weight. Wet ball milling or tumble mixing may be performed for durations of from 8 to 48 hours, preferably from 12 to 48 hours, preferably from 16 to 48 hours, preferably from 8 to 36 hours, preferably from 8 to 24 hours, preferably from 16 to 24 hours preferably from 12 to 24 hours. Ball milling may use an RPM of from 50 to 250 RPM, preferably from 75 to 200 RPM, preferably from 75 to 150 RPM, preferably between 100 and 125 RPM, each for containers having about 200 mm diameter. RPMs may vary dependent upon the dimensions of containers selected for use, and those greater than for example 200 mm in diameter may have correspondingly lower RPM as known to those skilled in the art. Wet end over end/tumble mixing may be performed at an RPM of from 10 to 30 rpm, preferably about 20. After wet ball milling and/or wet end-over-end/tumble mixing, the powder mixture may be optionally sieved using any number of meshes which may have openings of for example from 45 to 400 µm, and blended, without limitation as to repetition or order as known to those skilled in the art.

Jet milling processes as known to those skilled in the art may also be used to thoroughly mix the powders to form a powder, powder mixture or calcined powder mixture having a narrow particle size distribution. Jet milling uses high velocity jets of either inert gases or air to collide particles of the starting powders and/or powder mixtures and/or calcined powder mixtures without the use of milling or mixing media, thus preserving initial purity of the powder to be milled. The chamber may be designed such that larger particles may be preferentially reduced in size, which may provide a narrow particle size distribution in the final powders, powder mixture or calcined powder mixture. Powders exit the jet milling chamber upon reaching a predetermined particle size as determined at setup of the machine prior to processing, thus ending the process. Starting powders, powder mixtures and/or calcined powder mixtures as disclosed herein may be subjected to jet milling at pressures of about 100 psi, whether separately, or in combination with any, or all of, the as disclosed powder milling/mixing processes as disclosed herein. After jet milling, the powders or powder mixtures may be optionally sieved using any number of meshes which may have openings of for example from 45 to 400 µm, and blended, without limitation as to repetition or order as known to those skilled in the art.

The additional powder preparation procedures of attrition milling, high shear mixing, planetary milling, and other known procedures may also be applied. The aforementioned powder preparation techniques may be used alone or in any combination thereof, or upon more than one powder mixture which are thereafter sintered to form a unitary, multilayer sintered ceramic body.

Where wet mixing or milling processes are used, the slurry may be dried by rotary evaporation methods for example at a temperature of from about 40° C. to 90° C. for a duration of from 1 to 4 hours, dependent upon the volume of slurry to be dried, as known to those skilled in the art. In other embodiments, the slurry may be dried using spray drying techniques as known to those skilled in the art. After drying, the powder mixture may be optionally sieved using a mesh having openings of for example from 45 to 400 µm, and blended, without limitation as to repetition or order. The aforementioned powder preparation techniques may be used alone or in any combination thereof.

After drying, the specific surface area of the powder mixture of step a) may be from 2 to 18 m$^2$/g, preferably from 2 to 17 m$^2$/g, preferably from 2 to 14 m$^2$/g, preferably from 2 to 12 m$^2$/g, preferably from 2 to 10 m$^2$/g, preferably from 4 to 17 m$^2$/g, preferably from 6 to 17 m$^2$/g, preferably from 8 to 17 m$^2$/g, preferably from 10 to 17 m$^2$/g, preferably from 4 to 12 m$^2$/g, preferably from 4 to 10 m$^2$/g, and preferably from 5 to 8 m$^2$/g as measured according to ASTM C1274.

The purity of the powder mixtures may be maintained after mixing/milling from that of the starting materials through the use of milling media of high purity, for example aluminum oxide media of purity 99.99% and greater. In embodiments, use of zirconium oxide milling media may be preferable and may introduce zirconium oxide to the extent it remains in the at least one first and/or second layers of the multilayer sintered ceramic body in amounts of from 15 to 100 ppm, from 15 to 75 ppm, preferably from 15 to 60 ppm, preferably from 20 to 30 ppm.

Step b) of the method as disclosed herein comprises combining alumina powder and zirconia powder wherein the zirconia powder comprises at least one of partially stabilized and stabilized zirconia powder to make a second powder mixture; the starting powder materials comprising the second powder mixture are combined and mixed in proportions such that the second powder mixture upon sintering forms the at least one second layer 102 wherein the at least one second layer 102 comprises at least one of partially stabilized and stabilized zirconia (and combinations thereof) in an amount of not less than 5 volume % ZrO$_2$ and not greater than 30 volume % ZrO$_2$, and the balance comprising Al$_2$O$_3$. The starting powder materials selected to form the at least one second layer 102 are preferably high purity commercially available powders. However, other oxide powders may be used, for example those produced from chemical synthesis processes and related methods as long as the high purity requirement is satisfied. In some embodiments, dependent upon required CTE matching properties, the toughness and mechanical strength requirements of the plasma processing chamber component, the at least one second layer 102 may comprise at least one of partially stabilized and stabilized zirconia (and combinations thereof) in an amount of not less than 10 volume % ZrO$_2$ and not greater than 25 volume % ZrO$_2$, (and the balance comprising Al$_2$O$_3$) relative to the volume of the at least one second layer 102.

The following properties for powders of zirconia and alumina also apply to step a) with the exception that the zirconia of step a) may comprise any one or combinations of unstabilized, partially stabilized and stabilized zirconia. The zirconia powders in accordance with step b) are preferably stabilized, partially stabilized and combinations thereof.

The zirconium oxide powder may have a particle size distribution having a d10 of from 0.08 to 0.20 µm, a d50 of from 0.3 to 0.7 µm and a d90 of from 0.9 to 5 µm. The average particle size of the zirconium oxide powder used as a starting material for the mixture according to one embodiment of the present invention may be from 0.3 to 1 µm.

The zirconia powder typically has a specific surface area (SSA) of from 1 to 16 m$^2$/g, preferably from 2 to 14 m$^2$/g, preferably from 4 to 12 m$^2$/g, and more preferably from 5 to 9 m$^2$/g as measured according to ASTM C1274.

The purity of the zirconia powder starting material is typically higher than 99.8%, preferably higher than 99.9%, preferably higher than 99.95%, preferably higher than 99.975%, preferably higher than 99.99%, and preferably higher than 99.995%. This corresponds to a total impurity content of 2000 µm and less, preferably 1000 ppm and less, preferably 500 ppm and less, preferably 250 ppm and less, preferably 100 ppm and less, preferably 50 ppm and less and preferably from 25 to 150 ppm as measured using ICPMS methods as disclosed herein. Zirconia as used in embodiments disclosed herein comprises Hf in low amounts of about 2 to 5 wt % as is common in many commercially available zirconia powders. These purities of zirconia exclude Hf and any stabilizing compounds as disclosed according to Table 1.

In embodiments, the zirconia powder may comprise stabilizing compounds comprising at least one selected from the group consisting of yttria, lanthanum oxide ($La_2O_3$), ceria (CeO2), magnesia, samaria ($Sm_2O_3$), and calcia and combinations thereof. To form partially stabilized zirconia (PSZ), these stabilizing compounds may each be present in amounts of from 0.5 to 50 mol %, preferably from 0.5 to 30 mol %, preferably from 0.5 to 15 mol %, preferably from 0.5 to 10 mol %, preferably from 1 to 50 mol %, preferably from 1 to 30 mol %, preferably from 1 to 10 mol %, preferably from 1 to 5 mol %, and preferably about 3 mol %. To form stabilized zirconia (SZ), these stabilizing compounds may each be present in amounts of from greater than 6 to about 45 mol %, preferably from greater than 10 to about 45 mol %, preferably from greater than 25 to about 45 mol %, preferably from greater than 6 to 30 mol %, preferably from greater than 6 to about 15 mol %, preferably from greater than 8 to 15 mol %. Table 1 provides additional guidance for stabilizing or partially stabilizing zirconia.

In certain embodiments, the at least one second layer 102 is yttria stabilized and formed from a powder mixture comprising alumina and zirconia wherein the zirconia is selected from the group consisting of partially yttria stabilized zirconia (PYSZ) or fully yttria stabilized zirconia (YSZ). Partially yttria stabilized zirconia (PYSZ) may be formed from powder mixtures comprising from about 1 to 10 mol % yttria, preferably from 1 to 8 mol % yttria, preferably from 1 to 5 mol % yttria, preferably from 2 to 4 mol % yttria, and preferably about 3 mol % yttria. Yttria stabilized zirconia (YSZ) may be formed from powder mixtures comprising from about 8 to about 15 mol % yttria, preferably from 10 to 15 mol % yttria, and preferably from 12 to 15 mol % yttria.

The alumina powder comprising the first and second powder mixtures has powder characteristics as disclosed following.

The d10 particle size of the aluminum oxide powder used as a starting material according to embodiments of the present disclosure is preferably from 0.1 to 0.5 µm, preferably from 0.1 to 0.4 µm, preferably from 0.1 to 0.3 µm, preferably from 0.2 to 0.5 µm, preferably from 0.3 to 0.5 µm, preferably from 0.4 to 0.5 µm, preferably from 0.1 to 0.2 µm.

The d50 particle size of the aluminum oxide powder used as a starting material according to embodiments of the present disclosure is preferably from 2 to 8 µm, preferably from 2 to 7 µm, preferably from 2 to 6 µm, preferably from 3 to 8 µm, preferably from 4 to 8 µm, preferably from 5 to 8 µm and more preferably from 2.5 to 5 µm.

The d90 particle size of the aluminum oxide powder used as a starting material according to embodiments of the present disclosure is preferably from 15 to 40 µm, preferably from 15 to 30 µm, preferably from 15 to 25 µm, preferably from 20 to 40 µm, preferably from 30 to 40 µm, and preferably from 20 to 30 µm.

The aluminum oxide powder typically has a specific surface area of from 4 to 18 $m^2/g$, preferably from 4 to 14 $m^2/g$, preferably from 4 to 10 $m^2/g$, preferably from 4 to 6 $m^2/g$, preferably from 6 to 18 $m^2/g$, preferably from 6 to 14 $m^2/g$, preferably from 8 to 18 $m^2/g$, preferably from 10 to 18 $m^2/g$, preferably from 8 to 10 $m^2/g$, and preferably from 6 to 10 $m^2/g$.

The purity of the aluminum oxide starting material is typically higher than 99.99%, preferably higher than 99.995%, preferably higher than 99.999%, and preferably higher than 99.9995%, as measured using ICPMS methods. Correspondingly, the impurity content of the alumina powder may be 100 ppm and less, preferably 50 ppm and less, preferably 25 ppm and less preferably 10 ppm and less, and more preferably 5 ppm and less.

The alumina and zirconia powders are mixed in proportions such that the zirconia is present in an amount of from 10 to 30%, preferably from 10 to 25%, preferably from 10 to 20%, preferably from 15 to 25%, preferably from 20 to 25%, and preferably from 15 to 20% each by volume of the at least one second layer 102 (upon sintering) of the multilayer sintered ceramic body.

Combining the alumina and at least one of partially stabilized and stabilized zirconia powders to make the second powder mixture may be performed in accordance with the materials and methods as disclosed in step a) of the method.

Step c) of the method disclosed herein comprises combining alumina, yttria, and at least one of unstabilized, partially stabilized, and stabilized zirconia to make at least one third powder mixture. The at least one third powder mixture may comprise alumina in an amount of from greater than 43 to 92.5% and less, yttria in an amount of from 1 to 56% and less, and at least one of unstabilized, partially stabilized, and stabilized zirconia in an amount of from 0.4 and greater to 40%, each by weight of the at least one third powder mixture. Preferably, the at least one third powder mixture has an SSA of from about 1 to 18 $m^2/g$, preferably from about 1 $m^2/g$ to about 14 $m^2/g$, preferably from about 1 $m^2/g$ to about 10 $m^2/g$, preferably from about 1 $m^2/g$ to about 8 $m^2/g$, preferably from about 2 $m^2/g$ to about 18 $m^2/g$, preferably from about 2 $m^2/g$ to about 14 $m^2/g$, preferably from about 2 $m^2/g$ to about 10 $m^2/g$, preferably from about 3 $m^2/g$ to about 9 $m^2/g$, preferably from about 3 $m^2/g$ to about 6 $m^2/g$ as measured according to ASTM C1274. In preferred embodiments, the at least one third powder mixture may comprise about 73% alumina, about 6% yttria and about 21% of at least one of unstabilized, partially stabilized and stabilized zirconia, each by weight of the at least one third powder mixture. In further preferred embodiments, the at least one third powder mixture comprises about 73% alumina, about 6% yttria and about 21% of 3 mol % yttria partially stabilized zirconia, each by weight of the at least one third powder mixture. The at least one third powder mixture, upon sintering, forms at least one third layer 103 having multiple phases comprising YAG, alumina, and at least one of unstabilized, partially stabilized, and stabilized zirconia. In other embodiments, the at least one third powder mixture may be batched to form the YAG phase upon sintering, and as such comprises about 43 wt % alumina and 57% yttria. The at least one third layer comprising YAG would be CTE matched to at least one first layer comprising YAG within the ranges as disclosed.

Combining the yttria, alumina and zirconia powders to make the third powder mixture may be performed in accordance with the powder materials and methods as disclosed in Steps a) and b) of the method. The third powder mixture may be dry ball milled, roller blended, wet milled, wet tumble mixed, and other similar mixing methods as known to those skilled in the art.

As previously disclosed, combining at least two of alumina, yttria, magnesia and at least one of unstabilized, partially stabilized and stabilized zirconia powders to make at least first, second and third powder mixtures (in accordance with either or both of steps a), b) and c) may be performed using the powder preparation techniques of wet or dry ball (axially rotating) milling, wet or dry tumble (end over end or vertical) mixing, jet milling, and combinations of these. Use of these powder combination methods provides a high energy process which breaks down particulates and agglomerates.

Step d) of the method disclosed herein comprises calcining at least one of the first, second and third powder mixtures by applying heat to raise the temperature of at least one of the powder mixtures to a calcination temperature and maintaining the calcination temperature to perform calcination to form at least one of first, second and third calcined powder mixtures. This step may be conducted such that moisture may be removed and surface condition of the powder mixture is uniform prior to sintering. Calcination may be performed at temperatures of from 600° C. to 1200° C., preferably from 600 to 1100° C., preferably from 600 to 1000° C., preferably from 600 to 900° C., preferably from 700 to 1100° C., preferably from 800 to 1100° C., preferably from 800 to 1000° C., and preferably from 850 to 950° C. Calcination may be performed for durations of from 4 to 12 hours, preferably from 4 to 10 hours, preferably from 4 to 8 hours, preferably from 6 to 12 hours, preferably from 4 to 6 hours, in an oxygen containing environment. After calcination, at least one of the first, second and third powder mixtures may be sieved and/or tumbled and/or blended according to known methods to form at least one first, second and third calcined powder mixtures. The at least one first powder mixture is preferably calcined. Calcination may or may not result in a reduction in specific surface area.

The first powder mixture may have a d10 particle size of from 0.06 to 4 μm, preferably from 0.08 to 4 μm, preferably from 0.1 to 4 μm, preferably from 0.2 to 4 μm, preferably from 0.3 to 4 μm, preferably from 0.4 to 4 μm, preferably from 0.08 to 3 μm, preferably from 0.08 to 2 μm, preferably from 0.08 to 1 μm, preferably from 0.5 to 3 μm, preferably from 1 to 2 μm, preferably from 1 to 3 μm.

The second powder mixture may have a d10 particle size of from 0.075 to 0.4 μm, preferably from 0.075 to 0.3 μm, preferably from 0.075 to 0.2 μm, preferably from 0.1 to 0.4 μm, preferably from 0.1 to 0.3 μm, preferably from 0.1 to 0.2 μm, and preferably about 0.2 μm.

The first powder mixture may have a d50 particle size of from 0.7 to 50 μm, preferably from 1 to 40 μm, preferably from 1 to 30 μm, preferably from 1 to 20 μm, preferably from 1 to 10 μm, preferably from 1 to 5 μm, preferably from 5 to 50 μm, preferably from 10 to 50 μm, preferably from 20 to 50 μm, preferably from 30 to 50 μm, preferably from 3 to 8 μm, preferably from 5 to 10 μm, and preferably from 6 to 15 μm.

The second calcined powder mixture may have a d50 particle size of from 1 to 100 μm, preferably from 1 to 80 μm, preferably from 1 to 60 μm, preferably from 1 to 40 μm, preferably from 10 to 100 μm, preferably from 20 to 100 μm, preferably from 30 to 100 μm, preferably from 20 to 80 μm, preferably from 20 to 60 μm, and preferably from 20 to 40 μm.

The first calcined powder mixture may have a d90 particle size of from 10 to 350 μm, preferably from 10 to 300 μm, preferably from 10 to 250 μm, preferably from 10 to 200 μm, preferably from 10 to 175 μm, preferably from 10 to 150 μm, preferably from 10 to 100 μm, preferably from 10 to 75 μm, preferably from 10 to 50 μm, preferably from 10 to 40 μm preferably from 10 to 25 μm, preferably from 20 to 350 μm, preferably from 40 to 350 μm, preferably from 60 to 350 μm, preferably from 100 to 350 μm, preferably from 150 to 350 μm, preferably from 200 to 350 μm, preferably from 12 to 330 μm, preferably from 100 to 330 μm, preferably from 100 to 250 μm.

The second calcined powder mixture may have a d90 particle size of from 20 to 250 μm, preferably from 20 to 220 μm, preferably from 20 to 150 μm, preferably from 20 to 100

μm, preferably from 50 to 220 μm, preferably from 70 to 220 μm, preferably from 100 to 220 μm.

In certain embodiments, higher temperature calcination conditions as disclosed herein may result in formation of crystalline phases and agglomeration of the calcined powder mixtures and thus greater variability in particle size distributions overall and in particular larger variance and overall d50 and d90 particle sizes may result. In other embodiments, lower temperature calcination conditions as disclosed herein may not affect particle size distributions of the calcined powder mixtures relative to the starting materials and thereby particle size distributions are in the same range, or similar to, the starting powder materials. Lot to lot variation and management of heat transfer during calcination may also contribute to variations in particle size distributions. Thus, a broad range of particle size distributions, and in particular d50 and d90 particle sizes of the powder mixtures, may result from calcination conditions as disclosed herein.

The at least one first, second and third calcined powder mixtures may each have a specific surface area (SSA) of from about 1 m²/g to about 18 m²/g, preferably from about 1 m²/g to about 14 m²/g, preferably from about 1 m²/g to about 10 m²/g, preferably from about 1 m²/g to about 8 m²/g, preferably from about 2 m²/g to about 18 m²/g, preferably from about 2 m²/g to about 14 m²/g, preferably from 2 to 12 m²/g, preferably from about 2 m²/g to about 10 m²/g, preferably from about 3 m²/g to about 9 m²/g, and preferably from about 3 m²/g to about 6 m²/g as measured according to ASTM C1274.

The first calcined powder mixture may have a total impurity content of from 5 to 200 ppm, preferably from 5 to 150 ppm, preferably less than 100 ppm, preferably less than 75 ppm, preferably less than 50 ppm, preferably less than 25 ppm, preferably less than 15 ppm, preferably less than 10 ppm, preferably less than 8 ppm, preferably less than 5 ppm, preferably from 5 to 50 ppm, preferably from 5 to 30 ppm, preferably from 3 to 20 ppm relative to a mass of the first calcined powder mixture.

Table 11 shows ICPMS purity results of an exemplary first powder mixture prior to being formed into a polycrystalline YAG layer.

TABLE 11

| YAG ($Y_3Al_5O_{12}$) Calcined Powder Mixture | | | |
| --- | --- | --- | --- |
| Element | Average Impurity (ppm) | Element | Average Impurity (ppm) |
| Li 6/7 | 0.0197 | Cd 111 | 0.1989 |
| Be 9 | 0.1808 | In 115 | <0.0035 |
| B 11 | <0.0007 | Sn 118 | 0.0798 |
| Na 23 * | 1.8755 | Sb 121 | 0.0297 |
| Mg 24 | <0.7 | Te 126, 8, 30 | <0.014 |
| Al 27 | N/A | Cs 133 | <0.007 |
| Si 28 | <14 | Ba 137 | <0.056 |
| K 39/41* | <1.4 | La 138/139 | 0.0743 |
| Ca 43/44* | 1.7173 | Ce 140 | 0.0507 |
| Sc 45 | 0.0451 | Pr 141 | 0.0083 |
| Ti 47 | <0.035 | Nd 146 | 0.0264 |
| V 51 | 0.0131 | Sm 147 | 0.0196 |
| Cr 52 | 0.2720 | Eu 153 | 0.0063 |
| Mn 55 | 0.1822 | Gd 157 | 0.0991 |
| Fe 56 | <0.14 | Tb 159 | 0.1991 |
| Co 59 | 0.2041 | Dy 163 | 0.0357 |
| Ni 60 | 0.0978 | Ho 165 | 0.2552 |
| Cu 63 | 0.0660 | Er 166 | 0.1507 |
| Zn 66 | 0.0409 | Tm 169 | 0.1131 |
| Ga 71 | 0.1525 | Yb 171, 2, 3 | 0.1682 |
| Ge 72 | <0.007 | Lu 175 | 0.0133 |

81

TABLE 11-continued

YAG (Y$_3$Al$_5$O$_{12}$) Calcined Powder Mixture

| Element | Average Impurity (ppm) | Element | Average Impurity (ppm) |
|---|---|---|---|
| As 75 | 0.0306 | Hf 178 | 0.0305 |
| Se 78 | <0.035 | Ta 181 | <0.0035 |
| Rb 85 | 0.0526 | W 182 | <0.007 |
| Sr 84/87/88 | 0.3379 | Re 185 | <0.0035 |
| Y 89 | N/A | Ir 193 | <0.035 |
| Zr 90/92/94 | 1.1108 | Pt 195 | <0.056 |
| Nb 93 | <0.007 | Au 197 | 0.0164 |
| Mo 95 | 0.0320 | Tl 205 | 0.0430 |
| Ru 101 | <0.007 | Pb 208 | 0.0094 |
| Rh 103 | <0.042 | Bi 209 | 0.0213 |
| Pd 104, 8, 10 | <0.007 | Th 232 | <0.007 |
| Ag 107/109 | 0.0592 | U 238 | 0.0043 |

*N/A represents elements present in starting powders forming the powder mixtures Table 12 shows ICPMS purity results of an exemplary first powder mixture prior to being formed into a spinel layer.

TABLE 12

Spinel (MgAl$_2$O$_4$) Calcined Powder Mixture

| Element | Average Impurity (ppm) | Element | Average Impurity (ppm) |
|---|---|---|---|
| Li 6/7 | 0.0601 | Cd 111 | <0.0035 |
| Be 9 | <0.007 | In 115 | <0.0035 |
| B 11 | <0.0007 | Sn 118 | 0.0201 |
| Na 23 * | <0.35 | Sb 121 | <0.007 |
| Mg 24 | N/A | Te 126, 8, 30 | 0.0824 |
| Al 27 | N/A | Cs 133 | 0.0564 |
| Si 28 | <14 | Ba 137 | 0.3269 |
| K 39/41* | 1.9072 | La 138/139 | 0.0660 |
| Ca 43/44* | 1.9106 | Ce 140 | 0.1585 |
| Sc 45 | <0.035 | Pr 141 | 0.0076 |
| Ti 47 | <0.035 | Nd 146 | 0.0215 |
| V 51 | 0.0990 | Sm 147 | 0.0041 |
| Cr 52 | 0.2889 | Eu 153 | 0.0024 |
| Mn 55 | 0.1675 | Gd 157 | 0.0081 |
| Fe 56 | 1.5463 | Tb 159 | 0.0023 |
| Co 59 | 0.0114 | Dy 163 | <0.0021 |
| Ni 60 | 0.3177 | Ho 165 | <0.0021 |
| Cu 63 | 0.0111 | Er 166 | 0.2206 |
| Zn 66 | 0.2776 | Tm 169 | 0.0061 |
| Ga 71 | 0.1831 | Yb 171, 2, 3 | <0.0021 |
| Ge 72 | 0.0084 | Lu 175 | 3.3365 |
| As 75 | <0.014 | Hf 178 | <0.007 |
| Se 78 | 0.1546 | Ta 181 | <0.0035 |
| Rb 85 | 0.0193 | W 182 | <0.007 |
| Sr 84/87/88 | 0.0147 | Re 185 | 0.0272 |
| Y 89 | 24.8145 | Ir 193 | 0.0366 |
| Zr 90/92/94 | 2.6021 | Pt 195 | <0.056 |
| Nb 93 | <0.007 | Au 197 | <0.007 |
| Mo 95 | 0.1680 | Tl 205 | 0.0187 |
| Ru 101 | <0.007 | Pb 208 | 0.0575 |
| Rh 103 | 0.0441 | Bi 209 | <0.007 |
| Pd 104, 8, 10 | 0.0350 | Th 232 | 0.0105 |
| Ag 107/109 | <0.014 | U 238 | <0.0035 |

*N/A represents elements present in starting powders forming the powder mixtures Table 13 shows ICPMS purity results of an exemplary first powder mixture prior to being formed into a yttria-zirconia layer.

82

TABLE 13

Yttria-Zirconia Calcined Powder Mixture

| Element | Average (ppm) | Element | Average (ppm) |
|---|---|---|---|
| Li 6/7 | 0.0289 | Cd 111 | <0.0035 |
| Be 9 | <0.007 | In 115 | <0.0035 |
| B 11 | <0.0007 | Sn 118 | <0.014 |
| Na 23 | <0.35 | Sb 121 | 0.3069 |
| Mg 24 | 0.9772 | Te 126, 8, 30 | <0.014 |
| Al 27 | 1.2251 | Cs 133 | 0.0083 |
| Si 28 | <14 | Ba 137 | 0.1805 |
| K 39/41* | <1.4 | La 138/139 | 0.0700 |
| Ca 43/44* | 2.2990 | Ce 140 | 0.0483 |
| Sc 45 | 0.0426 | Pr 141 | 0.0513 |
| Ti 47 | 1.0083 | Nd 146 | 0.0108 |
| V 51 | 0.0305 | Sm 147 | 0.0036 |
| Cr 52 | 0.0286 | Eu 153 | 0.0351 |
| Mn 55 | 0.0597 | Gd 157 | 0.0174 |
| Fe 56 | <0.14 | Tb 159 | 0.0402 |
| Co 59 | 0.0081 | Dy 163 | 0.4822 |
| Ni 60 | 0.0659 | Ho 165 | 0.3116 |
| Cu 63 | 0.1721 | Er 166 | 0.3463 |
| Zn 66 | 0.2433 | Tm 169 | 0.0723 |
| Ga 71 | <0.007 | Yb 171, 2, 3 | 0.0817 |
| Ge 72 | 0.0243 | Lu 175 | 0.0326 |
| As 75 | <0.014 | Hf 178 | N/A |
| Se 78 | <0.035 | Ta 181 | 0.0549 |
| Rb 85 | <0.007 | W 182 | <0.007 |
| Sr 84/87/88 | <0.014 | Re 185 | 0.0077 |
| Y 89 | N/A | Ir 193 | <0.035 |
| Zr 90/92/94 | N/A | Pt 195 | 0.2064 |
| Nb 93 | 0.2199 | Au 197 | 0.5017 |
| Mo 95 | 0.0663 | Tl 205 | 0.0657 |
| Ru 101 | <0.007 | Pb 208 | 0.0632 |
| Rh 103 | <0.042 | Bi 209 | 0.0092 |
| Pd 104, 8, 10 | 0.0308 | Th 232 | 0.0272 |
| Ag 107/109 | 1.0690 | U 238 | 0.0043 |

*N/A represents elements present in starting powders forming the powder mixtures;

For each of Tables 10-14, N/D indicates the element was detected below the reporting limit of the ICPMS. The reported purities are across an average of 5 powder mixture lots.

The second powder mixture may have a total impurity content of from 5 to 200 ppm, preferably from 5 to 150 ppm, preferably less than 100 ppm, preferably less than 50 ppm, preferably less than 25 ppm, preferably less than 15 ppm, preferably from 10 to 100 ppm, preferably from 10 to 80 ppm, preferably from 10 to 60 ppm, preferably from 10 to 40 ppm, preferably from 20 to 80 ppm, preferably from 30 to 60 ppm relative to a mass of the second powder mixture.

Table 14 shows ICPMS purity results of an exemplary second powder mixture prior to being formed into the at least one second layer 102.

TABLE 14

| Element | Average (ppm) | Element | Average (ppm) |
|---|---|---|---|
| Li 6/7 | 0.177 | Cd 111 | 0.066 |
| Be 9 | N/D | In 115 | 0.039 |
| B 11 | 0.695 | Sn 118 | 0.129 |
| Na 23 * | N/D | Sb 121 | N/D |
| Mg 24 | 2.625 | Te 126, 8, 30 | 0.399 |
| Si 28 | 27.6 | Cs 133 | 0.095 |
| K 39/41* | 5.22 | Ba 137 | 0.660 |
| Ca 43/44* | 3.584 | La 138/139 | 0.165 |
| Sc 45 | 0.191 | Ce 140 | 0.665 |
| Ti 47 | 4.246 | Pr 141 | 0.024 |
| V 51 | 0.296 | Nd 146 | 0.112 |
| Cr 52 | 0.267 | Sm 147 | 0.051 |
| Mn 55 | 0.096 | Eu 153 | N/D |
| Fe 56 | N/D | Gd 157 | 0.016 |
| Co 59 | 0.109 | Tb 159 | 0.034 |
| Ni 60 | 0.203 | Dy 163 | 0.028 |

TABLE 14-continued

| Element | Average (ppm) | Element | Average (ppm) |
|---|---|---|---|
| Cu 63 | 0.276 | Ho 165 | 0.020 |
| Zn 66 | 0.877 | Er 166 | 0.048 |
| Ga 71 | 0.404 | Tm 169 | 0.023 |
| Ge 72 | 0.540 | Yb 171, 2, 3 | 0.050 |
| As 75 | 1.625 | Lu 175 | 0.028 |
| Se 78 | N/D | Ta 181 | N/D |
| Rb 85 | 0.245 | W 182 | 0.111 |
| Sr 84/87/88 | 0.213 | Re 185 | 0.140 |
| Nb 93 | 0.167 | Ir 193 | 0.059 |
| Mo 95 | 1.585 | Pt 195 | 0.605 |
| Ru 101 | 0.246 | Au 197 | 2.805 |
| Rh 103 | N/D | Tl 205 | 0.049 |
| Pd 104, 8, 10 | 0.123 | Pb 208 | 0.098 |
| Ag 107/109 | 0.854 | Bi 209 | 0.206 |
| | | Th 232 | 0.070 |
| | | U 238 | 0.016 |

The results of Table 14 are averaged across 5 powder lots. As depicted in Table 14, the second powder mixture may comprise magnesia in an amount of about 5 ppm and less, preferably 3 ppm and less, as measured relative to a mass of the at least one second powder mixture. The powder mixtures comprising alumina and at least one of stabilized and partially stabilized zirconia as disclosed herein are free of, or substantially free of dopants and/or sintering aids as disclosed herein. Hf, Y and Zr are not considered impurities, dopants or sintering aids, and are not listed in Table 14.

The starting powders comprising at least one first and second powder mixtures have varying properties of for example, particle size and purity. As such, features of the powder mixture, such as purity, may be higher than at least one of the starting powders alone due to combination with another starting powder which may be higher in purity.

Tables 10 to 14 indicate very high purity (>99.99% relative to 100% pure powders) of the at least one powder mixtures batched to form (upon sintering) at least one crystalline phase of YAG, magnesium aluminate spinel, yttria and zirconia wherein the zirconia is present in an amount of not less than 10 mol % and not greater than 25 mol %, and alumina and zirconia wherein the zirconia comprises at least one of stabilized and partially stabilized zirconia. As listed in the tables, each of the powder mixtures may comprise iron (Fe) in an amount of less than 0.5 ppm, preferably less than 0.25 ppm relative to a mass of the respective powder mixture.

Step e) of the method as disclosed herein comprises separately disposing the first, second and third calcined powder mixtures inside a volume defined by a tool set of a sintering apparatus to form at least one layer of the first powder mixture, at least one layer of the second powder mixture, and at least one layer of the third powder mixture, and creating vacuum conditions inside the volume. A spark plasma sintering (SPS) apparatus tool set used in the process as disclosed herein comprises at least a graphite die which is usually a cylindrical graphite die. In the graphite die, first, second and third powder mixtures are separately disposed between two graphite punches to form at least three separate layers.

In preferred embodiments, the SPS apparatus comprises a die comprising a sidewall comprising an inner wall and an outer wall, wherein the inner wall has a diameter that defines an inner volume capable of receiving at least one ceramic powder or powder mixtures; and an upper punch and a lower punch operably coupled with the die, wherein each of the upper punch and the lower punch have an outer wall defining a diameter that is less than the diameter of the inner wall of the die thereby defining a gap between each of the upper punch and the lower punch, and the inner wall of the die when at least one of the upper punch and the lower punch are moved within the inner volume of the die, wherein the gap is from 10 μm to 100 μm wide. Preferably, the die and punches are made of graphite. Such SPS tool is disclosed in U.S. provisional patent application Ser. No. 63/087,204, filed Oct. 3, 2020, and U.S. provisional patent application Ser. No. 63/124,547, filed Dec. 11, 2020 both of which are herein incorporated by reference.

In embodiments, three or more powder mixtures may be disposed within the graphite die. Vacuum conditions as known to those skilled in the art are established within the ceramic powder or powder mixtures disposed inside the inner volume. Typical vacuum conditions include pressures of $10^{-2}$ to $10^{-3}$ torr. The vacuum is applied primarily to remove air to protect the graphite from burning and to remove a majority of the air from the powder. The order of powder mixture disposition may be reversed or repeated as necessary to achieve the desired structure of the multilayer sintered ceramic body and component formed therefrom. In preferred embodiments, the second powder mixture is disposed between the first and third powders, and thus the second powder mixture is contiguous with each of the first and third powder mixtures as disposed within the graphite die during sintering. The at least one first, second and third powder layers are thereafter sintered to form first, second and third layers whereby first and second layers are contiguous, thereby forming nonlinear interface 104, and second and third layers are contiguous, thereby forming second interface 105, of the multilayer sintered ceramic body. Disposing the at least one first and second powder mixtures inside the volume defined by the tool set typically results in intermixing of the first and second powder mixtures, thereby creating the tortuosity as described above of the nonlinear interface 104 which is characteristic of the multilayer sintered bodies produced by the method as disclosed herein. This nonlinear interface 104 may provide an interlocking effect, and enhanced adhesion, between at least one first and second layers. Intermixing also occurs between the at least one second and third powder mixtures, thereby creating the second interface 105. This second interface 105 may provide an interlocking effect and enhanced toughness between at least one second and third layers. Nonlinear interface 104 and second interface 105 differ significantly from that of laminates and sintered bodies formed from at least one laminate or pre-sintered body, which have a substantially linear (or one dimensional) interface and as such, the multilayer sintered ceramic bodies as disclosed herein are not laminates or laminated bodies. The at least first, second and third powder mixtures may be directly loaded into the tool set of the sintering apparatus and sintered, without pre-sintering steps such as use of binders, dispersants, and the like, which may contribute to contamination and reduced density.

The process as disclosed utilizes commercially available, starting powders having micron-sized average (or d50) particle size distributions or those prepared from chemical synthesis techniques without the requirement of forming green tapes or bodies or machining the same prior to sintering.

The high densities and low porosities associated with the multilayer sintered ceramic bodies resulting from the disclosed process and powder materials are achieved without the use of binders or sintering aids in the initial powders. Other sintering techniques require use of sintering aids to lower sintering temperatures, which may adversely impact halogen-based plasma resistance and densification. Polymeric binders are also often used to create the aforementioned green bodies, which may contribute to residual porosity and lower densities upon binder burn out. No binders or sintering aids are required in the making of the multilayer, sintered corrosion resistant ceramic bodies or multilayer components formed therefrom as disclosed herein. The combination of CTE matching of the respective layers and pressure assisted sintering is preferable to form the multilayer sintered ceramic bodies having the characteristics as disclosed herein, including high density and high adhesion strength between layers.

Step f) of the method as disclosed herein comprises applying pressure to the layers of the first, second and third powder mixtures while heating to a sintering temperature and performing sintering to form the multilayer sintered ceramic body, wherein the at least one layer of the first powder mixture forms a first layer, the at least one layer of the second powder mixture forms a second layer, and the at least one layer of the third powder mixture forms a third layer, and g) lowering the temperature of the multilayer sintered ceramic body.

After the at least one first, second and third powder mixtures are disposed inside the inner volume of the die, pressure is applied axially to the powder mixtures disposed between the graphite punches. The pressure is increased to reach a pressure of from 5 MPa to 100 MPa, preferably from 5 MPa to 60 MPa, preferably from 5 MPa to 40 MPa, preferably from 5 MPa to 20 MPa, preferably from 5 MPa to 15 MPa, preferably from 10 MPa to 60 MPa, preferably from 10 MPa to 40 MPa, preferably from 10 MPa to 30 MPa, preferably from 10 MPa to 20 MPa, preferably from 15 MPa to 60 MPa preferably from 15 MPa to 40 MPa, preferably from 15 MPa to 30 MPa, preferably from 20 to 40 MPa, preferably from 15 MPa to 20 MPa, and preferably from 13 MPa to 18 MPa.

The application of heat to the powder mixture provided in the inner volume of the die facilitates sintering temperatures of from 1000 to 1700° C., preferably from 1200 to 1700° C., preferably from 1400 to 1700° C., preferably from 1500 to 1700° C., preferably from 1600 to 1700° C., preferably from 1200 to 1600° C., preferably from 1200 to 1400° C., preferably from 1400 to 1600° C., and preferably from 1500 to 1650° C. Sintering may typically be achieved with a time of from 0.5 to 180 minutes, preferably from 0.5 to 120 minutes, preferably from 0.5 to 100 minutes, preferably from 0.5 to 80 minutes, preferably from 0.5 to 60 minutes, preferably from 0.5 to 40 minutes, preferably from 0.5 to 20 minutes, preferably from 0.5 to 10 minutes, preferably from 0.5 to 5 minutes, preferably from 5 to 120 minutes, preferably from 10 to 120 minutes preferably from 20 to 120 minutes preferably from 40 to 120 minutes preferably from 60 to 120 minutes, preferably from 80 to 100 minutes, preferably from 100 to 120 minutes, and preferably from 30 to 90 minutes. In certain embodiments, sintering may be achieved with an isothermal time of zero and upon reaching the sintering temperature, a cooling rate as disclosed herein is initiated. According to process step g), the ceramic sintered body may be passively cooled by removal of the heat source. Natural or forced convection may be used until a temperature is reached which may facilitate the optional annealing process.

In preferred embodiments, the powder mixtures are heated directly by the punches and die of the sintering apparatus. The die and punches may be comprised of an electrically conductive material such as graphite, which facilitates resistive/joule heating. The sintering apparatus and procedures are disclosed in US 2010/0156008 A1, which is incorporated herein by reference.

Sintering the powder layers under pressure creates a co-compacted, unitary multilayer body. In accordance with the method as disclosed, the at least one layer of the first powder mixture, the at least one layer of the second powder mixture and the at least one layer of the third powder mixture are simultaneously formed in-situ into the first, second and third layers, respectively, of the multilayer sintered ceramic body during step f) of the method. This single step, concurrent sintering of the at least one first, second and third powder mixtures into the at least one first, second and third layers of the multilayer sintered ceramic body may provide enhanced interfacial adhesion, high mechanical strength and improved flatness of the multilayer sintered ceramic body. The CTE matching of the at least one first layer 100, the at least one second layer 102, and the at least one third layer 103, in particular across the range of sintering temperatures as disclosed herein, prevents the generation of stress due to CTE mismatching at the interface between the at least one second layer 102, the at least one first layer 100, and the at least one third layer 103 upon cooling after sintering, and during any thermal excursion in accordance with the method as disclosed, thus enabling the formation of multilayer sintered ceramic bodies (and components formed therefrom) of large dimension having high strength, plasma resistance, and high interfacial adhesion.

During sintering, a volume reduction typically occurs such that the ceramic sintered body may comprise a volume that is about one third that of the volume of the starting powder mixtures when disposed in the tool set of the sintering apparatus.

The temperature of the sintering apparatus according to the present disclosure is measured usually within the graphite die of the apparatus. Thereby, it is preferred that the temperature is measured as close as possible to the powder mixtures being processed so that the indicated temperatures are indeed realized within the powder mixtures to be sintered.

The order of application of pressure and temperature may vary as disclosed herein. In an embodiment, the indicated pressure may be applied and thereafter heat may be applied to achieve the desired temperature of sintering. In another embodiment, heat may be applied to achieve the desired temperature of sintering and thereafter the indicated pressure may be applied. In a further embodiment, the temperature and the pressure may be applied simultaneously to the powder mixtures to be sintered and raised until the indicated values are reached.

The method as disclosed may comprise a pre-sintering step with a specific heating ramp of from 1 to 100° C./min, preferably 2 to 50° C./min, preferably 3 to 25° C./min, preferably 3 to 10° C./min, more preferably 5 to 10° C./min until a specific pre-sintering time is reached.

The method as disclosed may comprise a pre-sintering step with a specific pressure ramp of from 0.50 MPa/min to 30 MPa/min, preferably 0.75 MPa/min to 10 MPa/min, more preferably 1 to 5 MPa/min until a specific pre-sintering time is reached.

The method as disclosed herein may comprise a pre-sintering step with the above-mentioned specific heating ramp and with the above-mentioned specific pressure ramp.

In the aforementioned pre-sintering steps, the temperature and pressure are maintained for a time period of 10 min to 360 minutes.

Inductive or radiant heating methods may also be used for heating the sintering apparatus and indirectly heating the powders in the tool set.

Step h) of the method as disclosed herein comprises optionally annealing the multilayer sintered ceramic body (or component formed therefrom) by applying heat to raise the temperature of the multilayer sintered ceramic body to reach an annealing temperature, performing annealing; and step i) lowering the temperature of the annealed multilayer sintered ceramic body (or component formed therefrom). In some embodiments, the method as disclosed herein may further include an optional annealing step. In the optional annealing step in accordance with embodiments as disclosed herein, the multilayer sintered ceramic body may be subjected to an annealing procedure by removal from the sintering apparatus and annealing in a furnace at temperatures of from about 900 to about 1800° C., preferably from about 1250 to about 1700° C., preferably from about 1300 to about 1650° C., and preferably from about 1400 to about 1600° C.

In embodiments, the optional annealing of the multilayer sintered ceramic body may be carried out at a heating and/or a cooling rate of from 0.5° C./min to 50° C./min, preferably from 0.5° C./min to 25° C./min, more preferably from 0.5° C./min to 10° C./min, and more preferably from 0.5° C./min to 5° C./min, more preferably from 1° C./min to 50° C./min, more preferably from 3° C./min to 50° C./min, more preferably from 5° C./min to 50° C./min, more preferably from 25° C./min to 50° C./min, preferably from 1° C./min to 10° C./min, preferably from 2° C./min to 10° C./min, and preferably from 2° C./min to 5° C./min.

Durations of the optional annealing step may be from 1 to 24 hours, preferably from 1 to 18 hours, preferably from 1 to 16 hours, preferably from 1 to 8 hours, preferably from 4 to 24 hours, preferably from 8 to 24 hours, preferably from 12 to 24 hours, preferably from 4 to 12 hours, and preferably from 6 to 10 hours.

In an embodiment, optional annealing in accordance with this disclosure may be performed after the sintering process and within the sintering apparatus. The optional process of annealing may preferably be performed under oxidizing conditions such as forced convection or in air. Annealing leads to a refinement of the chemical and physical properties of the multilayer sintered ceramic body or component fabricated therefrom through reduction of oxygen vacancies for stoichiometric correction and reduced stress in the sintered body or component. The optional process step of annealing the sintered multilayer corrosion resistant component is carried out in an oxidizing atmosphere, whereby the annealing process may provide increased albedo, improved mechanical handling and reduced porosity.

In some embodiments, the step of annealing may be performed by conventional methods used for the annealing of glass, ceramics and metals, and the degree of refinement may be selected by the annealing temperature and the duration of time that annealing is conducted. In other embodiments, annealing may not be performed on the sintered ceramic body.

After the optional process step of annealing the multilayer sintered ceramic body is performed, the temperature of the sintered, and in some instances annealed, multilayer sintered ceramic body is decreased to an ambient temperature by removal of the heat source to the multilayer sintered body (or component fabricated therefrom) in accordance with step i). The sintered and annealed multilayer sintered ceramic body or component fabricated therefrom is thereafter taken out of either the furnace in the instance that the annealing step is performed external to the sintering apparatus or removed from the tool set in case annealing is carried out in the sintering apparatus.

Step j) of the method as disclosed herein comprises machining the multilayer sintered ceramic body (or the annealed multilayer sintered ceramic body) to create a sintered ceramic component in the shape of a window, a lid, a dielectric window, an RF window, a ring, a focus ring, a process ring, a deposition ring, a nozzle, an injector, a gas injector, a shower head, a gas distribution plate, a diffuser, an ion suppressor element, a chuck, an electrostatic wafer chuck (ESC), and a puck. Machining, drilling, boring, grinding, lapping, polishing, and the like as known to those skilled in the art may be performed as necessary to form the multilayer sintered ceramic body into a predetermined shape of a component for use in plasma processing chambers. Use of the powder mixtures in the compositional ranges as disclosed herein may provide a multilayer sintered ceramic body having improved machinability through use of CTE matched layers, thereby reducing stress during the machining step of the method as disclosed.

An improved multilayer sintered ceramic body and methods for fabrication of the same, in particular of large body size for use in plasma processing chambers, is disclosed herein. The multilayer sintered ceramic bodies as disclosed may have a size of from 100 mm to at least 622 mm, including about 625 mm, with regard to the longest extension of the sintered body.

The process as disclosed herein provides for an improved control over the maximum pore size of the at least one first layer, higher density in particular within the at least one first layer, lower surface roughness of the plasma facing surface, improved adhesion between layers of the multilayer component, high mechanical strength and thereby handleability of the multilayer sintered ceramic body, and machinability of the multilayer sintered ceramic body.

The previously mentioned characteristics of the multilayer sintered ceramic body according to one embodiment are achieved in particular by adapting the purity of the first, second and third powders, the pressure applied to the first, second and third powders, the sintering temperature of the first, second and third powders, the duration of sintering, the temperature of the multilayer sintered body or component during the optional annealing step, the environment during the optional annealing step, and the duration of the optional annealing step.

The process steps as disclosed may have an order and repetitions varying from that as disclosed and may not be done in a particular order or specific number of repetitions. Further, it may be appreciated that additional powders beyond those disclosed may be used. The lack of sintering aids and the use of high purity rare earth elements or compounds as starting materials, having a purity of from 99.9% to 99.9999%, preferably from 99.99% to 99.9999%, preferably from 99.999% to 99.9999%, more preferably from 99.9995% to 99.9999%, enables the fabrication of a high purity, sintered multilayer corrosion resistant body as disclosed herein which provides improved plasma resistance particularly suitable for use as a multilayer corrosion-resistant member in a plasma processing-involving apparatus such as a semiconductor manufacturing apparatus. Furthermore, the process as disclosed herein does not require the formation of green or sintered bodies prior to the sintering step to join the at least one second layer 102, at least one first layer 100, and the at least one third layer 103. The unitary, multilayer sintered ceramic body as disclosed herein is formed directly from powders which are sintered within a single process step without the formation of green bodies or use of polymeric binders or sintering aids.

The pressure and current assisted process according to preferred embodiments as disclosed herein is suitable for use in the preparation of large multilayer sintered ceramic bodies, such as for example having a greatest dimension of from 100 mm to about 625 mm, preferably from 200 mm to about 625 mm, preferably from 300 mm to about 625 mm, preferably from 400 mm to about 625 mm wherein the multilayer sintered ceramic bodies are formed, for example, in a disc shape having a diameter as greatest dimension. The process as disclosed provides for rapid powder consolidation and densification, retaining a maximum grain size of about 10 $\mu$m and less in the sintered ceramic body, and achieving high densities and low porosities within the at least one first layer across the greatest dimension. This combination of fine grain size, high density, and CTE matching provides for a high strength multilayer sintered ceramic body of large dimension suitable for machining, handling and use as a component in semiconductor plasma processing chambers.

A multilayer sintered ceramic component that is prepared by spark plasma sintering is proposed for use in plasma etch and deposition processing chambers. Chamber components that may be formed from the multilayer component as disclosed herein comprise a window, a lid, a dielectric window, an RF window, a ring, a focus ring, a process ring, a deposition ring, a nozzle, an injector, a gas injector, a shower head, a gas distribution plate, a diffuser, an ion suppressor element, a chuck, an electrostatic wafer chuck (ESC), and a puck.

These density, purity and porosity levels detailed above may provide enhanced resistance to the effects of erosion and corrosion resulting from plasma etch and deposition processing. The method and materials as disclosed are particularly useful in the preparation of ceramic sintered bodies of large dimension, for example from a greatest dimension of from 200 to 625 mm. The high densities, and thereby high mechanical strength, of the ceramic sintered body also provide increased handleability, in particular at large dimensions. Successful fabrication of sintered yttrium aluminum oxide bodies or multilayered bodies comprising sintered yttrium aluminum oxide, and in particular bodies formed of phase pure YAG in ranges as disclosed herein, across a longest (from about 200 to 625 mm) dimension may be enabled by controlling variation in density across at least one, longest dimension. An average density of 98.5% and greater and 99.5% and greater is obtainable, with a variation in density of 5% or less, preferably 4% or less, preferably 3% or less, preferably 2% or less, preferably 1% or less across the greatest dimension, whereby the greatest dimension may be for example about 625 mm and less, 622 mm and less, 610 mm and less, preferably 575 mm and less, preferably 525 mm and less, preferably from 100 to 625 mm, preferably from 100 to 622 mm, preferably from 100 to 575 mm, preferably from 200 to 625 mm, preferably from 200 to 510 mm, preferably from 400 to 625 mm, preferably from 500 to 625 mm. Reducing the variation in density may improve handleability and reduce overall stress in the ceramic sintered body. This combination of fine grain size, uniform and high density provides for a high strength sintered YAG-containing layer of a multilayer sintered ceramic body of large dimension suitable for machining, handling and use as a component in a semiconductor processing chamber. Density measurements may be performed in accordance with ASTM B962-17 across a greatest dimension of the sintered body.

The methods and compositions disclosed herein will be illustrated in more detail with reference to the following Examples, but it should be understood that they are not deemed to be limited thereto.

EXAMPLES

The following examples are included to more clearly demonstrate the overall nature of the disclosure. These examples are exemplary, not restrictive, of the disclosure.

Measurements as disclosed within the examples section are performed in accordance with methods, standards and procedures as described in the specification.

Characteristics of the starting powders (and as a result the powder mixtures formed therefrom) may vary between differing powder lots, thus powder characteristics (such as specific surface area, particle size and impurities) are disclosed as ranges which may be representative of lot to lot variation. This lot to lot variation, as well as thermal management and heat transfer during calcination may contribute to broadened particle size distributions and variances in specific surface areas of the starting powders, powder mixtures and calcined powder mixtures as disclosed herein. Thus, a broad range of particle size distributions and specific surface areas may result from lot to lot variation and calcination conditions as disclosed herein.

Any of the starting powders and powder mixtures may be sieved, tumbled, blended, calcined, milled, etc. according to methods known to those skilled in the art.

The multilayer sintered ceramic bodies in accordance with the examples as disclosed herein are formed in a single sintering step from the powder mixtures (which in some embodiments may be calcined), without the formation of pre-sintered, cast or green bodies, tapes, films or laminates.

Particle sizes for the starting powders, powder mixtures and calcined powder mixtures were measured using a Horiba model LA-960 Laser Scattering Particle Size Distribution Analyzer capable of measuring particle size from 10 nm to 5 mm. Specific surface area for the starting powders, powder mixtures and calcined powder mixtures was measured using a Horiba BET Surface Area Analyzer model SA-9601 capable of measuring across a specific surface area of 0.01 to 2000 $m^2$/g with an accuracy of 10% and less for most samples. Specific surface area (SSA) measurements were performed according to ASTM C1274.

The apparatus used to prepare the Examples below is the spark plasma sintering (SPS) tool described above comprising a die comprising a sidewall comprising an inner wall and an outer wall, wherein the inner wall has a diameter that defines an inner volume capable of receiving at least one ceramic powder; and an upper punch and a lower punch operably coupled with the die, wherein each of the upper punch and the lower punch have an outer wall defining a diameter that is less than the diameter of the inner wall of the die thereby defining a gap between each of the upper punch and the lower punch and the inner wall of the die when at least one of the upper punch and the lower punch are moved within the inner volume of the die, wherein the gap is from 10 $\mu$m to 100 $\mu$m wide.

Comparator Example

Multilayer Sintered Ceramic Body Comprising a YAG First Layer and an Aluminum Oxide Second Layer A first layer of a multilayer sintered ceramic body was formed from a first powder mixture comprising alumina and yttria to form an at least one first layer comprising YAG as disclosed herein. The first powder mixture comprised an alumina powder wherein the alumina powder had a specific surface area of from 6.5 to 8.5 m$^2$/g, a d10 particle size of from 0.05 to 0.15 μm, a d50 particle size of from 0.1 to 0.3 μm, a d90 particle size of from 0.25 to 1 μm, and a yttria powder having a specific surface area of from 6 to 8 m$^2$/g, a d10 particle size of from 2 to 4.5 μm, a d50 particle size of from 3.5 to 6 μm and a d90 particle size of from 6 to 10 μm. Total impurity content of the alumina and yttria powders was from about 2 to about 30 ppm. The alumina and yttria powders were combined in ratios to form a first layer comprising YAG (yttrium aluminum oxide, garnet phase) upon sintering. Combining the alumina and yttria powders to make the first powder mixture was performed using the powder preparation techniques of wet ball milling wherein zirconia milling media was added at about 2× by weight of media loading relative to powder weight. Ethanol was added to form a slurry in an amount of about 45% by slurry weight. The media was added to the slurry and milled for 12 hours at an RPM of 150 and thereafter dried, tumbled, and sieved according to methods known to those skilled in the art to form the first powder mixture. The first powder mixture was calcined at 1100° C. for 8 hours to form a first calcined powder mixture. The first calcined powder mixture had a specific surface area (as measured using BET methods) of from 4.5 to 5.5 m$^2$/g, a d10 particle size of from 4.5 to 6.5 μm, a d50 particle size of from 9 to 15 μm, and a d90 particle size of from 20 to 30 μm (as measured using laser particle size methods).

The second layer of the multilayer sintered ceramic body was formed from an aluminum oxide powder. The aluminum oxide powder was measured to have a specific surface area of from 6.5 to 8.5 m$^2$/g, a d10 particle size of from 0.05 to 0.15 μm, a d50 particle size of from 0.1 to 0.3 μm, a d90 particle size of from 0.25 to 1 μm using the BET methods and laser particle size analysis methods as disclosed herein. Total impurity content of the alumina powder was about 30 ppm as measured using ICPMS.

The first calcined powder mixture and the alumina powder were separately disposed inside a volume defined by a tool set of a sintering apparatus as disclosed herein to form at least one layer of the first calcined powder mixture and at least one layer of the alumina powder, and vacuum conditions as disclosed herein were created inside the volume.

A pressure of 30 MPa was applied to the layers of the first calcined powder mixture comprising yttria and alumina (batched to form YAG upon sintering) and the alumina powder while heating to a sintering temperature of 1450° C. for a duration of 30 minutes and performing sintering to form a multilayer sintered ceramic body wherein the layer of the first calcined powder mixture upon sintering forms a first layer comprising YAG, and the layer of the alumina powder forms the second layer comprising aluminum oxide. The multilayer sintered body was thereafter annealed at 1400° C. for 8 hours in an oxidizing environment. The multilayer sintered ceramic body fractured within the alumina layer near the interface between the first layer comprising YAG and the alumina layer as depicted schematically in FIG. 4. Thus, the difference in CTE between YAG and aluminum oxide across the process temperature range generated sufficient stress to cause fracture within the aluminum oxide layer.

Example 1: Multilayer Sintered Ceramic Body Comprising at Least One YAG First Layer A multilayer sintered ceramic body was formed from first, second and third powder mixtures. The first powder mixture comprised alumina and yttria combined in ratios to form a first layer 100 comprising YAG as disclosed herein. The second powder mixture comprised alumina and partially stabilized zirconia in ratios to form a zirconia toughened aluminum oxide (ZTA) second layer comprising about 16% by volume of partially stabilized zirconia as disclosed herein. The third powder mixture comprised a powder mixture of yttria, alumina and partially stabilized zirconia.

The first powder mixture comprised an alumina powder wherein the alumina powder has a specific surface area (SSA) of from 5.5 to 9 m$^2$/g, a d10 particle size of from 0.05 to 1 μm, a d50 particle size of from 2 to 6 μm, a d90 particle size of from 15 to 30 μm, and a yttria powder having a specific surface area of 1.75 to 3.5 m$^2$/g, a d10 particle size of from 2 to 4 μm, a d50 particle size of from 5 to 9 μm and a d90 particle size of from 10 to 14 μm. Average impurity content of the alumina powder was about 6 ppm as measured across 3 powder lots, corresponding to a purity of about 99.9994% relative to 100% pure alumina. Average impurity content of the yttria powder was about 17 ppm as measured across 5 powder lots, corresponding to a purity of about 99.9983 relative to 100% pure yttria powder. Reporting limits to detect presence of lighter elements using ICPMS as disclosed herein are higher than reporting limits of heavier elements. In other words, heavier elements, such as from Sc and higher in atomic number, are detected with greater accuracy than those lighter elements, from for example Li to Ca. Use of ICPMS to detect lighter elements such as Li and Mg may be done within a confidence of about 2 ppm and greater. Si was not detected using ICPMS as known to those skilled in the art in the yttria and alumina powders and as such, the yttria and alumina powders comprise about 14 ppm or less of Si in the form of silica, and 2 ppm and less of Li and Mg, as, lithium fluoride and magnesia. The powders were combined in ratios to form a corrosion resistant first layer comprising YAG (yttrium aluminum oxide, garnet phase) upon sintering.

The yttria and alumina powders were combined in ratios to form an at least one first layer comprising YAG (yttrium aluminum oxide, garnet phase) upon sintering. Combining the alumina and yttria powders to make a first powder mixture was performed using the conventional powder preparation techniques of wet ball milling wherein high purity (>99.9%) media was used at from about 55% to about 65% loading relative to powder weight. A slurry was formed at from about 35% to about 45% by adding ethanol. The slurry was milled for about 15 hours at an RPM of 150 and thereafter dried, tumbled, and sieved according to methods known to those skilled in the art to form the first powder mixture. The first powder mixture was calcined at 850° C. for 6 hours. After calcination, the first powder mixture had a specific surface area of from 2 to 4 m$^2$/g, and a d50 particle size of from 9 to 13 um. The first powder mixture had total impurities of about 8 ppm and comprised about 14 ppm or less of Si and about 2 ppm or less of Mg, in the form of silica and magnesia, each relative to the total powder weight.

The second powder mixture comprised an alumina powder and a partially stabilized zirconia (PSZ) powder.

The alumina powder had a specific surface area (SSA) of from 6.5 to 8.5 m$^2$/g, a d10 particle size of from 0.05 to 0.15 μm, a d50 particle size of from 0.16 to 0.35 μm, and a d90 particle size of from 0.36 to 0.8 μm. Total impurity content of the alumina powder was from about 2 to about 11 ppm as measured using ICPMS methods. Li and Mg were measured in amounts of less than 1 ppm in the powder and as such, the alumina powder comprised about 1 ppm and less of Li and Mg, in the form of $Li_2O$, LiF and MgO. Calcium (CaO) was measured in an amount of less than 2 ppm. Si was not detected using ICPMS as disclosed herein in the zirconia powder and as such, the alumina powder comprised about 14 ppm or less of Si in the form of $SiO2$.

The partially stabilized zirconia (PSZ) powder had a surface area of from 6 to 8 m2/g, a d10 particle size of from 0.08 to 0.25 μm, a d50 particle size of from 0.27 to 0.60 μm, and a d90 particle size of from 1.0 to 3.0 μm. The PSZ powder comprised from about 2 to 4 weight % Hf and was partially stabilized with yttria in an amount of about 3 mol %. Hf and Y are not considered impurities in zirconia as disclosed herein. Hf is present in many commercially available zirconia powders, and yttria was added as a stabilizing compound in order to partially stabilize the zirconia. Excluding Hf and Y, the partially yttria stabilized zirconia powder had total impurities of about 61 ppm relative to the total powder mass. Use of ICPMS to detect lighter elements such as Li, Ca and Mg may be done within a confidence of about 1 ppm and greater. Li and Mg were measured in amounts of less than 1 ppm in the PSZ powder and as such, the partially stabilized zirconia powder comprised about 1 ppm and less of Li and Mg, in the form of $Li_2O$, LiF and MgO relative to the total powder mass. Calcium (CaO) was measured in an amount of about 15 ppm relative to the total powder mass. Si was not detected using ICPMS as disclosed herein in the PSZ powder and as such, the PSZ powder comprised about 14 ppm or less of Si in the form of silica relative to the total powder mass.

The powders comprising the second powder mixture were combined in ratios to form at least one second layer 102 upon sintering comprising about 16% by volume of partially yttria stabilized (PYSZ) zirconia and the balance alumina. Combining the alumina and PYSZ zirconia powders to make the second powder mixture was performed using the conventional powder preparation techniques of wet ball milling wherein high purity (>99.99%) alumina media was used at about 75 to 80% loading relative to powder weight. A slurry was formed at about 40 volume % by adding ethanol. The slurry was ball milled for about 20 hours at an RPM of about 150 and thereafter dried, tumbled, and sieved according to methods known to those skilled in the art to form the first powder mixture. The second powder mixture was calcined at 600° C. for 8 hours in air. The second calcined powder mixture had a specific surface area of from 6 to 8 m$^2$/g. The second calcined powder mixture had total impurities of about 12 ppm (excluding Hf and Y) and comprised about 14 ppm or less of Si in the form of silica, and about 3 ppm or less of magnesia, MgO, each relative to the total powder mass. The second powder mixture was sieved, tumbled, blended, etc. as known to those skilled in the art.

To make the third powder mixture, about 6 wt % yttria, about 73 wt % alumina, and about 21 wt % of 3 mol % yttria partially stabilized zirconia were combined in ratios to form the multiple phase, at least one third layer 103 upon sintering. Combining the powders to make the third powder mixture was performed using a wet ball milling process wherein high purity (>99.99%) alumina media was added at from about 75% to about 80% loading relative to powder weight. A slurry was formed at about 35 to 45% relative to slurry weight by adding ethanol. The slurry was ball milled for about 20 hours at an RPM of about 150 and thereafter dried, tumbled, and sieved according to methods known to those skilled in the art to form the second powder mixture. The third powder mixture was calcined at 900° C. for 8 hours and was measured to have a specific surface area of from 6 to 8 m$^2$/g. In certain embodiments, the calcination conditions as disclosed herein may result in formation of crystalline phases and agglomeration of the powder mixtures and thus greater variability in particle size distributions overall and in particular larger variance and overall d50 and d90 particle sizes may result. Lot to lot variation and management of heat transfer during calcination may also contribute to particle size distributions. Thus, a broad range of particle size distributions, and in particular d50 and d90 particle sizes, of the powder mixtures may result.

First, second and third powder mixtures may be calcined, sieved, tumbled, blended, etc. as known to those skilled in the art.

First, second and third powder mixtures were separately disposed inside a volume defined by a tool set of a sintering apparatus to form at least one layer of the first powder mixture, at least one layer of the second powder mixture, and at least one layer of the third powder mixture, and creating vacuum conditions of $10^{-2}$ to $10^{-3}$ torr inside the volume. Disposing the at least one first, second and third powder mixtures inside the volume defined by the tool set typically results in intermixing of the first, second and third powder mixtures, thereby creating a nonlinear interface 104 between the at least one first and second layers, and second interface 105 between the at least one second and third layers upon sintering.

The layers of the powder mixtures were co-compacted by applying a pressure of 15 MPa to the layers of the first, second and third powder mixtures while heating to a sintering temperature of 1625° C. for 60 minutes, wherein the at least one layer of the first powder mixture forms at least one first layer 100, the at least one layer of the second powder mixture forms at least one second layer 102, and the at least one layer of the third powder mixture forms at least one third layer 103, thus forming a unitary, multilayer sintered ceramic body having a greatest dimension of 572 mm.

Density was separately measured for an exemplary partially yttria stabilized zirconia sintered body (prepared under similar conditions of temperature, pressure and duration to that as disclosed herein) comprising about 16% by volume of PSZ and the balance alumina, and the density was measured to be about 4.319 g/cc, corresponding to about 100% of theoretical density (the theoretical density was calculated to be about 4.317 g/cc using the volumetric mixing rule as known to those skilled in the art). The two measurements are within the measurement variance for the Archimedes density measurements as disclosed herein, thus the PSZ comprising the at least one second layer may have a density of about 100% of theoretical.

Density was separately measured for an exemplary YAG sintered body (prepared under similar conditions of temperature, pressure and duration to that as disclosed herein) and the density was measured to be 4.55 g/cc, corresponding to greater than 99% of the theoretical density of YAG (a commercially available, single crystal sample of bulk YAG was measured to have an Archimedes density of 4.56 g/cc across 5 measurements, and this value is taken as the theoretical density of YAG as used herein). The two measurements are within the measurement variance for the Archimedes density measurements as disclosed herein, thus the polycrystalline YAG comprising the at least one first layer may have a density of about 100% of theoretical. The multilayer sintered ceramic body according to this example is CTE matched to the at least one first layer 100 comprising YAG and the at least one second layer as depicted in FIG. 9c).

Example 2: Multilayer Sintered Ceramic Body Comprising a YAG First Layer and Zirconia Toughened Alumina (ZTA) Second Layer (Results as Illustrated in FIGS. 13-16, 23-25 of the Specification)

A multilayer sintered ceramic body was formed from first and second powder mixtures. The first powder mixture comprised alumina and yttria combined in ratios to form at least one first layer 100 comprising YAG as disclosed herein. The second powder mixture comprised alumina and partially stabilized zirconia (partially stabilized zirconia as disclosed according to Example 1) in ratios to form a zirconia toughened aluminum oxide (ZTA) at least one second layer comprising about 16% by volume of partially stabilized zirconia as disclosed herein.

The yttria and alumina powders in accordance with Example 2 are as disclosed within Example 1 and were used to form the first powder mixture. Combining the alumina and yttria powders in accordance with this example to make the first powder mixture was performed using tumble (or vertical/end-over-end) mixing as known to those skilled in the art, wherein high purity (>99.9%) alumina media was used at from 80% to 100% media loading relative to powder weight. Ethanol was added to form a slurry at from about 35% to about 45% relative to slurry weight. The slurry was mixed for about 20 hours at an RPM of about 20, and thereafter dried, tumbled, and sieved according to methods known to those skilled in the art to form the first powder mixture. The first powder mixture was calcined at 950° C. for 4 hours. The first calcined powder mixture had a specific surface area of from 5 to 7 $m^2/g$, and a d50 particle size of from 5 to 20 μm. The first calcined powder mixture had total impurities (as measured using ICPMS) of about 5 ppm, comprising about 2 ppm or less of Ca (CaO) and K, and at or below the reporting limits (less than for example 1 ppm) for all other elements, including Mg in the form of magnesia MgO, and Li in the form of Li2O and LiF. Si was not detected using the ICPMS methods as disclosed herein in the first calcined powder mixture, thus within the accuracy of the ICPMS method, the first calcined powder mixture comprises about 14 ppm or less of Si in the form of silica. The first calcined powder mixture (batched to form YAG upon sintering) may be sieved, tumbled, blended, etc. as known to those skilled in the art.

The partially stabilized zirconia (PSZ) and alumina powders as disclosed in accordance with Example 1 were used to form the second powder mixture. Combining the alumina and PSZ powders in accordance with this example to make the second powder mixture was performed using tumble (or vertical/end-over-end) mixing as known to those skilled in the art, wherein high purity (>99.9%) alumina media was used at from 70% to 90% loading relative to powder weight. Ethanol was added to form a slurry at from about 40% to about 50% relative to slurry weight. The slurry was mixed for between from 16 to 24 hours at an RPM of about 20, and thereafter dried, tumbled, and sieved according to methods known to those skilled in the art to form the second powder mixture. The second powder mixture was calcined at 900° C. for 8 hours. The second calcined powder mixture had a specific surface area of from 6 to 8 $m^2/g$, and a d50 particle size of from 90 to 110 μm. The second calcined powder mixture had total impurities (as measured using ICPMS and excluding Hf and Y) of about 12 ppm, comprising about 3 ppm or less of Mg in the form of magnesia MgO, about 4 ppm of Ti, and about 0.75 ppm and less of all other elements, including Li in the form of $Li_2O$ and LiF. Si was not detected using the ICPMS methods as disclosed herein in the second calcined powder mixture, thus within the accuracy of the ICPMS method, the second calcined powder mixture comprises about 14 ppm or less of Si in the form of silica. The second calcined powder mixture (batched to form about 16% by volume of PSZ upon sintering) may be sieved, tumbled, blended, etc. as known to those skilled in the art.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume.

Disposing the at least one first and at least one second calcined powder mixtures inside the volume defined by the tool set typically results in intermixing of the first and second calcined powder mixtures, thereby creating a non-linear interface between the at least one first and second layers upon sintering.

The layers of the calcined powder mixtures were co-compacted by applying a pressure of 20 MPa was applied to the layers of first and second calcined powder mixtures while heating to a sintering temperature of 1500° C. for a duration of 30 minutes to perform sintering and form a unitary, multilayer sintered ceramic body having a greatest dimension of 150 mm.

FIG. 13 depicts x ray diffraction results confirming formation of highly phase pure, polycrystalline YAG comprising the at least one first layer 100 in accordance with this example. XRD of the at least one first layer 100 of the multilayer ceramic sintered bodies as disclosed herein may measure phase purity up to and including about 95% by volume. As such, the at least one first layer 100 of the unitary, multilayer sintered ceramic body comprises at least about 95% by volume of the YAG crystalline phase, and about 5% by volume or less of at least one crystalline phase selected from the group consisting of YAP, YAM, yttria and alumina and combinations thereof, in accordance with this example.

Scanning electron microscopy (SEM) in combination with image processing software (ImageJ, developed at the National Institute of Health (NIH), USA, an image processing and analysis program of scientific multi-dimensional images) were used to analyse the microstructure of the first layer 100 comprising YAG. FIGS. 14 to 16 illustrate features of the microstructure of the at least one first layer 100 comprising polycrystalline YAG.

FIG. 14 illustrates porosity results measured on a plasma facing surface 106 of the at least one first layer 100 comprising YAG in accordance with this example, depicting total pore area (μm²) on the vertical axis and a horizontal axis representing pore size in microns. Measurements were performed across 7 images taken at 5000×, each of area 53.7 μm×53.7 μm for a total measurement area of about 2885 μm². A total area comprising porosity within any one of the 7 images was measured as from about 0.015 to about 0.3 μm², preferably from about 0.015 to about 0.2 μm², preferably from about 0.015 to about 0.15 μm². A maximum pore size on a plasma facing surface 106 of the at least one first layer 100 comprising YAG of 0.7 μm and less was measured, and a maximum area comprising porosity was found to be about 0.3 μm² and less. No pores of pore size larger than 0.7 μm were measured across the 7 images analyzed within the polycrystalline YAG at least one first layer 100 in accordance with this example.

FIG. 15 depicts the cumulative fractional area comprising porosity (cumulative pore area) in $\mu m^2$ across an area in $mm^2$, expressed as the cumulative pore area (in $\mu m^2/mm^2$) for a given pore size of the 7 images as referenced in FIG. 14. Using SEM images and ImageJ image processing methods as disclosed herein, porosity was measured within each image (in $\mu m^2$) and normalized across the total image area measured (in $mm^2$) to calculate the cumulative pore area. The at least one first layer 100 comprising YAG as disclosed herein comprises a cumulative pore area of from about 2 to about 800 $\mu m^2/mm^2$, preferably from about 2 to about 600 $\mu m^2/mm^2$, preferably from about 2 to about 400 $\mu m^2/mm^2$, preferably from about 2 to about 300 $\mu m^2/mm^2$ as measured using SEM and image processing methods as disclosed herein. No pores of pore size larger than 0.6 $\mu m$ were measured across the 7 images analyzed within the YAG at least one first layer 100 of the multilayer sintered ceramic body. Thus, across 7 images, each of area about 54 $\mu m \times 54$ $\mu m$, the multilayer sintered ceramic bodies as disclosed herein have at least one first layer 100 having a plasma facing surface 106 comprising porosity corresponding to pore sizes of less than 1 $\mu m$ in very low (<0.1% by area) percentages by area, thus providing a corrosion and erosion resistant surface of the multilayer sintered ceramic body for use in plasma processing chambers.

FIG. 16a) illustrates a 5000×SEM image illustrating a high density, sintered microstructure after a thermal etching process of a plasma facing surface 106 of the at least one first layer 100 comprising a polycrystalline YAG phase. Very fine scale porosity with few pores are depicted on a plasma facing surface 106 of the YAG at least one first layer 100 is indicated. A nearly fully dense microstructure is depicted, having minimal porosity and pore sizes of about 1 $\mu m$ and less are visible. The multilayer sintered ceramic body according to one embodiment comprises at least one first layer 100 comprising polycrystalline YAG having a plasma facing surface 106 comprising pores wherein the pores have pore sizes on the order of 5 $\mu m$ and less, down to sub-micron scale pore sizes of from about 0.1 to about 5 $\mu m$, preferably from about 0.1 to about 4 $\mu m$, preferably from about 0.1 to about 3 $\mu m$ preferably from about 0.1 to about 2 $\mu m$, preferably from about 0.1 to about 1 $\mu m$. The at least one first layer 100 comprising YAG of the multilayer sintered ceramic body 98 formed from the materials and processes may comprise pores which have a maximum size of from 0.1 to 5 $\mu m$, preferably from 0.1 to 4 $\mu m$, preferably from 0.1 to 3 $\mu m$, preferably from 0.1 to 2 $\mu m$, from 0.1 to 1 $\mu m$ as measured using SEM and image processing methods as disclosed herein. About 22 pores were counted across the 54 $\mu m \times 54$ $\mu m$ surface area.

FIG. 16b) depicts a summation of the total surface area comprising pores or porosity (in % of surface area) for each of 7 SEM images measured for FIG. 15 on the vertical axis and a horizontal axis representing the corresponding pore size for a given % pore area in microns. Within a given image, the total area comprising porosity and the total image measurement area were used to calculate the % pore area. As depicted in FIG. 16, the measurements across 7 SEM images correspond to an at least one first layer 100 having a plasma facing surface 106 comprising YAG comprising porosity in a percent of total area in an amount of from 0.0005 to 2%, preferably from 0.0005 to 1%, preferably from 0.0005 to 0.5%, preferably from 0.0005 to 0.05%, preferably from 0.0005 to 0.03%, preferably from 0.0005 to 0.005%, preferably from 0.0005 to 0.003%, preferably from 0.0005 to 0.001%, preferably from 0.005 to 2%, preferably from 0.05 to 2%, preferably from 0.5 to 2%, preferably from 0.005 to 2%, preferably from 0.005 to 1%, preferably from 0.05 to 2%, preferably from 0.05 to 1%, preferably from 0.5 to 2% as measured from SEM images and using ImageJ software and methods as disclosed herein. Thus, across an image of area about 54 $\mu m \times 54$ $\mu m$, the multilayer sintered ceramic bodies as disclosed herein comprise a plasma facing surface 106 comprising porosity in very low (<1% by total area) percentages, thus providing a corrosion and erosion resistant surface of the multilayer sintered ceramic body 98 for use in plasma processing chambers.

The small pore/void maximum size and minimal % area of porosity of the at least one first layers 100 comprising YAG of the multilayer sintered bodies may enable reductions in particle generation and corrosion and erosion as required for use in semiconductor reactors. This minimal porosity corresponds to a high density, which also provides resistance to the corrosive and erosive properties to enable their use as components in semiconductor etch and deposition applications.

FIG. 23a) illustrates an SEM micrograph at 500× of a nonlinear interface 104 of the multilayer sintered ceramic body wherein the interface defined by the at least one second layer 102 and the at least one first layer 100 is an irregular, nonlinear boundary which in embodiments may comprise retrograde angles. In some embodiments as depicted in FIG. 23a), the interface may comprise at least one dovetail structure and/or at least a portion of a dovetail structure. In other embodiments at least a portion of the interface may comprise a trapezoidal shape. The tortuosity (T) as disclosed herein, is defined mathematically as the ratio of the length of the curve, C to the linear distance between its ends, L, whereby $T=C/L$. The image of FIG. 23a) was measured to have a tortuosity of 2.7. The nonlinear interface 104 as disclosed herein may have a tortuosity, T, of from greater than 1.02 to about 1.5, preferably from greater than 1.02 to about 2.0, preferably from greater than 1.02 to about 2.5, preferably from greater than 1.02 to about 3.0, preferably from 1.1 to about 3.0, preferably from 1.3 to about 3.0, preferably from 1.5 to 2.7, as measured using SEM and image processing methods (measurements within ImageJ software) as disclosed herein. A straight-line interface (as is typical of laminates and structures using pre-sintered bodies onto which layers are applied) has a tortuosity of about 1 or 1.02. The increased tortuosity of the nonlinear interface 104 (defined by the at least one first and second layers) of the multilayer bodies as disclosed herein provides an interlocking effect between layers, thereby increasing adhesion strength such that a unitary, multilayer ceramic sintered body is formed.

FIG. 23b) depicts an interface line (IL) of the nonlinear interface 104 as calculated from SEM and image processing methods. As depicted, exemplary SEM images depicting nonlinear interface 104 were imported into ImageJ software, and x/y coordinates corresponding to points along the interface were used to obtain the linear equation of the interface line (IL) as shown in FIG. 23b) and the nonlinear interface 104 was characterized by a distance of the nonlinear interface 104 from the interface line (IL). A distance (D) of the nonlinear interface 104 from the interface line (IL) varies in amount of from 10 to 100 $\mu m$, preferably from 20 to 100 $\mu m$, preferably from 30 to 100 $\mu m$, preferably from 40 to 100 $\mu m$, from 50 to 100 $\mu m$, preferably from 25 to 85 $\mu m$ as measured using SEM and image processing. Increased distance (D) from the interface line (IL) may contribute to the enhanced adhesion and interlocking effect of the multilayer sintered ceramic bodies as disclosed.

These reverse or retrograde angles, characteristics and structures may provide an anchoring effect thereby increasing interfacial and tensile strength and bonding across the nonlinear interface 104 defined by the at least one second layer 102 and the at least one first layer 100.

FIG. 24a) and b) illustrates SEM images depicting characteristics of the nonlinear interface 104 between the at least one first layer 100 and the at least one second layer 102 wherein a straight-line length between ends (L) is about 54 μm, and the measured interfacial length or curve (C) along nonlinear interface 104 is about 90 μm, as depicted in the exemplary image of FIG. 24b). The tortuosity according to FIG. 24b) using the calculations as disclosed herein is 1.7. Measurements were taken across 9 SEM images using ImageJ software analysis as disclosed herein. An average interfacial length of about 90 μm was measured, representing about a 66% increase in interfacial length (C) relative to the linear distance (L). Thus, disclosed herein is a multilayer sintered ceramic body having a nonlinear interface 104 defined by the at least one second layer and the at least one first layer wherein the interfacial length is increased by from 20 to 70%, preferably from 20 to 60%, preferably from 20 to 40%, preferably from 30 to 80%, preferably from 40 to 80%, preferably from 50 to 70%. Correspondingly, the at least one second layer 102 and the at least one first layer 100 may contact one another at an interface commensurate in interfacial area to the greatest dimension of the multilayer sintered ceramic body. For unitary, multilayer sintered bodies having greatest dimensions of from 100 to about 625 mm, the at least one second layer 102 and the at least one first layer 100 contact one another at a nonlinear interface 104 having an area of about 3,117 cm$^2$, preferably about 3,068 cm$^2$ and less, preferably 2,919 cm$^2$ and less, preferably from 78 to about 3,117 cm$^2$, preferably from 78 to about 3,068 cm$^2$, preferably from 78 to 2,919 cm$^2$, preferably from 78 to 1,963 cm$^2$, preferably from 78 to 1,257 cm$^2$, preferably from 78 to 707 cm$^2$, preferably from 78 to 314 cm$^2$, preferably from 314 to about 3,117 cm2, preferably from 314 to about 3,068 cm$^2$, preferably from 314 to 2,919 cm$^2$, preferably from 314 to 1,963 cm$^2$, preferably from 314 to 1,257 cm$^2$, preferably from 707 to about 3,068 cm$^2$, preferably from 1257 to 3,039 cm$^2$. In embodiments, it is preferable that the first and second layers are in direct contact, forming nonlinear interface 104, and thus the at least one first and second layers are contiguous layers. In other embodiments, circuitry, heating elements, RF coils/RF antennae and the like may be disposed between first and second layers as required by the specific component application, and irrespective of these features, first and second layers may be contiguous or substantially contiguous. This increased interfacial length and interfacial area will enhance adhesion at the nonlinear interface 104 between the at least one first layer 100 and the at least one second layer 102.

The number of grains in contact across the interface may also play a role in adhesion and strength characteristics of nonlinear interface 104. The number of grains were counted across an interface length to obtain the number of grains per μm. FIG. 25a) illustrates the number of grains per interface length in μm of the interface defined by the at least one first layer 100 and the at least one second layer 102 across 10 images, with smaller numbers of grains per micron preferable. In embodiments, the number of grains per micron comprises from 0.2 to 0.8 grains per μm, preferably from 0.3 to 0.6 grains per μm, preferably from 0.4 to 0.55 grains per micron for a multilayer sintered ceramic body comprising YAG as an at least one first layer and an at least one second layer of about 16% by volume of zirconia in an alumina matrix. FIG. 25b) depicts the ratio of interface length to the linear measurement (also defined herein as the tortuosity, T) across the image as disclosed, of about 54 μm. Higher ratios of interface length to linear interface length (tortuosity, T) are preferable to increase adhesion strength between the at least one first 100 and second layers 102.

Surface roughness measurements were performed using a Keyence 3D laser scanning confocal digital microscope model VK-X250X under ambient conditions in a class 1 cleanroom. The microscope rests on a TMC tabletop CSP passive benchtop isolator with 2.8 Hz Natural Frequency. This non-contact system uses laser beam light and optical sensors to analyse the surface through reflected light intensity. The surface roughness parameters Sa, Sdr and Sz are well-known in the underlying technical field and, for example, described in ISO standard 25178-2-2012. Sa represents an average roughness value calculated across a user-defined area of a surface of the multilayer sintered ceramic body (arithmetical mean height of the scale limited surface). Sz represents the maximum peak-to-valley distance across a user-defined area of a surface of the multilayer sintered ceramic body (maximum height, peak to valley, of the scale-limited surface). Sdr is a calculated numerical value defined as the "developed interfacial area ratio" and is a proportional expression for an increase in actual surface area beyond that of a completely flat surface. A flat surface is assigned an Sdr of zero, and the value increases with the slope of the surface. Sa values of from 0.0005 to 2 μm, preferably from 0.0005 to 1.5 μm, preferably from 0.0005 to 1 μm, preferably from 0.0005 to 0.75 μm, preferably from 0.0005 to 0.5 μm, preferably from 0.0005 to 0.25 μm, preferably from 0.0005 to 0.125 μm, preferably from 0.0005 to 0.075 μm, preferably from 0.0005 to 0.050 μm, preferably from 0.0005 to 0.025 μm, preferably from 0.0005 to 0.020 μm, preferably from 0.0005 to 0.015 μm, preferably from 0.0005 to 0.010 μm, preferably from 0.001 to 0.030 μm, preferably from 0.001 to 0.020 μm, preferably from 0.001 to 0.010 μm, across a plasma facing surface 106 of the at least one first layer 100 comprising YAG were measured. The peak to valley, or Sz, across a plasma facing surface 106 of the at least one first layer 100 comprising YAG was measured to be from 0.3 to 5 μm, preferably from 0.3 to 4 μm, preferably from 0.3 to 3 μm, preferably from 0.3 to 2 μm, preferably from 0.3 to 1 μm, preferably from 0.65 to 5 μm, preferably from 1 to 5 μm, preferably from 2 to 5 μm, preferably from 0.35 to 3 μm, preferably from 0.5 to 1 μm, and a plasma facing surface 106 of the at least one first layer 100 may have a developed interfacial area, Sdr of from $5 \times 10^{-5}$ to $550 \times 10^{-5}$, preferably from $30 \times 10^{-5}$ to $400 \times 10^{-5}$, preferably from $30 \times 10^{-5}$ to $200 \times 10^{-5}$, preferably from $40 \times 10^{-5}$ to $100 \times 10^{-5}$. Table 6 lists surface roughness results in accordance with this example.

The multilayer sintered ceramic body according to this embodiment comprising at least one second layer (comprising about 16% of partially stabilized zirconia by volume and the balance alumina) is CTE matched to the at least one first layer comprising YAG as depicted in FIG. 9c). An absolute value of the difference in CTE between the at least one first and second layers was measured (using dilatometry methods as performed in accordance with ASTM E228-17) to be about $0.27 \times 10^{-6}/°$ C. and less (a percentage difference of about 2% and less relative to the CTE of at least one first layer) across a temperature range of from ambient to about 1700° C. (or at least from about 200° C. to about 1400° C. as depicted in the figures).

Example 3: Plasma Resistant at Least One First Layers Comprising Stoichiometric YAG and Variations Exemplary at least one first layers 100 comprising YAG and variations thereof were made in accordance with methods and materials as disclosed in accordance with aspects of Example 2 and Table 7. The starting powders and methods for powder combining are as disclosed in accordance with Example 2. The at least one first layers comprising YAG (and variations as disclosed) were formed using the sintering pressure, temperature and time conditions as listed in Table 6.

Stoichiometric YAG and variations (excess alumina, zirconia doped and reduced density) were subjected to halogen-based plasma processing in order to analyse corrosion and erosion performance.

A two-step etch process was conducted, having a pressure of 10 millitorr, a bias of 600 volts and ICP power of 2000 watts, with a first etch step having a $CF_4$ flow rate of 90 standard cubic centimetres per minute (sccm), an oxygen flow rate of 30 standard cubic centimetres per minute (sccm), an argon flow rate of 20 standard cubic centimetres per minute (sccm), and a second etch step having an oxygen flow rate of 100 standard cubic centimetres per minute (sccm) and an argon flow rate of 20 standard cubic centimetres per minute (sccm), wherein first and second etch steps are performed for 300 seconds each and repeated for a combined duration of 6 hours.

Upon completion of the etch procedure, surface feature parameters of Sa, Sz and Sdr were measured according to ISO standard 25178-2-2012 as listed in Table 6. Stoichiometric YAG, YAG having excess alumina (0.25% and 0.5%), and slightly reduced density YAG each had an Sa (after plasma processing) that was the same as, or substantially the same as that measured prior to plasma exposure.

Zr doped YAG, YAG having excess alumina (0.25%), and slightly reduced density YAG each had an Sz (after plasma processing) that was substantially the same as that measured prior to plasma exposure.

Stoichiometric YAG, YAG having excess alumina (0.25% and 0.5% by volume) and Zr doped YAG each had an Sdr (after plasma processing) that was substantially the same as that measured prior to plasma exposure.

Other features of Sa, Sz and Sdr are as disclosed in accordance with this example as are listed in Table 6. The at least one first layer comprising YAG as disclosed herein provides a surface which is resistant to the corrosive and erosive effects of halogen based plasmas.

Example 4: Multilayer Sintered Ceramic Body Comprising a High Density YAG First Layer A multilayer sintered ceramic body having 0.5% by volume excess alumina was formed. A first powder mixture comprised alumina and yttria combined in ratios to form an at least one first layer 100 comprising YAG as disclosed herein with 0.5% by volume excess alumina.

The alumina and yttria powders forming the first powder mixture according to this example are as disclosed according to Example 2 with the addition of 0.5% by volume of excess alumina added to the powder mixture forming the at least one first layer comprising polycrystalline YAG.

Combining and calcining the alumina and yttria powders to make the first powder mixture was performed as disclosed according to Example 2.

The second powder mixture was formed using the powders and methods for combination in accordance with Example 2.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume.

Disposing the at least one first and at least one second calcined powder mixtures inside the volume defined by the tool set typically results in intermixing of the first and second calcined powder mixtures, thereby creating a non-linear interface between the at least one first and second layers upon sintering.

The layers of the first and second calcined powder mixtures were co-compacted by applying a pressure of 15 MPa and sintered at a temperature of 1625° C. for 60 minutes to form a multilayer sintered ceramic body having a greatest dimension of about 625 mm.

Density measurements were performed on the multilayer sintered ceramic body in accordance with this example by sectioning a sample cut from the full thickness of the multilayer sintered body into its respective layers and performing density measurements on each layer separately. Measurements were performed in accordance with the Archimedes immersion method of ASTM B962-17, and a density of about 4.57 g/cc was measured for the YAG at least one first layer 100. Density values as reported are for an average across 5 measurements. A commercially available, single crystal sample of bulk YAG was measured for density using the methods as disclosed herein. An Archimedes density of 4.56 g/cc across 5 measurements was obtained and this value is taken as the theoretical density of YAG as used herein. As such, the at least one first layer 100 comprising YAG of the multilayer sintered ceramic body has a theoretical density of from 99 to 100%, preferably from 99.5 to 100%, preferably from 99.7 to 100%, preferably about 100% relative to f the theoretical density of YAG.

The at least one second layer 102 comprising about 16% by volume of partially stabilized zirconia (and the balance alumina) was measured for density using the same methods, and a density of about 4.32 g/cc was calculated. Due to the zirconia and alumina comprising separate crystalline phases, the volumetric mixing rule as known in the art may be used to calculate a theoretical density of ZTA comprising about 16% by volume of zirconia. A density of 4.32 was measured and taken as the theoretical density of the at least one second layer 102 comprising about 16 volume % of partially stabilized zirconia. As such, the at least one second layer 102 of the multilayer sintered ceramic body comprising about 16% by volume of zirconia has a percent of theoretical density of from 99 to 100%, preferably from 99.5 to 100%, preferably about 100% of that of the theoretical density.

The multilayer sintered ceramic body as disclosed in accordance with this example has a very high density (about 100% of theoretical density, also expressed as relative density), which in embodiments may be greater than 99%, preferably from 99 to 100%, preferably from 99.5 to 100%, preferably from 99.8 to 100%, preferably about 100% of the theoretical density of the unitary, multilayer sintered ceramic body comprising at least one first and second layers. Thus, the unitary, multilayer sintered ceramic body comprises at least one first layer comprising YAG having greater than 99% of theoretical density, and further comprises at least one second layer comprising alumina and about 16 volume % partially stabilized zirconia (ZTA) having greater than 99% of theoretical density of the at least one second layer.

The multilayer sintered ceramic body according to this example comprising at least one second layer (comprising about 16% of partially stabilized zirconia by volume and the balance alumina) is preferably CTE matched to the at least one first layer comprising YAG as depicted in FIG. 9c). An absolute value of the difference in CTE between the at least one first and second layers was measured (using dilatometry methods as performed in accordance with ASTM E228-17) to be about $0.27 \times 10^{-6}/°$ C. and less (a percentage difference of about 2% and less relative to the CTE of at least one first layer) across a temperature range of from ambient to about 1700° C. (or at least from about 200° C. to about 1400° C. as depicted in the figures).

Example 5: Unitary, Multilayer Sintered Ceramic
Body Comprising at Least One First Layer
Comprising at Least One Crystalline Phase of
Yttria and 20 Mol % Zirconia, and at Least One
Second Layer Comprising Zirconia Toughened
Alumina (ZTA)

A multilayer sintered ceramic body was formed from first and second powder mixtures. The first powder mixture comprised zirconia and yttria combined in amounts to form at least one first layer comprising at least one crystalline phase of 80 mol % yttria and 20 mol % zirconia. The second powder mixture comprised alumina and partially stabilized zirconia (the partially stabilized zirconia as disclosed according to Example 1) in ratios to form a zirconia toughened aluminum oxide (ZTA) second layer (comprising about 16% by volume of zirconia) as disclosed herein.

The first powder mixture comprised a partially stabilized zirconia powder (stabilization by about 3 mol % yttria in zirconia) having a surface area of from 6 to 8 $m^2/g$, a d10 particle size of from 0.5 to 0.2 μm, a d50 particle size of from 0.2 to 0.5 μm, and a d90 particle size of from 1.2 to 3 μm, and a yttria powder having a specific surface area of 2 to 3 $m^2/g$, a d10 particle size of from 2 to 4 μm, a d50 particle size of from 6 to 8 μm and a d90 particle size of from 11 to 13 μm. Reaction of the zirconia and yttria powders to form at least one crystalline phase makes it possible to use any zirconia powder, without the need for stabilization of the tetragonal/monoclinic phase transformation that occurs with phase pure zirconia. As such, the zirconia powder to form the at least one first layer may comprise any one of or combinations of unstabilized, partially stabilized and stabilized zirconia. Total impurity content of the zirconia and yttria powders was from about 2 to 10 ppm. Use of ICPMS methods as disclosed herein to detect lighter elements such as Ca, Li and Mg may be done within a confidence of about 2 ppm and greater. Ca, Li and Mg were not detected (using ICPMS methods as disclosed herein) in the yttria and zirconia powders and as such, the yttria and zirconia powders comprise about 2 ppm or less of Ca, Li and Mg, in the form of calcia, lithia or lithium fluoride and magnesia. Si was not detected in the yttria and zirconia powders and as such, the yttria and zirconia powders comprise about 14 ppm or less of Si in the form of silica (according to the ICPMS methods as disclosed). The powders were combined in ratios to form at least one first layer comprising at least one crystalline phase comprising 20 mol % zirconia and the balance yttria upon sintering. Combining the partially stabilized zirconia and yttria powders to make the first powder mixture was performed using wet ball milling wherein 3 mol % yttria stabilized zirconia media was used at about 90% loading relative to powder weight. A slurry was formed at about 40 volume % by adding ethanol. The slurry was milled for about 12 hours at an RPM of 150 and thereafter dried, tumbled, and sieved according to methods known to those skilled in the art to form the first powder mixture. The first powder mixture was calcined at 850° C. for 6 hours. The first calcined powder mixture had a specific surface area of from 2 to 4 $m^2/g$, and a d50 particle size of from about 5 to 10 μm. The first calcined powder mixture had total impurities of about 8 ppm and comprised about 14 ppm (or less) of Si, in the form of silica and may be sieved, tumbled, blended, etc. as known to those skilled in the art.

The second powder mixture comprised alumina and partially stabilized zirconia (partially stabilized zirconia as disclosed in accordance with Example 1) to form the at least one second layer as disclosed herein. The second powder mixture comprised an alumina powder wherein the alumina powder has a specific surface area of from 6 to 8 $m^2/g$, a d10 particle size of from 0.05 to 0.15 μm, a d50 particle size of from 0.2 to 0.5 μm, a d90 particle size of from 0.51 to 1 μm, and a partially stabilized zirconia (PSZ) powder having a surface area of from 6 to 8 $m^2/g$, a d10 particle size of from 0.08 to 0.2 μm, a d50 particle size of from 0.2 to 0.8 μm, and a d90 particle size of from 1.2 to 5 μm. Total impurity content of the alumina powder was from about 2 to 10 ppm. The zirconia powder comprised from about 2 to 4 mol % Hf and was stabilized with yttria in an amount of about 3 mol %. Hf and Y are not considered impurities in zirconia as disclosed herein. Excluding Hf and Y, the zirconia powder had total impurities of about 20 ppm. Use of ICPMS to detect lighter elements such as Si may be done within a confidence of about 14 ppm and greater. Use of ICPMS to detect lighter elements such as Mg, Ca and Li may be done within a confidence of about 2 ppm and greater. Mg, Ca and Li were not detected (using ICPMS methods as disclosed herein) in the zirconia and alumina powders and as such, the zirconia and alumina powders comprise about 2 ppm (or less) of Mg, Ca and Li in the form of magnesia, calcia and lithia or lithium fluoride.

The powders were combined in ratios to form at least one second layer comprising about 16% by volume of zirconia and the balance alumina upon sintering. Combining the alumina and zirconia powders to make the second powder mixture was performed using the conventional powder preparation techniques of wet ball milling wherein high purity (>99.99%) alumina media was used at about 75 to 80% loading relative to powder weight. A slurry was formed at about 40 volume % by adding ethanol. The slurry was ball milled for about 20 hours at an RPM of about 150 and thereafter dried, tumbled, and sieved according to methods known to those skilled in the art to form the second powder mixture. The second powder mixture was calcined at 900° C. for 6 hours. The second calcined powder mixture had a specific surface area of from 5 to 7 $m^2/g$. The second calcined powder mixture had total impurities of about 15 ppm and comprised about 14 ppm or less of Si, in the form of silica and may be sieved, tumbled, blended, etc. as known to those skilled in the art.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume.

Disposing the at least one first and at least one second calcined powder mixtures inside the volume defined by the tool set typically results in intermixing of the first and second calcined powder mixtures, thereby creating a non-linear interface between the at least one first and second layers upon sintering.

The layers of the first and second calcined powder mixtures were co-compacted by applying a pressure of 15 MPa and sintering at a temperature of 1500° C. for 45 minutes to form a multilayer sintered ceramic body having a greatest dimension of 150 mm. Density was measured for an exemplary, composite oxide sintered body comprising 16% by volume of zirconia and the balance alumina, and the density was measured to be 4.319 g/cc, corresponding to nearly 100% of theoretical density (as calculated using the volumetric mixing rule as known to those skilled in the art).

The multilayer sintered ceramic body according to this example, comprising at least one second layer of about 16% zirconia by volume and the balance alumina, is preferably closely CTE matched to the at least one first layer comprising at least one crystalline phase of 80 mol % yttria and 20 mol % zirconia (in accordance with embodiments as depicted in FIG. 20a). An absolute value of the difference in CTE between the at least one first and second layers was measured (using dilatometry methods as performed in accordance with ASTM E228-17) to be about $0.48 \times 10^{-6}$/° C. and less (a percentage difference of about 6.5% and less relative to the CTE of at least one first layer) across a temperature range of from ambient to about 1700° C. (or at least from about 200° C. to about 1400° C. as depicted in the figures).

Example 6: Multilayer Sintered Ceramic Body Comprising at Least One First Layer of at Least One Crystalline Phase of Yttria and 20 Mol % Zirconia, and a Second Layer of Zirconia Toughened Alumina (ZTA)

A multilayer sintered ceramic body was formed from first and second powder mixtures. The first powder mixture comprised zirconia and yttria combined in amounts to form an at least one first layer comprising at least one crystalline phase of 80 mol % yttria and 20 mol % zirconia as disclosed herein. The second powder mixture comprised alumina and partially stabilized zirconia (the partially stabilized zirconia as disclosed according to Example 1) in ratios to form a zirconia toughened aluminum oxide (ZTA) second layer (comprising about 16% by volume of partially stabilized zirconia) as disclosed herein.

The starting powders of yttria, zirconia and alumina comprising the first and second powder mixtures are as disclosed in accordance with Example 5.

Combining the zirconia and yttria powders to make the first powder mixture was performed using tumble (or vertical/end-over-end) mixing as known to those skilled in the art, wherein high purity (>99.9%) alumina media was used at from about 80% to about 100% loading relative to powder weight. A slurry was formed at from about 35% to about 45% by slurry weight by adding ethanol. The slurry was mixed for about 20 hours at an RPM of about 20, and thereafter dried, tumbled, and sieved according to methods known to those skilled in the art to form the first powder mixture. The first powder mixture was calcined at 850° C. for 6 hours and sieved, tumbled, blended, etc. as known to those skilled in the art.

Combining the alumina and partially stabilized zirconia powders to form the second powder mixture (and subsequently form the at least one second layer) was performed in accordance with Example 2. Calcination was performed at 850° C. for 6 hours in an oxygen containing environment.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume.

Disposing the at least one first and at least one second calcined powder mixtures inside the volume defined by the tool set typically results in intermixing of the first and second calcined powder mixtures, thereby creating a non-linear interface between the at least one first and second layers upon sintering.

The layers of the calcined powder mixtures were co-compacted by applying a pressure of 15 MPa to the layers of first and second calcined powder mixtures while heating to a sintering temperature of 1600° C. for a duration of 60 minutes to perform sintering, and form a unitary, multilayer sintered ceramic body having a greatest dimension of about 575 mm.

FIG. 21a) illustrates an SEM image showing a non-linear interface 104 of the unitary, multilayer sintered ceramic body 98 according to this example wherein the first layer 100 comprises at least one crystalline phase of a ceramic material comprising yttria and zirconia wherein the zirconia is partially stabilized and comprises about 3 mol % yttria and is present in an amount of about 20 mol % and the balance yttria. In embodiments, the at least one first layer 100 may comprise a reaction layer 108 contiguous with the at least one second layer 102 wherein the at least one second layer 102 and the reaction layer 108 form a border comprising the nonlinear interface 108. As may be viewed in the SEM results of FIG. 21, the reaction layer is highly dense, having minimal porosity (in an amount of <1% by area). The reaction layer 108 may have a thickness of from 10 to 30 μm, preferably from 15 to 30 μm, preferably from 20 to 30 μm, preferably from 25 to 30 μm, preferably about 20 μm as measured from SEM imaging. Adhesion strength of the non-linear interface 104 may be enhanced by the reaction layer 108. In embodiments, the reaction layer 108 may comprise at least one crystalline phase selected from the group consisting of YAG, YAP, YAM, a cubic crystalline phase (comprising a solid solution of at least two of yttria, alumina and zirconia), and a fluorite crystalline phase (comprising a solid solution of at least two of yttria, alumina and zirconia) and combinations thereof. FIG. 21b) depicts a high density, sintered microstructure of an at least one first layer 100 comprising about 20 mol % zirconia and the balance yttria. A nearly fully dense microstructure is depicted, having minimal porosity.

The multilayer sintered ceramic body according to this example comprising at least one second layer (comprising about 16% of partially stabilized zirconia by volume and the balance alumina as disclosed in Example 1) is preferably CTE matched to the at least one first layer comprising at least one crystalline phase of 80 mol % yttria and 20 mol % zirconia as depicted in FIG. 20a). An absolute value of the difference in CTE between the at least one first and second layers was measured (using dilatometry methods as performed in accordance with ASTM E228-17) to be about $0.48 \times 10^{-6}$/° C. and less (a percentage difference of about 6.5% and less relative to the CTE of at least one first layer) across a temperature range of from ambient to about 1700° C. (or at least from about 200° C. to about 1400° C. as depicted in the figures).

Example 7: At Least One First Layer Comprising
Polycrystalline YAG

A powder of yttria (purity about 99.9992% relative to
100% pure yttria) having a specific surface area of from
about 1 to 2 m²/g, a d10 particle size of from 3.5 to 6.5 μm,
a d50 particle size of from 7.5 to 10.5 μm and a d90 particle
size of from 15 to 20 μm, and a powder of alumina (purity
about 99.9998% relative to 100% pure alumina) having a
specific surface area of from 5 to 7 m²/g, a d10 particle size
of from 1 to 3 μm, a d50 particle size of from 3.5 to 6.5 μm
and a d90 particle size of from 50 to 70 μm were combined
in a molar ratio to form a first powder mixture which upon
sintering forms at least one first layer comprising the cubic,
yttrium aluminum garnet (YAG) phase. High purity alumina
media (≥99.9% as measured by ICPMS methods) was added
at about 100% loading by powder weight, and ethanol was
added in an amount of about 40% by combined weight of
ethanol and powder to form a slurry. Ball milling using an
axial rolling action about a horizonal axis at 150 rpm was
performed for a duration of 20 hours and thereafter the
ethanol was extracted from the powder mixture using rotary
evaporation according to known methods. Upon calcination
at 1050° C. for 6 hours in air, the calcined powder mixture
was measured to have a specific surface area of from 2 to 4
m²/g, a d10 particle size of from 1 to 4 μm, a d50 particle
size of from 3.5 to 6.5 μm and a d90 particle size of from 75
to 95 μm. The powders, powder mixture and/or calcined
powder mixture may be sieved using aperture sizes of from
45 to 400 μm, calcined, blended and/or milled at various
process steps according to methods known to those skilled
in the art. Purity was measured using ICPMS methods as
disclosed herein, and a total impurity content of the calcined
powder mixture of about 5 ppm relative to a total mass of the
oxides calculated from all constituents was measured, cor-
responding to a purity of 99.9995%. Purity limits and
impurity contents for the starting powders of yttria and
alumina, as well as the calcined powder mixtures as dis-
closed herein do not include Si. The detection limit using
ICPMS methods to measure purity as disclosed herein for Si
is about 14 ppm, thus the starting powders of yttria and
alumina as well as the calcined powder mixtures may
comprise Si in the form of silica at a detection level of about
14 ppm or less.

The calcined powder mixture was disposed inside a
volume defined by a tool set of a sintering apparatus as
disclosed herein, and vacuum conditions of from $10^{-2}$ to
$10^{-3}$ torr were created inside the volume.

A pressure of 5 MPa was applied, and the calcined powder
mixture inside the volume was heated from ambient tem-
perature at about 10° C./minute to 800° C., and thereafter
pressure was ramped at a rate of about 0.4 to about 0.6
MPa/minute and the temperature ramp was continued as
previously disclosed to reach the sintering conditions of
1500° C. and 20 MPa for 30 minutes to form a polycrys-
talline YAG sintered ceramic body. A portion of the
polycrystalline YAG sintered ceramic body was sintered
according to the same conditions and thereafter annealed in
air at 1400° C. for 8 hours in a furnace. Density measure-
ments were performed in accordance with ASTM B962-17
on the as-sintered and the annealed polycrystalline YAG
sintered ceramic body. Densities of 4.547 g/cc and 4.542
g/cc were averaged across 5 measurements for the as sin-
tered and annealed YAG sintered ceramic body samples,
respectively. This corresponds to 99.81% and 99.70% of the
theoretical density for YAG and corresponding volumetric porosity of 0.19% and 0.30% respectively, as calculated
from density measurements as disclosed herein.

Measurements of crystalline phase purity of the polycrys-
talline YAG sintered ceramic bodies were performed using
a combination of XRD, SEM imaging and use of image
processing software as disclosed herein. XRD was per-
formed using a PANanlytical Aeris model XRD capable of
crystalline phase identification to about +/−5% by volume,
thus the polycrystalline YAG sintered ceramic body in
accordance with this example was measured to comprise
YAG to an upper limit of about 95% by volume using XRD.
In order to determine the phase purity to greater accuracy,
for example up to and including about 99.8%, SEM images
were taken using backscatter detection (BSD) methods as
known to those skilled in the art. Using BSD, the YAG phase
appears grey, varying somewhat dependent upon grain ori-
entation, the aluminum oxide phase appears black, the
yttrium oxide phase appears white, and porosity, if present,
also appears black. Images were taken at 5000× using BSD
methods as known to those skilled in the art to identify the
YAG, alumina and yttria phases, and any porosity present as
depicted in FIG. 11a) corresponding to the polycrystalline
YAG sintered ceramic body. In order to differentiate
between black regions comprising alumina and those com-
prising porosity, the BSD image was black and white
thresholded using ImageJ processing software to highlight
regions which may comprise either porosity or alumina as
depicted for the same region in FIG. 11b). ImageJ has been
developed at the National Institute of Health (NIH), USA,
and is a Java-based public domain image processing and
analysis program for image processing of scientific multi-
dimensional images. The BSD detector as used for mea-
surements disclosed herein has further capability to measure
topographic features, thereby highlighting any deviations in
the surface topography, such as porosity. Using the topo-
graphic mode of the BSD detector, images were taken at
5000× across a surface of the same region of the polycrys-
talline YAG sintered ceramic body of FIG. 11a) and the
topographic images are shown in FIG. 12a). Regions com-
prising porosity were highlighted as illustrated in FIG. 12b)
after thresholding in ImageJ. The area comprising porosity
within the topographic image of FIG. 12b) was thereafter
subtracted from the area comprising alumina and/or porosity
in the BSD images of FIG. 11b), providing the % area, and
thereby % by volume, comprising alumina in the sintered
ceramic body corresponding to the polycrystalline YAG
sintered ceramic body. The combination of these analytical
tools and methods may provide for the determination of
phase purity to about +/−0.1% by volume. Using the dis-
closed methods of Archimedes density measurements, XRD,
SEM imaging and image analysis software, the polycrystal-
line YAG sintered ceramic body in accordance with this
example may comprise about 0.2% by volume of the alu-
mina phase, about 0.19% of volumetric porosity, and about
99.6% by volume of the YAG phase. The polycrystalline
YAG sintered ceramic body according to this example may
comprise an integral body as made according to the process
disclosed herein, and thus may comprise the YAG phase, an
aluminum oxide phase and volumetric porosity distributed
on a surface and throughout the body. In other words, a
structure measured on a surface is representative of a struc-
ture within a volume of the bulk sintered ceramic body.
Thus, the polycrystalline YAG sintered ceramic bodies com-
prising the YAG phase in amounts from 90 to 99.8%,
preferably from 90 to 99.6%, preferably from 90 to 99.4%,
preferably from 95 to 99.8% by volume, preferably from 95
to 99.6%, preferably from 95 to 99.4%, each by volume, may be formed using the materials and methods as disclosed herein. Accounting for measurement variance, the polycrystalline YAG sintered ceramic bodies comprising the YAG phase in amounts as specified herein may further comprise porosity in an amount by volume of from 0.1 to 0.3%, and aluminum oxide in an amount by volume of from 0.1 to about 0.3%.

Example 8: Layer Machineability

A three-layer sintered ceramic body was prepared as disclosed herein. The outer corrosion layer was YAG, the second layer (i.e., support layer) was ZTA, and the third layer was 51% YAG and 49% ZTA mixture ("the YAG/ZTA layer").

A 5.6-inch-long piece of the sintered ceramic body was cut from a larger piece for this experiment. 0.400 inches of thickness of this piece were ground away using a diamond wheel from Continental Diamond Tool Corporation. At the start of the grinding process, the diamond wheel had a diameter of 2.574 inches. After the grinding process, the portion of the diamond wheel facing the ZTA layer had a diameter of 2.535 inches. Specifically, 0.039 inches of the diamond wheel had been consumed grinding the ZTA layer. The process involved passing the diamond wheel back and forth along the length of the part until 0.400 inches had been ground way.

The portion of the diamond wheel facing the YAG/ZTA layer, had a diameter of 2.544 inches. Accordingly, only 0.030 inches of the diamond wheel had been consumed in grinding the YAG/ZTA layer, compared to the 0.039 inches consumed by the ZTA layer. A total of 55 minutes of grinding was required to remove the 0.400 inches of the sintered ceramic body.

Based on wear of the diamond wheel, the YAG/ZTA layer is significantly easier to machine. In the same test, only 0.001 inches of the diamond wheel facing the YAG layer had been consumed. Thus, the YAG layer is the easiest layer to machine.

A number of embodiments have been described as disclosed herein. Nevertheless, it will be understood that various modifications may be made without departing from the spirit and scope of the embodiments as disclosed herein. Accordingly, other embodiments are within the scope of the following claims.

What is claimed is:

1. A multilayer sintered ceramic body comprising: at least one first layer comprising poly-crystalline YAG, wherein the at least one first layer comprising poly-crystalline YAG comprises pores wherein the pores have a maximum size of from 0.1 to 5 µm, at least one second layer comprising alumina and zirconia wherein the zirconia comprises at least one of stabilized and partially stabilized zirconia, and at least one third layer comprising at least one selected from the group consisting of YAG, alumina, and zirconia, wherein the at least one second layer is disposed between the at least one first layer and the at least one third layer, wherein an absolute value of the difference in coefficient of thermal expansion (CTE) between any of the at least one first, second and third layers is from 0 to $0.75 \times 10^{-6}/°$ C. as measured in accordance with ASTM E228-17, and wherein the at least one first, second and third layers form a unitary sintered ceramic body.

2. The multilayer sintered ceramic body of claim 1 wherein the absolute value of the difference in coefficient of thermal expansion between any of the layers is from 0 to $0.7 \times 10^{-6}/°$ C.

3. The multilayer sintered ceramic body of claim 1 wherein the absolute value of the difference in coefficient of thermal expansion (CTE) between any of the at least one first, second, and third layers is maintained throughout a temperature range of from 200 to 1400° C.

4. The multilayer sintered ceramic body of claim 1 wherein the at least one first layer has a density of from 4.47 to 4.56 g/cc, as measured according to ASTM B962-17.

5. The multilayer sintered ceramic body of claim 1 wherein the at least one first layer has an Sa of from 0.0005 to 2 µm as measured according to ISO standard 25178-2-2012 or an Sz of from 0.3 to 5 µm as measured according to ISO standard 25178-2-2012.

6. The multilayer sintered ceramic body of claim 1 wherein the at least one second layer comprises zirconia in an amount by volume of from 10 to 30% relative to a volume of the at least one second layer.

7. The multilayer sintered ceramic body of claim 1 wherein the at least one second layer comprises partially stabilized zirconia.

8. The multilayer sintered ceramic body of claim 1 having a greatest dimension of from 100 to about 625 mm.

9. The multilayer sintered ceramic body of claim 1 wherein the at least one second layer comprises about 16% by volume of zirconia relative to a volume of the at least one second layer.

10. The multilayer sintered ceramic body of claim 1 wherein the at least one first layer comprises poly crystalline YAG in an amount by volume of from 98 to 99.9%, and the balance comprising at least one crystalline phase selected from the group consisting of aluminum oxide, yttrium oxide, YAM and YAP and combinations thereof as measured using XRD, SEM and image processing methods.

11. The multilayer sintered ceramic body of claim 1 wherein the at least one first layer comprising poly crystalline YAG comprises pores wherein the pores have a maximum size of from 0.1 to 1 µm as measured using SEM.

12. The multilayer sintered ceramic body of claim 1 wherein the at least one first layer comprising poly crystalline YAG has a cumulative pore distribution of from about 2 to about 800 $µm^2/mm^2$ as measured using SEM.

13. The multilayer sintered ceramic body of claim 1 wherein the at least one first layer comprising poly crystalline YAG has porosity by percentage of surface area of from 0.0005 to 2% as measured using SEM.

14. The multilayer sintered ceramic body of claim 1 wherein the at least one first layer comprising poly crystalline YAG has a total impurity content from 5 to 50 ppm relative to the mass of the at least one first layer as measured using ICPMS methods.

15. The multilayer sintered ceramic body of claim 1 wherein the at least one second layer has a density of from 4.19 to 4.46 g/cc as measured in accordance with ASTM B962-17.

16. The multilayer sintered ceramic of claim 1 wherein the at least one second layer comprises zirconia in an amount of 16% by volume and has a density of about 4.32 g/cc as measured in accordance with ASTM B962-17.

17. The multilayer sintered ceramic body of claim 16 wherein the at least one second layer has a coefficient of thermal expansion (CTE) of from $6.98 \times 10^{-6}/°$ C. to $9.26 \times 10^{-6}/°$ C. throughout a temperature range of from 200° C. to 1400° C. as measured in accordance with ASTM E228-17.

18. The multilayer sintered ceramic body of claim 15 wherein the at least one second layer has a dielectric loss of $7 \times 10^{-4}$ and less at a frequency of 1 MHz at ambient temperature as measured in accordance with ASTM DI 50.

19. The multilayer sintered ceramic body of claim 1 wherein the at least one second layer has a total impurity content of from 5 to 200 ppm relative to the mass of the at least one second layer as measured using ICPMS methods.

20. The multilayer sintered ceramic body of claim 1 wherein the at least one first layer has a thickness d1, the at least one second layer has a thickness d2, and the at least one third layer has a thickness d3, wherein the thickness d2, of the at least one second layer is from 60% to 85% of the combined thicknesses of the at least one first, second and third layers.

21. A method of making a multilayer sintered ceramic body, the method comprising the steps of: a. combining powders comprising yttria and alumina to make a first powder mixture; b. combining alumina powder and at least one of partially stabilized and stabilized zirconia powder to make a second powder mixture; c. combining alumina powder, yttria powder and at least one of unstabilized, partially stabilized, and stabilized zirconia powder to make at least one third powder mixture; d. calcining at least one of the first, second, and third powder mixtures by applying heat to raise the temperature of at least one of the powder mixtures to a calcination temperature and maintaining the calcination temperature to perform calcination to form at least one of first, second, and third calcined powder mixtures; e. separately disposing the first, second, and third powder mixtures in an inner volume defined by a tool set of a sintering apparatus to form at least one layer of the first powder mixture, at least one layer of the second powder mixture, and at least one layer of the third powder mixture and creating vacuum conditions inside the volume, wherein the tool set comprises a die comprising a sidewall comprising an inner wall and an outer wall, wherein the inner wall has a diameter that defines the inner volume capable of receiving the powders; and an upper punch and a lower punch operably coupled with the die, wherein each of the upper punch and the lower punch have an outer wall defining a diameter that is less than the diameter of the inner wall of the die thereby defining a gap between each of the upper punch and the lower punch and the inner wall of the die when at least one of the upper punch and the lower punch are moved within the inner volume of the die, wherein the gap is from 10 μm to 100 μm wide; f applying pressure to the layers of the first, second, and third powder mixtures while heating to a sintering temperature and performing sintering to form the multilayer sintered ceramic body, wherein the at least one layer of the first powder mixture forms at least one first layer, the at least one layer of the second powder mixture forms at least one second layer, and the at least one layer of the third powder mixture forms at least one third layer; and g. lowering the temperature of the multilayer sintered ceramic body, wherein the at least one first layer comprises poly crystalline YAG, and the at least one second layer comprises alumina wherein the alumina comprises at least one of stabilized zirconia and partially stabilized zirconia, and the at least one third layer comprises yttria, alumina, and at least one of unstabilized zirconia, stabilized zirconia and partially stabilized zirconia, wherein the at least one second layer is disposed between the at least one first layer and the at least one third layer.

22. The method of claim 21 wherein the first, second and third powder mixtures have a combined total impurity content of 200 ppm and less as measured using ICPMS.

23. The method of claim 21 wherein the second powder mixture comprises partially stabilized or stabilized zirconia in an amount by weight of not less than 15% and not greater than 34% relative to the weight of the second powder mixture.

24. The method of claim 21 wherein the first, second and third powder mixtures are crystalline as determined by x ray diffraction methods.

25. The method of claim 21 wherein the second powder mixture comprises partially stabilized zirconia.

26. The method of claim 21 wherein the second powder mixture comprises partially yttria stabilized zirconia.

27. The method of claim 21 wherein the second powder mixture comprises 3 mol % partially yttria stabilized zirconia.

28. The method of claim 21 wherein a pressure applied to the at least one first, second and third layers of the first, second and third powder mixtures is from 5 MPa to 100 MPa.

29. The method of claim 21 wherein the temperature of the calcining step is from 600° C. to 1200° C.

30. The method of claim 21 wherein the sintering temperature is from 1000° C. to 1700° C.

31. The method of claim 21, further comprising the steps of: h. optionally annealing the multilayer sintered ceramic body by applying heat to raise the temperature of the multilayer sintered ceramic body to reach an annealing temperature, performing annealing; and i. lowering the temperature of the annealed multilayer sintered ceramic body.

32. The method of claim 21 further comprising the step of: j. machining the multilayer sintered ceramic body to create a multilayer sintered ceramic component in the shape of a window, a lid, a dielectric window, an RF window, a ring, a focus ring, a process ring, a deposition ring, a nozzle, an injector, a gas injector, a shower head, a gas distribution plate, a diffuser, an ion suppressor element, a chuck, an electrostatic wafer chuck (ESC), and a puck.

33. A multilayer sintered ceramic body made by the process of claim 31.

34. The multilayer sintered ceramic body of claim 33 having a greatest dimension of from 100 mm to about 625 mm.

* * * * *